United States Patent [19]
Katayama et al.

[11] Patent Number: 5,828,794
[45] Date of Patent: Oct. 27, 1998

[54] IMAGE PROCESSING METHOD AND APPARATUS FOR ENLARGING AND REDUCING IMAGE DATA

[75] Inventors: Akihiro Katayama; Yoshihiro Ishida, both of Kawasaki; Akihiro Yoshitani, Yokohama, all of Japan

[73] Assignee: Canon Kabushiki Kaisha, Tokyo, Japan

[21] Appl. No.: 636,629

[22] Filed: Apr. 23, 1996

Related U.S. Application Data

[60] Continuation of Ser. No. 285,444, Aug. 4, 1994, abandoned, which is a division of Ser. No. 124,479, Sep. 22, 1993.

[30] Foreign Application Priority Data

| Sep. 24, 1992 | [JP] | Japan | 4-254989 |
| May 7, 1993 | [JP] | Japan | 5-106643 |
| May 27, 1993 | [JP] | Japan | 5-126319 |

[51] Int. Cl.⁶ ............................................ G06T 3/40
[52] U.S. Cl. ............................ 382/298; 382/197; 358/451
[58] Field of Search .................................... 382/298, 299, 382/197, 199; 358/451, 455, 528; 345/131, 127; 395/139

[56] References Cited

U.S. PATENT DOCUMENTS

| 4,124,871 | 11/1978 | Morrin, II | 382/47 |
| 4,484,349 | 11/1984 | McCubbrey | 382/41 |
| 4,700,402 | 10/1987 | Okai et al. | 382/21 |
| 4,893,258 | 1/1990 | Sakuragi | 382/47 |
| 4,916,551 | 4/1990 | Lin et al. | 358/483 |
| 4,918,542 | 4/1990 | Nagashima et al. | 358/451 |
| 4,956,869 | 9/1990 | Miyatake et al. | 382/22 |
| 5,007,100 | 4/1991 | D'Aoust et al. | 382/27 |
| 5,070,531 | 12/1991 | Schuerman et al. | 382/47 |
| 5,093,870 | 3/1992 | Watanabe | 382/22 |
| 5,299,029 | 3/1994 | Moriya et al. | 382/47 |
| 5,309,524 | 5/1994 | Hirabayashi et al. | 358/451 |
| 5,317,652 | 5/1994 | Chatterjee | 382/304 |

FOREIGN PATENT DOCUMENTS

| 0422245 | 4/1991 | European Pat. Off. . |
| 0482862 | 4/1992 | European Pat. Off. . |
| 482862 | 4/1992 | European Pat. Off. . |
| 522877 | 1/1993 | European Pat. Off. . |
| 549351 | 6/1993 | European Pat. Off. . |
| 04157578 | 5/1992 | Japan . |
| 05020467 | 1/1993 | Japan . |
| 05174140 | 7/1993 | Japan . |
| 5-342340 | 12/1993 | Japan . |
| 06012490 | 1/1994 | Japan . |
| 6-4658 | 1/1994 | Japan . |

OTHER PUBLICATIONS

Patent Abstracts of Japan, vol. 015, No. 454 (E–1135) Nov. 19, 1991 & JP–A–03 195 188 (Seiko Epson Corp) Aug. 26, 1991.

Patent Abstracts of Japan, vol. 013, No. 580 (P–980) Dec. 21, 1989 & JP–A–01 243 188 (Meidensha Corp) Sep. 27, 1989.

(List continued on next page.)

*Primary Examiner*—Yon J. Couso
*Assistant Examiner*—Larry J. Prikockis
*Attorney, Agent, or Firm*—Fitzpatrick, Cella, Harper & Scinto

[57] ABSTRACT

An image processing apparatus is provided, including division means for dividing input image data into a plurality of areas. Enlargement/reduction means are provided for enlarging/reducing image data. First calculation means calculate a first image size as a sum of results from enlargement/reduction at first to i-th areas enlarged/reduced by the enlargement/reduction means at a designated enlargement/reduction ratio. Second calculation means calculate a second image size as a result from the enlargement/reduction at an image comprising the first to i-th areas at the designated enlargement/reduction ratio. Determination means determine an enlargement/reduction ratio of enlargement/reduction to be performed on the image comprising the first to i-th areas, based on the first image size and the second image size.

22 Claims, 113 Drawing Sheets

OTHER PUBLICATIONS

Matsumoto and Kobayashi: "Examination of Image Quality Evaluation in Facsimile Resolution Conversion," Journal of Society of Image Electronics, No. 5, pp. 354–362 (1983).

Imanaka and Semasa: "Improvement of Image Quality of Facsimile Receieved Image by Smoothing Processing," Draft of Annual Meeting of Society of Image Electronics No. 18, 1991.

Arai and Yasuda: "Examination of Facsimile Line Density Conversion," Journal of Society of Image Electronics, vol. 7, No. 1, pp. 11–18, 1978.

Patent Abstracts of Japan, vol. 009 No. 186 (P–377) Aug. 2, 1985 & JP–A–60 055 475 (Matsushita Denki Sangyo KK) Mar. 30, 1985.

Patent Abstracts of Japan, vol. 014, No. 050 (P–0998) Jan. 30, 1990 & JP–A–01 277 976 (Meidensha Corp) Nov. 8, 1989.

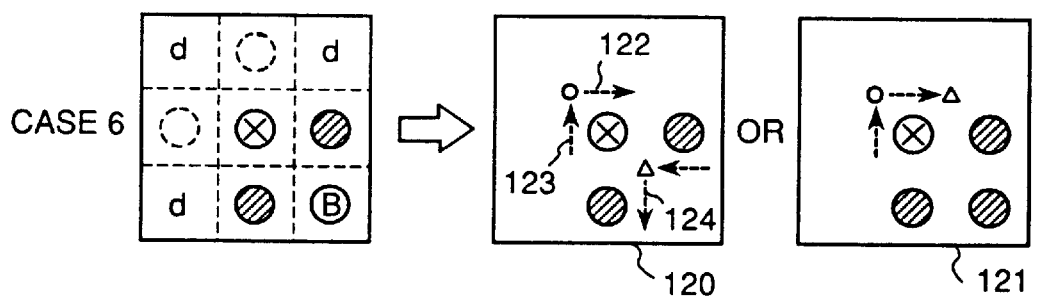
F I G. 12

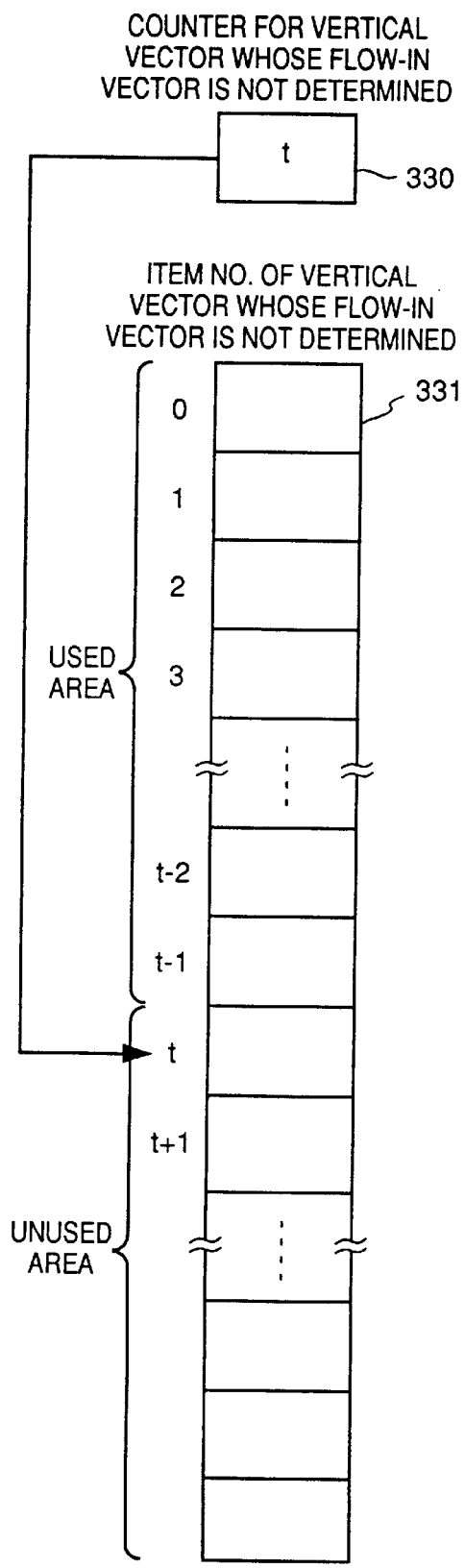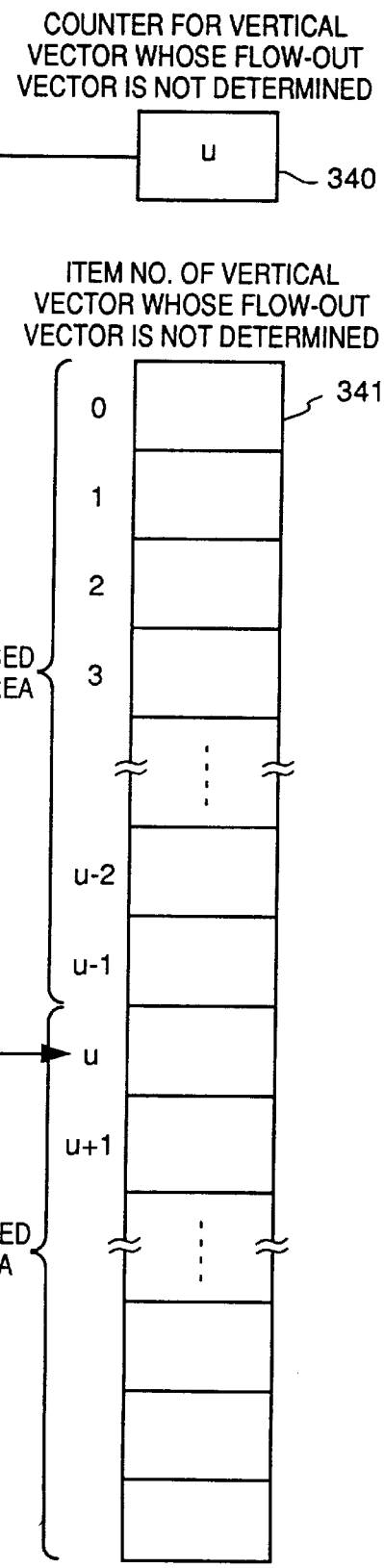

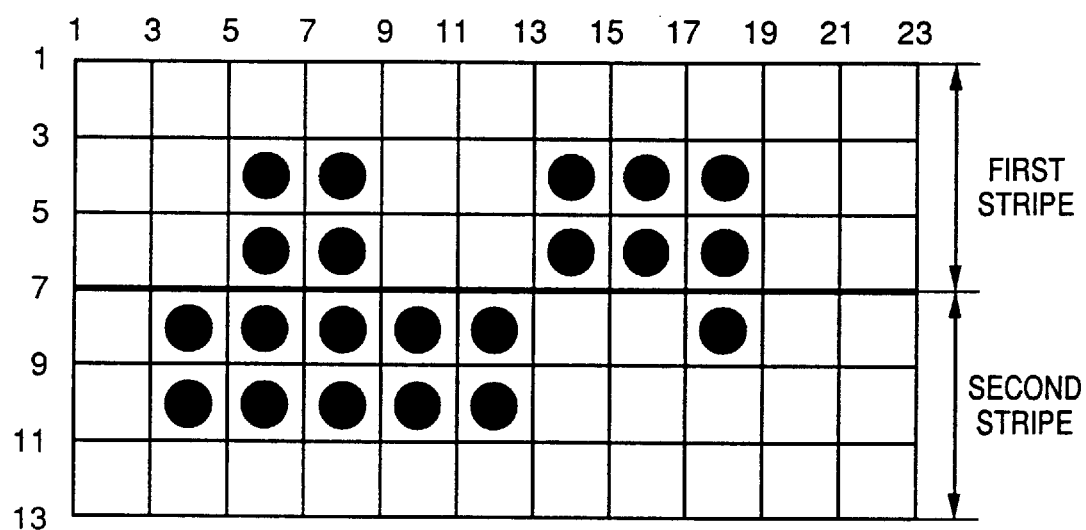
F I G. 65

FIG. 66

| ADDRESS | x-COORDINATE | START POINT/END POINT | STRIPE NUMBER | OUTLINE NUMBER | COORDINATE NUMBER | ADDRESS OF NEXT POINT | ADDRESS OF PREVIOUS POINT |
|---|---|---|---|---|---|---|---|

FIG. 67

| FIRST STRIPE | | SECOND STRIPE | |
|---|---|---|---|
| 2 | TOTAL NUMBER OF OUTLINE LOOPS IN STRIPE | 2 | TOTAL NUMBER OF OUTLINE LOOPS IN STRIPE |
| 4 | TOTAL NUMBER OF POINTS IN FIRST OUTLINE | 4 | TOTAL NUMBER OF POINTS IN FIRST OUTLINE |
| 5 | FIRST POINT | 3 | FIRST POINT |
| 3 | | 7 | |
| 9 | SECOND POINT | 13 | SECOND POINT |
| 3 | | 7 | |
| 9 | THIRD POINT | 13 | THIRD POINT |
| 7 | | 11 | |
| 5 | FOURTH POINT | 3 | FOURTH POINT |
| 7 | | 11 | |
| 4 | TOTAL NUMBER OF POINTS IN SECOND OUTLINE | 4 | TOTAL NUMBER OF POINTS IN SECOND OUTLINE |
| 13 | FIRST POINT | 17 | FIRST POINT |
| 3 | | 7 | |
| 19 | SECOND POINT | 19 | SECOND POINT |
| 3 | | 7 | |
| 19 | THIRD POINT | 19 | THIRD POINT |
| 7 | | 9 | |
| 13 | FOURTH POINT | 17 | FOURTH POINT |
| 7 | | 9 | |

FIG. 68

| 0 | 9 | NEGATIVE START | 1 | 1 | 3 | | |
|---|---|---|---|---|---|---|---|

| 1 | 5 | NEGATIVE END | 1 | 1 | 4 | | |
|---|---|---|---|---|---|---|---|

| 2 | 19 | NEGATIVE START | 1 | 2 | 3 | | |
|---|---|---|---|---|---|---|---|

| 3 | 13 | NEGATIVE END | 1 | 2 | 4 | | |
|---|---|---|---|---|---|---|---|

| 4 | 3 | POSITIVE START | 2 | 1 | 1 | | |
|---|---|---|---|---|---|---|---|

| 5 | 13 | POSITIVE END | 2 | 1 | 2 | | |
|---|---|---|---|---|---|---|---|

| 6 | 17 | POSITIVE START | 2 | 2 | 1 | | |
|---|---|---|---|---|---|---|---|

| 7 | 19 | POSITIVE END | 2 | 2 | 2 | | |
|---|---|---|---|---|---|---|---|

FIG. 69

| 4 | 3 | POSITIVE START | 2 | 1 | 1 | | |
|---|---|---|---|---|---|---|---|
| 1 | 5 | NEGATIVE END | 1 | 1 | 4 | | |

| 0 | 9 | NEGATIVE START | 1 | 1 | 3 | | |
|---|---|---|---|---|---|---|---|
| 3 | 13 | NEGATIVE END | 1 | 2 | 4 | | |

| 5 | 13 | POSITIVE END | 2 | 1 | 2 | | |
|---|---|---|---|---|---|---|---|
| 6 | 17 | POSITIVE START | 2 | 2 | 1 | | |

| 2 | 19 | NEGATIVE START | 1 | 2 | 3 | | |
|---|---|---|---|---|---|---|---|
| 7 | 19 | POSITIVE END | 2 | 2 | 2 | | |

F I G. 70

| 4 | 3 | POSITIVE START | 2 | 1 | 1 | 1 | — |
|---|---|---|---|---|---|---|---|
| 1 | 5 | NEGATIVE END | 1 | 1 | 4 | — | 4 |

| 0 | 9 | NEGATIVE START | 1 | 1 | 3 | 3 | — |
|---|---|---|---|---|---|---|---|
| 3 | 13 | NEGATIVE END | 1 | 2 | 4 | — | 0 |

| 6 | 17 | POSITIVE START | 2 | 2 | 1 | 5 | — |
|---|---|---|---|---|---|---|---|
| 5 | 13 | POSITIVE END | 2 | 1 | 2 | — | 6 |

| 2 | 19 | NEGATIVE START | 1 | 2 | 3 | 7 | — |
|---|---|---|---|---|---|---|---|
| 7 | 19 | POSITIVE END | 2 | 2 | 2 | — | 2 |

FIG. 71

| | |
|---|---|
| 1 | } TOTAL NUMBER OF OUTLINE LOOPS IN IMAGE |
| 14 | } TOTAL NUMBER OF POINTS IN FIRST OUTLINE |
| 5 | } FIRST POINT |
| 3 | |
| 9 | } SECOND POINT |
| 3 | |
| 9 | } THIRD POINT |
| 7 | |
| 13 | } FOURTH POINT |
| 7 | |
| 13 | } FIFTH POINT |
| 3 | |
| 19 | } SIXTH POINT |
| 3 | |
| 19 | } SEVENTH POINT |
| 9 | |
| 17 | } EIGHTH POINT |
| 9 | |
| 17 | } NINTH POINT |
| 7 | |
| 13 | } 10TH POINT |
| 7 | |
| 13 | } 11TH POINT |
| 11 | |
| 3 | } 12TH POINT |
| 11 | |
| 3 | } 13TH POINT |
| 7 | |
| 5 | } 14TH POINT |
| 7 | |

FIG. 73

| ADDRESS | CONVERTED x-COORDINATE | y-COORDINATE | x-COORDINATE | START POINT/ END POINT | STRIPE NUMBER | OUTLINE NUMBER | COORDINATE NUMBER | ADDRESS OF NEXT POINT | ADDRESS OF PREVIOUS POINT | SPECIAL PROCESSING |

FIG. 74

FIRST STRIPE

| Value | Description |
|---|---|
| 2 | TOTAL NUMBER OF OUTLINE LOOPS IN STRIPE |
| 4 | TOTAL NUMBER OF POINTS IN FIRST OUTLINE |
| 9 | FIRST POINT |
| 5 | |
| 15 | SECOND POINT |
| 5 | |
| 15 | THIRD POINT |
| 11 | |
| 9 | FOURTH POINT |
| 11 | |
| 4 | TOTAL NUMBER OF POINTS IN SECOND OUTLINE |
| 25 | FIRST POINT |
| 5 | |
| 35 | SECOND POINT |
| 5 | |
| 35 | THIRD POINT |
| 11 | |
| 25 | FOURTH POINT |
| 11 | |

SECOND STRIPE

| Value | Description |
|---|---|
| 2 | TOTAL NUMBER OF OUTLINE LOOPS IN STRIPE |
| 4 | TOTAL NUMBER OF POINTS IN FIRST OUTLINE |
| 5 | FIRST POINT |
| 13 | |
| 23 | SECOND POINT |
| 13 | |
| 23 | THIRD POINT |
| 19 | |
| 5 | FOURTH POINT |
| 19 | |
| 4 | TOTAL NUMBER OF POINTS IN SECOND OUTLINE |
| 33 | FIRST POINT |
| 13 | |
| 35 | SECOND POINT |
| 13 | |
| 35 | THIRD POINT |
| 15 | |
| 33 | FOURTH POINT |
| 15 | |

FIG. 75

| | | | | | | | | | | |
|---|---|---|---|---|---|---|---|---|---|---|
| 0 | 16 | 15 | 11 | NEGATIVE START | 1 | 1 | 3 | | | |
| 1 | 8 | 9 | 11 | NEGATIVE END | 1 | 1 | 4 | | | |
| 2 | 36 | 35 | 11 | NEGATIVE START | 1 | 2 | 3 | | | |
| 3 | 24 | 25 | 11 | NEGATIVE END | 1 | 2 | 4 | | | |
| 4 | 4 | 5 | 13 | POSITIVE START | 2 | 1 | 1 | | | |
| 5 | 24 | 23 | 13 | POSITIVE END | 2 | 1 | 2 | | | |
| 6 | 32 | 33 | 13 | POSITIVE START | 2 | 2 | 1 | | | |
| 7 | 36 | 35 | 13 | POSITIVE END | 2 | 2 | 2 | | | |

FIG. 76

| | | | | | | | | | | |
|---|---|---|---|---|---|---|---|---|---|---|
| 4 | 4 | 5 | 13 | POSITIVE START | 2 | 1 | 1 | | | N |
| 1 | 8 | 9 | 11 | NEGATIVE END | 1 | 1 | 4 | | | N |
| 0 | 16 | 15 | 11 | NEGATIVE START | 1 | 1 | 3 | | | N |
| 3 | 24 | 25 | 11 | NEGATIVE END | 1 | 2 | 4 | | | Y |
| 5 | 24 | 23 | 13 | POSITIVE END | 2 | 1 | 2 | | | Y |
| 6 | 32 | 33 | 13 | POSITIVE START | 2 | 2 | 1 | | | N |
| 2 | 36 | 35 | 11 | NEGATIVE START | 1 | 2 | 3 | | | N |
| 7 | 36 | 35 | 13 | POSITIVE END | 2 | 2 | 2 | | | N |

FIG. 77

| | | | | | | | | | |
|---|---|---|---|---|---|---|---|---|---|
| 4 | 4 | 5 | 13 | POSITIVE START | 2 | 1 | 1 | — | N |
| 1 | 8 | 9 | 11 | NEGATIVE END | 1 | 1 | — | 4 | N |
| 0 | 16 | 15 | 11 | NEGATIVE START | 1 | 1 | 3 | — | N |
| 3 | 24 | 25 | 11 | NEGATIVE END | 1 | 2 | 4 | — | 0 | Y |
| 6 | 32 | 33 | 13 | POSITIVE START | 2 | 2 | 1 | — | N |
| 5 | 24 | 23 | 13 | POSITIVE END | 2 | 1 | 2 | — | 6 | Y |
| 2 | 36 | 35 | 11 | NEGATIVE START | 1 | 2 | 3 | — | N |
| 7 | 36 | 35 | 13 | POSITIVE END | 2 | 2 | 2 | — | 2 | N |

FIG. 78

| Value | Description |
|---|---|
| 1 | TOTAL NUMBER OF OUTLINE LOOPS IN IMAGE |
| 14 | TOTAL NUMBER OF POINTS IN FIRST OUTLINE |
| 9 | FIRST POINT |
| 5 | |
| 15 | SECOND POINT |
| 5 | |
| 15 | THIRD POINT |
| 13 | |
| 23 | FOURTH POINT |
| 13 | |
| 23 | FIFTH POINT |
| 11 | |
| 25 | SIXTH POINT |
| 11 | |
| 25 | SEVENTH POINT |
| 5 | |
| 35 | EIGHTH POINT |
| 5 | |
| 35 | NINTH POINT |
| 15 | |
| 33 | 10TH POINT |
| 15 | |
| 33 | 11TH POINT |
| 11 | |
| 25 | 12TH POINT |
| 11 | |
| 25 | 13TH POINT |
| 13 | |
| 23 | 14TH POINT |
| 13 | |
| 23 | 15TH POINT |
| 19 | |
| 5 | 16TH POINT |
| 19 | |
| 5 | 17TH POINT |
| 13 | |
| 9 | 18TH POINT |
| 13 | |

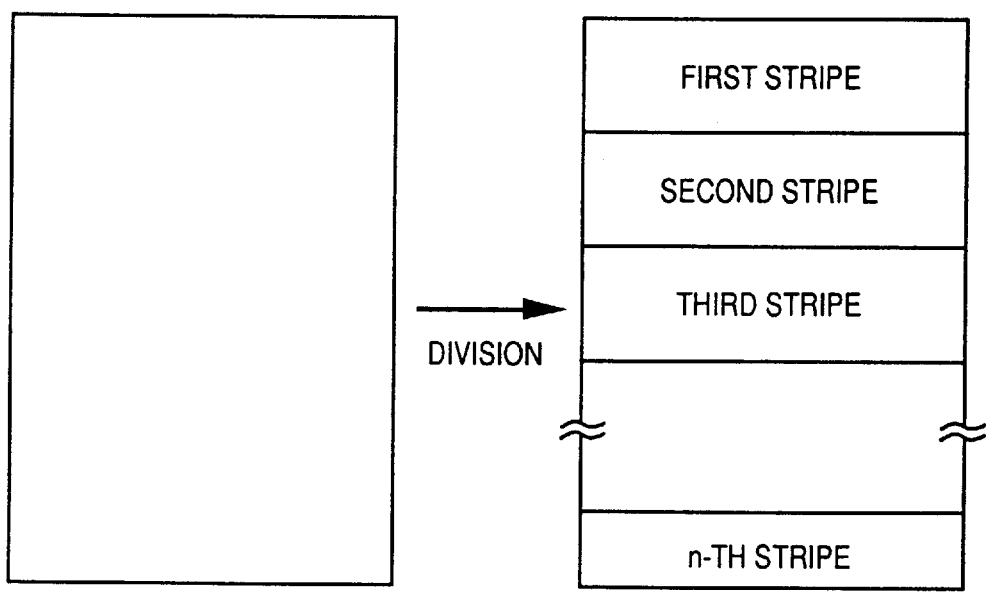
F I G. 82

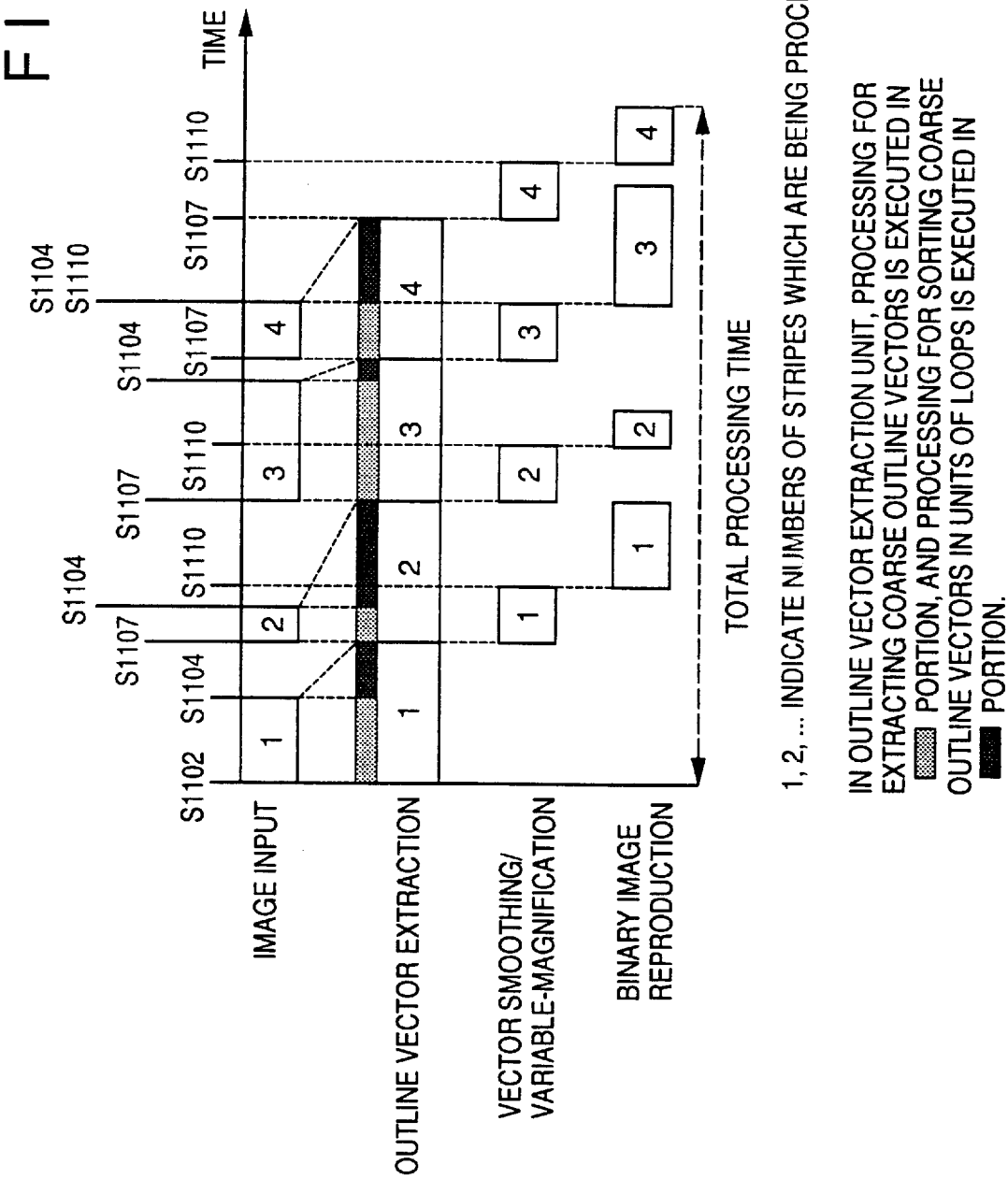

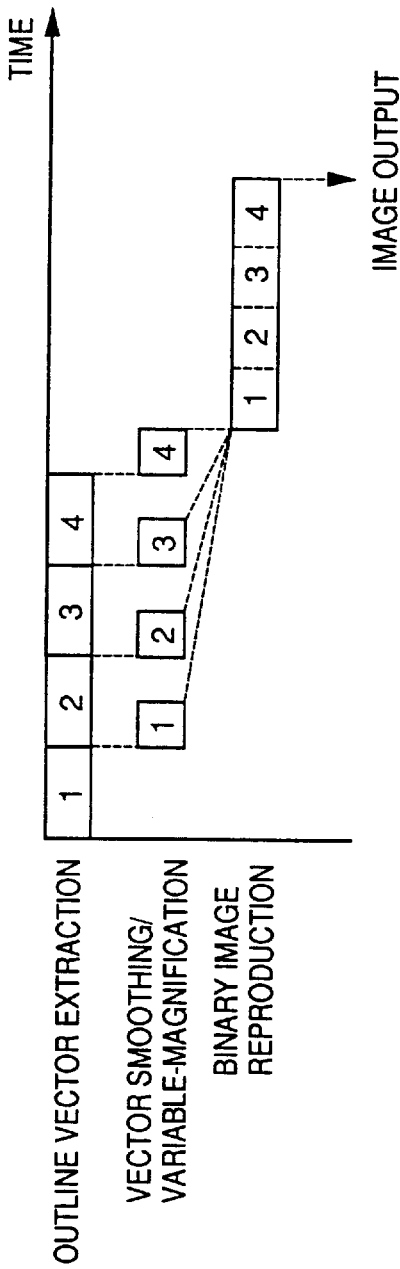

IMAGE PROCESSING METHOD AND APPARATUS FOR ENLARGING AND REDUCING IMAGE DATA

This application is a continuation of application Ser. No. 08/285,444, filed Aug. 4, 1994, now abandoned, which is a divisional of application Ser. No. 08/124,479, filed Sep. 22, 1993, now pending.

BACKGROUND OF THE INVENTION

The present invention relates to an image processing method and apparatus and, more particularly, to an image processing method and apparatus for extracting an outline loop of a binary image input in a raster scan order.

When an outline font is to be formed from a binary dot pattern, an outline loop of a binary image character pattern is extracted, and the extracted outline loop is stored in a vector information format, thereby forming the outline font of the character. In order to extract an outline loop from such a binary image, a trace start point for outline loop trace in a binary image is initially found. When the trace start point is found, the outline of the image is traced in turn from the trace start point, and the trace is continued while adding trace end marks to traced outline points. When the trace makes a round, a one outline point array (outline loop) is obtained. Upon repetition of such a procedure, all outline loops in the image can be extracted.

Upon execution of outline trace, since there are eight pixels around a certain pixel, a total of eight trace directions are present.

FIG. 2 shows an eight-coupling outline trace procedure. Referring to FIG. 2, reference numeral 201 denotes a binary image pattern including an inner blank portion 202. A case will be exemplified below wherein the outline loop of the pattern 201 is extracted. Note that one square in FIG. 2 indicates one dot (pixel).

(1) The binary image pattern 201 is raster-scanned from a reference point (0, 0) of a screen.

(2) When the raster-scan operation meets a point where a pixel without a trace end mark (e.g., a dot 203), the point is defined as $P_0$, and outline trace of the dot pattern is started. If no point $P_0$ is present after the entire screen is scanned, the procedure ends.

(3) A search operation is started in eight neighboring pixel directions neighboring the start point $P_0$ in the order shown in FIG. 3. Then, a point (a dot 204 in FIG. 2), where a first detected black pixel neighboring a white pixel is present, is defined as the next outline point $P_1$. In this case, when no neighboring points are present, the point is defined as an isolated point, and the control returns to the procedure (2).

(4) In this manner, a point Pi is marked, and the next outline point $P_{i+1}$ is extracted from neighboring pixels in eight directions neighboring the point $P_i$, as shown in FIG. 4. From a previously marked point 401, whether or not a dot is present is searched counterclockwise about the point $P_i$ (dot 204), and a point where a first detected pixel is present is defined as the next outline point $P_{i+1}$.

(5) Thereafter, the procedure (4) is repeated to sequentially obtain outline points. When $P_{n+1}=P_1$, and $P_n=P_0$, the points $P_0, P_1, \ldots, P_{n-1}$ are defined as an outline point array of one region, and the control advances to a procedure (6).

(6) The control returns to the procedure (2) to obtain an outline point array of another image region.

Note that, in FIGS. 3 and 4, the central portion indicates a point of interest, the notation of ⊙ (401) indicates a previously marked point. Note that numerals in FIGS. 3 and 4 represent the search order of the presence/absence of a pixel (dot).

However, in the above-mentioned procedures, since the trace operation is performed along an outline loop after the outline trace start point is determined, extraction processing of an outline loop must be started after the entire image is stored on a memory. For this reason, the required memory capacity becomes large, resulting in an increase in cost, a long processing time, and the like.

In order to reduce the memory capacity, a method of extracting an outline point based on the states of a pixel of interest and its neighboring pixels by fetching an image in the raster-scan order has been proposed previously. This method has a connection information table for holding connection states of outline loops in units of pixels, and after outlines are extracted for all pixels in the image, the connection information table is scanned again to obtain a total number of loops of outline vectors, the number of outline points constituting each loop, the coordinate values of outline points constituting each loop, and the like.

However, with this method, after outline (coarse outline) vectors are extracted for all pixels in an image, the connection information table is scanned again to obtain a total number of loops of outline vectors, the number of outline points constituting each loop, the coordinate values of outline points constituting each loop, and the like. For this reason, the capacity of the connection information table becomes undesirably large since it must hold all connection information of outline points in the image, resulting in a decrease in search speed of the table.

SUMMARY OF THE INVENTION

The present invention has been made in consideration of the above situation, and has as its object to provide an image processing method and apparatus, which can reduce the memory capacity for storing the connection relationships of outline vectors upon extraction of outline vectors.

It is another object of the present invention to provide an image processing method and apparatus, which can output a high-definition image when a binary image is reproduced.

It is still another object of the present invention to provide an image processing method and apparatus, which can reduce the memory capacity for storing the connection relationships of outline vectors upon extraction of outline vectors, and can obtain a good connection state between outline vectors extracted from independent stripe-shaped images.

It is still another object of the present invention to provide an image processing method, which can drastically shorten the throughput time of the entire processing upon execution of image processing for obtaining a fine variable-magnification image using outline vectors of an input image.

It is still another object of the present invention to provide an image processing method and apparatus, which can prevent the number of lines of a finally output image obtained by combining processing results upon execution of variable-magnification processing in units of stripes from being largely different from the number of lines of an output image obtained when the entire input image is subjected to variable-magnification processing.

It is still another object of the present invention to provide an image processing method and apparatus, which can prevent deterioration of a finally output image at a joint portion of stripes, which is caused upon execution of processing in units of divided stripes.

It is still another object of the present invention to provide an image processing method and apparatus, which can drastically shorten the throughput time of the entire processing while suppressing deterioration of an image at a joint portion of stripes so as to obtain a fine variable-magnification image using outline vectors of an input image.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 1 and 1A are views showing a pixel of interest and its neighboring pixels according to the first embodiment of the present invention;

FIG. 12 is a view showing a pixel state in Case 6 in outline vector extraction of the first embodiment;

FIG. 33 shows a registration table for vertical vectors whose flow-in vectors are not determined;

FIG. 34 shows a registration table for vertical vectors whose flow-out vectors are not determined;

FIG. 38 is a flow chart showing processing of Case A in FIG. 37 and the like;

FIG. 42 is a flow chart showing processing of Case B in FIG. 41 and the like;

FIG. 45 is a flow chart showing processing for searching a horizontal vector which flows into a vertical vector, in FIG. 44 and the like;

FIG. 46 is a flow chart showing processing for searching a vertical vector from which a horizontal vector flows out, in FIG. 44 and the like;

FIG. 48 is a flow chart showing processing of Case D in FIG. 47 and the like;

FIG. 52 is a flow chart showing processing of Case C in FIG. 51 and the like;

FIG. 65 is a view showing an input image for explaining the fourth embodiment;

FIG. 66 is a view for describing the start and end points of a horizontal vector present on a stripe dividing boundary line;

FIG. 67 shows a coordinate table of outline vectors obtained by stripe dividing processing;

FIG. 68 is a view showing the coordinates on a dividing boundary line obtained by scanning the table shown in FIG. 67;

FIG. 69 is a view showing packet s obtained by resorting those in FIG. 68 according to x-coordinates;

FIG. 70 is a view showing packets obtained by resorting packet pairs shown in FIG. 69 according to a certain condition;

FIG. 71 is a view showing a merging·sorting result of outline vectors subjected to dividing processing;

FIG. 73 is a view for describing the start and end points of a horizontal vector present on a stripe dividing boundary line;

FIG. 74 shows a coordinate table of outline vectors obtained by stripe dividing processing;

FIG. 75 is a view showing the coordinates on a dividing boundary line obtained by scanning the table shown in FIG. 74;

FIG. 76 is a view showing packets obtained by resorting those in FIG. 75 according to x-coordinates;

FIG. 77 is a view showing packets obtained by resorting packet pairs shown in FIG. 76 according to a certain condition;

FIG. 78 is a view showing a merging·sorting result of outline vectors subjected to dividing processing;

FIG. 82 is a view showing a method of dividing an input image into stripe-shaped images (stripes);

FIG. 95 is a timing chart showing processing timings in units of stripes by the respective units of the apparatus of the 11th embodiment;

FIG. 96 is a timing chart showing processing timings in units of stripes by the respective units of an apparatus according to the 13th embodiment of the present invention;

FIG. 120 is a block diagram showing an arrangement of an apparatus in the 29th embodiment of the present invention;

FIG. 121 is a flow chart showing processing executed by a control unit 2609 in the 29th embodiment;

FIG. 122 is a flow chart showing processing executed by the control unit 2609 in the 29th embodiment;

FIG. 123 is a block diagram showing an arrangement of an apparatus in the 30th embodiment of the present invention;

FIG. 124 is a flow chart showing processing executed by a control unit 2609 in the 30th embodiment;

FIG. 125 is a flow chart showing processing executed by the control unit 2609 in the 30th embodiment; and FIG. 126 is a block diagram showing an arrangement of an apparatus according to the 31st embodiment of the present invention.

DETAILED DESCRIPTION OF THE PREFERRED EMBODIMENTS

The preferred embodiments of the present invention will be described in detail hereinafter with reference to the accompanying drawings.

<First Embodiment>

Figure 1:
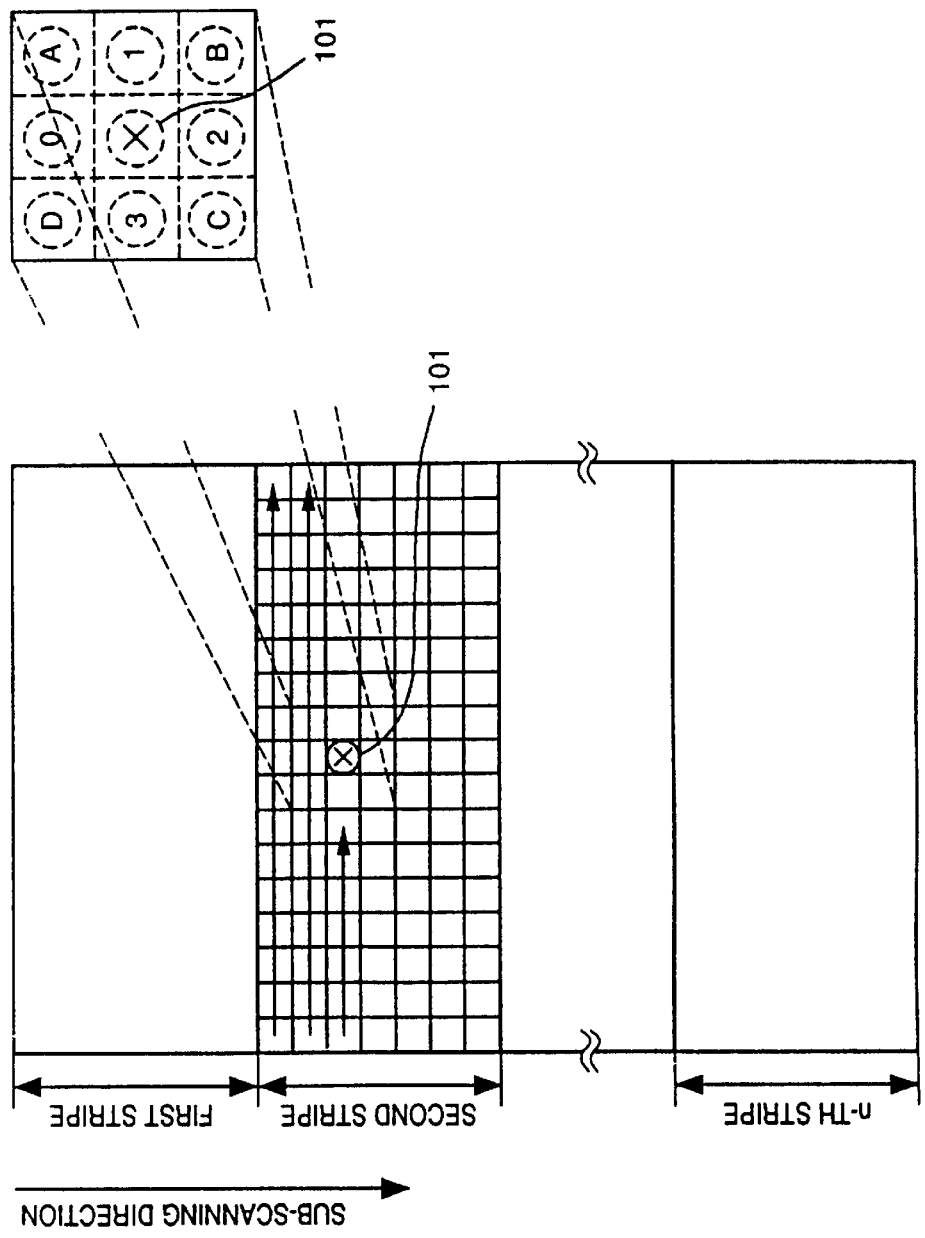
Figure 2:
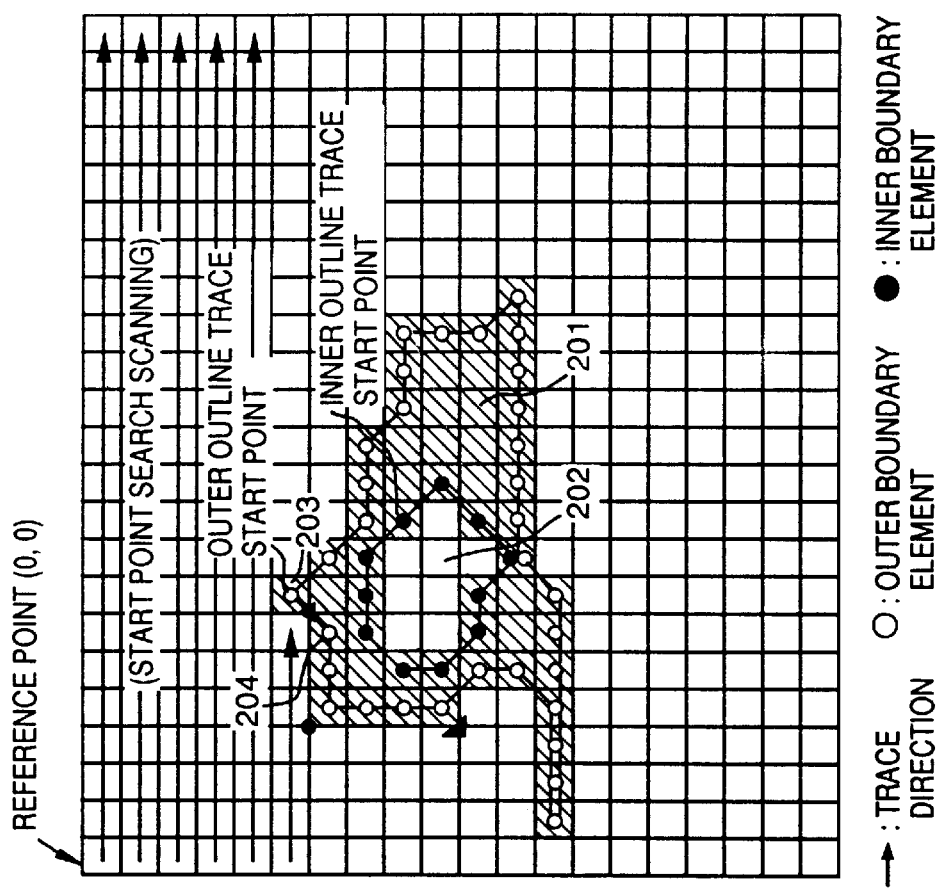
FIG. 2 is a view for explaining the principle of a conventional outline extraction method from a binary image.
Figure 3:
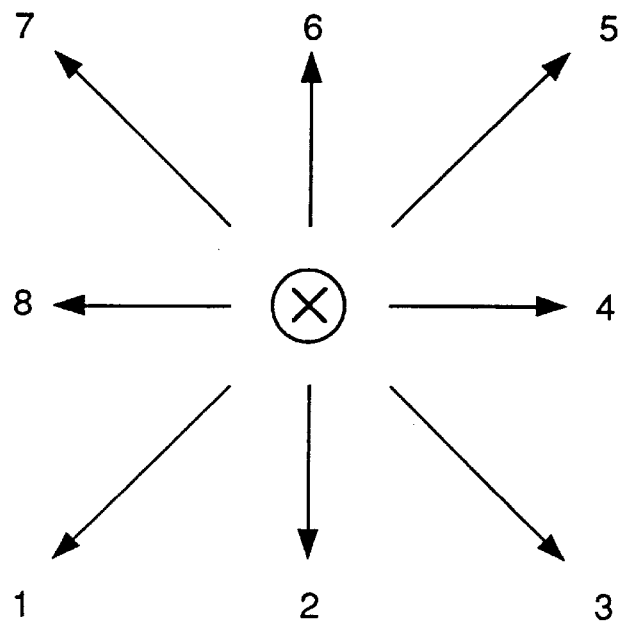
FIG. 3 is a view showing trace processing directions in outline extraction.
Figure 4:
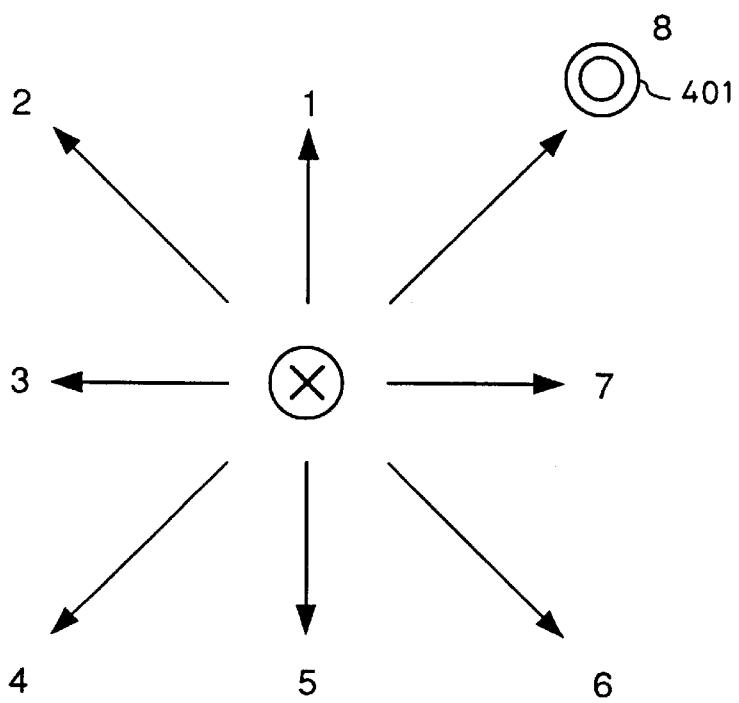
FIG. 4 is a view showing trace processing directions in outline extraction.

In this embodiment, as shown in FIGS. 1 and 1A, an input image is divided into stripes, and processing progresses while checking the states of a pixel (101) of interest and its eight surrounding pixels in units of stripes.

The pixel of interest is raster-scanned, and the processing of the entire image is sequentially executed while shifting the position of the pixel of interest pixel by pixel.

Referring to FIGS. 1 and 1A, reference numeral 101 denotes a pixel of interest. Positions indicated by "0" and "2" respectively represent pixels (0) and (2), which are located at the same positions as the pixel 101 of interest in the main scanning direction, and at positions one raster before and after the pixel of interest in the sub-scanning direction. Positions indicated by "3" and "1" represent pixels (3) and (1), which are located on the same raster as the pixel 101 of interest, and at positions immediately before and next to the pixel of interest. Positions indicated by "A" and "B" represent pixels, which are located at positions next to the pixel of interest in the main scanning direction, and at positions one raster before and after the pixel of interest. Positions indicated by "C" and "D" represent pixels, which are located at positions immediately before the pixel of interest in the main scanning direction, and at positions one raster before and after the pixel of interest.

Figure 5:
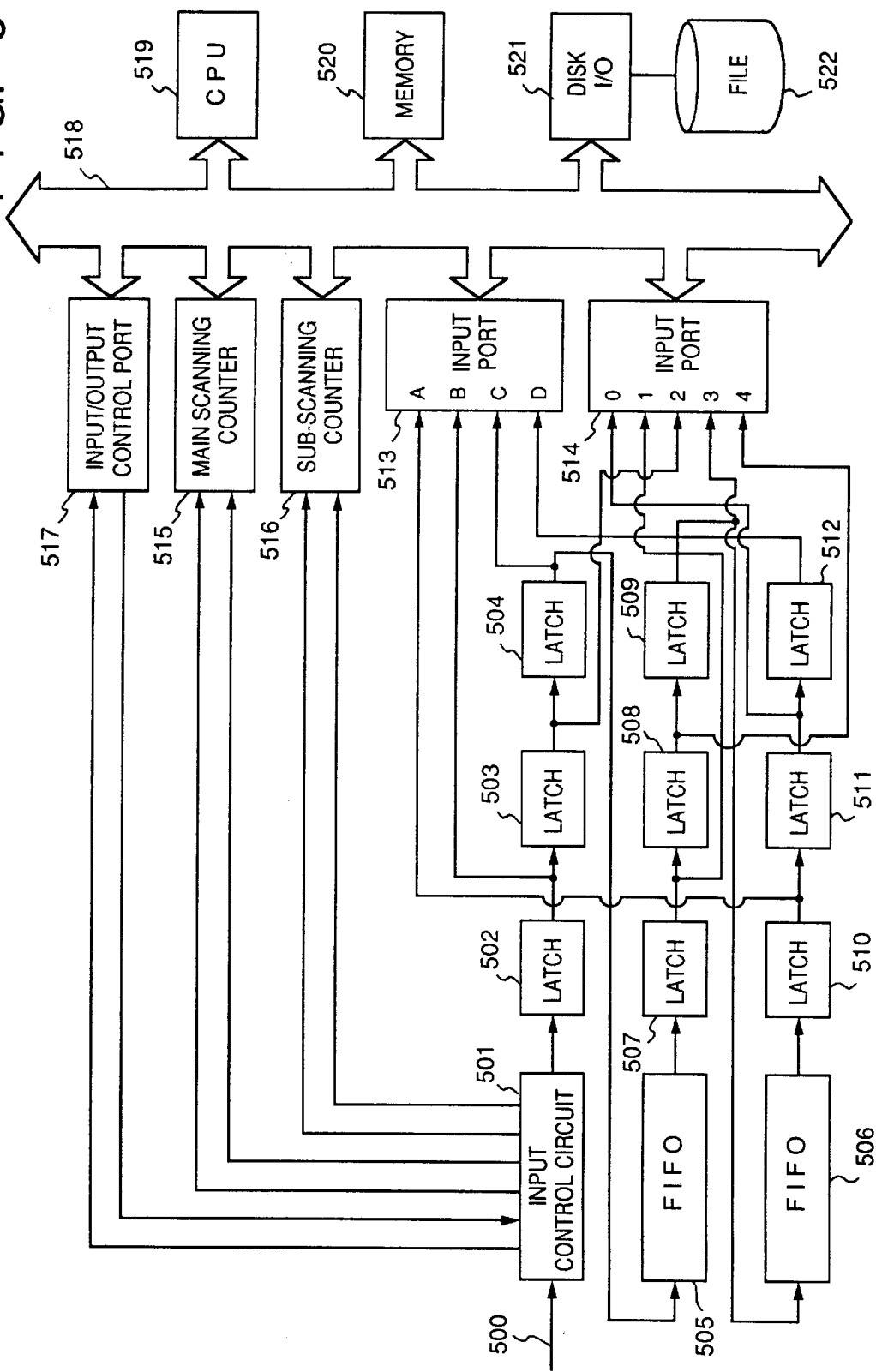
FIG. 5 is a schematic block diagram showing an arrangement of an outline extraction apparatus according to the first embodiment of the present invention.

FIG. 5 is a block diagram showing a hardware arrangement for performing outline detection according to this embodiment.

Reference numeral 501 denotes an input control (interface) circuit for exchanging image data input via a signal line 500. Binary image data in a raster-scanning format are sequentially input from the signal line 500. Reference numeral 502 denotes a latch, for holding image data input from the input control circuit 501 while sequentially updating the image data pixel by pixel in synchronism with a pixel synchronization clock (not shown). The latch 502 receives the next pixel data from the input control circuit 501 in response to the next pixel synchronization clock. At this time, already held pixel data is latched and held in a latch 503 in synchronism with the pixel clock. Similarly, pixel data held in the latch 503 is held in a latch 504 in response to the next pixel synchronization clock.

Reference numerals 505 and 506 denote FIFOs (first-in, first-out memories) each for holding pixel data for one raster. The FIFO 505 sequentially fetches the outputs from the latch 504 in synchronism with the pixel synchronization clocks, and outputs data one raster before to a latch 507. Similarly, the FIFO 506 fetches the outputs from a latch 509, and outputs pixel data one raster before to a latch 510. Latches 507, 508, and 509, and latches 510, 511, and 512 operate in the same manner as the latches 502, 503, and 504.

With the above arrangement, the latches 502, 503, 504, 507, 508, 509, 510, 511, and 512 always store 3×3 pixel data, in other words, pixel data in a certain region. If pixel data held in the latch 508 is assumed to be a position of a pixel of interest (reference numeral 101 in FIG. 1), the surrounding latches, respectively hold data at the pixel positions "B", "2", "C", "1", "3", "A", "0", and "D" in FIG. 1.

Reference numerals 513 and 514 denote input ports. The input port 513 supplies data in the latches 510, 502, 504, and 512, i.e., data at the positions "A", "B", "C", and "D" in FIG. 1, to a CPU 519. Similarly, the input port 514 supplies data in the latches 511, 507, 503, 509, and 508, i.e., data at the positions "0", "1", "2", and "3", and at the position of the pixel of interest, to the CPU 519.

Reference numeral 515 denotes a main scanning counter indicating a pixel position in the main scanning direction. The counter 515 is reset in response to a sub-scanning synchronization signal (not shown), and performs a count-up operation in response to a pixel synchronization signal. Reference numeral 516 denotes a sub-scanning counter indicating a pixel position in the sub-scanning direction. The counter 516 is reset in response to a page synchronization signal (not shown), and performs a count-up operation in response to a sub-scanning synchronization signal. Reference numeral 517 denotes an input/output control port, which holds a signal for instructing execution/reservation of pixel data input to the input control circuit 501, a signal for informing updating of pixel data from the input control circuit 501 to the CPU 519, and the like, Reference numeral 521 denotes an input/output control device (disk I/O) for a hard disk 522.

The input/output control port 517, the main scanning counter 515, the sub-scanning counter 516, the input ports 513 and 514, a memory 520, and the disk I/O 521 are connected to the CPU 519 via a bus 518.

In this manner, the CPU 519 updates pixel data via the input/output control port 517, and can detect the pixel position (i, j) of a pixel of interest via the main scanning counter 515 and the sub-scanning counter 516. Also, the CPU 519 can detect the states of the pixel of interest and its surrounding pixels in the eight directions via the input ports 513 and 514.

Upon completion of processing of the pixel of interest, the CPU 519 instructs to update pixel data stored in the nine latches via the input/output control port 517, and at the same time, clears a pixel data updating instruction signal. Also, the CPU 519 updates pixel data latched by the latches, and upon completion of the updating processing, it outputs an updating end signal to the input/output control port 517.

The CPU 519 monitors an updating end signal from the input/output control port 517 after it outputs the updating instruction signal. Upon reception of the updating end signal, the CPU 519 executes processing associated with new pixel data stored in the nine latches, and thereafter, repeats the above-mentioned operations.

Note that the CPU 519 has a ROM storing an operation processing sequence (to be described in detail later) of the CPU 519, and an internal RAM used as a work area.

Upon completion of processing of the last pixel in an image region as a pixel of interest, the input control circuit 501 outputs an end signal to the input/output control port 517.

Processing operations in respective cases according to the states of the pixel of interest and its eight surrounding pixels will be described below.

When the pixel of interest is a white pixel, since the pixel is not a part of an outline, processing ends, and raster-scanning is advanced by one pixel to update the position of the pixel of interest.

When the pixel of interest is a black pixel, the following processing is executed in accordance with the states of its surrounding pixels. FIGS. 6 to 21 show the processing contents in the corresponding states.

Figure 6:
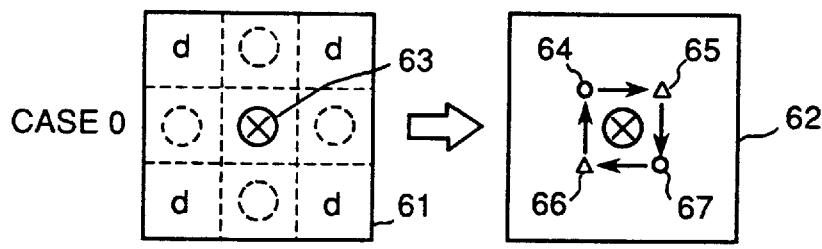
FIG. 6 is a view showing a pixel state in Case 0 in outline vector extraction of the first embodiment.
Figure 7:
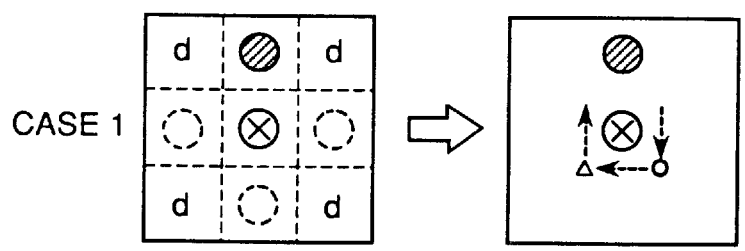
FIG. 7 is a view showing a pixel state in Case 1 in outline vector extraction of the first embodiment.
Figure 8:
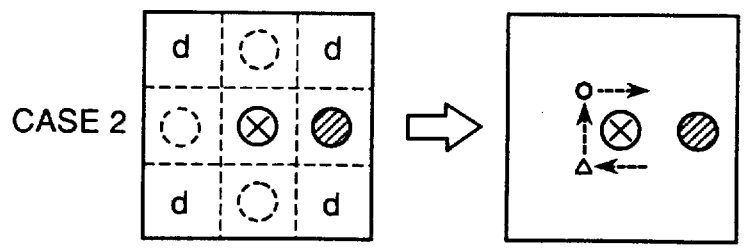
FIG. 8 is a view showing a pixel state in Case 2 in outline vector extraction of the first embodiment.

In a pixel matrix 61 in FIG. 6, "d" means "do not care". More specifically, pixels at positions indicated by "d" can be either white or black pixels. The same applies to other drawings. In a pixel matrix 62 in FIG. 6, the notations of ○ represent the start points of lateral (horizontal) vectors and the end points of longitudinal (vertical) vectors, and the notations of Δ represent the start points of vertical vectors and the end points of horizontal vectors. In the matrix 62 in FIG. 6, a solid arrow represents an outline vector, both the start and end points of which are determined, and which has a direction indicated by the arrow. Also, a dotted arrow, as shown in FIG. 7, represents an outline vector, either the start or end point of which is determined (i.e., the other one is not determined), and which has a direction indicated by the arrow. The meanings of these notations ○, Δ, solid arrow, and dotted arrow also apply to other drawings. The notation of ● indicates a black pixel. A white pixel is illustrated as a dotted circle only when its position is to be indicated; otherwise, it is not illustrated.

Assume that the start and end point positions of each of these outline vectors are located at intermediate positions between two adjacent pixels in both the main scanning and sub-scanning directions. The positions of pixels in both the main scanning and sub-scanning directions are represented by positive integers, and the pixel position is expressed by two-dimensional coordinates. For example, if the position of a pixel 63 of interest in FIG. 6 is (3, 7) [the third pixel position in the seventh raster], four vectors shown in the matrix 62 in FIG. 7 are expressed as four continuous vectors respectively having four points, i.e., a point 64 (2.5, 6.5), a point 65 (3.5, 6.5), a point 66 (3.5, 7.5), and a point 67 (2.5, 7.5) as the start and end points.

If these vectors are expressed by (coordinates of start points, coordinates of end points), the four vectors in FIG. 6 are respectively expressed by:

[(2.5, 6.5), (3.5, 6.5)]
[(3.5, 6.5), (3.5, 7.5)]
[(3.5, 7.5), (2.5, 7.5)]
[(2.5, 7.5), (2.5, 6.5)]

Therefore, in order to avoid expressions using decimal fractions in the following description, a pixel position is expressed by only even numbers, and start and end point positions are expressed by odd integers, for the sake of simplicity. More specifically, in an m (pixels)×n (pixels) image, each pixel is expressed by coordinates of 2m×2n positive even numbers (integers). Thus, in FIG. 6, the position of the pixel of interest can be expressed by (6, 14), and the four start and end points can be expressed by (5, 13), (7, 13), (7, 15), and (5, 15). Therefore, the four vectors in FIG. 6 are respectively expressed by:

[(5, 13), (7, 13)]
[(7, 13), (7, 15)]
[(7, 15), (5, 15)]
[(5, 15), (5, 13)]

In the following description, assume that a binary image is constituted by n rasters each consisting of m pixels, i.e., m×n pixels (m and n are positive integers). An i-th pixel position in a j-th raster is expressed by (2i, 2j) (i and j are positive integers, and satisfy i≦m and j≦n).

<Description of Outline Extraction Processing>

Figure 22:
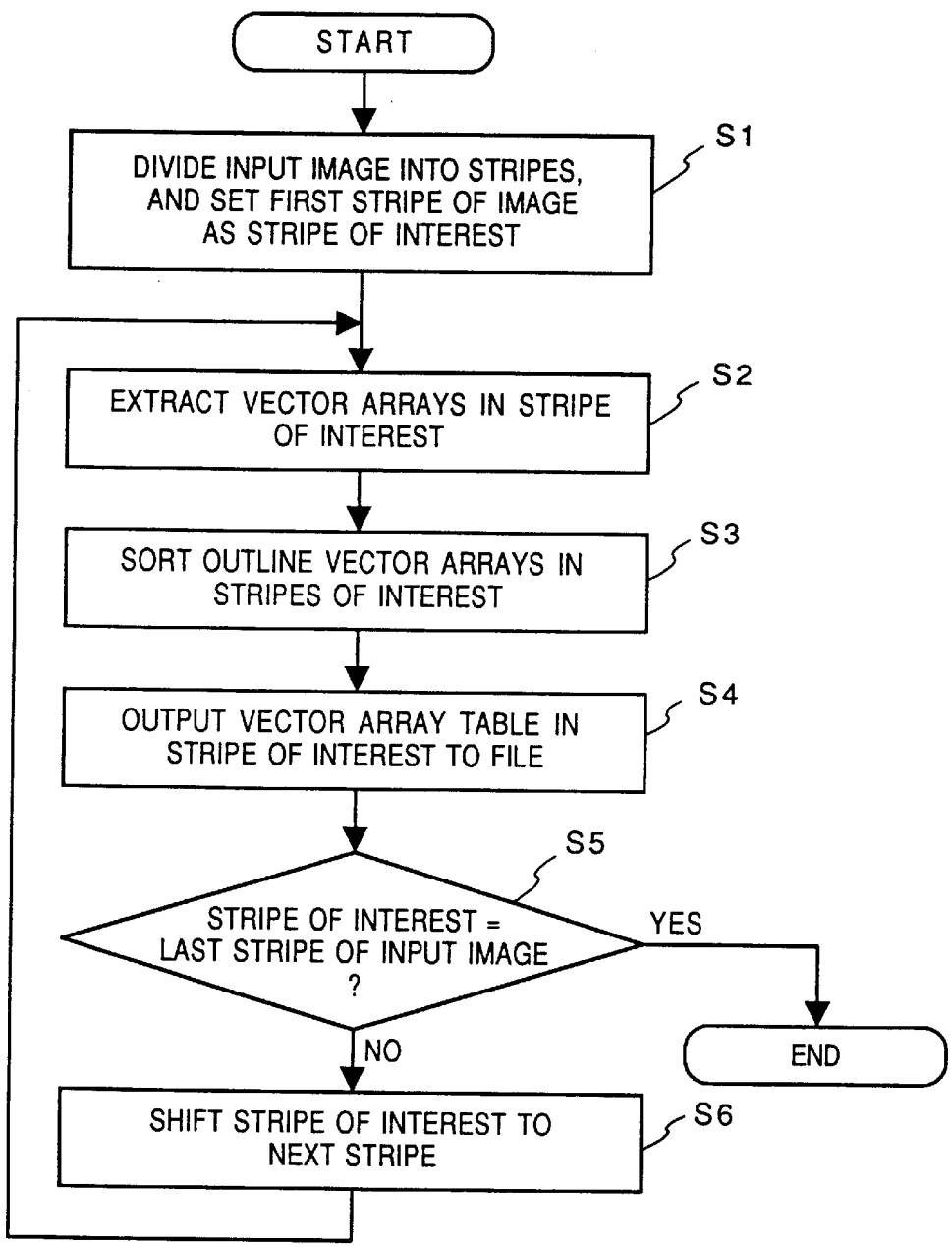
FIG. 22 is a flow chart showing the entire outline extraction processing in the first embodiment.

FIG. 22 is a flow chart showing the general flow of outline extraction processing by the CPU 519 in the apparatus of this embodiment.

In step S1, initialization of processing is executed, i.e., an input image is divided into stripes, and the first stripe of the image is set as a stripe of interest, as shown in FIG. 1. The stripes obtained by dividing an input image may have either the same or different numbers of lines (widths). The number of lines of each stripe may be set to be a predetermined value or may be arbitrarily set by external setting means.

Figure 23:
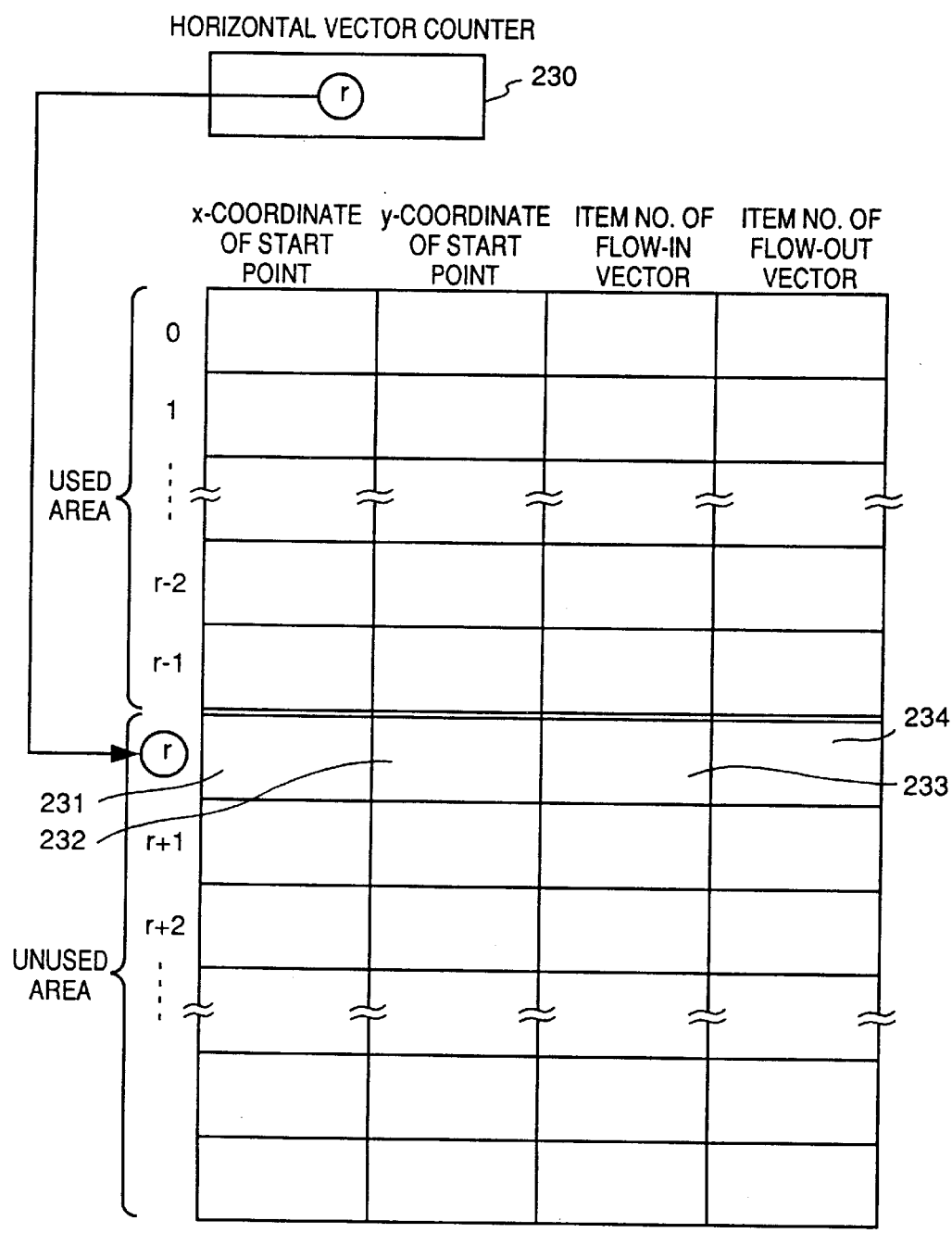
FIG. 23 shows a horizontal vector registration table in the first embodiment.
Figure 24:
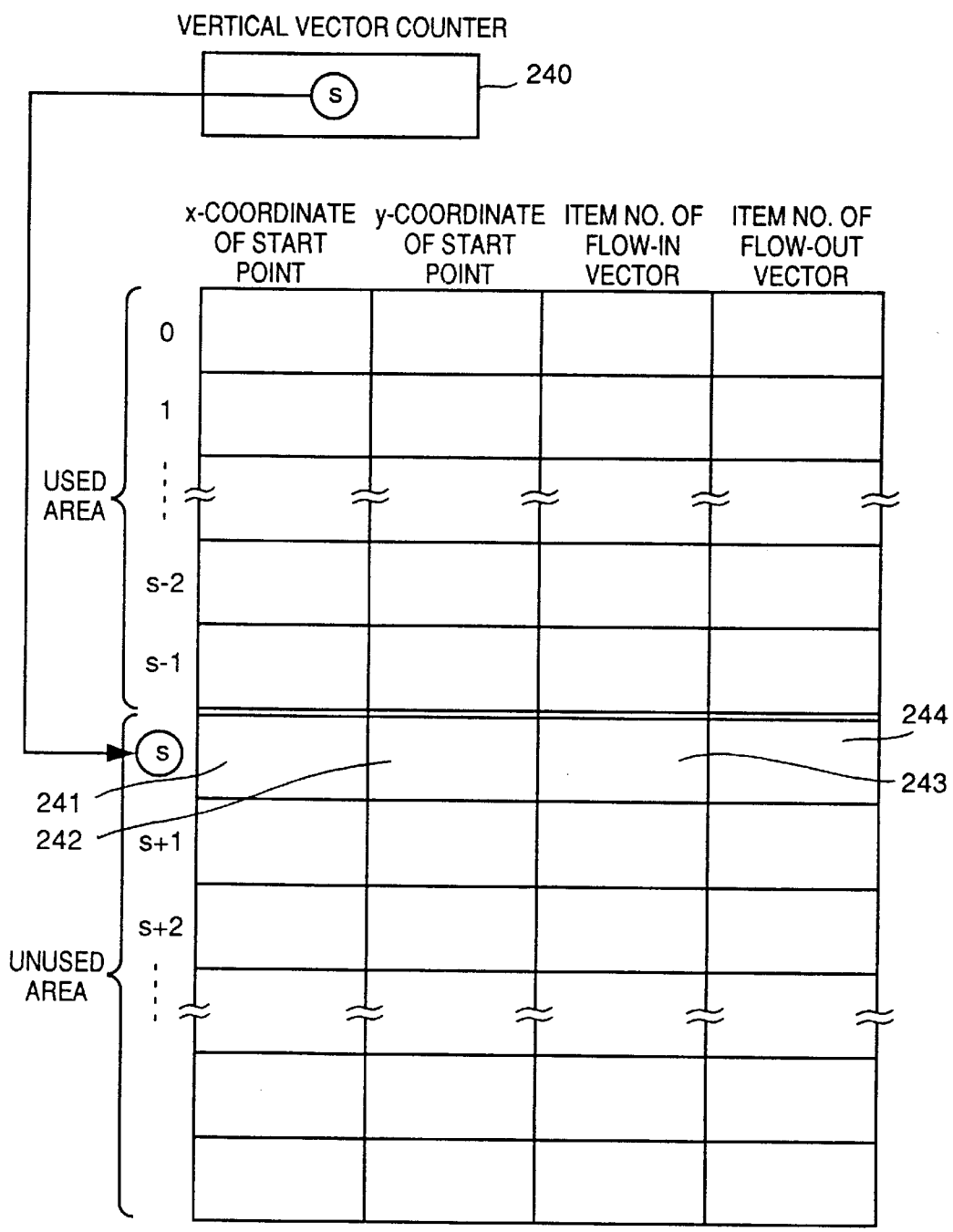
FIG. 24 shows a vertical vector registration table in the first embodiment.

In step S2, a vector array is extracted from binary image data in the stripe of interest, and the coordinates of the start point of each vector, a vector which flows into the vector of interest (i.e., a vector which has the coordinates of the start point of the vector of interest as the end point), and a vector which flows out from the vector of interest (i.e., a vector which has the coordinates of the end point of the vector of interest as the start point) are output in the form of tables shown in FIGS. 23 and 24 (these tables will be defined as connection information tables hereinafter). FIG. 23 shows a table for horizontal vectors, and FIG. 24 shows a table for vertical vectors. As described above, in this embodiment, an outline of a binary image is decomposed into vertical and horizontal vectors to extract outlines (outlines in the first stage). It should be noted that all outlines of a binary image are expressed by repetition of horizontal and vertical vectors like horizontal vector → vertical vector → horizontal vector → vertical vector → . . . although the length of each vector is indefinite.

Figure 25:
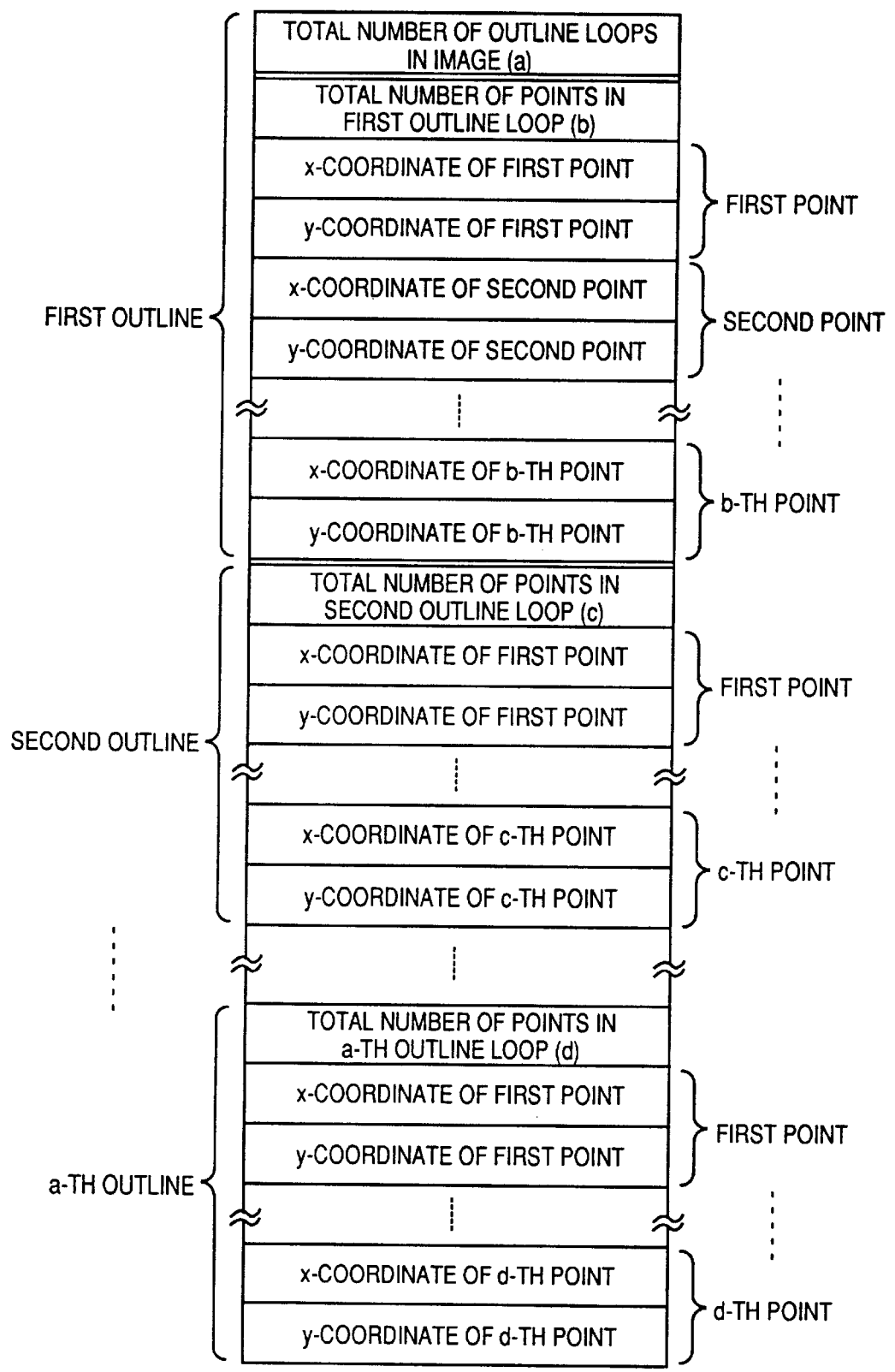
FIG. 25 shows the data format of an outline loop in the first embodiment.

In step S3, a table, which stores the total number of outline loops in an image, the total number of points in each outline loop, and the x- and y-coordinates of points in each outline loop, as shown in FIG. 25, is formed by tracing the item numbers of flow-in and flow-out vectors from the tables shown in FIGS. 23 and 24.

The flow then advances to step S4, the table information is stored in the disk 522 via the disk I/O 521 in the file format, and the contents of the tables shown in FIGS. 23 and 24 are cleared.

Thereafter, the flow advances to step S5 to check if the stripe of interest is the last stripe in the input image. If NO in step S5, the flow advances to step S6; otherwise, the processing ends. In step S6, the stripe of interest is shifted to the next stripe, and the flow returns to step S2.

As described above, an input image is divided into at least one stripe, and outline extraction·sorting·file output processing operations are executed in units of stripes, thus reducing the capacities of the tables shown in FIGS. 23 and 24.

The content of the vector array extraction processing in step S2 will be described below with reference to the flow chart in FIG. 26.

In step S11, it is checked by checking bit 4 (pixel of interest) of the input port 514 if the pixel of interest is a white or black pixel. If the pixel of interest is a white pixel, the flow advances to step S13; if the pixel of interest is a black pixel, the flow advances to step S12. In step S12, the states of eight pixels around the pixel of interest are checked, and a proper processing routine is called according to the checked states.

In step S13, updating of the pixel position is instructed via the input/output control port 517, as described above. When the updating end signal is received from the input/output control port 517, the flow advances to step S14 to check, via the input/output control port 517, if processing of the last pixel is completed. If NO in step S14, the flow returns to step S11 to execute the same processing for the next pixel of interest; otherwise, the flow returns to the previous routine.

Figure 26:
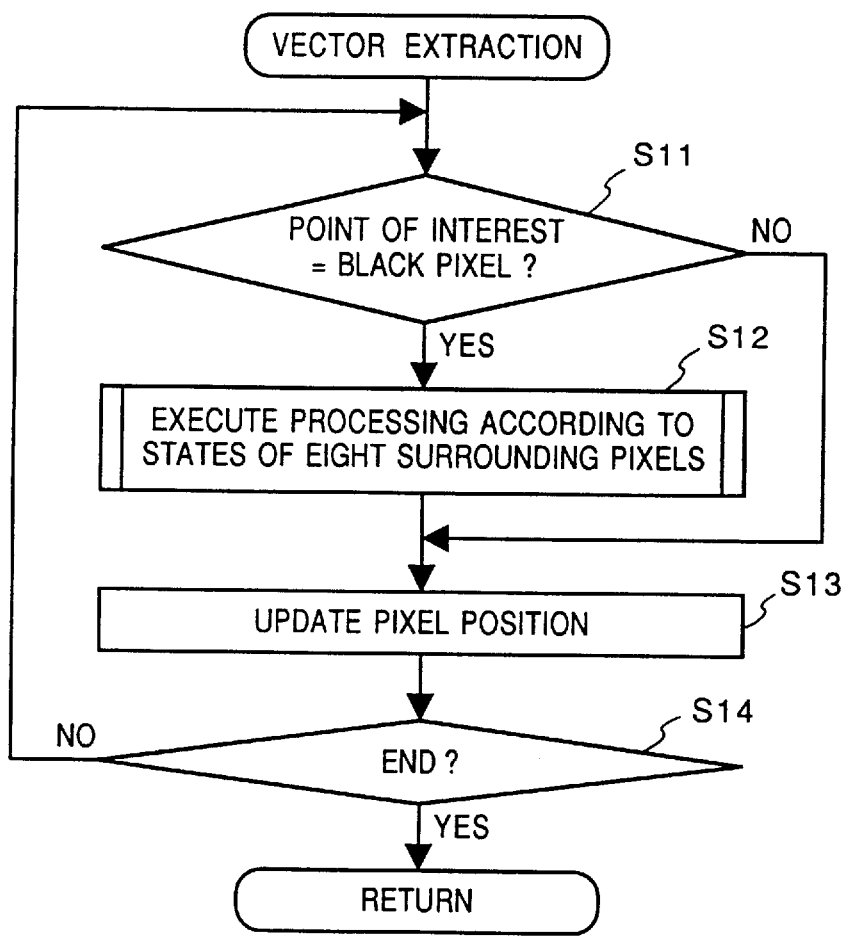
FIG. 26 is a flow chart showing the overall vector array extraction processing in the first embodiment.
Figure 27:
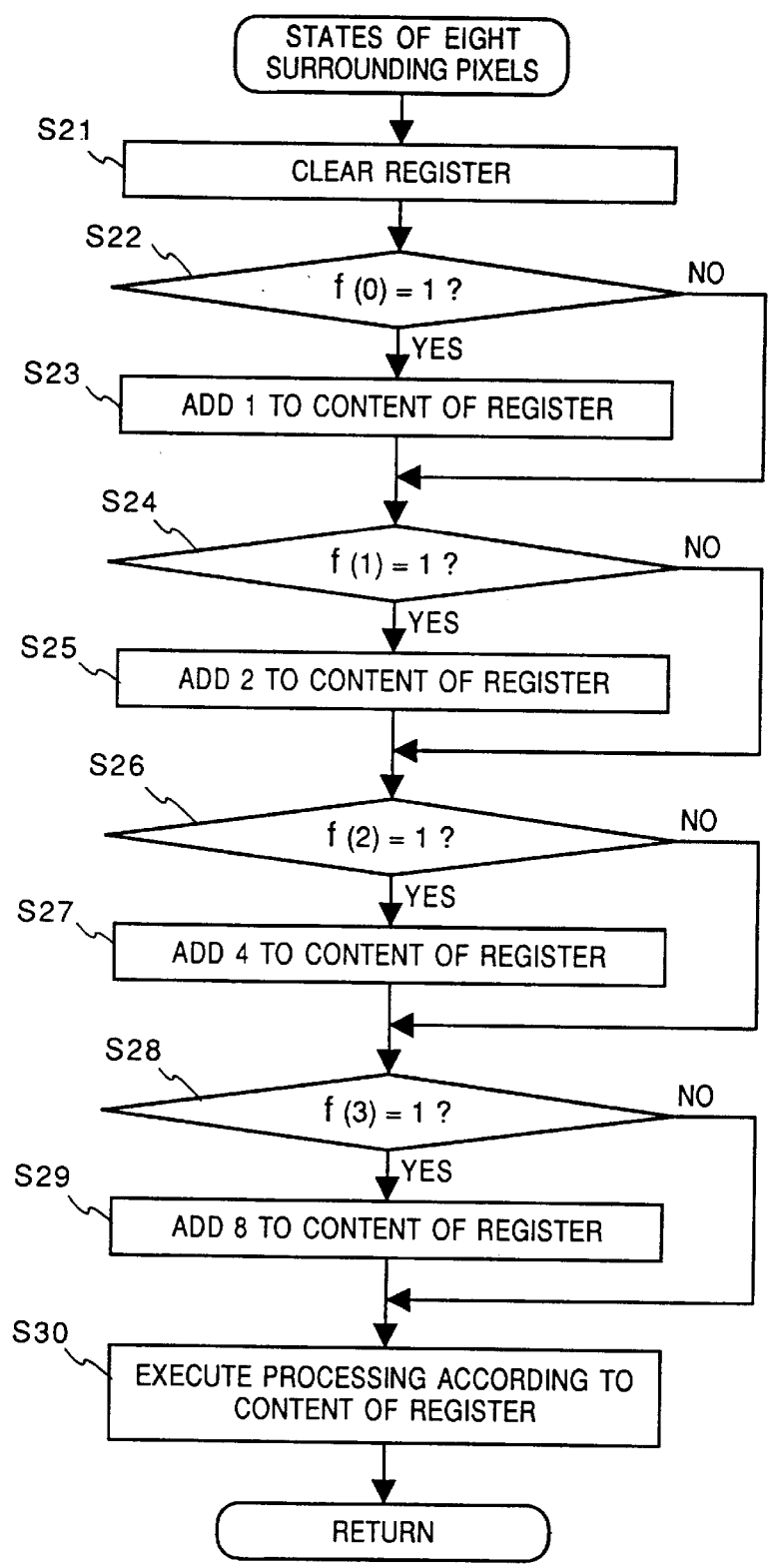
FIG. 27 is a flow chart showing the details of processing executed when the pixel of interest is a black pixel in FIG. 26.

FIG. 27 is a flow chart showing processing executed according to the states of the surrounding pixels in step S12 in FIG. 26.

In step S21, a register in the CPU 519 is initialized to "0". The flow then advances to step S22. If it is determined in step S22 that the state of a pixel at the position "0" in FIG. 1 (to be expressed by f(0) hereinafter) indicates a black pixel (to be expressed by "1" hereinafter), the flow advances to step S23; if the state indicates a white pixel (to be expressed by "0" hereinafter), the flow skips step S23, and advances to step S24. In step S23, "1" is added to the content of the register. More specifically, "1" is set in bit 0 in the register.

The flow then advances to step S24. If it is determined in step S24 that the state of a pixel at the position "1" in FIG. 1 indicates a black pixel (f(1)=1), the flow advances to step S25, and "2" is added to the content of the register ("1" is set in bit 1). If f(1)=0, the flow skips step S25.

When the flow advances to step S26, it is similarly checked, in turn, if a pixel at the position "2" in FIG. 1 is a black pixel. If f(2)=1 (black pixel), the flow advances to step S27, and "4" is added to the content of the register ("1" is set in bit 2); if f(2)=0, the flow skips step S27.

In step S28, the control pays attention to a pixel at the position "3" in FIG. 1, and if f(3)=1, the flow advances to step S29 to add "8" to the content of the register ("1" is set in bit 3). Otherwise, the flow skips the processing in step S29, and advances to step S30.

As a result, one of values "0" to "15" is held in the register in accordance with the states of the pixels at the pixel positions "0", "1", "2", and "3" shown in FIG. 1. In step S30, a routine having a processing number corresponding to the value held in the register is called.

Processing operations (Cases 0 to 15) corresponding to the values "0" to "15" held in the register will be described below. It can be understood that these Cases 0 to 15, and the pixel of interest and its surrounding pixels have the following relationships therebetween.

Case 0 corresponds to FIG. 6; Case 1, FIG. 7; Case 2, FIG. 8; Case 3, FIG. 9; Case 4, FIG. 10; Case 5, FIG. 11; Case 6, FIG. 12; Case 7, FIG. 13; Case 8, FIG. 14; Case 9, FIG. 15; Case 10, FIG. 16; Case 11, FIG. 17; Case 12, FIG. 18; Case 13, FIG. 19; Case 14, FIG. 20; and Case 15, FIG. 21.

The processing contents of these states will be described in detail hereinafter.

Figure 28:
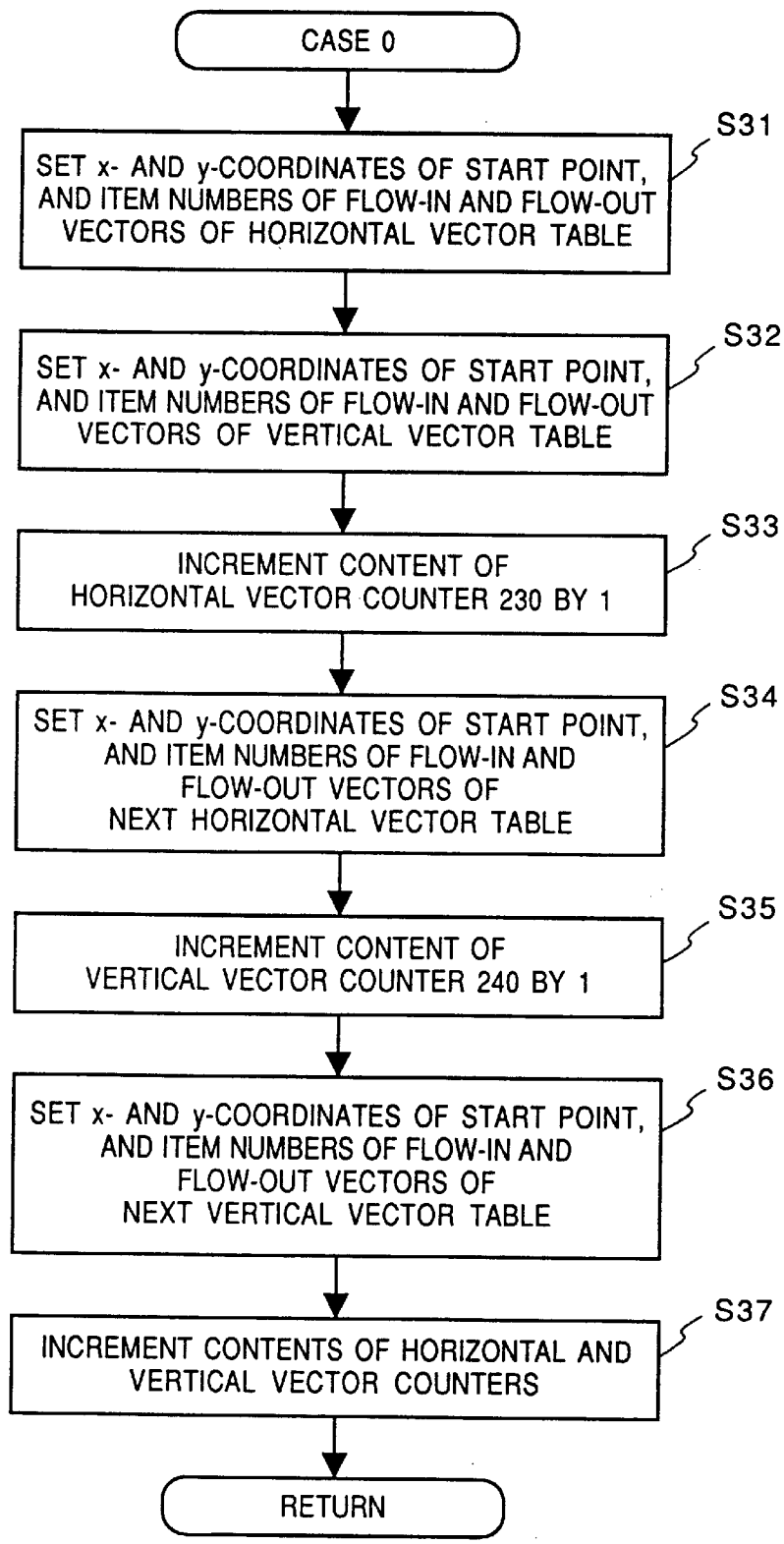
FIG. 28 is a flow chart showing the processing content corresponding to Case 0 when the pixel of interest is a black pixel in FIG. 27.

If it is determined in step S30 in FIG. 27 that the value of the register is "0", the processing shown in FIG. 28 is called. FIG. 28 shows a routine for processing the state (Case 0) shown in FIG. 6, as described above. In the following description, assume that the coordinates of the pixel 63 of interest are (2i, 2j).

<Description of Processing in Case 0 (FIGS. 6, 23, 24, and 28)>

In step S31 in FIG. 28, coordinates (2i−1, 2j−1) are registered as the coordinates of a start point of a horizontal vector. More specifically, (2i−1) is stored in the column of the x-coordinate (231 in FIG. 23) of the start point (64 in FIG. 6) of the horizontal vector indicated by a horizontal vector counter 230 shown in FIG. 23, and (2j−1) is stored in the column of the y-coordinate (232 in FIG. 23) of the start point of the horizontal vector. A source vertical vector, which flows into this horizontal vector, is a vector to be stored at a position next to the position of a vertical vector indicated by a vertical vector counter 240 in FIG. 24 at this time in the start point coordinate table. Also, a destination vertical vector, to which this horizontal vector flows out, is present at the position of a vertical vector indicated by the vertical vector counter 240 at this time.

More specifically, in the column of the flow-in vector item number of the horizontal vector shown in FIG. 23, a value obtained by adding "1" to the value of the vertical vector counter 240 is stored at a position (233 in FIG. 23) indicated by the horizontal vector counter 230. Also, in the column of the flow-out vector item number of the horizontal vector, the value of the vertical vector counter 240 is stored at a position (234 in FIG. 23) indicated by the horizontal vector counter 230.

In step S32, coordinates (2i+1, 2j−1) are similarly registered as the coordinates of a start point (65 in FIG. 6) of a vertical vector. A horizontal vector, which flows into this vertical vector, is the horizontal vector registered in step S31, and a horizontal vector, to which this vertical vector flows out, is a horizontal vector to be stored at the position next to the horizontal vector, which is registered in step S31 in a horizontal vector start point coordinate table.

More specifically, referring to FIG. 24, (2i+1) is stored in a column 241, (2j−1) is stored in a column 242, the value of the horizontal vector counter 230 at this time is stored in a column 243, and a value obtained by adding "1" to the value of the horizontal vector counter 230 at this time is stored in a column 244.

The flow advances to step S33, and the content of the horizontal vector counter 230 is incremented by "1". In step S34, coordinates (2i+1, 2j+1) are registered as the coordinates of a start point (67 in FIG. 6) of a horizontal vector. As a vertical vector which flows into this horizontal vector, the vertical vector registered in step S32 is registered, and as a vertical vector to which this horizontal vector flows out, a vertical vector (i.e., a vector connecting points 66 (start point) and 64 (end point) in FIG. 6) to be stored in step S36 which will have to be at a position next to the vertical vector registered in step S32 in the vertical vector start point coordinate table is registered.

In step S35, the content of the vertical vector counter 240 is incremented by "1". In step S36, coordinates (2i−1, 2j+1) are registered as the start point coordinates of a vertical vector. As a horizontal vector which flows into this vertical vector, the horizontal vector registered in step S34 is registered, and as a horizontal vector to which this vertical vector flows out, the horizontal vector registered in step S31 is registered. In this manner, the contents of the horizontal and vertical vector counters 230 and 240 are finally incremented by "1" in step S37, and the processing ends.

As shown in the matrix 62 in FIG. 6, this processing result is extracted as a state wherein the two horizontal vectors, i.e., the vector connecting the points 64 and 65 and the vector connecting the points 67 and 66, and the two vertical vectors, i.e., the vector connecting the points 65 and 67 and the vector connecting the points 66 and 64 form a single loop.

The processing in Case 0 is executed as described above. To summarize this processing, when one horizontal vector is found, since a vertical vector which has the start point of the found vector as an end point exists inevitably, a number (to be found from the vertical vector table shown in FIG. 24) for specifying the vertical vector is written in the column of the flow-in vector item number. Since a vertical vector is inevitably connected to the end point position of the horizontal vector of interest, a number (to be found from the vertical vector table shown in FIG. 24) for specifying the vertical vector is written in the column of the flow-out vector item number. Based on the same principle, the same processing as described above is executed for the vertical vector table. The same applies to Cases 1 to 15 to be described below.

<Description of Case 1 (FIGS. 7, 23, 24, and 29)>

Figure 29:
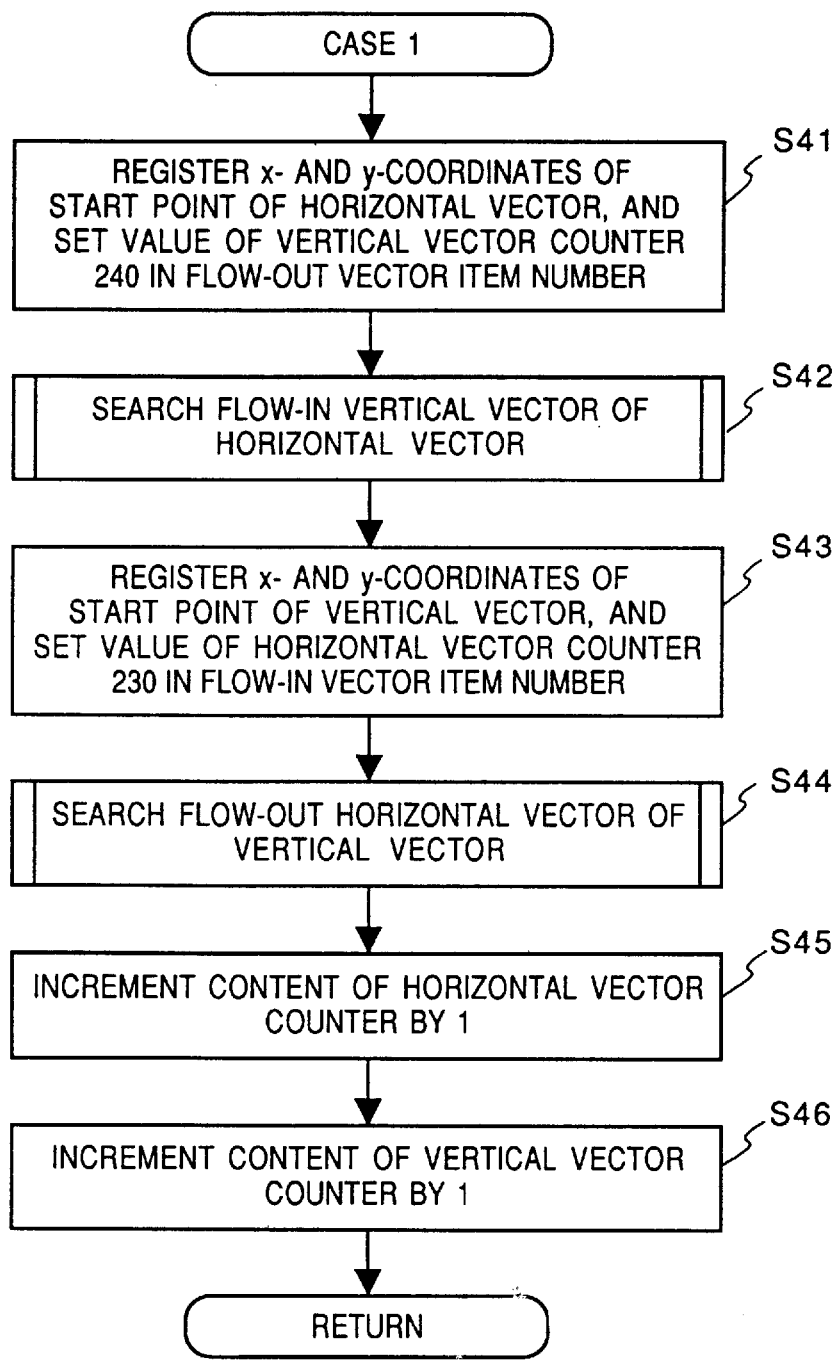
FIG. 29 is a flow chart showing the processing content of Case 1 in the first embodiment.

FIG. 29 is a flow chart showing processing of case 1, which processing is called if it is determined in step S30 in FIG. 27 that the value held in the register is "1".

In step S41, coordinates (2i+1, 2j+1) are registered in the columns of the x- and y-coordinates of the start point of the table shown in FIG. 23. A number (the column 234) of a vertical vector to which this horizontal vector flows out is assumed to be the value of the vertical vector counter 240, which value is to be registered in step S43 (to be described later). The flow advances to step S42. In step S42, a vertical vector which flows into the horizontal vector registered in step S41 is searched from a table 341 for vertical vectors whose flow-out destinations are not determined shown in FIG. 34, and is registered. The processing content in step S42 is shown in the flow chart in FIG. 30.

In step S51, the value of a counter 340 for holding the number of vertical vectors whose flow-out vectors are not determined, and which are registered in the table 341 is set in a variable k. In step S52, it is checked if the content in the column of the x-coordinate of the start point of the vertical vector indicated by an item number (k−1) registered in the table 341 for item numbers of vertical vectors whose flow-out vectors are not determined is (2i+1). If the x-coordinate is not (2i+1), the variable k is decremented by 1, and step S52 is executed again. If it is determined in step S52 that the x-coordinate of the start point is (2i+1), the flow advances to step S54.

In step S54, it is determined that the vertical vector with the item number (k−1) in the table 341 is a flow-in source vector of the horizontal vector registered in step S41 described above, and it is also determined that the horizontal vector registered in step S41 is a flow-out destination vector of this vertical vector. Therefore, the vertical vector number corresponding to the item number (k−1) in the table 341 is stored in the column of the flow-in vector item number of the horizontal vector indicated by the horizontal vector counter 230 in FIG. 23, and the value of the horizontal vector counter 230 in step S41 is stored in the column of the flow-out vector item number of the vertical vector in FIG. 24.

In step S55, the vector whose flow-out destination is determined in steps S53 and S54 is deleted from the table 341, and the deleted portion is squeezed sequentially by shifting contents. In step S56, the value of the counter 340 is decremented by "1" to indicate that the number of vertical vectors whose flow-out destinations are not determined, and which are registered in the table 341 is decreased by "1". Thereafter, the control returns to the previous routine.

The processing in step S42 in FIG. 29 ends, as described above, and the flow then advances to step S43. In step S43, coordinates (2i−1, 2j+1) are registered as the start point of a vertical vector, and as a horizontal vector which flows into this vertical vector, the horizontal vector registered in step S41 is registered. In step S44, a horizontal vector to which the vertical vector registered in step S43 flows out is searched from a table 311 (FIG. 31) for item numbers of horizontal vectors whose flow-in source vectors are not determined, and the searched horizontal vector is registered. The processing content in step S44 is shown in the flow chart in FIG. 35.

Figure 30:
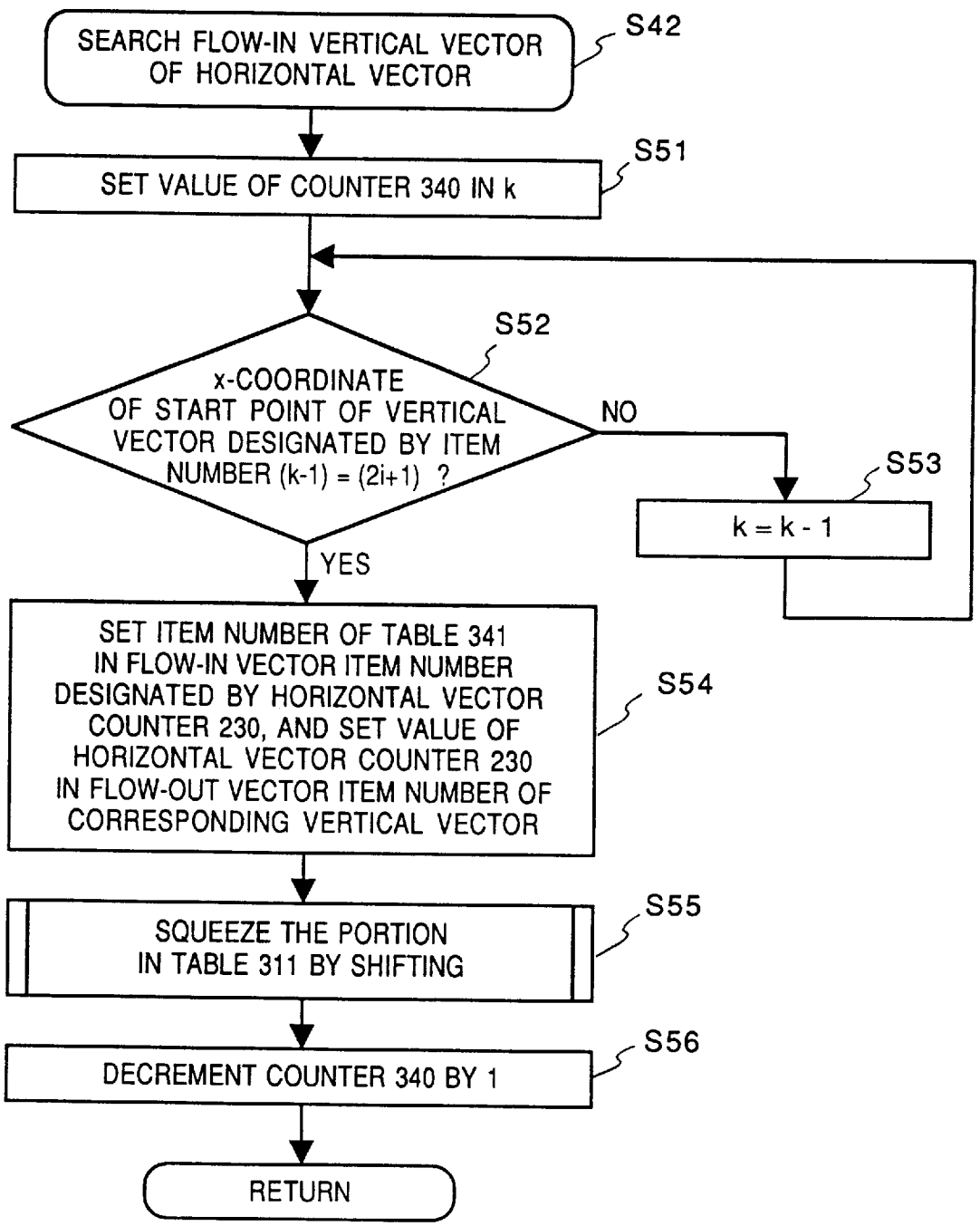
FIG. 30 is a flow chart showing processing for searching a vertical vector, which flows into a horizontal vector.
Figure 31:
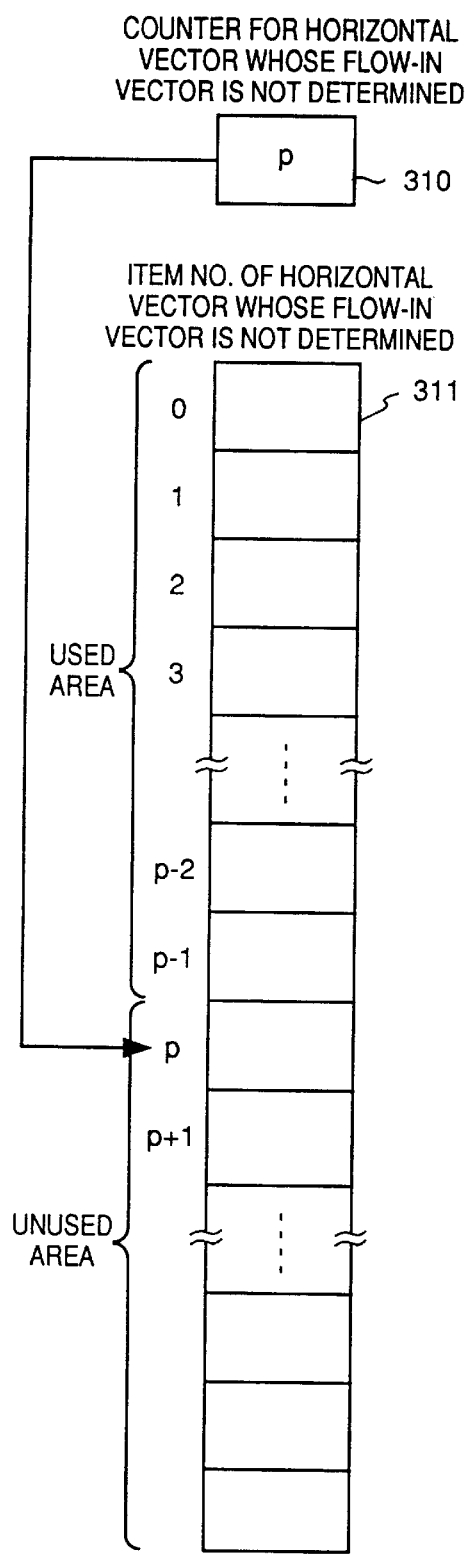
FIG. 31 shows a registration table for horizontal vectors whose flow-in vectors are not determined.

This processing is executed in the same manner as in the processing shown in FIG. 30. More specifically, a vector as a flow-out destination of the vertical vector registered in step S43 is registered in the column of the flow-out vector item number in FIG. 24. The value of the vertical vector counter 240 is set in the column of the flow-in vector item number of the horizontal vector to which this vertical vector flows out so as to register that this vertical vector is a flow-in vector. In this manner, the table 311 shown in FIG. 31 is updated.

In step S45, the content of the horizontal vector counter 230 is incremented by "1". In step S46, the content of the vertical vector counter 240 is incremented by "1". Thereafter, the control returns to the previous routine.

<Description of Processing in Case 2 (FIGS. 8, 23, 24, 33, and 36)>

Figure 36:
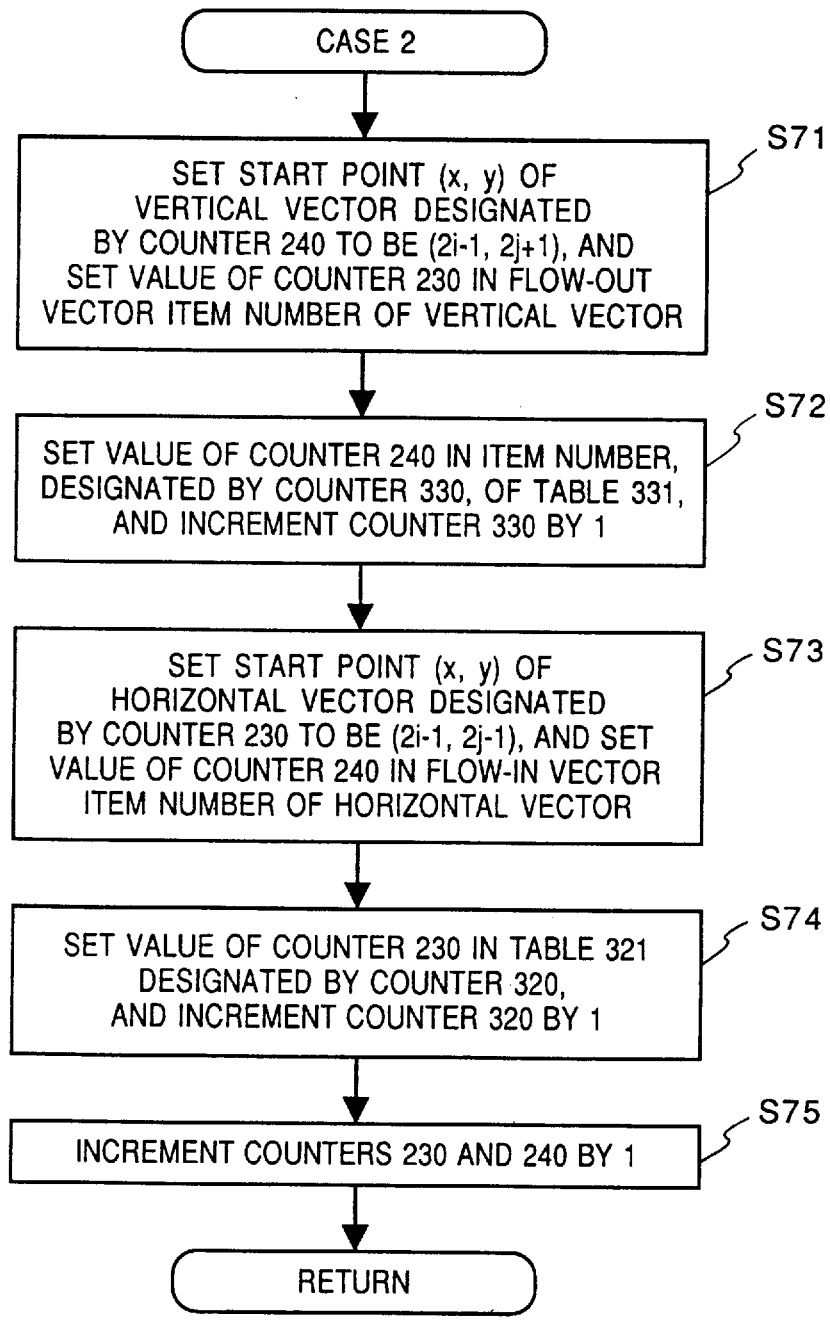
FIG. 36 is a flow chart showing the processing content of Case 2 in the first embodiment.

If it is determined in step S30 in FIG. 27 that the value held in the register is "2", processing shown in FIG. 36 is executed. The processing shown in FIG. 36 is a routine for processing the state shown in FIG. 8.

In step S71, coordinates (2i−1, 2j+1) are registered as the start point of a vertical vector indicated by the vertical vector counter 240 in FIG. 24, and as a horizontal vector to which this vertical vector flows out, a horizontal vector to be registered in step S73 is registered. In step S72, the vertical vector registered in step S71 is registered in an unused area neighboring the used area in a table 331 (FIG. 33) for vertical vectors whose flow-in vectors are not determined, since a horizontal vector which flows into this vertical vector is not determined. In addition, the content of a counter 330 for vertical vectors whose flow-in source vectors are not determined is incremented by "1". The flow then advances to step S73. In step S73, coordinates (2i−1, 2j−1) are registered as the start point of a horizontal vector in the column of the table indicated by the counter 230 shown in FIG. 23, and as a flow-in source vertical vector of this table, the vertical vector registered in step S71 is registered.

Figure 32:
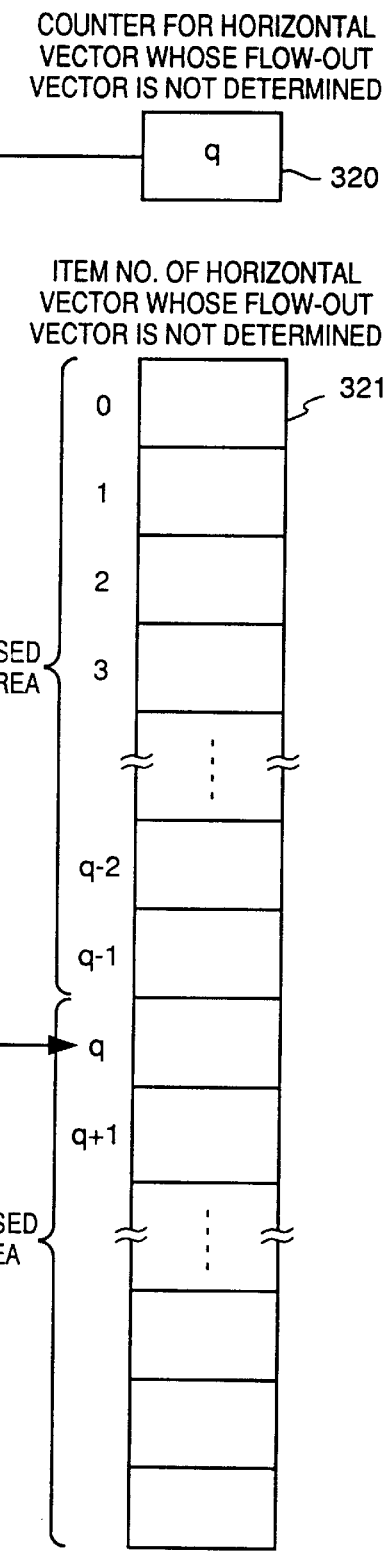
FIG. 32 shows a registration table for horizontal vectors whose flow-out vectors are not determined.

In step S74, the horizontal vector registered in step S73 is registered, as a vector whose flow-out destination vertical vector is not determined, in an unused area neighboring the used area in a table 321 (FIG. 32) for horizontal vectors whose flow-out vectors are not determined, and the content of a counter 320 for horizontal vectors whose flow-out destination vectors are not determined is incremented by "1". In step S75, the contents of both the horizontal and vertical vector counters 230 and 240 are incremented by "1", and the control returns to the previous routine.

<Description of Case 3 (FIGS. 9, 23, 24, and 37)>

Figure 37:
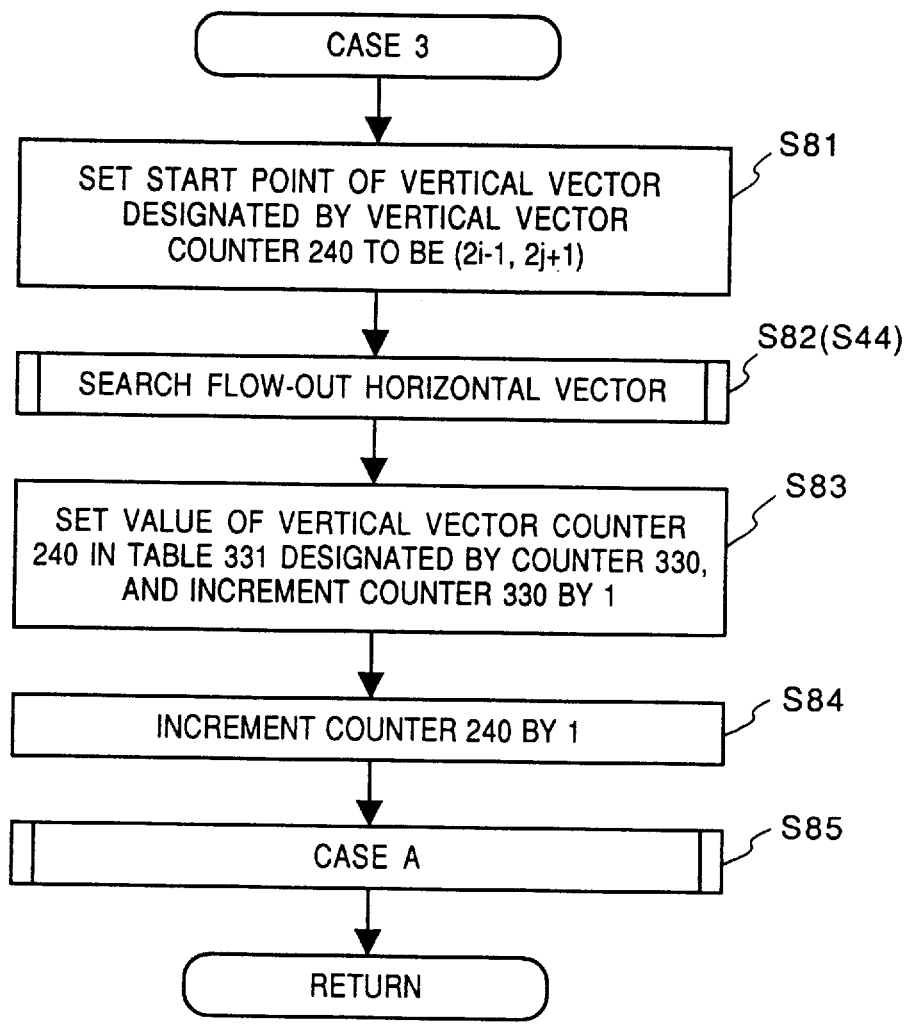
FIG. 37 is a flow chart showing the processing content of Case 3 in the first embodiment.

If it is determined in step S30 in FIG. 27 that the value in the register is "3", processing shown in FIG. 37 is executed. The processing shown in FIG. 37 is a routine for processing the state shown in FIG. 9.

Figure 9:
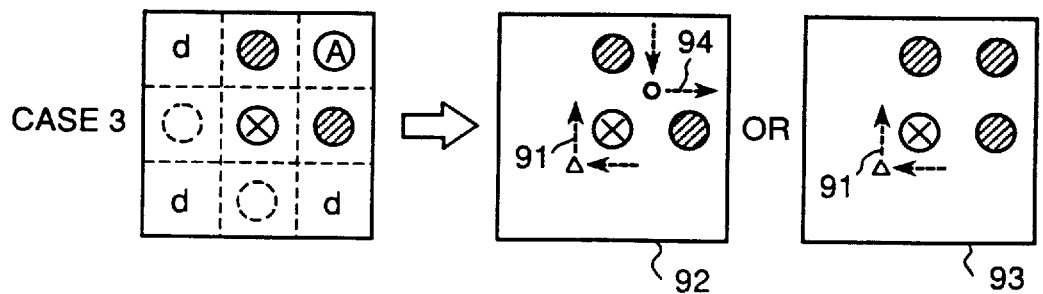
FIG. 9 is a view showing a pixel state in Case 3 in outline vector extraction of the first embodiment.

In step S81, coordinates (2i−1, 2j+1) are registered as the start point of a vertical vector 91 (FIG. 9). The flow advances to step S82 to obtain a horizontal vector as a flow-out destination of the vertical vector registered in step S81 in the same manner as in step S44 described above. In step S83, the value of the vertical vector counter 240 is set in the table 331 indicated by the counter 330, and thereafter, the content of the counter 330 is incremented by "1". In step S84, the content of the vertical vector counter 240 is incremented by "1". In step S85, processing of Case A is executed. This processing is shown in the flow chart in FIG. 38.

Figure 38:
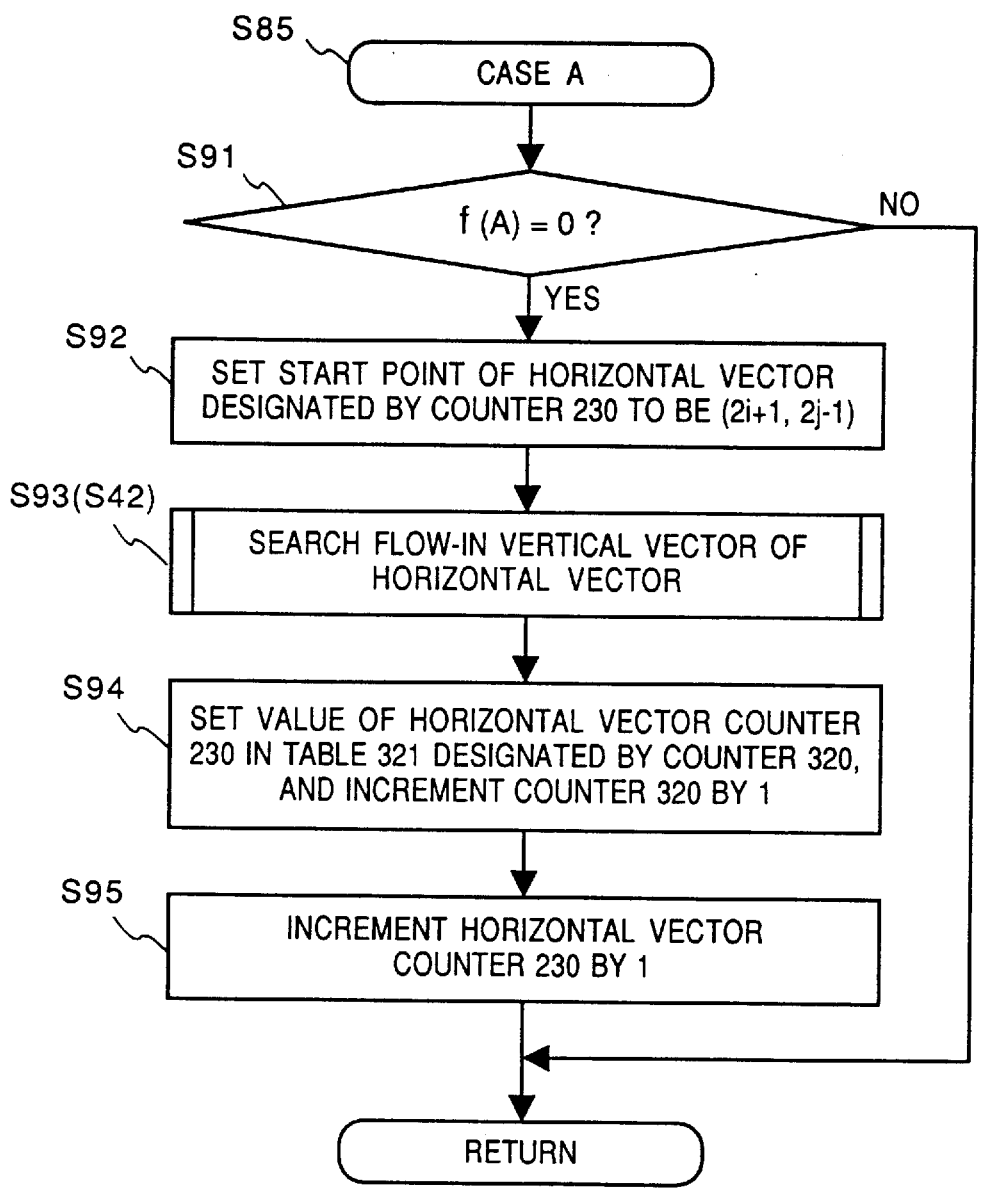

Referring to the flow chart in FIG. 38, it is checked in step S91 if a pixel A in FIG. 9 is a white pixel, i.e., "0". If NO in step S91, the processing ends without any processing. This state is indicated by a matrix 93 in FIG. 9.

If the pixel A is a white pixel, the flow advances to step S92, the start point of a horizontal vector 94 (FIG. 9) is set to be (2i+1, 2j−1). In step S93, a vertical vector which flows into this horizontal vector is searched. The flow then advances to step S94, and the number of this horizontal vector is set in the table 321 since the flow-out vector of this horizontal vector is not determined. In step S95, the content of the horizontal vector counter 230 is incremented by "1", and the processing ends.

<Description of Case 4 (FIGS. 10, 23, 24, 31 to 34, and 39)>

Figure 10:
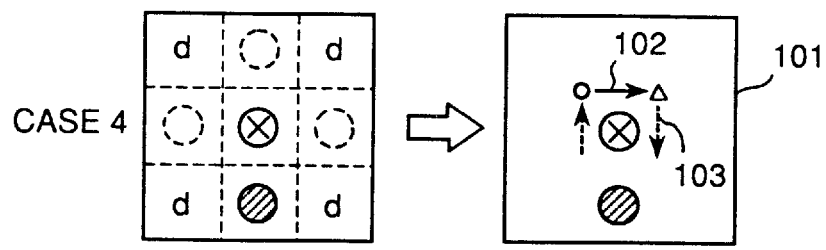
FIG. 10 is a view showing a pixel state in Case 4 in outline vector extraction of the first embodiment.
Figure 11:
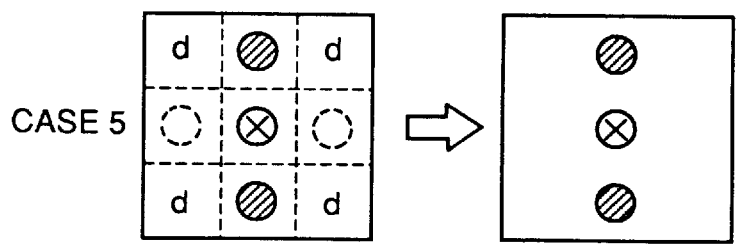
FIG. 11 is a view showing a pixel state in Case 5 in outline vector extraction of the first embodiment.
Figure 39:
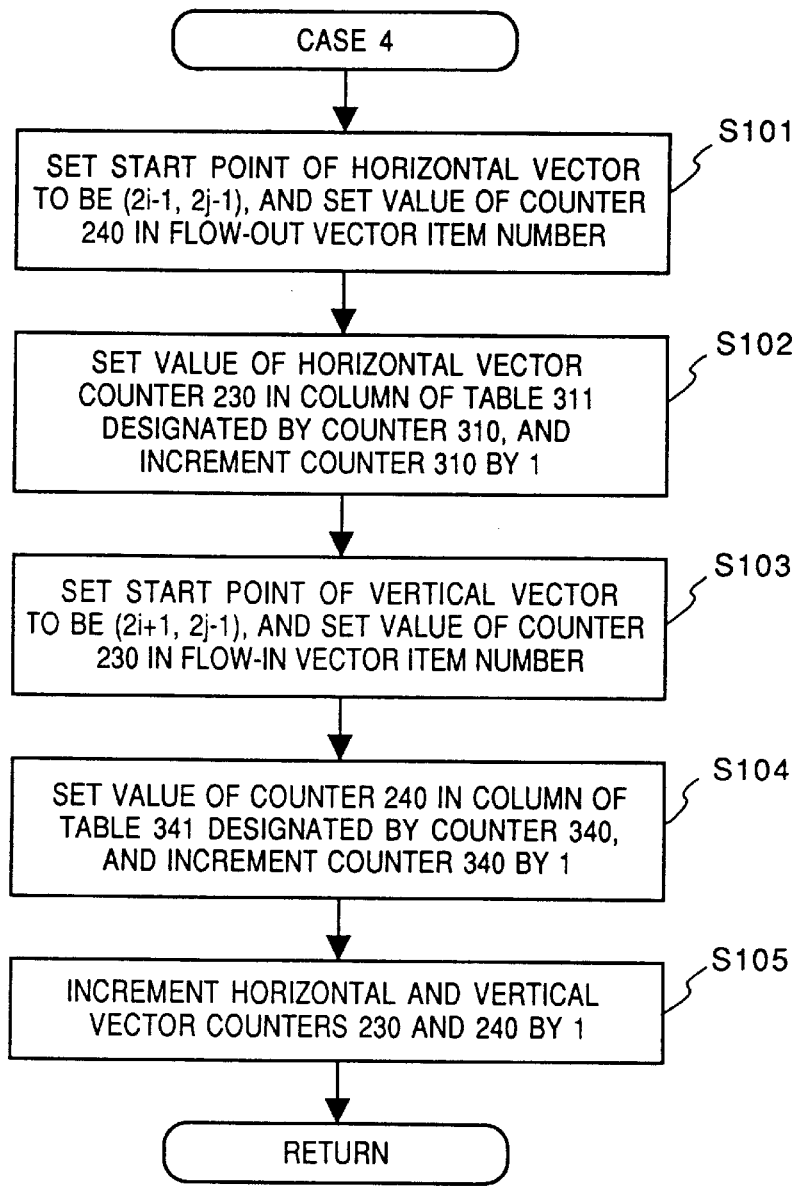
FIG. 39 is a flow chart showing the processing content of Case 4 in the first embodiment.

If it is determined in step S30 in FIG. 27 that the value in the register is "4", a routine shown in FIG. 39 is called. In this routine, processing for Case 4 shown in FIG. 10 is executed.

In step S101, coordinates (2i−1, 2j−1) are registered as the start point of a horizontal vector 102. In addition, it is determined that a vector to which this horizontal vector 102 flows out is a vertical vector to be registered in step S103, and the value of the vertical vector counter 240 at this time is set in the column of the flow-out vector item number in FIG. 23. In step S102, it is determined that a vector which flows into the vector registered in step S101 is not determined, and the value of the counter 230 is registered in the table 311 shown in FIG. 31, thereby updating the table 311. In step S103, coordinates (2i+1, 2j−1) are defined as the start point of a vertical vector 103 (FIG. 10). Also, it is determined that a vector which flows into this vector is the horizontal vector 102 registered in step S101, and the value of the horizontal vector counter 230 is set in the column of the flow-in vector item number in the table shown in FIG. 24. In step S104, it is determined that a vector to which the vertical vector 103 registered in step S103 flows out is not determined, and the value of the vertical vector counter 240 is set in the table 341 indicated by the counter 340 in FIG. 34. In step S105, the contents of the horizontal and vertical vector counters 230 and 240 are respectively incremented by "1", and the control returns to the previous routine.

<Description of Case 5>

Figure 40:
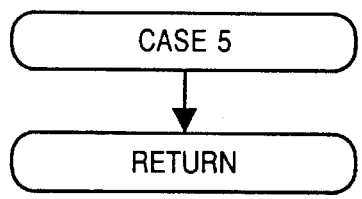
FIG. 40 is a flow chart showing the processing content of Case 5 in the first embodiment.

If it is determined in step S30 in FIG. 27 that the value in the register is "5", a routine shown in FIG. 40 is called. The routine shown in FIG. 40 is called in the state shown in FIG. 11, and the control returns without any processing.

<Description of Case 6 (FIGS. 12, 23, 24, 31 to 34, 41, and 42)>

Figure 41:
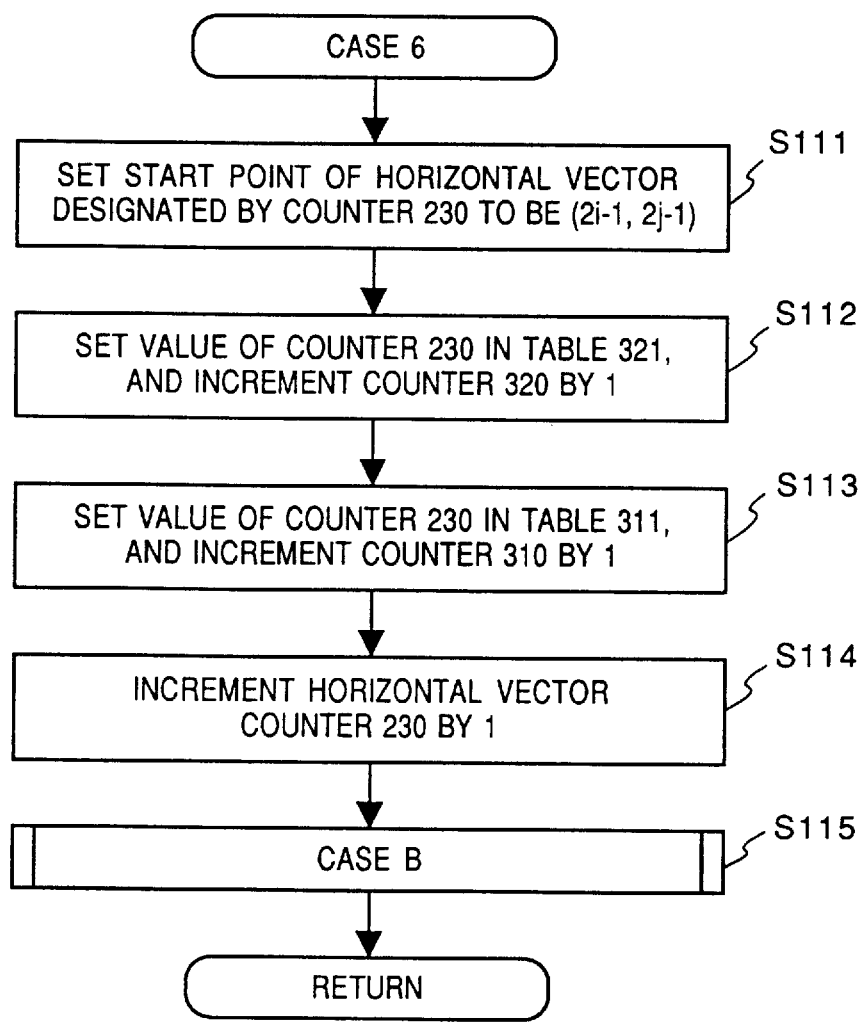
FIG. 41 is a flow chart showing the processing content of Case 6 in the first embodiment.

If it is determined in step S30 in FIG. 27 that the value in the register is "6", a routine shown in the flow chart in FIG. 41 is called. This routine executes processing for Case 6 shown in FIG. 12.

In step S111, the start point of a horizontal vector 122 (FIG. 12) indicated by the counter 230 in FIG. 23 is registered as (2i−1, 2j−1). In step S112, it is determined that a flow-out destination vector of the horizontal vector 122 registered in step S111 is not determined, and the content of the counter 230 is set in the table 321 (FIG. 32) for horizontal vectors whose flow-out destination vectors are not determined, as in step S94 in FIG. 38. In step S113, it is determined that a source vector which flows into the horizontal vector 122 registered in step S111 is not determined, and the value of the counter 230 is registered in the table 311 (FIG. 31) for horizontal vectors whose flow-in source vectors are not determined, as in step S102 in FIG. 39. In step S114, the content of the horizontal vector counter 230 is incremented by "1". In step S115, it is checked if a pixel at a position (B) is a white or black pixel. If the pixel is a white pixel, coordinates (2i+1, 2j+1) are registered as the start point of a vertical vector 124, as shown by a matrix 120 in FIG. 12; if the pixel is a black pixel, the processing ends, as shown by a matrix 121 in FIG. 12.

Figure 42:
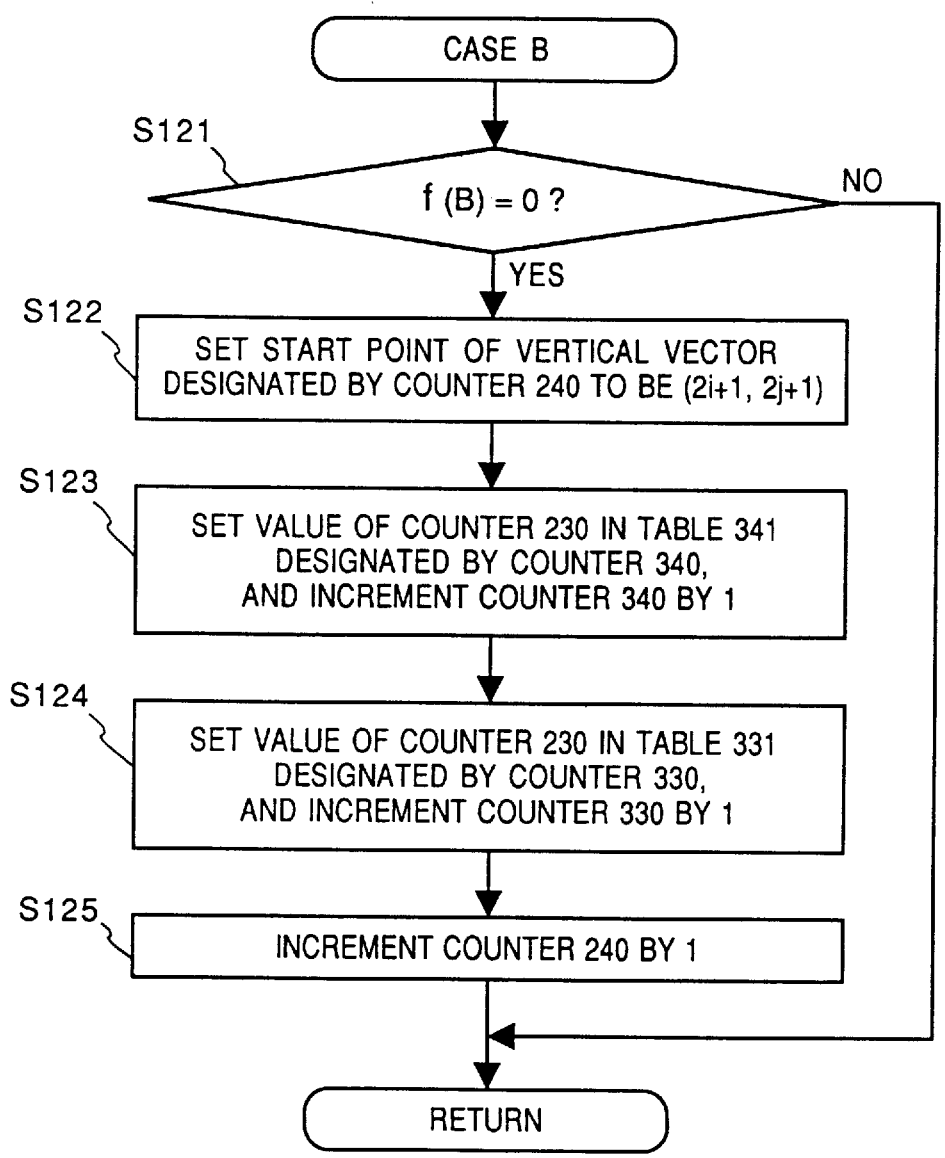

FIG. 42 shows the details of the processing in step S115.

In step S121, it is checked if the pixel B (see FIG. 12) is a white or black pixel. If the pixel B is a black pixel, the flow returns. If the pixel B is a white pixel, the flow advances to step S122. In step S122, coordinates (2i+1, 2j+1) are registered as the start point of the vertical vector 124. In step S123, it is determined the vertical vector 124 is a vertical vector whose flow-out destination vector is not determined, and the value of the counter 240 is set in the table 341 in FIG. 34, as in step S104 in FIG. 39. Furthermore, in step S124, it is determined that a source vector which flows into the vertical vector 124 registered in step S122 is not determined, and the value of the counter 240 is set in the table 331 in FIG. 33, as in step S72 in FIG. 36. In step S125, the content of the vertical vector counter 240 is incremented by "1", and the control returns to the previous routine.

<Description of Case 7 (FIGS. 13, 38, 42, and 43)>

Figure 43:
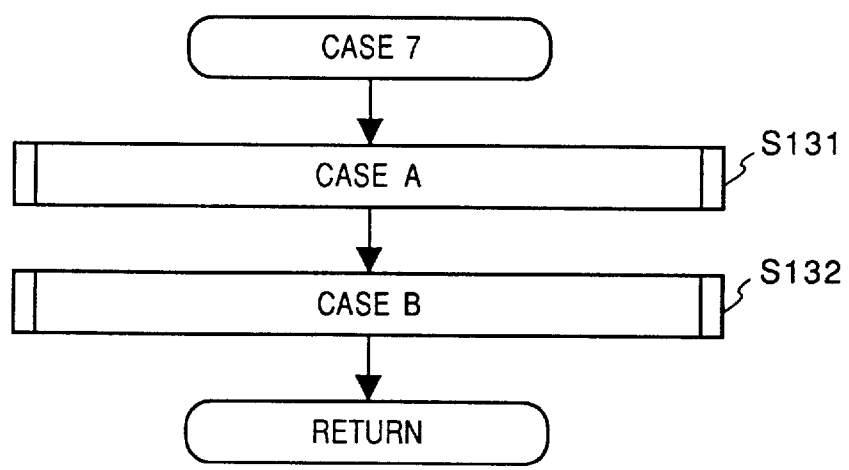
FIG. 43 is a flow chart showing the processing content of Case 7 in the first embodiment.

If it is determined in step S30 in FIG. 27 that the value of the register is "7", a routine shown in the flow chart in FIG. 43 is executed. This routine executes processing for Case 7 shown in FIG. 13.

In step S131, processing according to the state of a pixel A is performed, as in step S85 in FIG. 38. In step S132, processing according to the state of a pixel B is performed, as in step S115 in FIG. 40, and the flow returns to the previous routine.

Figure 13:
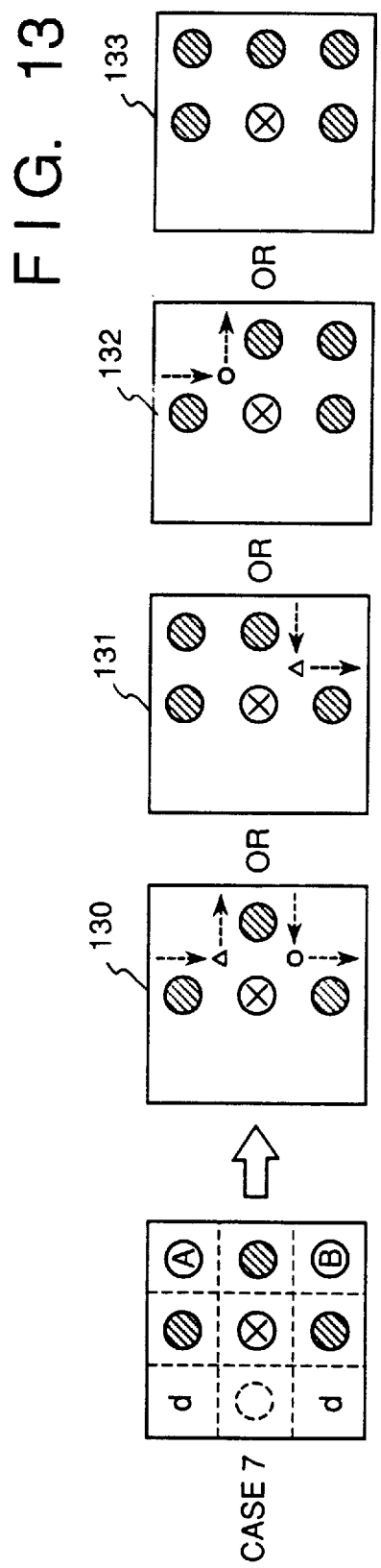
FIG. 13 is a view showing a pixel state in Case 7 in outline vector extraction of the first embodiment.
Figure 14:
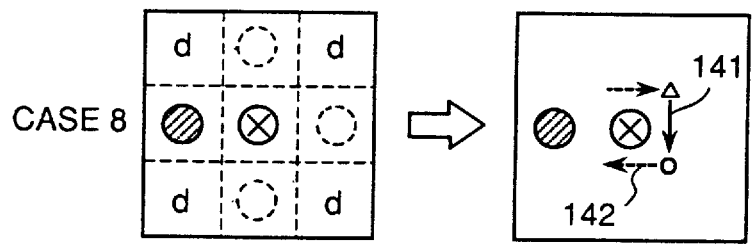
FIG. 14 is a view showing a pixel state in Case 8 in outline vector extraction of the first embodiment.

Note that, in FIG. 13, a matrix 130 shows a, case wherein both pixels at positions (A) and (B) are white pixels; a matrix 131 shows a case wherein only a pixel at the position (A) is a black pixel; a matrix 132 shows a case wherein only a pixel at the position (B) is a black pixel; and a matrix 133 shows a case wherein both pixels at the positions (A) and (B) are black pixels.

<Description of Case 8 (FIGS. 14, and 44 to 46)>

Figure 44:
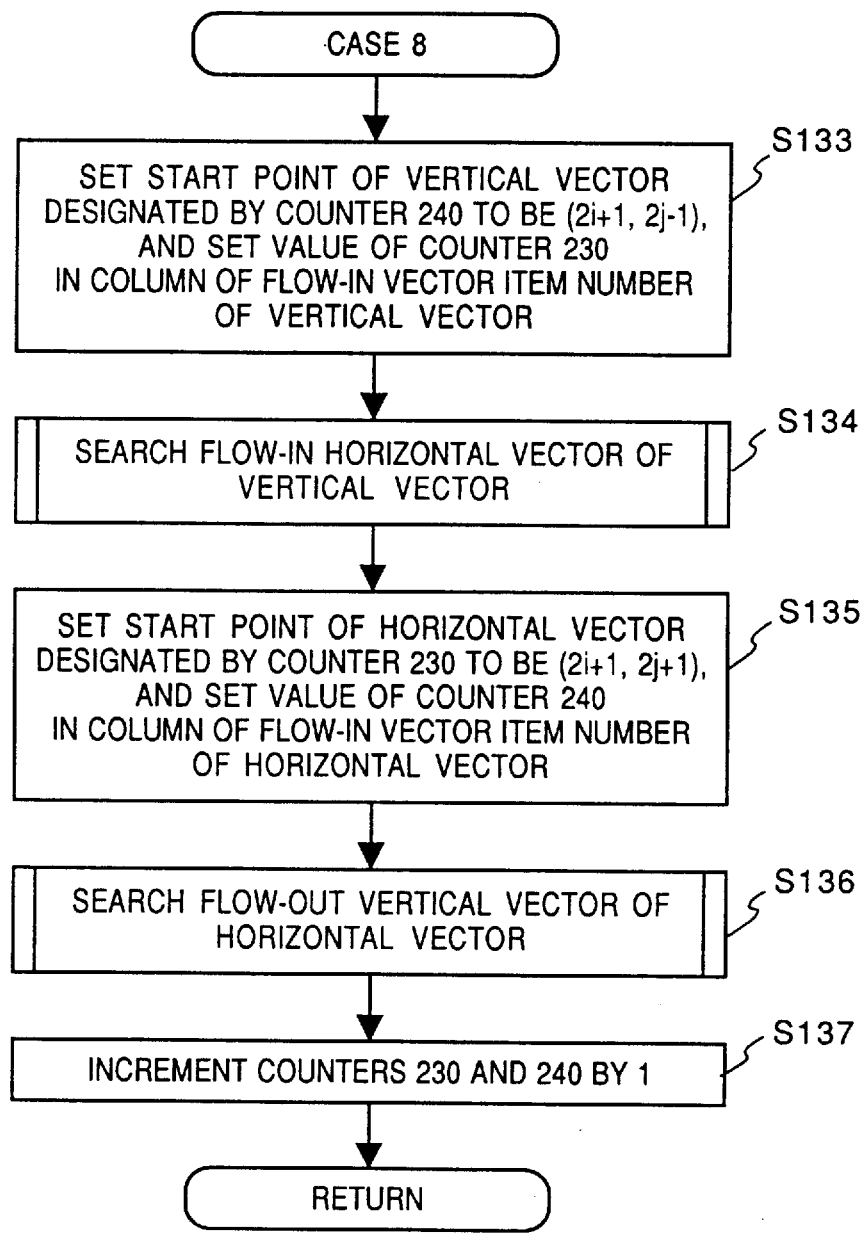
FIG. 44 is a flow chart showing the processing content of Case 8 in the first embodiment.

If it is determined in step S30 in FIG. 27 that the value of the register is "8", a processing routine shown in FIG. 44 is called. This routine executes processing for Case 8 shown in FIG. 14.

In step S133, the start point of a vertical vector 141 (FIG. 14) designated by the vertical vector counter 240 is registered as (2i+1, 2j−1) in the table shown in FIG. 24. It is determined that a destination horizontal vector to which this vector flows out is a vector to be registered in step S135 (to be described later), and the value of the counter 230 is registered in the column of the flow-out vector item number. In step S134, a source horizontal vector which flows into the vertical vector 141 registered in step S133 is obtained in a procedure shown in FIG. 45 using the table 321 shown in FIG. 32.

Figure 35:
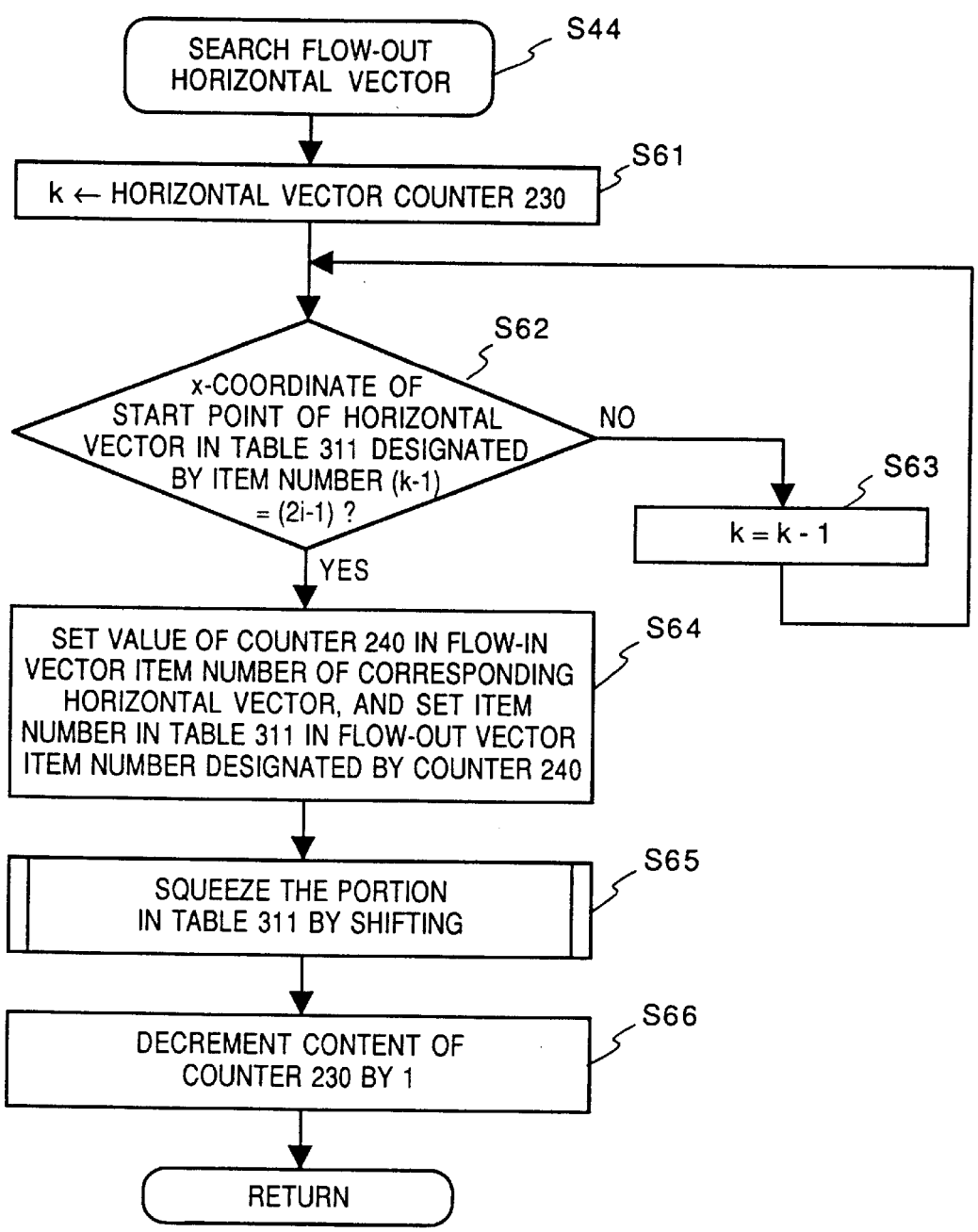
FIG. 35 is a flow chart showing processing for searching a horizontal vector which flows out into a vertical vector.
Figure 45:
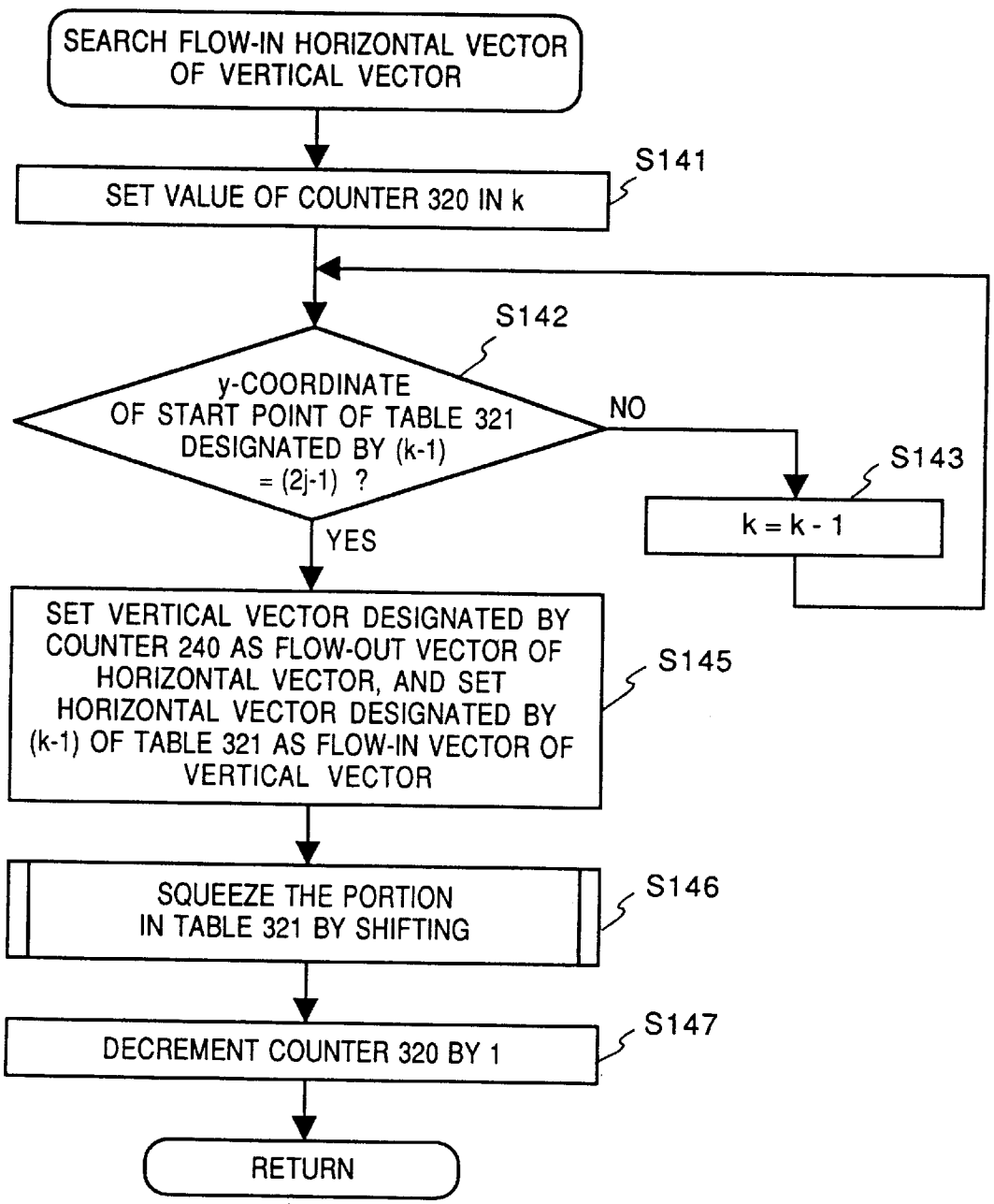

The processing shown in FIG. 45 is executed in the same procedure as that of the processing shown in FIGS. 30 and 35 described above. That is, a source horizontal vector which flows into the vertical vector 141 registered in step S133 is registered, and the vertical vector 141 registered in step S133 is registered as a destination vertical vector to which this horizontal vector flows out (step S145). In step S146, the selected portion of the table 321 is squeezed sequentially by shifting the contents. In step S147, the content of the counter 320 is decremented by "1", thus updating the table 321 shown in FIG. 32.

In step S135 shown in FIG. 44, the start point of a horizontal vector 142 (FIG. 14) indicated by the horizontal vector counter 230 is registered as (2i+1, 2j+1), and the vertical vector 141 registered in step S133 is registered as a source vertical vector which flows into this vector 142. In step S136, a destination vertical vector to which the horizontal vector 142 registered in step S135 flows out is obtained according to a procedure shown in FIG. 46 using the table 331 shown in FIG. 33.

Figure 46:
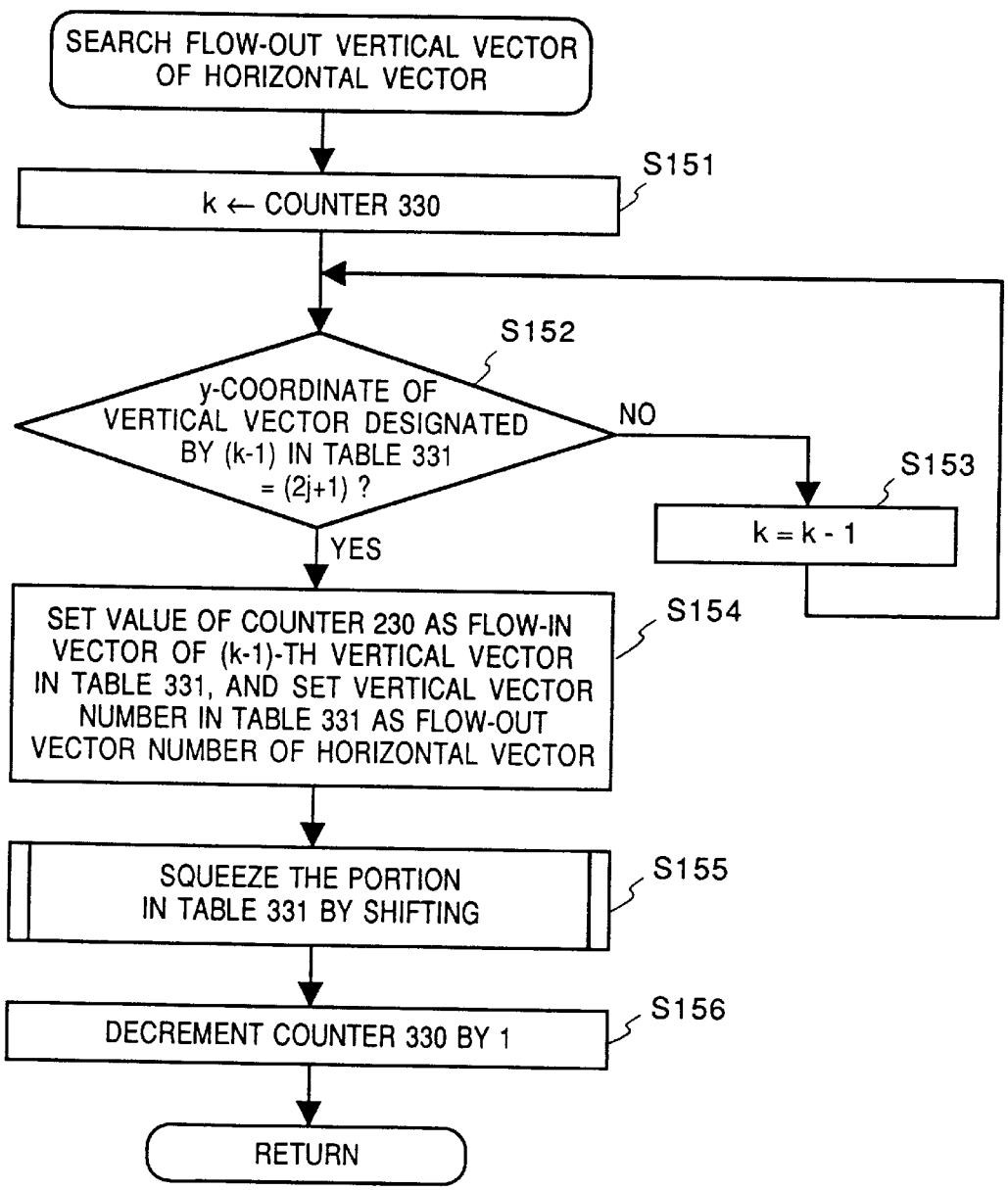

The processing in FIG. 46 is executed in the same procedure as that of the processing shown in FIGS. 30, 35, and 45 described above. That is, a destination vertical vector to which the horizontal vector 142 registered in step S135 in FIG. 44 flows out is registered, and the horizontal vector 142 registered in step S135 is registered as a source vector which flows into this vertical vector (step S154 in FIG. 46). Thereafter, the content of the table 331 shown in FIG. 33 is updated in steps S155 and S156.

Referring back to FIG. 44, in step S137, the horizontal and vertical vector counters 230 and 240 are respectively incremented by "1", and the flow returns to the previous routine.

<Description of Case 9 (FIGS. 15 and 47)>

Figure 47:
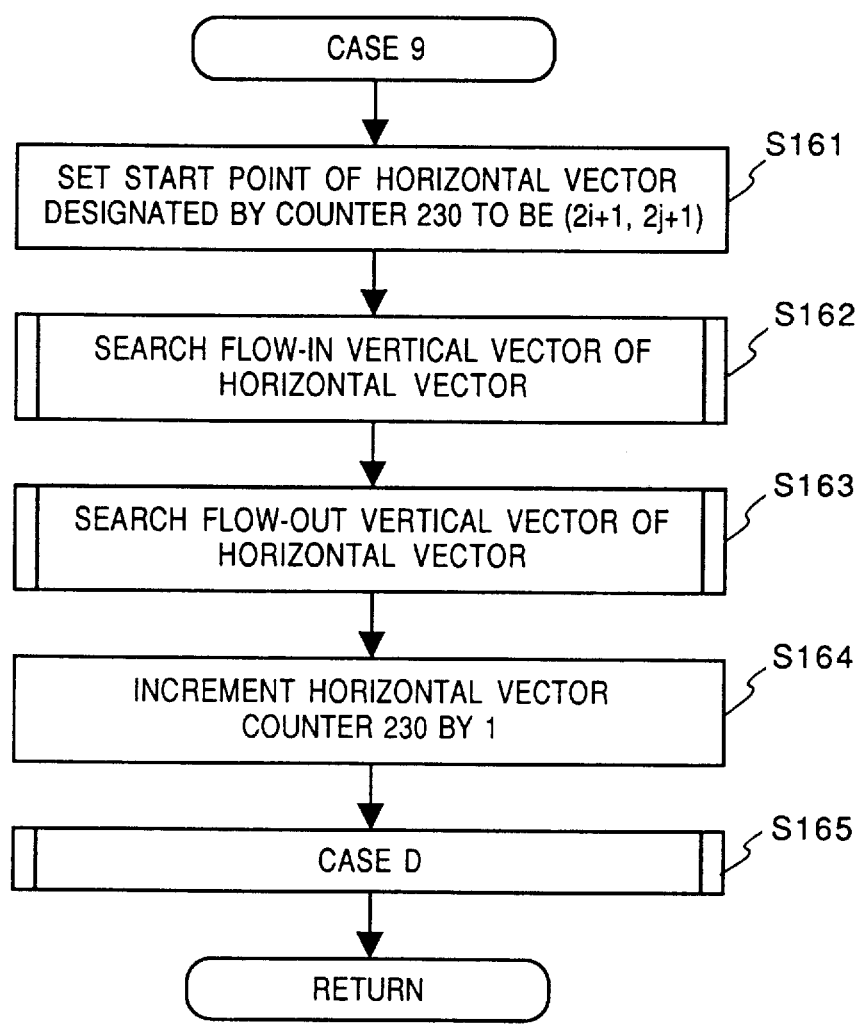
FIG. 47 is a flow chart showing the processing content of Case 9 in the first embodiment.

If it is determined in step S30 in FIG. 27 that the value of the register is "9", a routine shown in FIG. 47 is called. This routine executes processing for Case 9 shown in FIG. 15.

Figure 15:
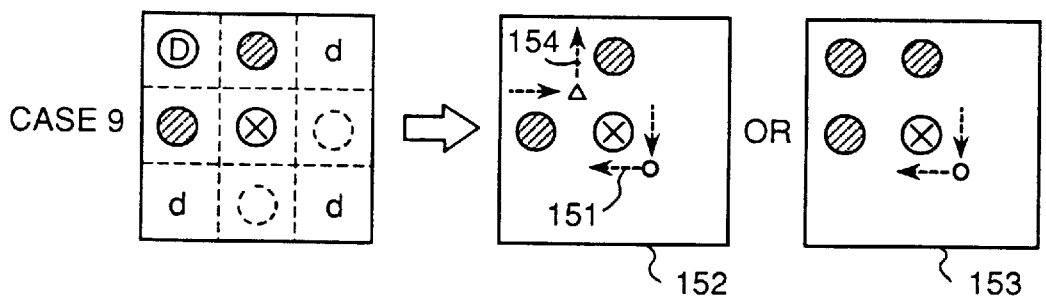
FIG. 15 is a view showing a pixel state in Case 9 in outline vector extraction of the first embodiment.
Figure 16:
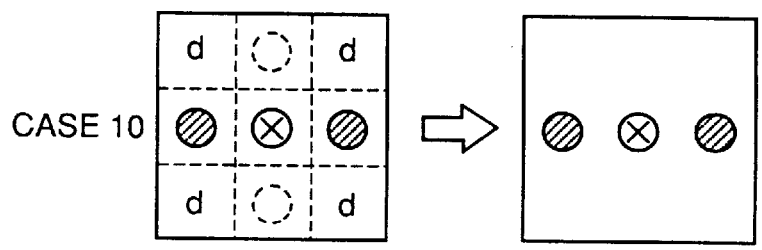
FIG. 16 is a view showing a pixel state in Case 10 in outline vector extraction of the first embodiment.

In step S161, coordinates (2i+1, 2j+1) are registered as the start point of a horizontal vector 151 (FIG. 15). In step S162, a vertical vector which flows into this horizontal vector 151 is searched from the table 341 shown in FIG. 34, and the searched vector is registered, in the same procedure as that shown in FIG. 30 described above. Also, the horizontal vector registered in step S161 is registered in the table shown in FIG. 24 as a horizontal vector to which the searched vertical vector flows out. In this manner, the table 341 shown in FIG. 34 is updated.

In step S163, a destination vertical vector to which the horizontal vector 151 registered in step S161 flows out is searched using the table shown in FIG. 33, and the searched vector is registered, in the same procedure as that shown in FIG. 46. Also, the horizontal vector 151 registered in step S161 is registered as a source vector which flows into the searched vertical vector, thereby updating the table 331 shown in FIG. 33.

In step S164, the content of the horizontal vector counter 230 is incremented by "1". In step S165, it is checked if a pixel at a position (D) is a white or black pixel. If the pixel at the position (D) is a white pixel, coordinates (2i−1, 2j−1) are registered as the start point of a vertical vector 154, as shown by a matrix 152 in FIG. 15; if it is a black pixel, the processing ends (a matrix 153 in FIG. 15).

Figure 48:
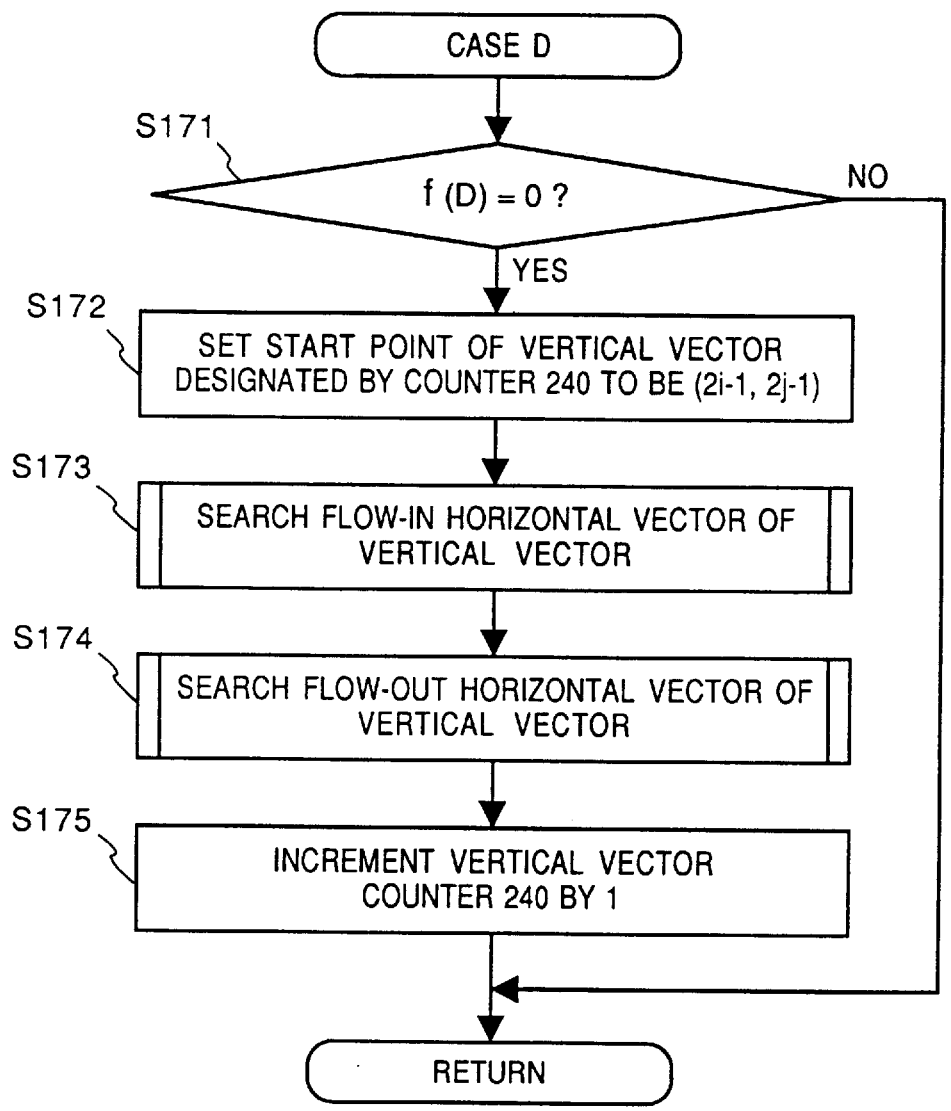

FIG. 48 shows the content of the processing (Case D) in step S165.

In step S171, it is checked if the pixel at the position (D) is a white or black pixel. If the pixel at the position (D) is a black pixel, the flow returns to the previous routine. If the pixel at the position (D) is a white pixel, the flow advances to step S172, and coordinates (2i−1, 2j−1) are registered as the start point of the vertical vector 154. The flow then advances to step S173, and the above-mentioned processing shown in FIG. 45 is executed. More specifically, a source horizontal vector which flows into the vertical vector 154 registered in step S172 is registered, and the vertical vector 154 registered in step S172 is registered as a destination vertical vector into which this horizontal vector flows, thereby updating the table 321 shown in FIG. 32.

In step S174, the above-mentioned processing shown in FIG. 35 is executed. More specifically, a destination horizontal vector to which the vertical vector 154 registered in step S172 flows out is registered, and the vertical vector 154 registered in step S172 is registered as a source vector which flows into this horizontal vector, thereby updating the table 311 shown in FIG. 31. In step S175, the content of the vertical vector counter 240 is incremented by "1", and the flow returns to the previous routine.

<Processing of Case 10>

Figure 49:
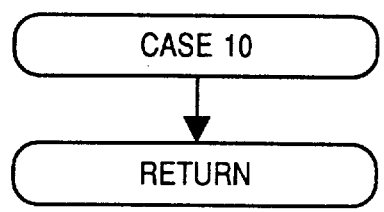
FIG. 49 is a flow chart showing the processing content of Case 10 in the first embodiment.

If it is determined in step S30 in FIG. 27 that the value of the register is "10", a routine shown in FIG. 49 is called. This routine executes processing for Case 10 shown in FIG. 16. When the routine shown in FIG. 49 is called, the flow returns to the previous routine without any processing.

<Description of Case 11>

Figure 50:
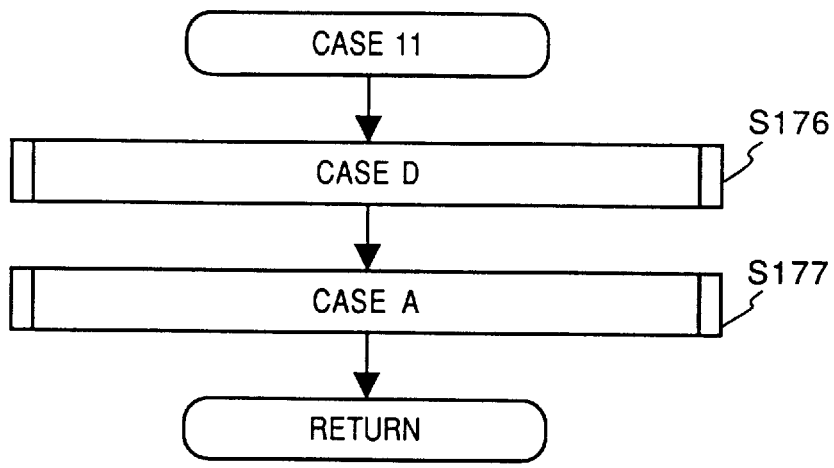
FIG. 50 is a flow chart showing the processing content of Case 11 in the first embodiment.

If it is determined in step S30 in FIG. 27 that the value of the register is "11", a routine shown in FIG. 50 is called. This routine executes processing for Case 11 shown in FIG. 17.

In step S176, the above-mentioned processing shown in the flow chart in FIG. 48 is executed according to the state of a pixel at the position (D), as in step S165. In step S177, the above-mentioned processing shown in FIG. 38 is executed according to the state of a pixel at the position (A), like in steps S85 and S131.

Figure 17:
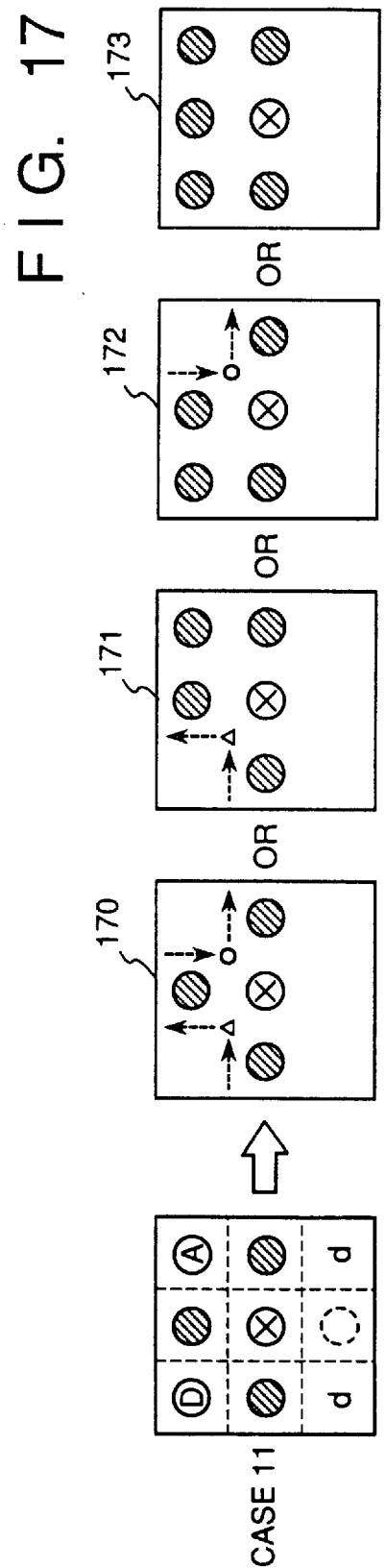
FIG. 17 is a view showing a pixel state in Case 11 in outline vector extraction of the first embodiment.
Figure 18:
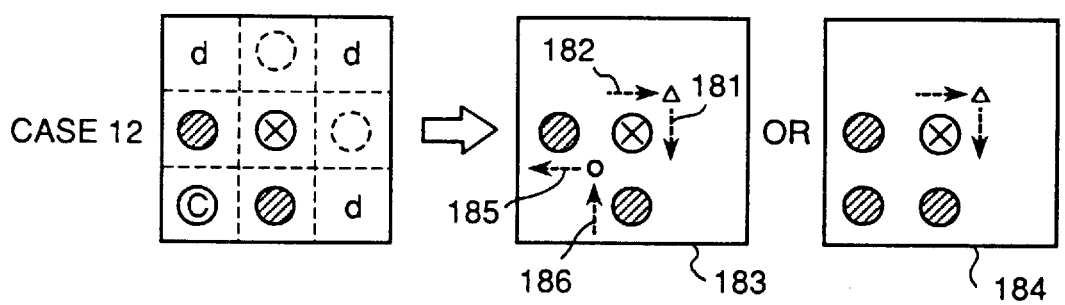
FIG. 18 is a view showing a pixel state in Case 12 in outline vector extraction of the first embodiment.

Note that in FIG. 17, a matrix 170 shows a case wherein both pixels at positions (D) and (A) are white pixels; a matrix 171 shows a case wherein only a pixel at the position (A) is a black pixel; a matrix 172 shows a case wherein only a pixel at the position (D) is a black pixel; and a matrix 173 shows a case wherein both pixels at the positions (A) and (D) are black pixels.

<Description of Case 12 (FIGS. 18, 23, 24, 51, and 52)>

Figure 51:
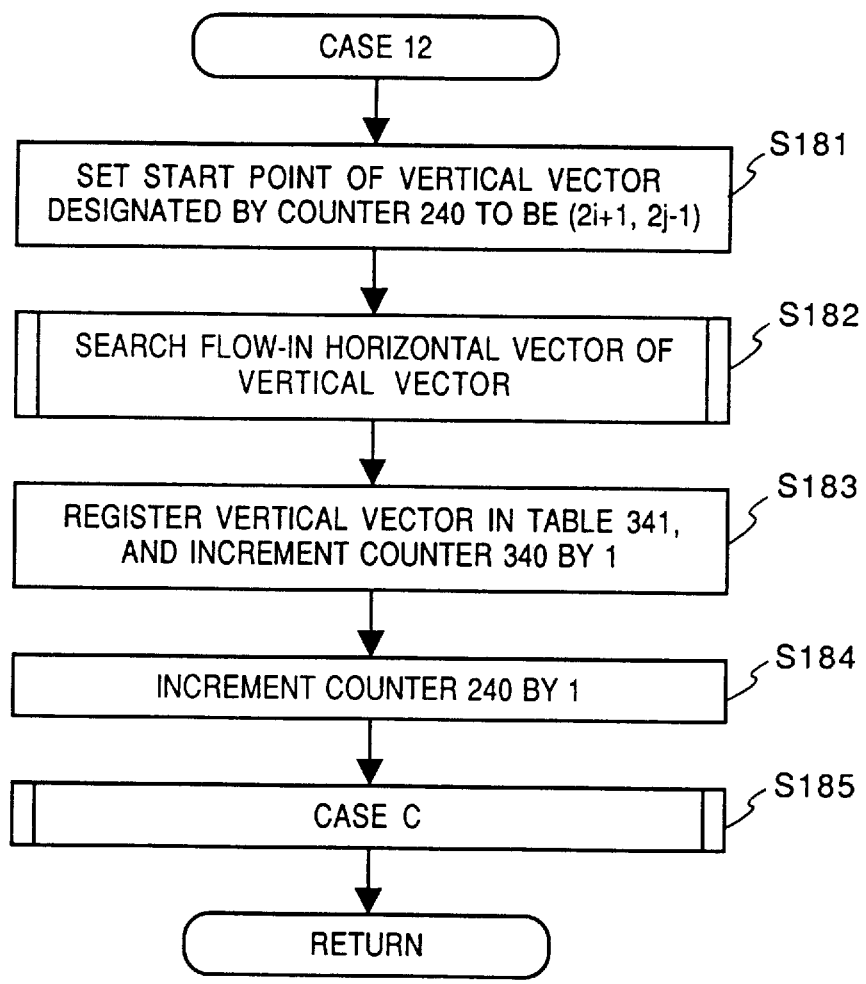
FIG. 51 is a flow chart showing the processing content of Case 12 in the first embodiment.

If it is determined in step S30 in FIG. 27 that the value of the register is "12", a routine shown in FIG. 51 is called. This routine executes processing for the state in Case 12 shown in FIG. 18. In step S181, coordinates (2i+1, 2j-1) are registered as the start point of a vertical vector 181 (FIG. 18) in the table shown in FIG. 24. In step S182, source horizontal vector 182 which flows into the vertical vector 181 registered in step S181 is searched and registered according to the procedure shown in FIG. 45 in the same manner as in step S134 in FIG. 44 described above. Also, the vertical vector 181 registered in step S182 is registered as a flow-out destination vector of this horizontal vector 182, thereby updating the table 321 shown in FIG. 32.

In step S183, it is registered in the table 341 shown in FIG. 34 that a flow-out destination vector of the vertical vector 181 registered in step S181 is not determined, and the counter 340 is updated. In step S184, the vertical vector counter 240 is incremented by "1". In step S185, it is checked if a pixel at the position (C) is a white or black pixel. If the pixel at the position (C) is a white pixel, coordinates (2i-1, 2j+1) are registered as the start point of a horizontal vector 185, as shown by a matrix 183 in FIG. 18; if it is a black pixel, the processing ends, as shown by a matrix 184 in FIG. 18.

Figure 52:
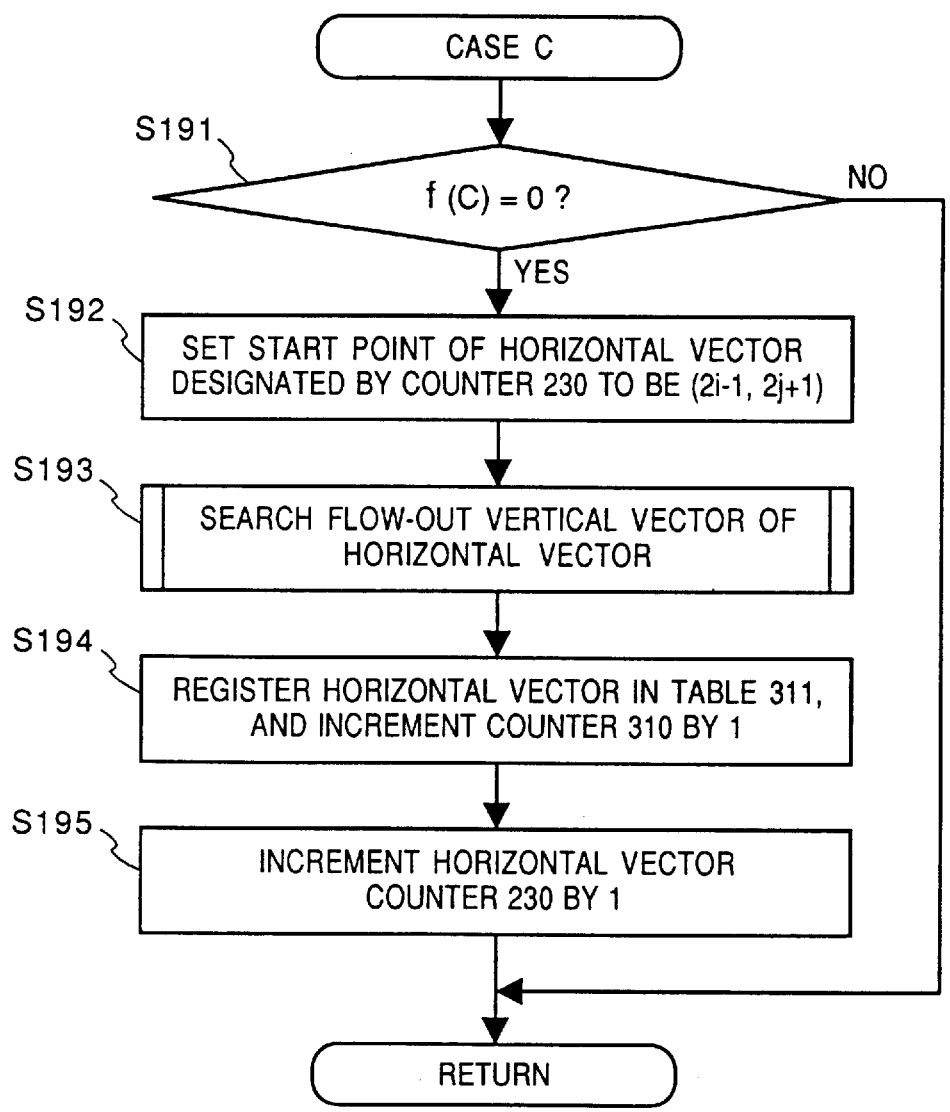

The content of the processing in step S185 is shown in the flow chart in FIG. 52.

In step S191, it is checked if a pixel at the position (C) is a white or black pixel. If the pixel at the position (C) is a black pixel, the flow returns to the previous routine. If the pixel at the position (C) is a white pixel, the flow advances to step S192, and coordinates (2i-1, 2j+1) are registered as the start point of a horizontal vector 185. In step S193, the above-mentioned processing shown in the flow chart in FIG. 46 is executed to register a destination vertical vector to which the horizontal vector 185 registered in step S192 flows out. Also, the horizontal vector 185 registered in step S192 is registered in the table shown in FIG. 24 as a source vector which flows into this vertical vector, thereby updating the table 331 shown in FIG. 33.

In step S194, it is registered in the table 311 (FIG. 31) for horizontal vectors whose flow-in source vectors are not determined that a source vertical vector 186 which flows into the horizontal vector 185 registered in step S192 is not determined, and thereafter, the content of the counter 310 is incremented by "1". The flow then advances to step S195, and the content of the horizontal vector counter 230 is incremented by "1". Thereafter, the flow returns to the previous routine.

<Description of Case 13 (FIGS. 19 and 53)>

Figure 53:
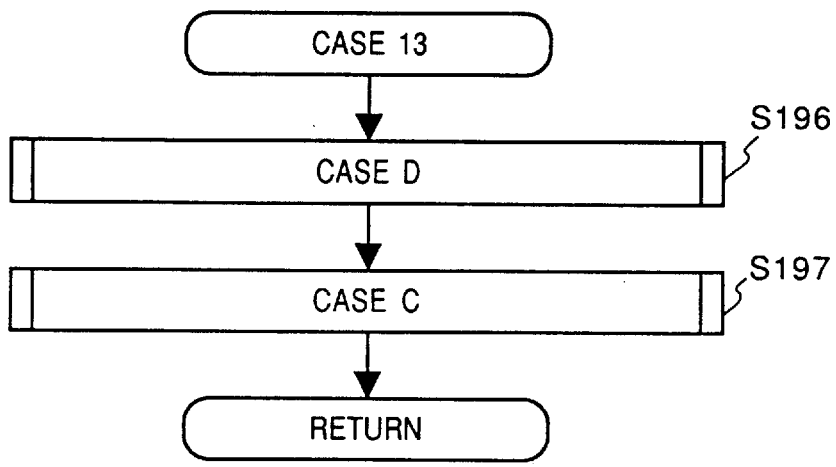
FIG. 53 is a flow chart showing the processing content of Case 13 in the first embodiment.

If it is determined in step S30 in FIG. 27 that the value of the register is "13", a routine shown in FIG. 53 is called. This routine executes processing for Case 13 shown in FIG. 19.

In step S196, the above-mentioned processing shown in the flow chart in FIG. 48 is executed according to the state of a pixel at the position (D), as in step S165 in FIG. 47 and step S176 in FIG. 50.

Figure 19:
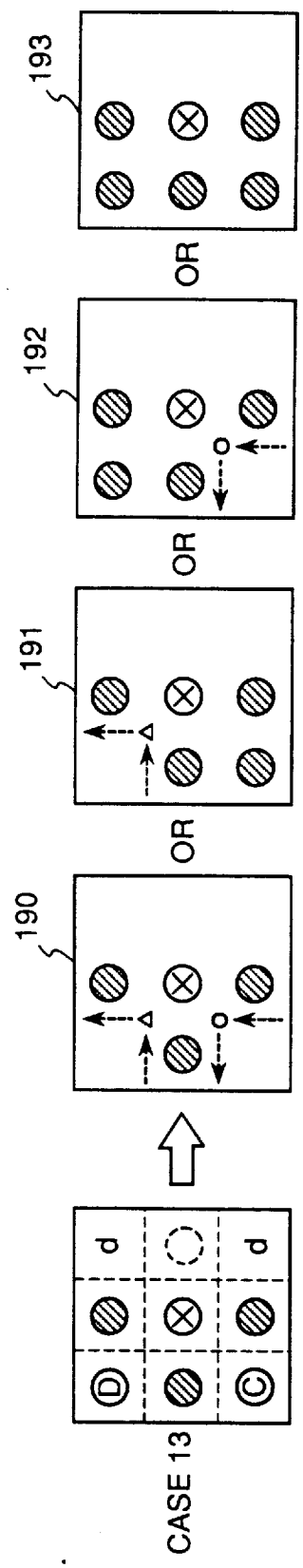
FIG. 19 is a view showing a pixel state in Case 13 in outline vector extraction of the first embodiment.

In step S197, the above-mentioned processing shown in the flow chart in FIG. 52 is executed according to the state of a pixel at the position (C), as in step S185 in FIG. 51. In FIG. 19, a matrix 190 shows a processing result obtained when both pixels at positions (D) and (C) are white pixels; a matrix 191 shows a processing result obtained when only a pixel at the position (C) is a black pixel; a matrix 192 shows a processing result obtained when only a pixel at the position (D) is a black pixel; and a matrix 193 shows a processing result obtained when both the pixels at the positions (C) and (D) are black pixels.

<Description of Case 14>

Figure 54:
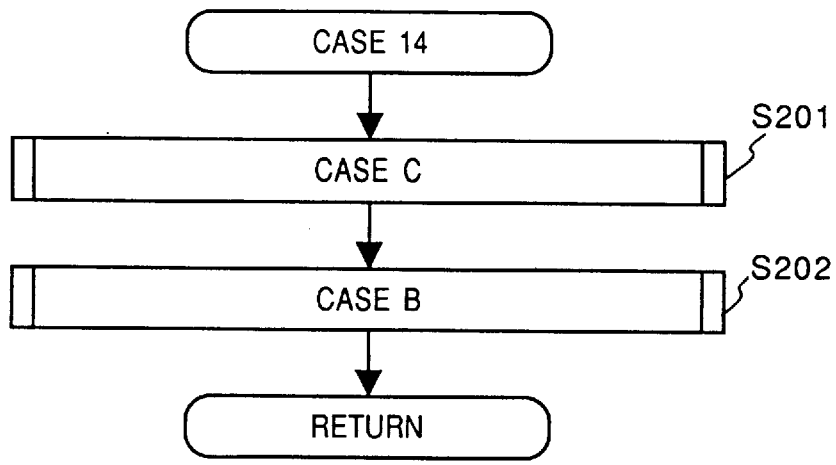
FIG. 54 is a flow chart showing the processing content of Case 14 in the first embodiment.

If it is determined in step S30 in FIG. 27 that the value of the register is "14", a routine shown in FIG. 54 is called. This routine executes processing for Case 14 shown in FIG. 20.

In step S201 in FIG. 54, the above-mentioned processing for Case C shown in FIG. 52 is executed according to the state of a pixel at the position (C), as in step S185 in FIG. 51 and step S197 in FIG. 53. In step S202, the processing for Case B shown in FIG. 42 is executed according to the state of a pixel at the position (B), as in step S115 in FIG. 41 and step S132 in FIG. 43.

Figure 20:
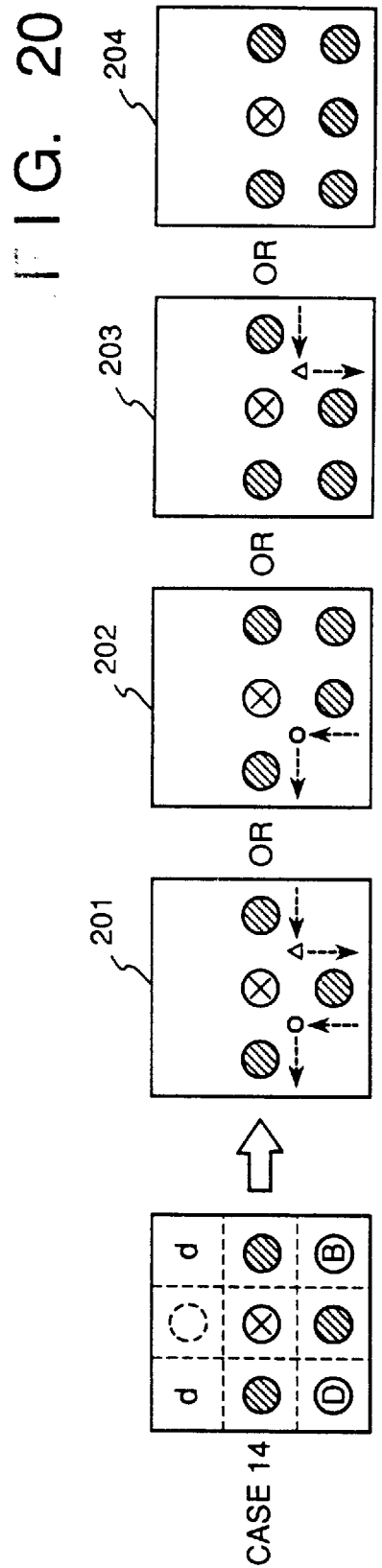
FIG. 20 is a view showing a pixel state in Case 14 in outline vector extraction of the first embodiment.

In FIG. 20, a matrix 201 shows a processing result obtained when both pixels at positions (D) and (C) are white pixels; a matrix 202 shows a processing result obtained when only a pixel at the position (C) is a black pixel; a matrix 203 shows a processing result obtained when only a pixel at the position (D) is a black pixel; and a matrix 204 shows a processing result obtained when both the pixels at the positions (C) and (D) are black pixels.

<Description of Case 15>

Figure 55:
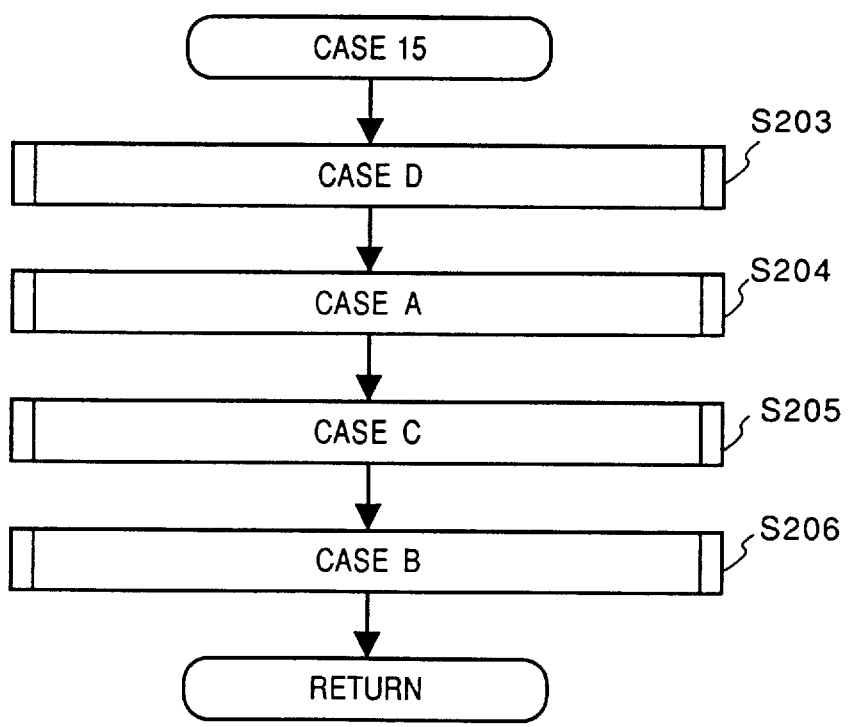
FIG. 55 is a flow chart showing the processing content of Case 15 in the first embodiment.

If it is determined in step S30 in FIG. 27 that the value of the register is "15", a routine shown in FIG. 55 is called. This routine executes processing for the state in Case 15 shown in FIG. 21.

In step S203, the above-mentioned processing for Case D shown in the flow chart in FIG. 48 is executed according to the state of a pixel at the position (D), as in step S165 and the like described above. In step S204, the above-mentioned processing for Case A shown in FIG. 38 is executed according to the state of a pixel at the position (A), as in steps S85, S131, and the like described above. In step S205, the above-mentioned processing for Case C shown in FIG. 52 is executed according to the state of a pixel at the position (C) as in step S185 and the like described above. Furthermore, in step S206, the above-mentioned processing for Case B shown in FIG. 42 is executed according to the state of a pixel at the position (B) as in step S115 in FIG. 41 and the like.

Figure 21:
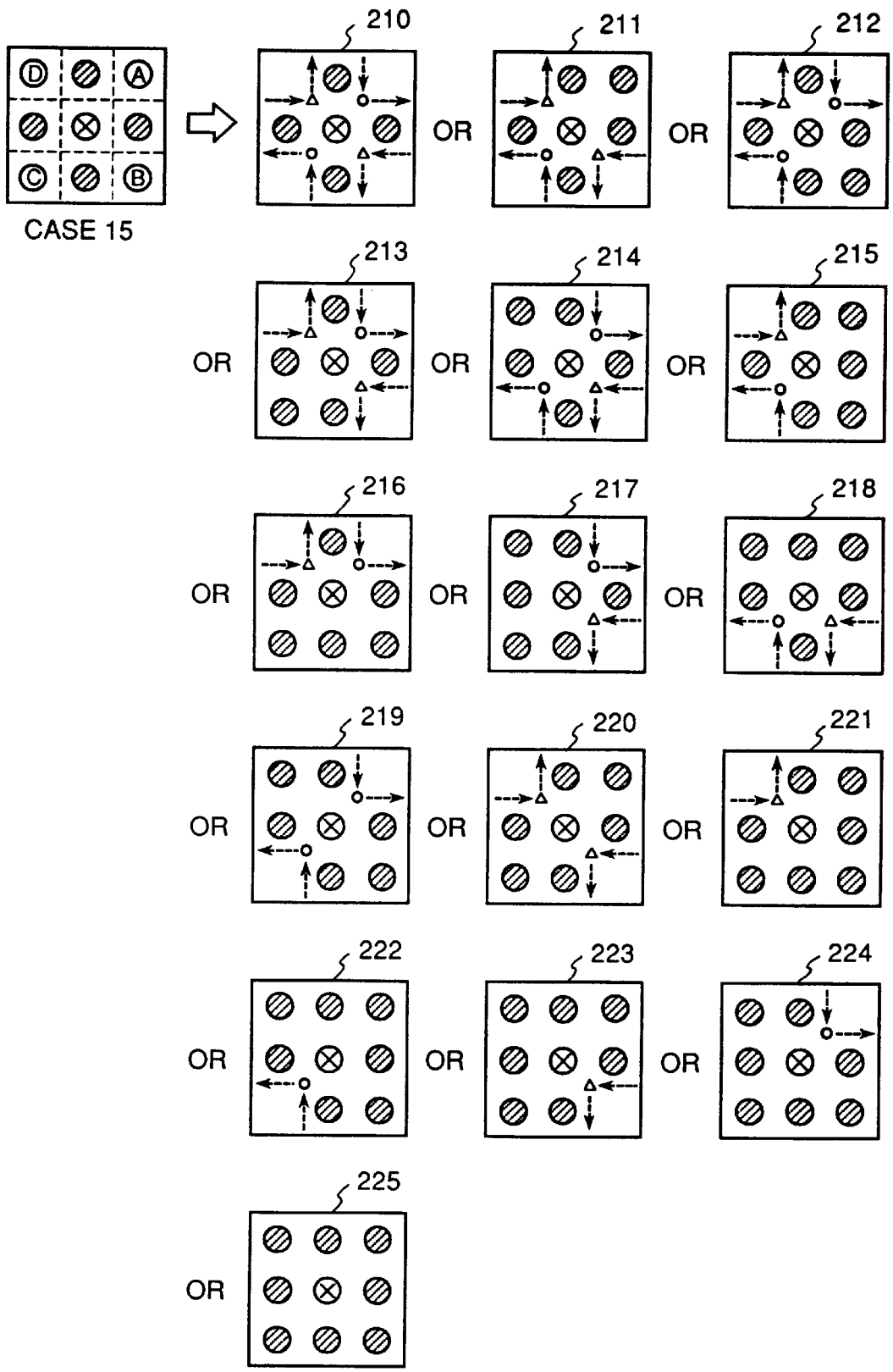
FIG. 21 is a view showing a pixel state in Case 15 in outline vector extraction of the first embodiment.

Thus, a matrix 210 shown in FIG. 21 shows a processing result obtained when all pixels at the positions (D), (A), (C), and (B) are white pixels; a matrix 211 shows a processing result obtained when only a pixel at the position (A) is a black pixel; a matrix 212 shows a processing result obtained when only a pixel at the position (B) is a black pixel; a matrix 213 shows a processing result obtained when only a pixel at the position (C) is a black pixel; a matrix 214 shows a processing result obtained when only a pixel at the position (D) is a black pixel; a matrix 215 shows a processing result obtained when only pixels at the positions (A) and (B) are black pixels; a matrix 216 shows a processing result obtained when only pixels at the positions (B) and (C) are black pixels; a matrix 217 shows a processing result obtained when only pixels at the positions (C) and (D) are black pixels; a matrix 218 shows a processing result obtained when only pixels at the positions (D) and (A) are black pixels; a matrix 220 shows a processing result obtained when only pixels at the positions (A) and (C) are black pixels; a matrix 221 shows a processing result obtained when only a pixel at the position (D) is a white pixel; a matrix 222 shows a processing result obtained when only a pixel at the position (C) is a white pixel; a matrix 223 shows a processing result obtained when only a pixel at the position (B) is a white pixel; a matrix 224 shows a processing result obtained when only a pixel at the position (A) is a white pixel; and a matrix 225 shows a processing result obtained when all pixels are black pixels.

With the above-mentioned procedure, a series of vector array extraction processing operations in step S2 in FIG. 22 are executed.

<Outline Vector Array Sorting Processing>

Figure 56:
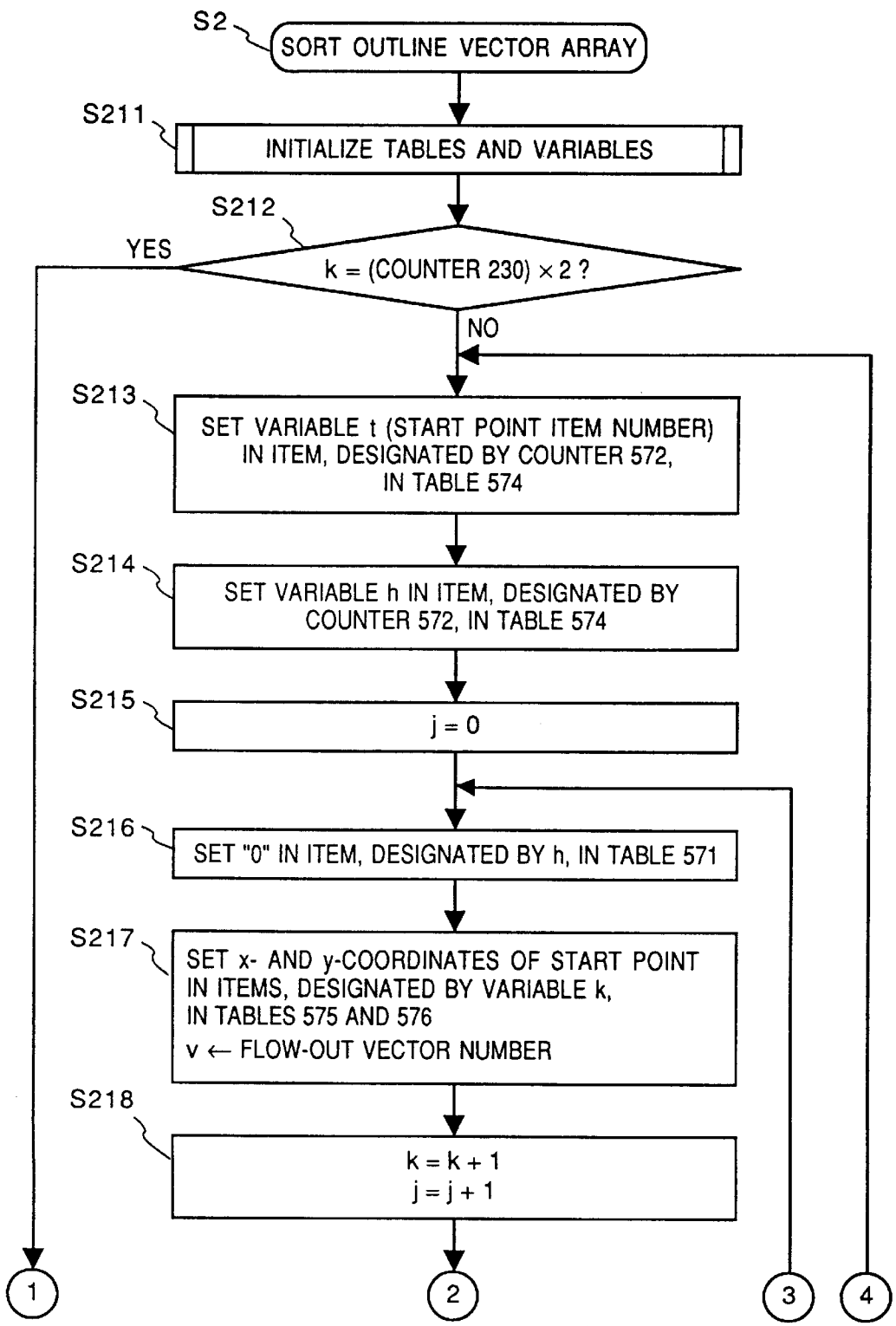
FIG. 56 is a flow chart showing outline vector array sorting processing in the first embodiment.
Figure 57:
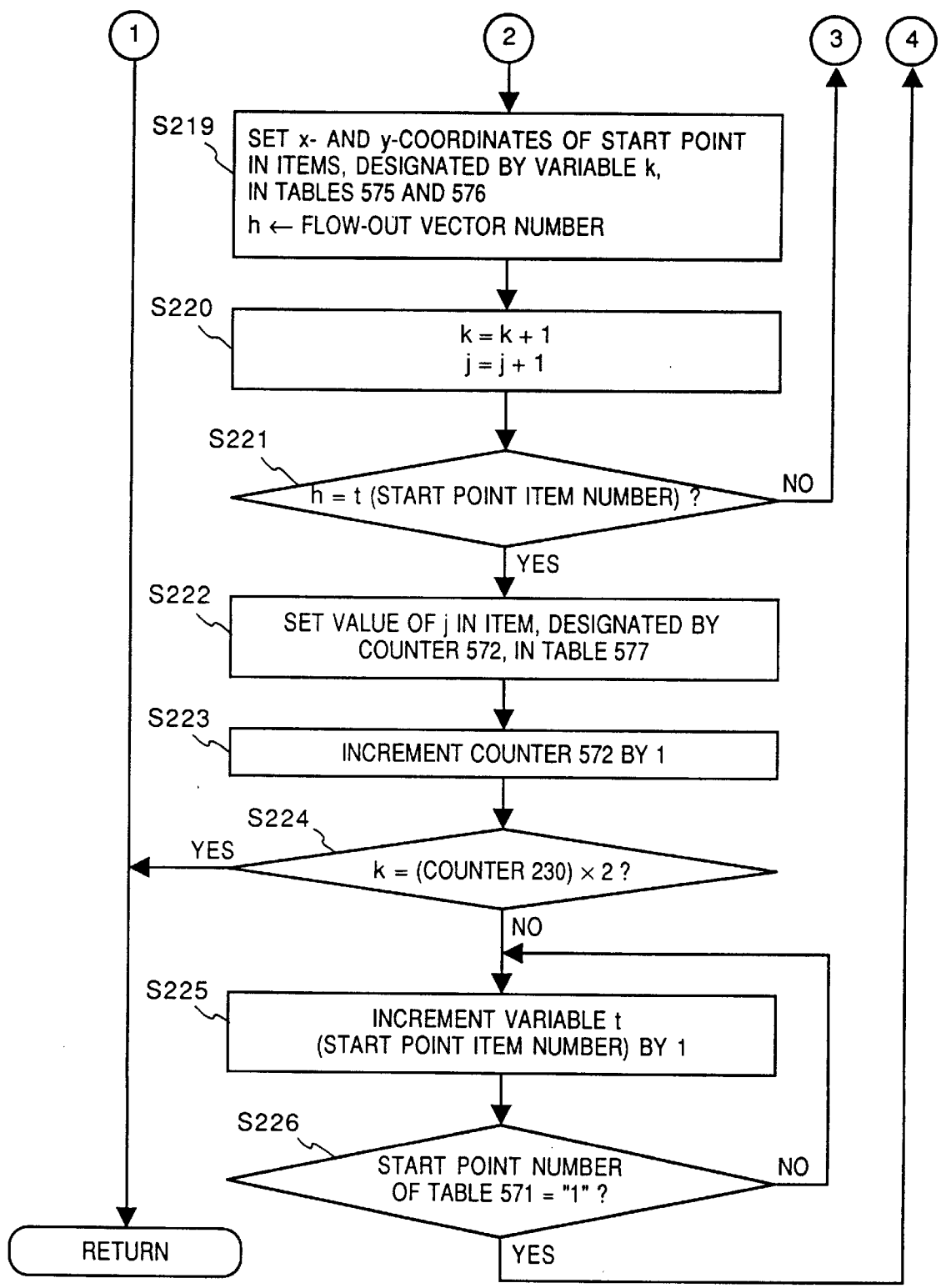
FIG. 57 is a flow chart showing outline vector array sorting processing in the first embodiment.

FIGS. 56 and 57 show the content of outline vector array sorting processing in step S3 in FIG. 22. The flow charts in FIGS. 56 and 57 operate using the tables (FIGS. 23 and 24) associated with horizontal and vertical vectors formed in step S2 in FIG. 22, and tables shown in FIG. 58 (to be described later).

Figure 58:
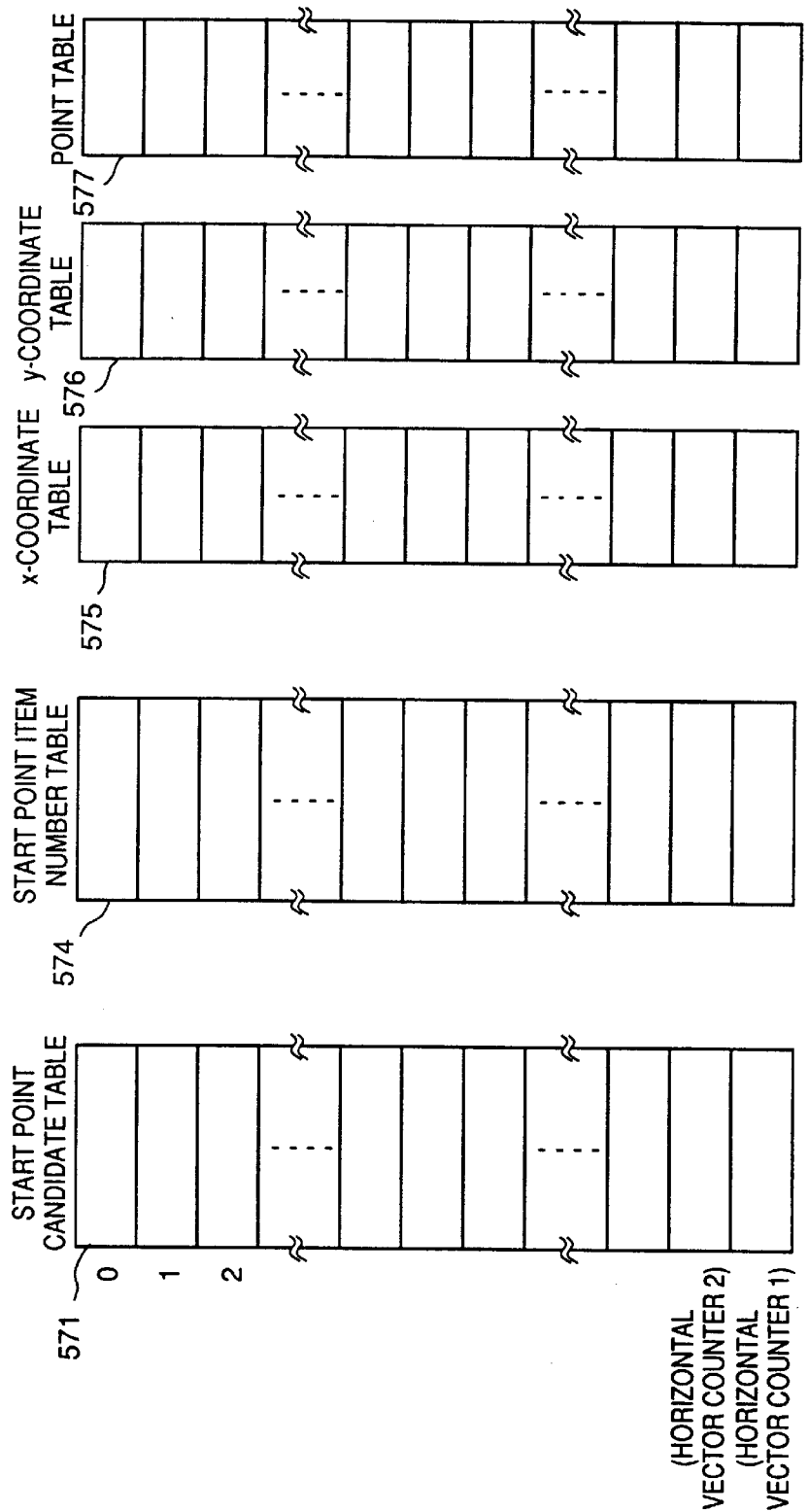
FIG. 58 is a view for explaining a start point candidate table in the outline vector array sorting processing in the first embodiment.
Figure 59:
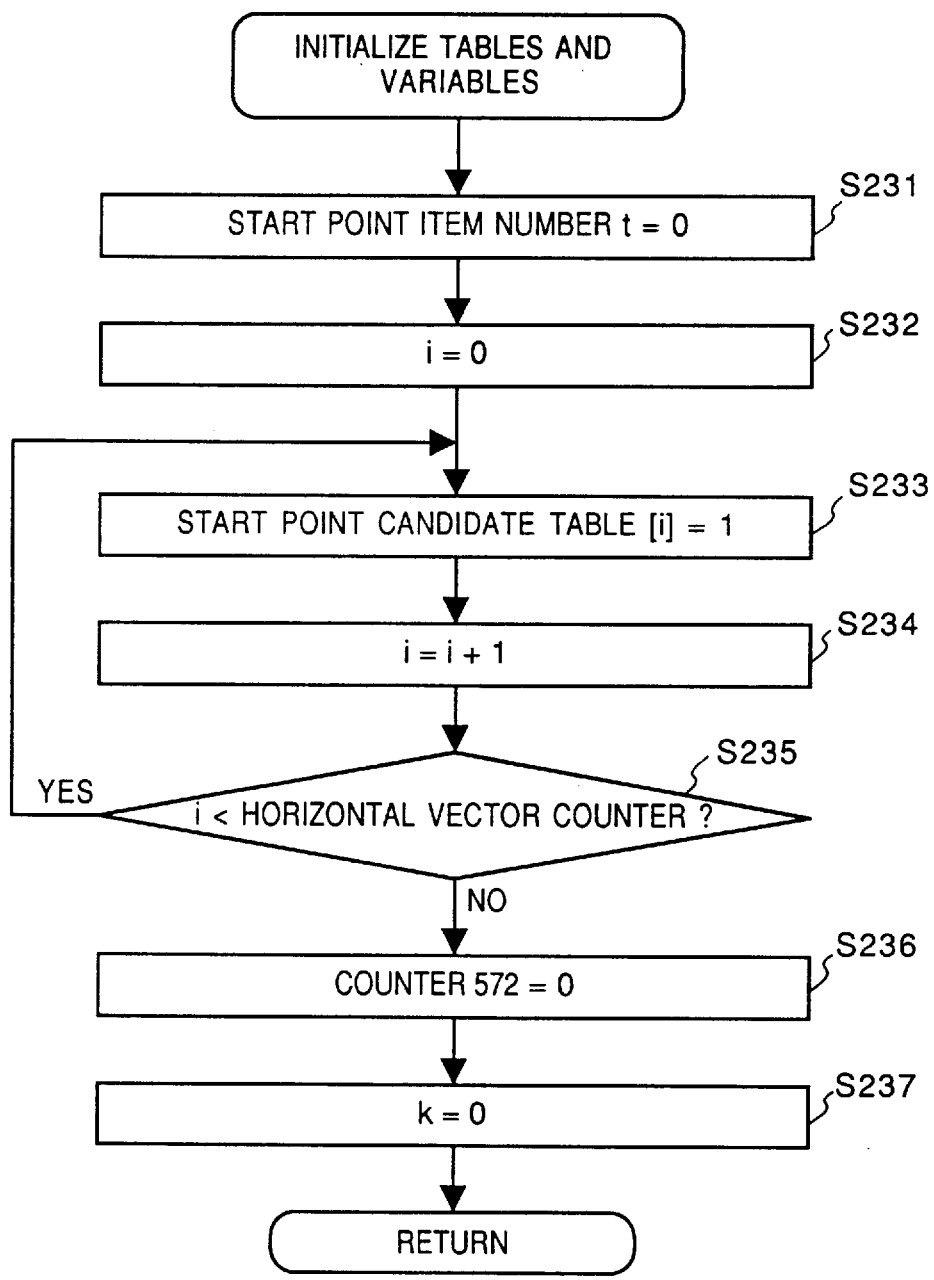
FIG. 59 is a flow chart showing the content of table-variable initialization processing in FIG. 56.

In step S211, required items in the tables shown in FIG. 58 are initialized. The processing content in step S211 is shown in detail in the flow chart in FIG. 59.

In step S231, "0" is set in a variable t (start point item number) for temporarily holding an item number of a start point. The flow advances to step S232 to set "0" in a variable i. In step S233, "1" is set in an i-th item of a start point candidate table 571. In step S234, the variable i is incremented by "1". It is then checked in step S235 if the variable i has a value smaller than the value of the horizontal vector counter 230. If YES in step S235, the flow returns to step S233.

However, if NO in step S235, the flow advances to step S236, and a loop counter 572 is reset to "0". In step S237, a variable k is reset to "0", and the flow returns to the previous routine. Thus, "1" is set in all the 0-th to (the value of the horizontal vector counter 230–1)-th columns of the start point candidate table 571.

Upon completion of step S211, the flow then advances to step S212 to check if the variable k is equal to a value obtained by doubling the value of the horizontal vector counter 230. If YES in step S212, the flow returns to the main routine; otherwise, the flow advances to step S213. In step S213, the value held in the variable t is stored at an item position of a start point item number table 574, which position is designated by the value held in the loop counter 572. In step S214, the value stored in the item of the start point item number table 574 (i.e., the value stored in step S213), which item is designated by the loop counter 572, is set in a variable h. In step S215, a variable j is reset to "0".

The loop counter 572 indicates the number of a currently sorted outline loop. In the item number column of the start point item number table 574, which is designated by the loop counter 572, the item number of the start point of the currently sorted outline loop is stored. The variable k holds the total number of processed and processing points in processed and processing outline loops so far, and the variable j holds the number of processed points in the currently sorted outline loop. The variable h indicates the item number of the next horizontal vector to be processed.

The flow advances to step S216, and the item number of the start point candidate table 571 designated by the variable h is reset to "0". The flow advances to step S217, and the values held at the item positions of the x- and y-coordinates (FIG. 23) of the horizontal vector start point designated by the value of the variable h are respectively stored at item positions, designated by the variable k, in x- and y-coordinate tables 575 and 576. At the same time, the value held at the item position of the horizontal vector flow-out destination vector item number (FIG. 23) designated by the value of the variable h is set in a variable v. The variable v indicates the item number of the next vertical vector to be processed. In step S218, the values held in the variables k and j are respectively incremented by "1".

The flow then advances to step S219, and the values held at the item positions of the x- and y-coordinates (FIG. 24) of the vertical vector start point designated by the value of the variable v are respectively stored at item positions, designated by the value of the variable k, in the x- and y-coordinate tables 575 and 576. At the same time, the value held at the item position of the vertical vector flow-out destination vector item number (FIG. 24) designated by the value of the variable v is set in the variable h. Thus, the variable h is set with the item number of the horizontal vector which flows out from this vertical vector. In step S220, the values held in the variables k and j are respectively incremented by "1".

In step S221, it is checked if the value of the variable h is equal to the value of a counter 573 (variable t) for holding the item number of the start point of the currently sorted outline loop. If NO in step S221, the flow returns to step S216 to continue processing for the next point as another point on the same outline loop. However, if YES in step S221, the flow advances to step S222, and processing of the currently sorted outline loop ends. In step S222, the value held in the variable j is stored, as the number of points included in the currently processed outline loop, at the item position, designated by the loop counter 572, in a point table 577 for holding the number of points included in each outline loop. In step S223, the loop counter 572 indicating the number of the currently sorted outline loop is incremented by "1".

In step S224, it is checked if the number of already processed points held in the variable k is equal to a value obtained by doubling the number of points held in the horizontal vector table held in the horizontal vector counter 230. If YES in step S224, the processing ends, and the flow returns to the main routine. However, if NO in step S224, the flow advances to step S225, and the value of the start point item number counter 573 is incremented by "1". In step S226, it is checked if the value held in the item, designated by the value of the start point item number counter 573, in the start point candidate table 571 is "1". If NO in step S226, the flow returns to step S225 to search the start point candidate again. However, if YES in step S226, the flow returns to step S213 to start sorting of points in the next outline loop.

With the processing in step S3 in FIG. 22, the start point data of the vectors shown in FIGS. 23 to 25 are sorted as a coordinate array of points aligned in units of outline loops in the tables shown in FIG. 58.

<Output of Vector Array Table>

Figure 60:
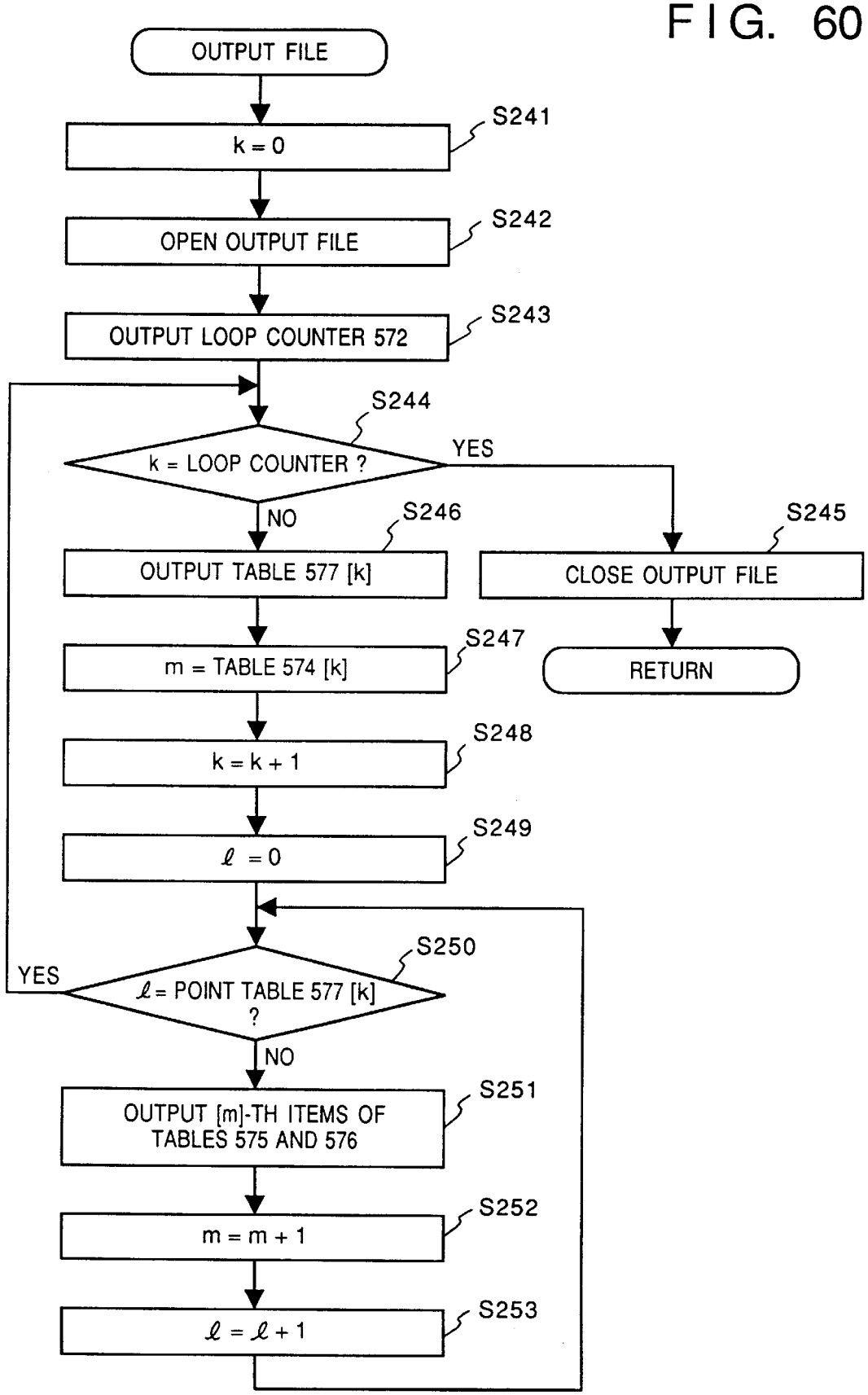
FIG. 60 is a flow chart showing processing for outputting a vector array table to a file.

The vector array table file output processing in step S4 in FIG. 22 will be described below with reference to the flow chart shown in FIG. 60.

In step S241, the variable k is reset to "0". The flow advances to step S242 to open an output file on the disk 522. In step S243, the value held in the loop counter 572 is output to the file opened in step S242. It is checked in step S244 if the value of the variable k is equal to the value held in the loop counter 572. If YES in step S244, the flow advances to step S245 to reset the values of the counters 230, 240, 310, 320, 330, and 340 (to "0"), and the flow returns to the previous routine.

However, if NO in step S244, the flow advances to step S246, and the value stored at the item position, designated by the value of the variable k, in the outline loop point table 577 is output to the disk 522. In step S247, the value stored at the item position, designated by the value of the variable k, in the start point item number table 574 is set in a variable m. Note that the variable k holds the number of the currently output outline loop, and the variable m holds the item number where the start point of the point array in the currently output outline loop is stored. In step S248, the value of the variable k is incremented by "1", and in step S249, the value of a variable l is reset to "0". The variable l holds the number of already output points in the currently output outline loop.

In step S250, it is checked if the value of the variable l is equal to the number of points in the currently output outline loop. If YES in step S250, the flow returns to step S244; otherwise, the flow advances to step S251. In step S251, the values stored at the item positions, designated by the value of the variable m, in the x- and y-coordinate tables 575 and 576 are output to the output file. In step S252, the value of the variable m is incremented by "1", and in step S253, the value of the variable l is incremented by "1". Thereafter, the flow returns to step S250.

Upon completion of the processing in step S4, it is checked in step S5 if the stripe of interest processed so far is the last stripe in the image. If YES in step S5, all the processing operations in FIG. 22 end. If NO in step 5, the flow advances to step S6 to shift the stripe of interest to the next stripe, and the flow returns to step S2.

According to the above-mentioned procedure, outline loops connected in four directions are extracted. However, the present invention is not limited to this, but may be applied to a case wherein outline loops connected in eight directions are to be extracted.

As described above, in a conventional system, the tables (connection information tables) shown in FIGS. 23 and 24 require a capacity for one page. However, according to the present invention, since an input image is divided into stripes, outline vector arrays are independently extracted and sorted in units of stripes, and an outline vector array table is output to a file, the capacities of the tables (connection information tables) shown in FIGS. 23 and 24 can be reduced, and the memory capacity can be saved. Since the capacities of the tables (connection information tables) shown in FIGS. 23 and 24 can be reduced, the search range upon sorting of vector arrays is narrowed accordingly, thus allowing high-speed processing.

<Second Embodiment>

Figure 61:
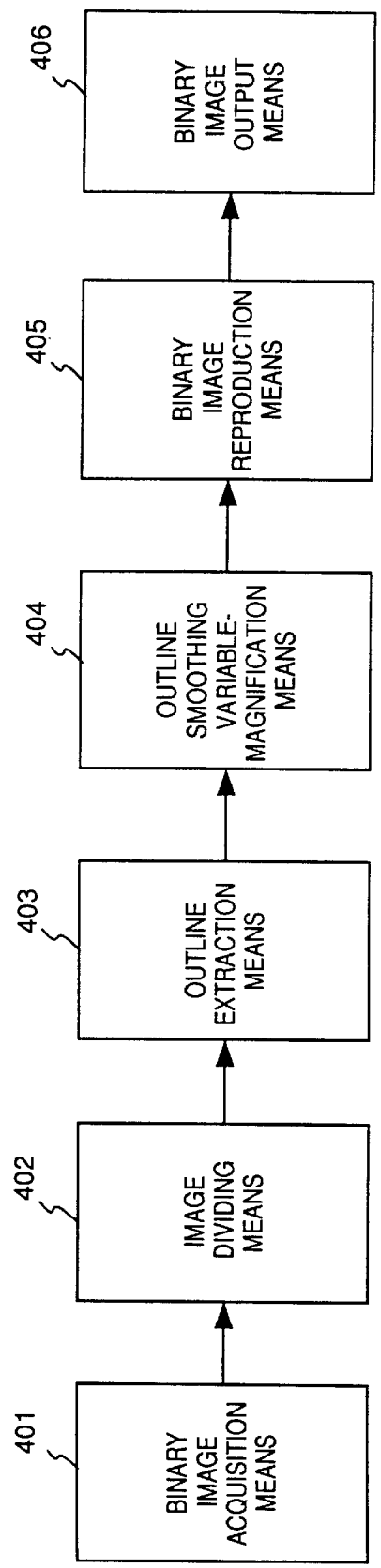
FIG. 61 is a schematic block diagram showing an arrangement according to the second embodiment of the present invention.

FIG. 61 is a block diagram of an apparatus for executing variable-magnification processing of an image in this embodiment. Referring to FIG. 61, reference numeral 401 denotes a binary image acquisition means for acquiring a digital binary image to be subjected to outline extraction-variable-magnification processing, and outputting a binary image in the raster-scanning format. For example, the binary image acquisition means 401 comprises a known raster-scanning type binary image output device for reading an image using an image reader, binarizing the read image, and outputting the binary image in the raster-scanning format.

Reference numeral 402 denotes an image dividing means for dividing the acquired binary image into at least one stripe. The number of lines (line width) in each stripe can be arbitrarily set by external means.

Reference numeral 403 denotes an outline extraction means for extracting coarse outline vectors (outline vectors before being subjected to smoothing and variable-magnification processing) in units of divided stripes. The means 403 corresponds to the outline extraction means described in the first embodiment of the present invention.

Reference numeral 404 denotes an outline smoothing-variable-magnification means for executing smoothing and variable-magnification processing of coarse outline vector data in the form of vector data in units of divided stripes. The outline smoothing-variable-magnification means itself comprises a device described in, e.g., previously filed Japanese Laid-Open No. 05-174140 (filed on Dec. 26, 1991). This processing will be briefly described below. For example, the smoothing and variable-magnification processing include processing for, when two vertical vectors and two horizontal vectors, which have a vector length of "1", are obtained in the above-mentioned processing, removing a vector group (four vectors) forming the corresponding loop, or for, when a pixel projects as an isolated dot, removing this portion, and processing for defining points (e.g., for defining a point recognized as a corner of a binary image as a fixed point (corner point), and defining points other than the corner points as floating points), calculating a weighting coefficient of a floating point of interest with a plurality of corner or floating points before and after the floating point of interest, and correcting the coordinate position of the floating point of interest. Also, the smoothing and variable-magnification processing include processing for, when horizontal and vertical vectors continuously appear along a predetermined inclination, removing some points, which are not influenced by, e.g., enlargement or reduction, of these vectors.

Reference numeral 405 denotes a binary image reproduction means for reproducing, from outline vector data subjected to smoothing and variable-magnification processing, a binary image expressed by these data as binary image data in the raster-scanning format in units of divided stripes. For example, the binary image reproduction means 405 can comprise a device described in, e.g., previously filed Japanese Laid-Open No. 05-174140 (filed on Jul. 12, 1991). This processing will be briefly described below. That is, a portion inside an outline drawn based on vector data obtained by the smoothing processing (including an outline drawn by enlargement processing) is filled with black pixels.

Reference numeral 406 denotes a binary image output means for displaying binary image data in the raster-scanning format, forming a hard copy of the image, or outputting the image data onto a communication path.

Figure 62:
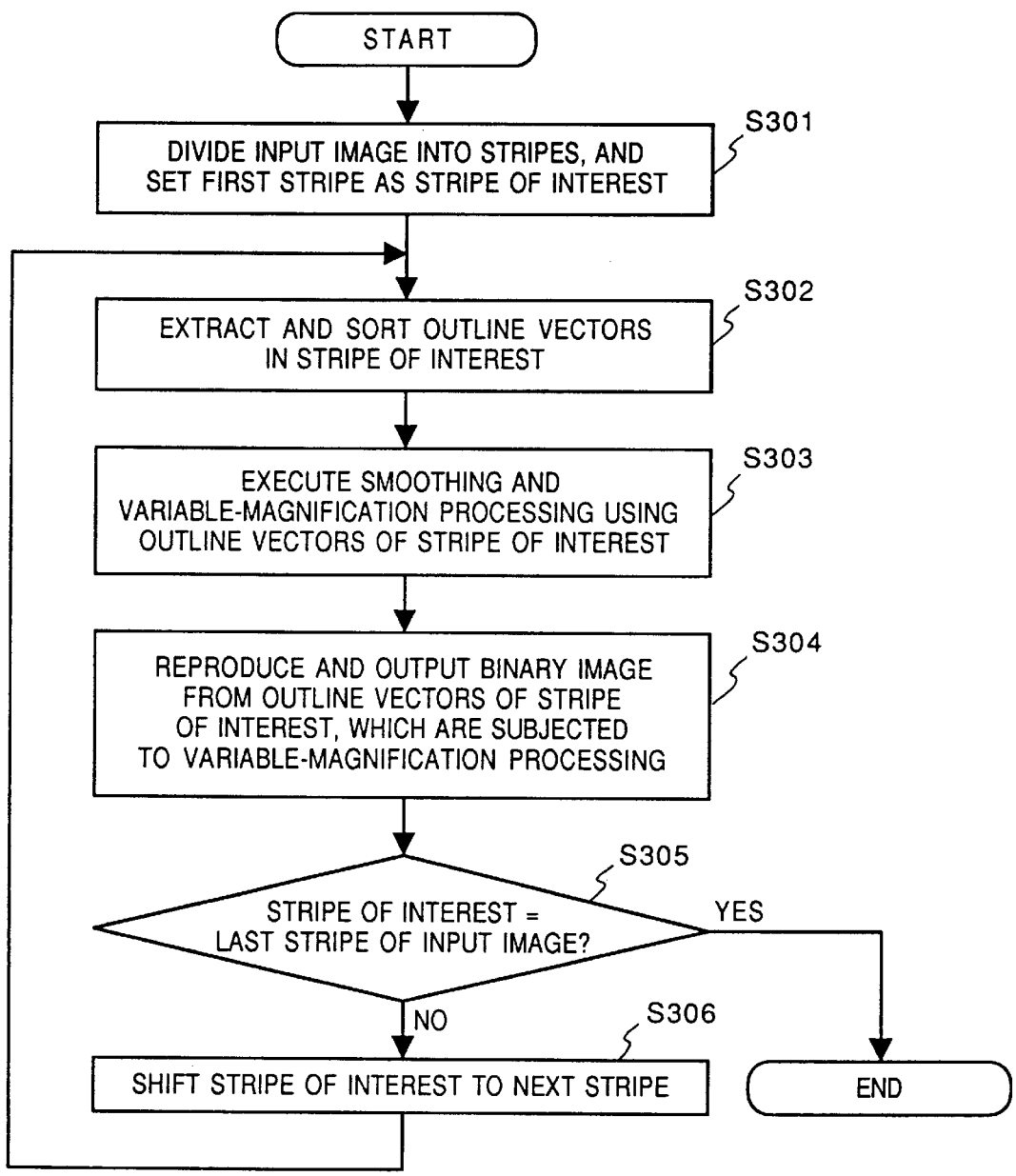
FIG. 62 is a flow chart showing the processing flow of the second embodiment.

FIG. 62 is a flow chart showing the processing flow of the second embodiment.

In step S301, an input image is divided into stripes, and the first stripe is set as a stripe of interest. When an input image is divided, the number of lines in each stripe may be arbitrarily set by an external means, or the input image may be divided by a predetermined number of lines in place of externally setting the number of lines. Alternatively, although an input image is basically divided by a predetermined number line, when a white line appears in the middle of a stripe, the image may be temporarily divided at that position. For example, assume that, when an input image is divided into stripes each consisting of five lines, a white line appears at the eighth line position. At this time, the first stripe consists of five lines, but the second stripe consists of three lines. The third stripe consists of five stripes again from the ninth line unless another white line appears in the middle of the stripe. However, when two or more white lines continuously appear, the continuous white lines as a whole are considered and processed as one line for the sake of convenience. More specifically, when n white lines (including the eighth line) continuously appear from the eighth line, the second stripe consists of (2+n) lines. This is to prevent an input image from being divided into stripes including an unnecessary stripe consisting of only white lines (which is insignificant since no figure is present). Note that the white line means a line consisting of all white pixels.

The merit of a combination of a method of dividing an image into stripes by a predetermined number of lines, and a method of dividing an image upon appearance of a white line will be described below.

When a white line appears, since outline vector groups extracted so far form closed loops, the vector groups extracted so far are sorted, and are output to a disk as outline vectors in the file format, thus starting the next processing. However, when no white line is present in an input image, all outline vectors must be held in a working memory, and the working memory requires a huge capacity. Therefore, when the method of dividing an image into stripes by a predetermined number of lines is combined with the method of dividing an image upon appearance of a white line, the capacity of the working memory can be greatly reduced.

In step S302, extraction and sorting of outline vectors in the stripe of interest are executed. These operations are executed as described in the first embodiment. Upon completion of extraction and sorting of outline vectors in the stripe of interest, the flow advances to step S303 to execute smoothing and variable-magnification processing of outline vectors in the stripe of interest. In the processing in step S303, the stripe of interest is considered as an input image, and smoothing and variable-magnification processing described in Japanese Laid-Open No. 05-174140 are executed, as described above. Upon completion of the smoothing and variable-magnification processing of the stripe of interest, the flow advances to step S304. In step S304, a binary image is reproduced from the outline vectors of the stripe of interest, which are subjected to the variable-magnification processing, and the reproduced image is output. The reproduction and output processing of a binary image can be realized by a method and arrangement described in previously filed Japanese Laid-Open No. 05-020467. Upon completion of the reproduction and output processing of the binary image, the flow advances to step S305 to check if the stripe of interest is the last stripe of the input image. If YES in step S305, the processing ends; otherwise, the flow advances to step S306 to shift the stripe of interest to the next stripe, and the flow returns to step S302.

With the above-mentioned arrangement, extraction of outline vectors from an input image, smoothing and variable-magnification processing of extracted vectors, and reproduction and output processing of a binary image are executed in units of stripes. For this reason, the storage capacities for the following purposes can be reduced:

1) the disk capacity or working memory capacity for outline vector extraction;
2) the disk capacity or working memory capacity for storing sorted outline vector data;
3) the disk capacity or working memory capacity for executing smoothing and variable-magnification processing of outline vectors; and
4) the disk capacity or working memory capacity for reproducing and outputting a binary image from outline vectors.

<Third Embodiment>

Figure 63A:
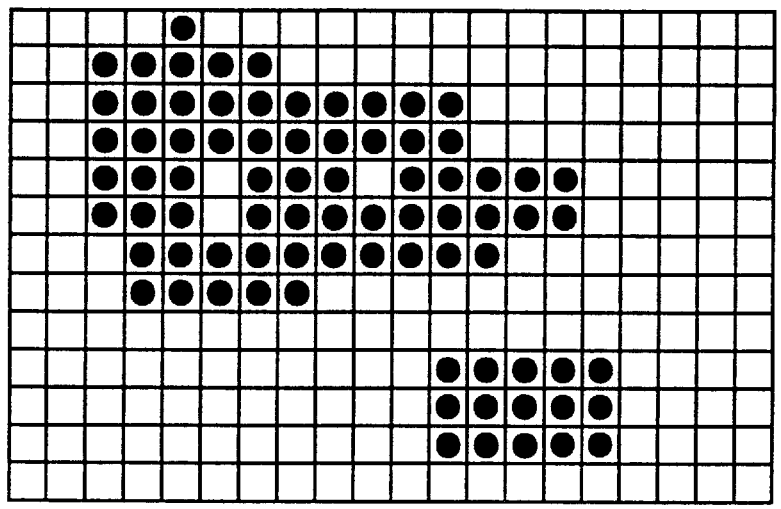
FIGS. 63A and 63B are views for explaining the third embodiment of the present invention.
Figure 63B:
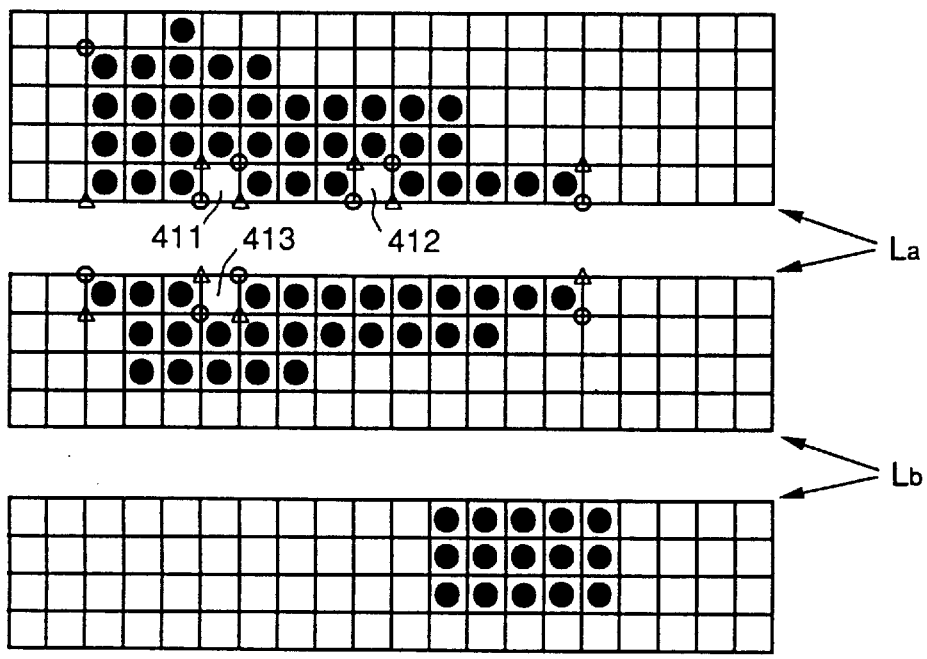

In the second embodiment, upon execution of smoothing and variable-magnification processing of outline vectors which are extracted and sorted in units of stripes, processing is executed while considering the divided stripe itself as an independent input image. With this processing, although all stripes can be parallelly processed without requiring extra processing, it is found that a reproduced image may deteriorate due to smoothing in an example shown in, e.g., FIG. 63A. More specifically, when an image shown in FIG. 63A is an input image, and the stripe dividing method (for dividing an image in units of five lines) in the second embodiment is used, the first stripe has a width of five lines, and the second stripe has a width of four lines since a white line appears at the fourth line position, as shown in FIG. 63B. Since the remaining number of lines of the input image is equal to or smaller than 5, all the remaining lines (four lines) are input as the third stripe. In this case, when the method and apparatus described in Japanese Laid-Open No. 05-174140 are used, recessed portions (white pixels) 411, 412, and 413 are deleted by smoothing, and portions corresponding to 411, 412, and 413 are omitted from a reproduced image after variable-magnification processing.

In order to solve this problem, the following processing is added to the smoothing processing of the second embodiment.

More specifically, when an originally single FIG. extends over two or more stripes upon being divided into stripes, the start and end points of a vector which flows out from a position on a boundary line upon division (although lines La and Lb are boundary lines in FIG. 63B, only the line La satisfies a condition that a single figure extends over two stripes upon division), and a vector which flows into a position on the boundary line upon division are designated as "corner points" (the corner points are points whose coordinate positions are not corrected by smoothing processing, and can be interpreted as points located at corners literally).

Referring to FIG. 63B, 10 Δ points and 10 ○ points are designated as corner points. Since the points designated as corner points are excluded from smoothing, the white pixels 411, 412, and 413 can be preserved, and deterioration of a reproduced image can be eliminated.

<Fourth Embodiment>

In the second and third embodiments, since smoothing, variable-magnification processing, reproduction, and output processing are executed in units of stripes, a merit capable of performing processing with a small memory capacity can be provided. However, since an originally one outline vector in an input image is divided into a plurality of vectors, and the plurality of vectors are independently smoothed, a smoothed outline vector may become slightly different from the one obtained by smoothing the originally one outline vector. A technique for solving this problem will be described below. With this technique, extraction and sorting of outline vectors are performed in units of divided stripes, and upon completion of extraction and sorting of all outline vectors, vectors which constitute an originally one outline vector are detected and merged from the sorted vectors. This technique can be achieved by checking a vector which flows out from a position on a division boundary line, and a vector which flows into a position on a division boundary line, and re-sorting these vectors.

Figure 64:
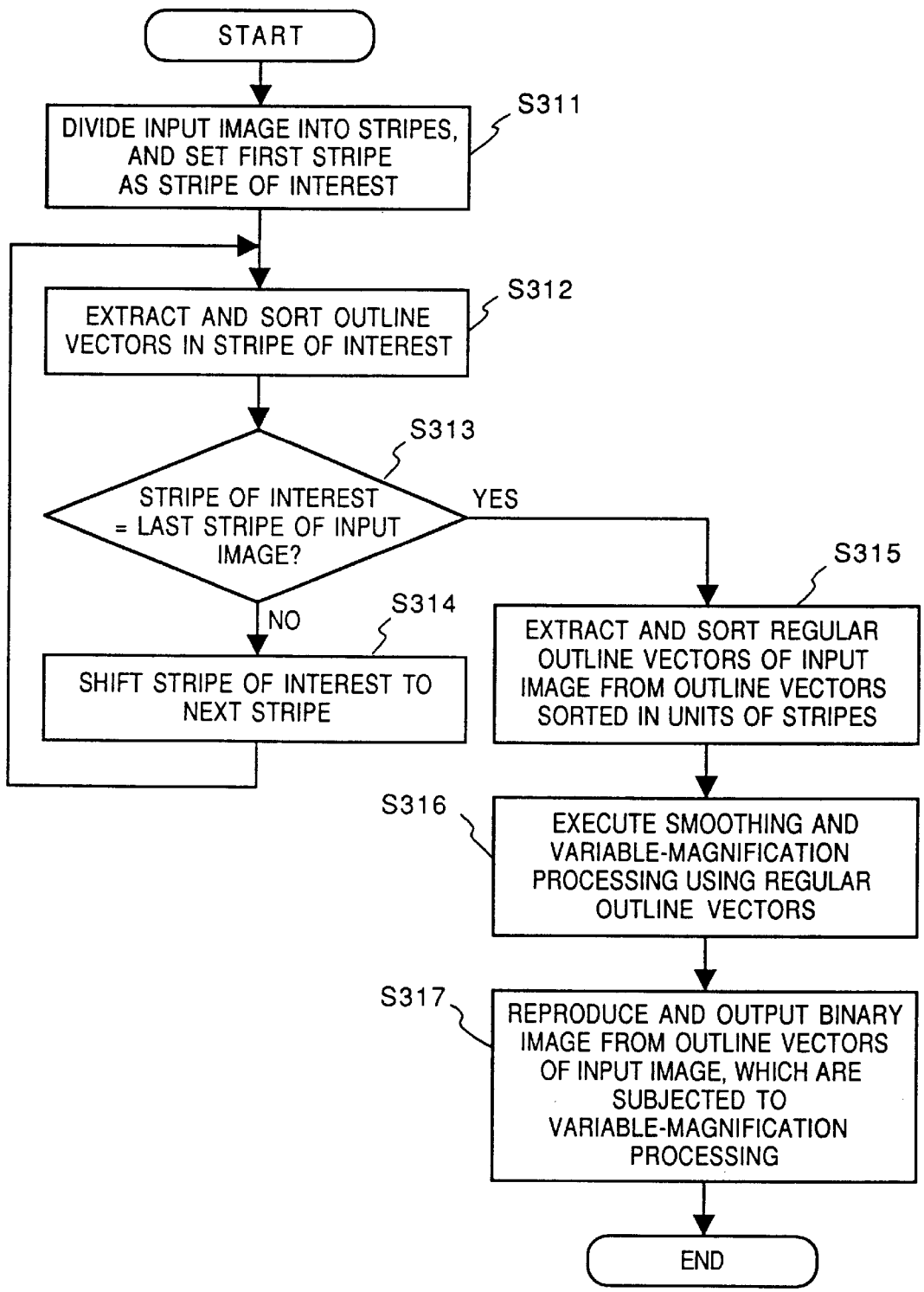
FIG. 64 is a flow chart showing the processing flow according to the fourth embodiment of the present invention.

FIG. 64 is a flow chart obtained when the processing sequence of the second embodiment is partially modified.

In step S311, an input image is divided into stripes, and the first stripe is set as a stripe of interest. This operation is the same as that in step S301 in FIG. 62. The flow then advances to step S312 to extract and sort outline vectors in the stripe of interest. This operation is also the same as that in step S302 in FIG. 62. In step S313, it is checked if the stripe of interest is the last stripe of the input image. If NO in step S313, the flow advances to step S314 to shift the stripe of interest to the next stripe, and the flow returns to step S312. However, if YES in step S313, the flow advances to step S315.

In step S315, an originally one outline vector (this outline vector is defined as a regular outline vector of the input image), which is divided into a plurality of outline vectors are extracted and sorted from the outline vectors sorted in units of stripes. The processing in step S315 will be exemplified below with reference to FIG. 65.

In this case, for the sake of simplicity, the number of lines of each stripe obtained by dividing an input image is 3. When outline vectors are extracted in the format shown in FIG. 25, an extraction result shown in FIG. 67 is obtained (the coordinates are expressed by integers as in the first embodiment). At this time, the y-coordinate of a boundary line upon stripe division is "7". In an example shown in FIG. 65, an original outline vector is extracted as four outline vectors. However, since these vectors are originally one outline vector, they are merged. This processing will be described below.

Points whose y-coordinates are "7" (in practice, an integer multiple of "7") are obtained from FIG. 67, and are expressed in a packet format shown in FIG. 66. More specifically, data stored on a disk or memory, as shown in FIG. 67, are scanned. At this time, the third point of the first outline of the first stripe is obtained as a first point. The obtained point is expressed in the format shown in FIG. 66. Note that "address" in FIG. 66 indicates a serial number assigned to a point whose y-coordinate="7". "x-coordinate" indicates the x-coordinate of a point whose y-coordinate= "7" obtained by scanning data stored in the disk or memory. "start point/end point" expresses that the obtained point serves as a start point in the negative direction (negative start) or an end point in the negative direction (negative end) with respect to a horizontal vector, or serves as a start point in the positive direction (positive start) or an end point in the positive direction (positive end). "stripe number" indicates the stripe number of the obtained point, "outline number" indicates the number of order of the outline in a stripe, and "coordinate number" indicates the number of order of the obtained point. When points whose y-coordinates are "7" obtained from FIG. 67 are expressed in the format shown in FIG. 66, a result shown in FIG. 68 is obtained. When these points are re-sorted in the order from smaller x-coordinate values, a result shown in FIG. 69 is obtained. When the same values are present, they are sorted in the order of "positive start", "negative start", "negative end", and "positive end". Furthermore, each two re-sorted packets are paired from the start, and in each pair, the two packets are re-sorted in the order of "positive start", "negative Start", "negative end", and "positive end". In the example shown in FIG. 69, since only a pair of packets having addresses "5" and "6" do not satisfy the above condition, they are re-sorted. With this processing, outline vectors in each pair have a predetermined connection relationship therebetween, that is, the first packet is connected to the next packet. More specifically, the address of the next point of the first packet stores the address of the next packet, and the address of the previous point of the first packet stores no address. Also, the address of the next point of the next packet stores no address, and the address of the previous point of the next packet stores the address of the first packet. This state is shown in FIG. 70.

Final merging of outline vectors is performed using FIGS. 67 and 70. This processing will be described below.

Scanning is started from the first point of the first outline of the first stripe in FIG. 67. For the sake of simplicity, the ϵ-th point of the ω-th outline of the θ-th stripe is expressed by (θ-ω-ϵ). First, (1-1-1) is registered. Since this point is not located on a boundary line, the point of interest moves to the next point (1-1-2), and this point is registered. Since (1-1-2) is not located on a boundary line, either, the point of interest moves to the next point (1-1-3), and this point is registered. Since (1-1-3) is located on a division boundary line, FIG. 70 is looked up to search a point as a destination of next movement, and the point of interest moves to the searched point. In this case, (1-2-4) is the point as the destination of next movement. (1-2-4) is registered, and the point of interest moves to the next point. Although (1-2-4) is a point on a division boundary line, since it is determined with reference to FIG. 69 that a destination of the next movement is not determined, the point of interest moves to (1-2-1) according to the order shown in FIG. 67, and (1-2-1) is registered. Subsequently, (1-2-2) and (1-2-3) are registered. Since (1-2-3) is located on a division boundary line, FIG. 69 is looked up to move the point of interest to (2-2-2) as the next destination of movement. At this time, (1-2-3) and (2-2-2) indicate an identical point. When an identical point continuously appears in this manner, neither of them are registered. As for (1-2-3), since this point has already been registered, it is deleted. Although (2-2-2) is located on a division boundary line, since it is determined with reference to FIG. 70 that the next destination of movement is not determined, the point of interest moves to (2-2-3) according to the order in FIG. 67. Similarly, (2-2-3), (2-2-4), and (2-2-1) are registered. Since (2-2-1) is located on a division boundary line, FIG. 70 is looked up to move the point of interest to (2-1-2), and (2-1-2) is registered. Although (2-1-2) is a point on a division boundary line, since it is determined with reference to FIG. 70 that the destination of movement is not determined, (2-1-3), (2-1-4), and (2-1-1) are registered according to the order in FIG. 67. Since (2-1-1) is a point on a division boundary line, the point of interest moves to (1-1-4) with reference to FIG. 70, and (1-1-4) is registered. Since a point next to (1-1-4) is the scanning start point (1-1-1), registration ends, and the number of registered points is checked. The total number of points in an outline is stored, and the total number of outline loops in an input image is stored.

FIG. 71 shows the above-mentioned processing result. If non-processed outline vectors still remain, they are converted to regular outline vectors by the same processing as described above, and are registered next to data in FIG. 71 to have the format shown in FIG. 25. An outline vector having no coordinate points on division boundary lines can be registered next to data in FIG. 71 without any extra processing so as to have the format shown in FIG. 25. At this time, the total number of outline loops in the input image must be rewritten to express the number of vector loops registered in FIG. 71.

Upon completion of the above-mentioned processing for all vectors, the flow advances to step S316. In step S316, smoothing and variable-magnification processing are executed using the regular outline vectors. This processing is executed as described in the second embodiment. Upon completion of step S316, the flow advances to step S317, and a binary image is reproduced and output from the outline vectors of the input image, which are subjected to the variable-magnification processing. This processing is also executed as described in the second embodiment.

With the above-mentioned processing, regular outline vectors of an input image can be obtained from divisionally extracted outline vectors, and when these regular outline vectors are subjected to smoothing and variable-magnification processing, a high-quality reproduced image can be obtained.

<Fifth Embodiment>

Stripe division processing has a merit of reducing the working memory capacity necessary for extraction, smoothing, variable-magnification, reproduction, and display of outlines. However, the stripe division processing influences smoothing of outline vectors, and influences image quality of a reproduced image to a considerable extent. Therefore, the number of divided stripes is reduced as much as possible (the width of each stripe is increased as much as possible). A method of decreasing the number of divided stripes will be described below.

The object of the stripe division processing is to prevent a working memory from overflowing by, e.g., outline extraction processing. Therefore, no stripe division processing is required as long as the working memory does not overflow. In other words, the stripe division processing can be executed before the working memory overflows.

More specifically, the address designated by the horizontal vector counter 230 or the vertical vector counter 240 shown in FIG. 23 or 24 is monitored by the CPU 519 (FIG. 5). When the address value exceeds a predetermined value (depending on the capacity of the working memory), a stripe can be divided at the currently processed line. In this method, processing can be performed while designating, as corner points, the start and end points of a vector which flows into a position on a division boundary line and a vector which flows out from a position on a division boundary line as in the third embodiment. Also, the technique described in the fourth embodiment can be used in combination.

<Sixth Embodiment>

When a variable-magnification image is to be obtained using outline vectors extracted according to the rules used in the first embodiment, the pixel width of a thin line portion of an output image generated upon execution of variable-magnification processing at magnifications as low as ×1 to ×2 tends to become large. This is because the method described in the first embodiment extracts outline vectors while defining an outline point at a pixel position at the center between white and black pixels. More specifically, an image regeneration unit processes, as a black pixel, a pixel itself indicated by an outline coordinate value of an image obtained by smoothing and variable-magnification processing. For this reason, at a low magnification as described above, when pixels on an outline loop defined to surround pixels of an original image are defined as black pixels, and a region surrounded by an outline loop are filled with black pixels, a region filled with black pixels tends to be widened from an area defined by an original magnification at a non-negligible ratio as compared to a region filled with white pixels.

In contrast to this, a method of solving the above-mentioned problem has been proposed by the present applicant in Japanese Patent Application No. 4-169581. That is, when outline vectors are extracted from a binary image, an outline point is defined at a position nearer a black pixel than a white pixel between white and black pixels of an input image, so that a black pixel region is extracted to have a narrower width than that of a white pixel region. Thus, even when an image is re-generated while defining pixels on the outline loop as black pixels, and filling a region surrounded by the outline loop with black pixels, the line width of a variable-magnification image at a low magnification can be prevented from being increased.

Even when the method described in Japanese Laid-Open No. 06-012490 is used as an outline vector extraction method, the same discussion as in the first, second, third, and fifth embodiments is applicable. When the method described in Japanese Laid-Open No. 06-012490 is applied to an outline smoothing-variable-magnification technique described in Japanese Laid-Open No. 05-174140, combination patterns of lengths and directions of a total of seven continuous side vectors (including a combination of a maximum of three vectors, i.e., an outline side vector of interest, and side vectors before and after the vector of interest in first smoothing processing disclosed in Japanese Patent Application No. 3-345062) can be modified in correspondence with outline vectors extracted by the method described in Japanese Laid-Open No. 06-012490. More specifically, in Japanese Patent Application No. 4-169581, since an extracted outline point is set at a position nearer a black pixel than a white pixel between white and black pixels in an input image, for example, a black line having a one-pixel width is extracted as an outline loop having a ½ width, and a white line having a one-pixel with in a black region is extracted as an outline loop having a (1+½) width. Even in portions having the same pixel width in an input image, a recessed portion of a black pixel region is extracted to be wider by one pixel than a projecting portion thereof. As compared to the outline extraction method used in the first embodiment, a projecting portion of a black pixel region is extracted to be narrower by a ½ pixel width, and a recessed portion thereof is extracted to be wider by a ½ pixel width. Therefore, the combinations of lengths and directions of side vectors are adjusted in correspondence with these differences.

In this manner, the method described in Japanese Laid-Open No. 06-012490 can be applied to the method described in Japanese Laid-Open No. 05-174140 while other processing operations are performed according to an embodiment in Japanese Laid-Open No. 05-174140.

<Seventh Embodiment>

A case will be described below wherein extraction and sorting of outline vectors are performed in units of stripes, and upon completion of extraction and sorting of all vectors, an originally one outline vector is detected and merged from the sorted vectors in accordance with the method described in previously proposed Japanese Laid-Open No. 06-012490.

Since the basic principle is the same as that of the fourth embodiment, processing in step S315 largely different from that in the fourth embodiment will be described below.

Figure 72:
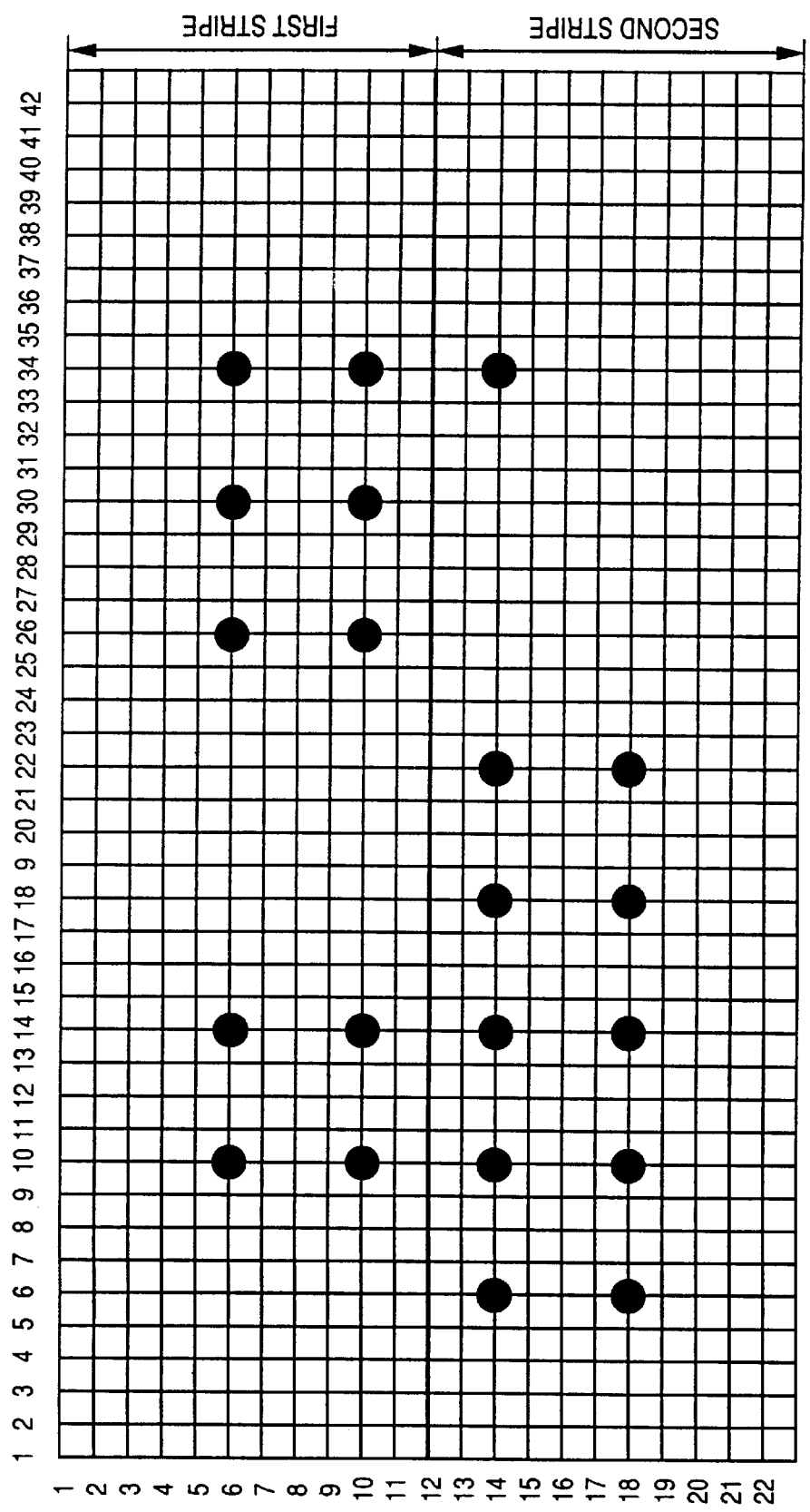
FIG. 72 is a view showing an input image for explaining the seventh embodiment of the present invention.

As in the fourth embodiment, an image shown in FIG. 65 is assumed as an input image. In order to avoid decimal fraction expression of coordinates, each pixel position is converted to (4m+2, 4n+2) (for m=0, 1, . . . , 10, n=0, 1, . . . , 5) to rewrite the image in FIG. 65, as shown in FIG. 72, and an image shown in FIG. 72 is assumed as an input image. The number of lines of each divided stripe is set to be 12 (corresponding to three lines in the image shown in FIG. 65). When outline vectors are extracted in the format shown in FIG. 25, a result shown in FIG. 74 is obtained. At this time, the y-coordinate of a stripe boundary line is 12. In the example shown in FIG. 72, an outline vector is extracted as four outline vectors. However, since these vectors constitute an originally one outline vectors, they are merged. This processing will be described below.

First, the y-coordinate of a new vector generated by the stripe division processing is obtained. In this case, since stripes are divided into 12 lines, the y-coordinate of a new vector generated by the stripe division processing is "11" or "13". To generally describe the y-coordinate, if the y-coordinate of a division boundary line is represented by λ, the y-coordinate of a new vector generated by the stripe division processing is (λ−1) or (λ+1).

When the y-coordinate is obtained, data stored on a disk or memory, as shown in FIG. 74, are scanned, and the coordinate value of the corresponding vector is expressed in a packet format shown in FIG. 73. At this time, the third point of the first outline of the first stripe is obtained as a first point. The obtained point is expressed in the format shown in FIG. 73. In FIG. 73, "address" indicates a serial number assigned to a point whose y-coordinate is "11" or "13". "converted x-coordinate (XX)" indicates a value of the x-coordinate of the point calculated using the following conditional formulas:

If (x-coordinate value) % 4=3,
  XX=(x-coordinate value+1)
If (x-coordinate value) % 4=1,
  XX=(x-coordinate value−1)
where % represents the operation for calculating a remainder.

This is to cause the x-coordinates of points present between adjacent pixels to indicate the same value in order to apply the method in the fourth embodiment for the sake of convenience. "x-coordinate" and "y-coordinate" indicate the x- and y-coordinates of a point whose y-coordinate is "11" or "13" obtained by scanning data stored in the disk or memory. "start point/end point" expresses that the obtained point serves as a start point in the negative direction (negative start) or an end point in the negative direction (negative end) with respect to a horizontal vector, or serves as a start point in the positive direction (positive start) or an end point in the positive direction (positive end). "stripe number" indicates the stripe number of the obtained point, "outline number" indicates the number of order of the outline in a stripe, and "coordinate number" indicates the number of order of the obtained point. When points whose y-coordinates are "11" or "13" are expressed in the format shown in FIG. 73, a result shown in FIG. 74 is obtained. These points are re-sorted in an order from smaller XXs (x-coordinates). However, when the same values are present, they are sorted in the order satisfying the following condition:

① positive start ② negative start
③ negative end ④ positive end          Condition 1

For example, in FIG. 74, two each packets respectively having XX=24 and XX=36 are present. When these packets are sorted according to Condition 1, a result shown in FIG. 76 is obtained. Since packets having XX=24 respectively have attributes "negative end" and "positive end", they are sorted while temporarily considering that the number of the packet having the attribute "negative end" is smaller than that of the packet having the attribute "positive end". At this time, a flag for executing special processing for outline points having the same value XX and different x-coordinate values is set (Y indicates a state wherein the flag is set, and N indicates a state wherein the flag is reset). Furthermore, the re-sorted packets are paired from the first one, and in each pair, the packets are re-sorted to satisfy the order of Condition 1. In FIG. 76, since only a pair of packets having addresses "5" and "6" do not satisfy this condition, they are re-sorted. With this processing, outline vectors in each pair have a predetermined connection relationship therebetween, that is, the first packet is connected to the next packet. More specifically, the address of the next point of the first packet stores the address of the next packet, and the address of the previous point of the first packet stores no address. Also, the address of the next point of the next packet stores no address, and the address of the previous point of the next packet stores the address of the first packet. This state is shown in FIG. 77. Final merging of outline vectors is performed using FIGS. 74 and 77.

In the fourth embodiment, since an outline point is set at a middle point between adjacent pixels in an image, a horizontal vector is defined when a point at address "4" (FIG. 70) is connected to a point at address "1". However, when an outline point is set near a black pixel, an oblique vector is defined in this case. In order to avoid this problem, an oblique vector is developed into horizontal and vertical vectors using the following rules. First, vectors having oblique connection directions are classified depending on cases. When a vector is defined by [(p, q), (r, s)] (where (p, q) represents the coordinates of the start point, and (r, s) represents the coordinates of the end point), an outline point is interpolated between (p, q) and (r, s) as follows.

<Rule 1>
A. When special processing flag is set in neither of (p, q) nor (r, s):
  (A-1) If r>p and s>q, (p, q)→(p, q+2)→(r, s)
  (A-2) If r>p and s<q, (p, q)→(r, s+2)→(r, s)
  (A-3) If r<p and s>q, (p, q)→(r, s−2)→(r, s)
  (A-4) If r<p and s<q, (p, q)→(p, q−2)→(r, s)
  (A-5) If s=q and r>p, (p, q)→(p, q+2)→(r, s+2)→(r, s)
  (A-6) If s=q and r<g, (p, q)→(p, q−2)→(r, s−2)→(r, s)
  (A-7) If p=r, (p, q)→(r, s)
B. When special processing flag is set in only (p, q):
  (B-1) If r>p and s>q, (p, q)→(p+2, q)→(p+2, q+2)→(r, s)
  (B-2) If r<p and s<q, (p, q)→(p−2, q)→(p−−, q−2)→(r, s)
  (B-3) If s=q and r>p, (p, q)→(p+2, q)→(p+2, q+2)→(r, s+2)→(r, s)
  (B-4) If s=q and r<p, (p, q)→(p−2, q)→(p−2, q−2)→(r, s−2)→(r, s)
C. When special processing flag is set in only (r, s):
  (C-1) If r>p and s<q, (p, q)→(r−2, s+2)→(r−2, s)→(r, s)
  (C-2) If r<p and s>q, (p, q)→(r+2, s−2)→(r+2, s)→(r, s)
  (C-3) If s=q and r>p, (p, q)→(p, q+2)→(r−2, s+2)→(r−2, s)→(r, s)
  (C-4) If s=q and r<p, (p, q)→(p, q−2)→(r+2, s−2)→(r+2, s)→(r, s)
D. When special processing flag is set in both (p, q) and (r, s):
  (D-1) if r>p, (p, q)→(p+2, q)→(p+2, q+2)→(r−2, s+2)→(r−2, s)→(r, s)
  (D-2) if r<p, (p, q)→(p−2, q)→(p−2, q−2)→(r+2, s−2)→(r+2, s)→(r, s)

<Rule 2>
In vectors constituting an outline including interpolated points, horizontal and vertical vectors must alternately appear.
  Two or more continuous horizontal vectors and two or more continuous vertical vectors are respectively merged into a single horizontal vector, and a single vertical vector.
  Merging of outline vectors is performed using Rules 1 and 2, and FIGS. 74 and 75. Scanning is started from the first point of the first outline of the first stripe in FIG. 74. For the sake of simplicity, the ε-th point of the ω-th outline of the θ-th stripe is expressed by (θ-ω-ε), and a point associated with a division boundary (i.e., a point whose y-coordinate value is "11" or "13") will be referred to as a boundary point hereinafter. First, (1-1-1) is checked. Since this point is not a boundary point, it is registered, and the point of interest moves to the next point (1-1-2). Since (1-1-2) is not a boundary point, either, it is registered, and the point of interest moves to the next point (1-1-3). Since (1-1-3) is a boundary point, FIG. 77 is looked up to check a point as a destination of next movement. In this case, (1-2-4) is the point as the destination of next movement. Since a vector having (1-1-3) as the start point and (1-2-4) as the end point corresponds to (C-3) of Rule 1, outline points are interpolated to vectors (15, 11) → (15, 13) → (23, 13) → (23, 11) → (25, 11). Then, Rule 2 is applied to merge continuous horizontal vectors and continuous vertical vectors. When vectors are examined from (1-1-2) as an outline point immediately before (1-1-3), vectors are expressed by (15, 5) → (15, 11) → (15, 13) → (23, 13) → (23, 11) → (25, 11). Since (15, 5) → (15, 11) and (15, 11) → (15, 13) are vertical vectors, they are merged to obtain vectors (15, 5) → (15, 13) → (23, 13) → (23, 11) → (25, 11). Points (15, 13), (23, 13), and (23, 11) are registered, and a point as a destination of next movement is obtained from FIG. 74. Since the point (25, 11) is a point expressed by (1-2-4), the point as the destination of next movement is (1-2-1). Since a vector (23, 11) → (25, 11) is a horizontal vector, and a vector (25, 11) → (25, 5) is a vertical vector, and these vectors alternately appear, (25, 11) is registered. Similarly, (1-2-1) and (1-2-2) are registered. Since (1-2-3) is a boundary point, the point as the destination of next movement obtained from FIG. 74 is (2-2-2). Since this vector corresponds to (A-7) of Rule 1, a vector (35, 11) → (35, 13) is obtained. When vectors are examined from a point (35, 5) immediately before (35, 11) as in the above case, vectors (35, 5) → (35, 11) → (35, 13) are obtained. Since two vertical vectors continuously appear, they are merged, and (35, 11) is not registered. A point next to (35, 13) is (2-2-3), and since two vertical vectors continuously appear like (35, 5) → (35, 13) → (35, 15), (35, 13) is not registered, either. In this manner, a point as a destination of next movement is always monitored, two or more continuous horizontal vectors and two or more continuous vertical vectors are respectively merged into a single horizontal vector and a single vertical vector, and when a vertical vector and a horizontal vector alternately appear, outline points are registered. A point next to (2-2-3) is (2-2-4), and since a vertical vector and a horizontal vector alternately appear like (35, 5) → (35, 15) → (33, 15), (2-2-3), i.e., (35, 15) is registered. As described above, when processing is executed according to Rules 1 and 2, a table shown in FIG. 78 is finally obtained.

The processing content of step S315 has been described. Upon completion of this processing for all vectors, the flow advances to step S316. In step S316, smoothing and variable-magnification processing are executed using regular outline vectors. This processing is as described in the sixth embodiment. Upon completion of step S316, the flow advances to step S317 to reproduce and output a binary image from outline vectors of an input image subjected to variable-magnification processing.

With the above-mentioned processing, regular outline vectors of an input image can be obtained from divisionally extracted outline vectors, and when these regular vectors are subjected to smoothing and variable-magnification processing, a high-quality reproduced image can be obtained.

<Eighth Embodiment>

Figure 79:
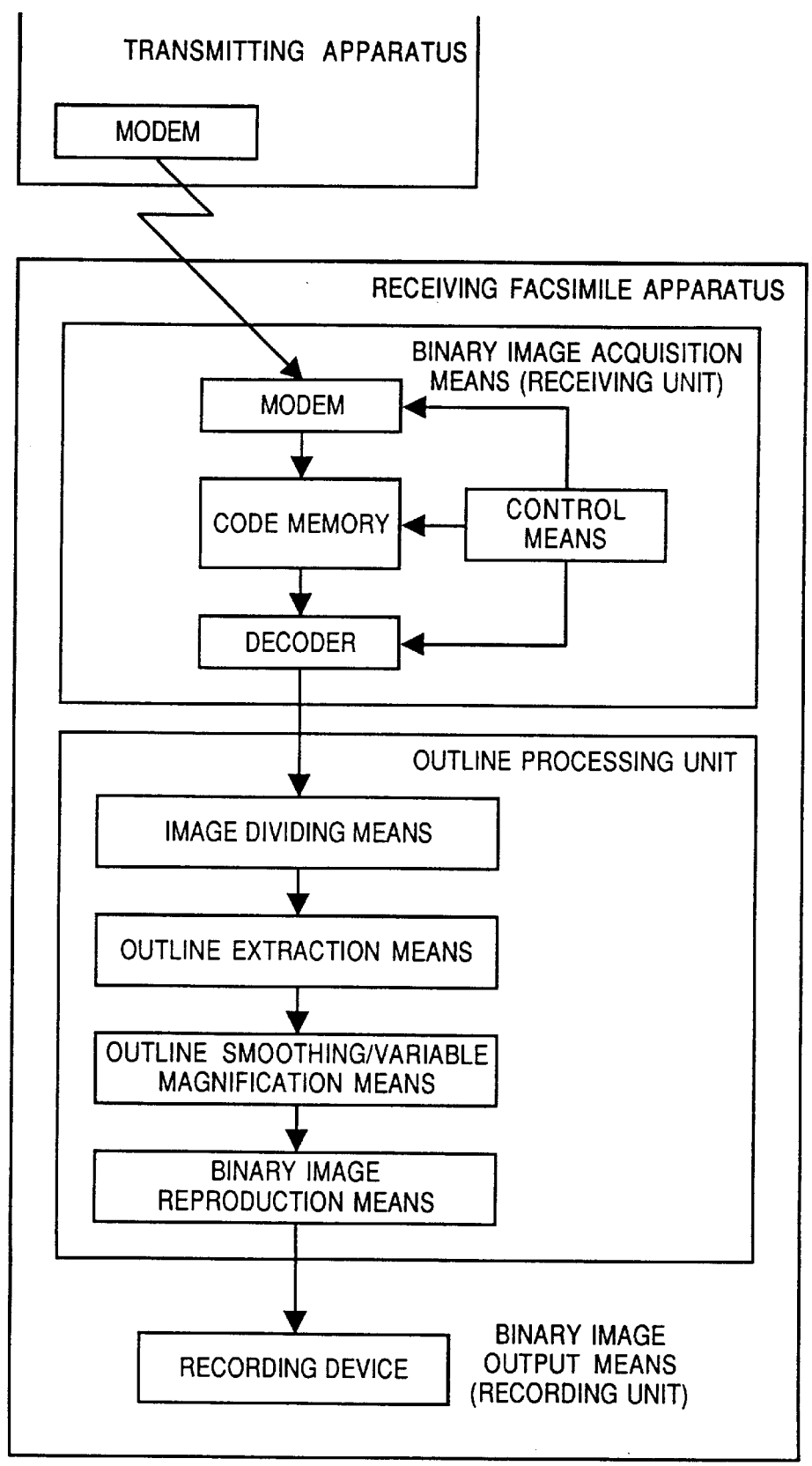
FIG. 79 is a block diagram showing an arrangement in which the seventh embodiment is applied to a receiving facsimile apparatus.
Figure 80:
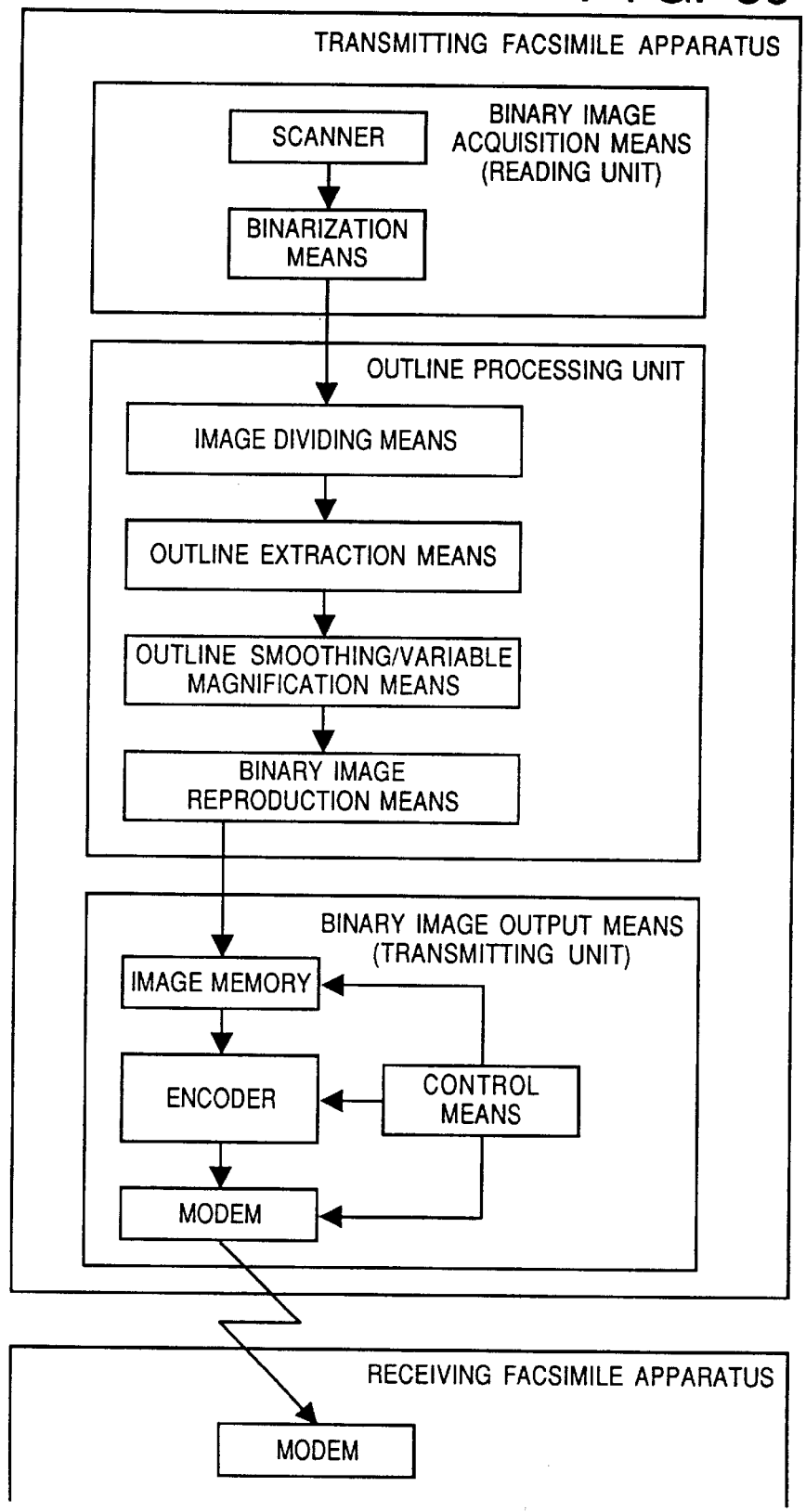
FIG. 80 is a block diagram showing an arrangement in which the seventh embodiment is applied to a transmitting facsimile apparatus.
Figure 81:
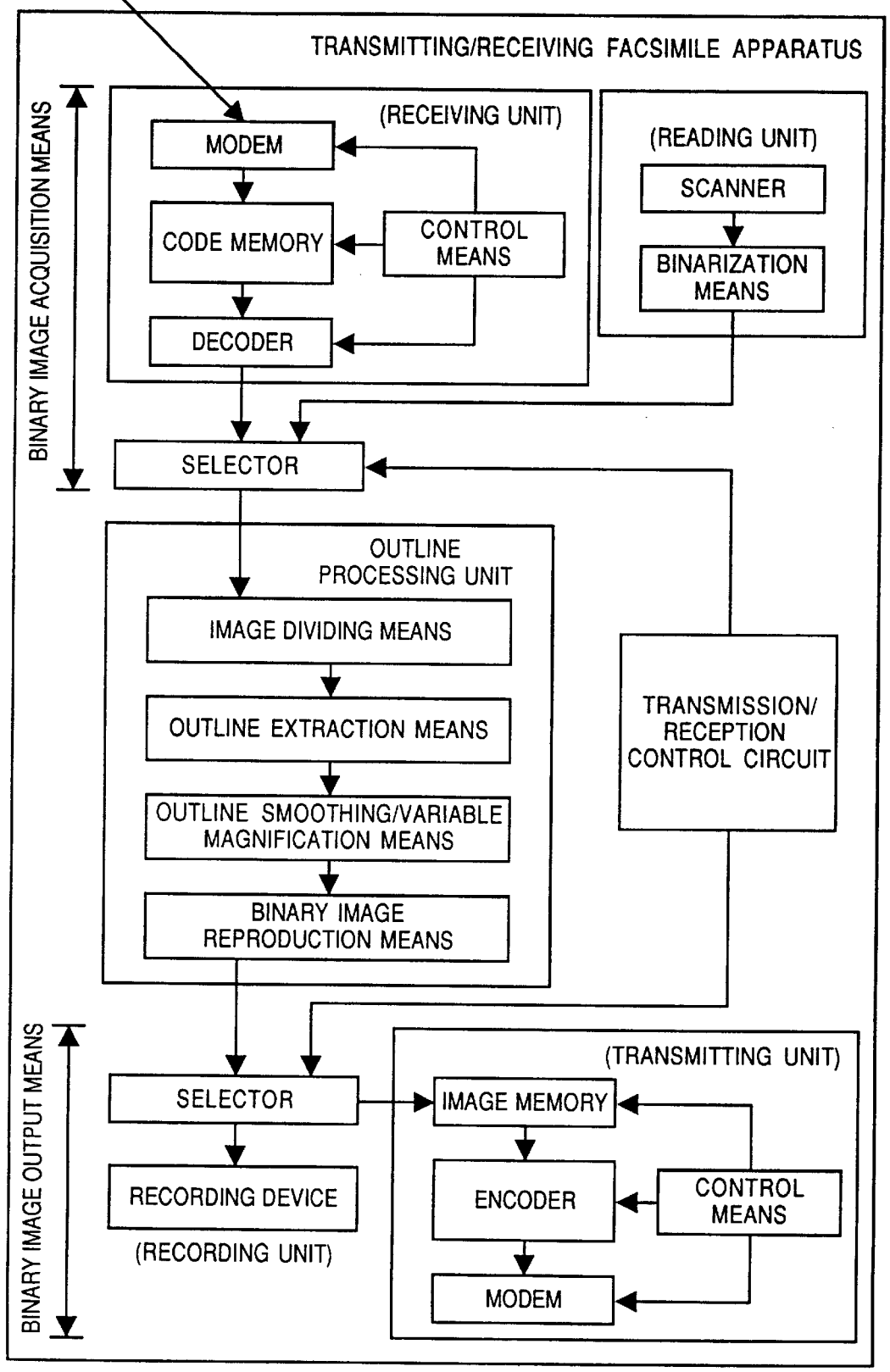
FIG. 81 is a block diagram showing an arrangement in which the seventh embodiment is applied to a transmitting/receiving facsimile apparatus.

FIGS. 79, 80, and 81 are block diagrams when this embodiment is applied to a facsimile apparatus.

FIG. 79 is a block diagram when this embodiment is applied to a receiving facsimile apparatus, which forms input binary image data by decoding codes transmitted by, e.g., MH coding, and executes the above-mentioned outline processing. A binary image re-generated by an outline processing unit is output onto a paper sheet by a recording device, or is displayed on a display device (not shown).

FIG. 80 is a block diagram when this embodiment is applied to a transmitting facsimile apparatus, which forms input image data by binarizing an image signal input via a scanner, and executes the outline processing. A binary image re-generated by an outline processing unit is stored in an image memory, and is encoded into, e.g., MH codes by an encoder, and the codes are transmitted.

FIG. 81 is a block diagram when this embodiment is applied to a transmitting/receiving facsimile apparatus. This apparatus is realized by combining the above-mentioned two arrangements. A selector is controlled by a transmission/reception control circuit, and an input/output operation of an outline processing unit is determined depending on a transmission/reception operation. In particular, a reading unit can be selected as a binary image acquisition means, and a recording device can be arranged (or selected) as a binary image output means. In this case, a digital copying machine (or copy mode) having a variable-magnification function can be realized.

As described above, according to the first to eighth embodiments of the present invention, since an input image is divided into stripes, the capacity of the working memory or disk can be reduced, and the memory capacity can be saved. Since the capacity of the working memory or disk can be reduced, the search range in outline sorting processing can be narrowed, thus achieving high-speed processing.

[Ninth to 27th Embodiments]

As an outline vector extraction method, trace along an outline loop is normally performed. Therefore, in this method, since outline loop extraction processing must be started after the entire image is fetched on an image memory, the required image memory capacity is increased, resulting in an increase in cost and a long processing time.

In contrast to this, a method of obtaining a fine variable-magnification image by extracting outline vectors from a binary image, and executing variable-magnification and smoothing processing of an image using the extracted outline vectors has been proposed in Japanese Laid-Open No. 05-174140. Also, as a method of extracting outline vectors from a binary image, a method which requires only a memory capacity for three rasters has been proposed in Japanese Laid-Open No. 04-157578. According to the method described in Japanese Laid-Open No. 04-157578, the capacity of an image memory can be small. However, with this method, a large-capacity memory capable of storing all vector data extracted from a single image is required as well as a working memory.

From this background, the present inventors proposed, as the first to eighth embodiments of the present invention, a method of saving the working memory by executing processing for obtaining a desired image by combining processing results after an input image is divided into stripes, as shown in FIG. 82, and outline vector extraction, variable-magnification, and smoothing processing are performed in units of stripes.

However, in the apparatus arrangement described in the first to eighth embodiments, since outline extraction, variable-magnification/smoothing processing, and image reproduction processing are executed in turn for a certain stripe, thereafter, the same processing operations are repeated for the next stripe, and such operations are repeated, the throughput time from the beginning to the end of processing may become very long. (FIG. 83 and subsequent drawings exemplify a case wherein an input image is divided into four stripes, and the same applies to a case wherein the number of stripes is different.)

Thus, the ninth to 27th embodiments have been made to solve the above-mentioned problem, and have as their object to provide an image processing method, which can drastically shorten the throughput time of overall image processing for obtaining a fine variable-magnification image using outline vectors of an input image.

Furthermore, when the outline vector processing method using stripes obtained by dividing an image is used, variable-magnification processing is executed in units of stripes. For this reason, if the magnification is not an integer multiple, the number of lines of a finally output image obtained by combining processing results in units of stripes becomes different from the number of lines of an output image obtained when the entire input image is subjected to variable-magnification processing, due to rounding errors upon execution of variable-magnification calculations in units of stripes.

The ninth to 27th embodiments of the present invention have been made in consideration of the abovementioned problem, and have as their object to provide an image processing method and apparatus, which can prevent the number of lines of a finally output image obtained by combining processing results obtained upon execution of variable-magnification processing in units of stripes from being largely different from the number of lines of an output image obtained when the entire input image is subjected to variable-magnification processing.

Figure 107C:
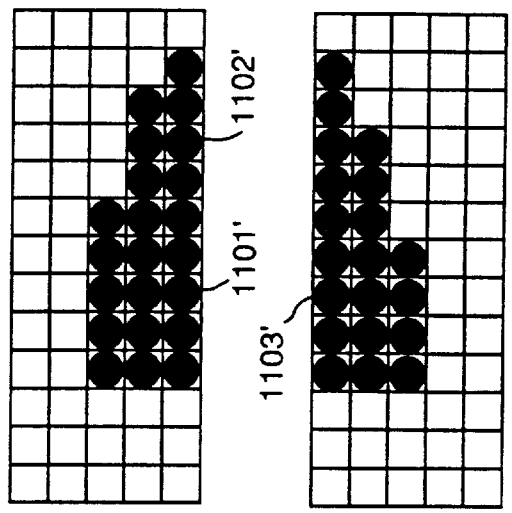
FIGS. 107A to 107C are views showing an example wherein a finally output image deteriorates when an input image is divided into stripes, and variable-magnification processing using outline vectors is executed in units of stripes.
Figure 107B:
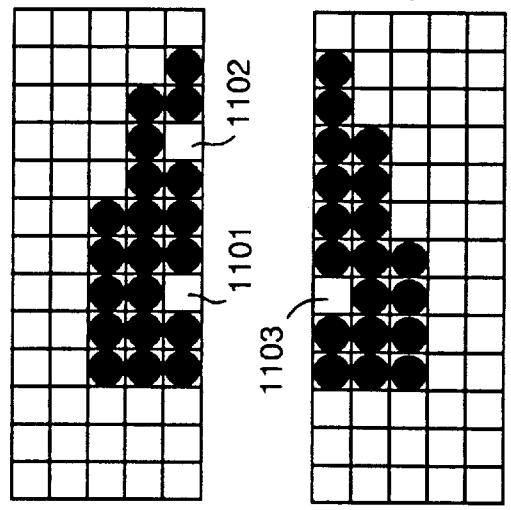
Figure 107A:
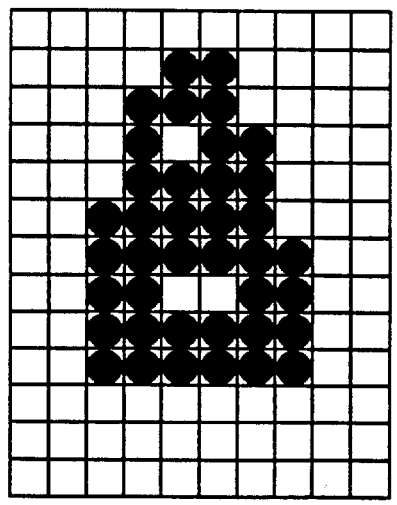

Furthermore, when the above-mentioned processing is executed, high-speed processing can be achieved, and the working memory can be saved, while a reproduced image may deteriorate due to smoothing in an example shown in, e.g., FIG. 107A. More specifically, when an input image shown in FIG. 107A is divided into stripes each including five lines, as shown in FIG. 107B, recessed portions (white pixels) 1101, 1102, and 1103 shown in FIG. 107B are deleted by smoothing, and an image shown in FIG. 107C is obtained after variable-magnification processing.

The ninth to 27th embodiments of the present invention have been made in consideration of the abovementioned problem, and have as their object to provide an image processing method and apparatus, which can prevent deterioration of a finally output image at a joint portion of stripes, caused upon execution of processing in units of divided stripes.

<Ninth Embodiment>

An image processing apparatus for extracting outline vectors from image data, and reproducing an image from extracted outline vectors will be described below as an embodiment of the present invention.

<Apparatus Arrangement>

Figure 85:
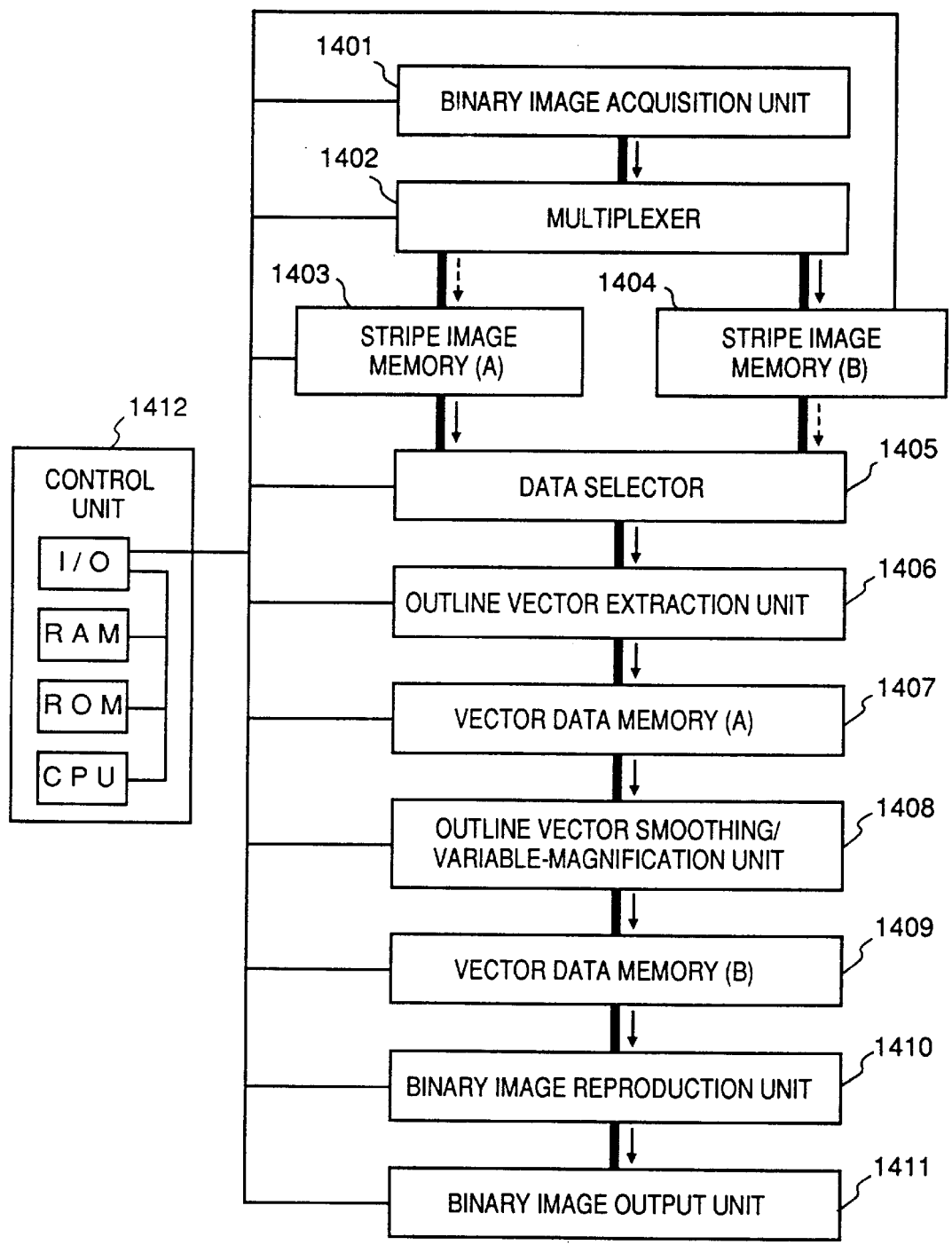
FIG. 85 is a block diagram showing an arrangement of an apparatus according to the ninth embodiment of the present invention.

FIG. 85 is a block diagram of an apparatus for performing variable-magnification processing of an image according to this embodiment. Referring to FIG. 85, a binary image acquisition unit 1401 acquires a digital binary image to be subjected to variable-magnification processing, and outputs a binary image in a raster-scanning format. For example, the unit 1401 corresponds to an input interface for fetching an image from a telephone line in, e.g., a facsimile apparatus. The unit 1401 includes a CPU and a ROM, and operates independently of other means. The unit 1401 can stop and re-start an input operation of image data in response to a command from a control unit 1412. When an input image is input up to its last line, the unit 1401 supplies an interrupt signal to the control unit 1412 to set "1" in a value of a flag "last" allocated on a RAM of the control unit 1412. The meaning of this flag will be described later.

A multiplexer 1402 outputs a binary image input in the raster-scanning format from the binary image acquisition unit 1401 to one of a stripe image memory (A) 1403 or a stripe image memory (B) 1404, which is selected by the control unit 1412. When the control unit 1412 controls the multiplexer 1402 to output data for a lines from the beginning of an input image to the image memory (A) 1403, and to output data for the next b lines to the image memory (B) 1404, stripes for a lines and b lines can be obtained on the image memory (A) 1403 and the image memory (B) 1404. The number of lines in each stripe may be a fixed value or a variable value which can be controlled by the control unit 1412.

The stripe image memory (A) 1403 and the stripe image memory (B) 1404 are image memories for temporarily storing an input image sent in the raster-scanning format from the multiplexer 1402. An image stored in the memory (A) 1403 or the memory (B) 1404 is defined as one stripe, and the subsequent processing is performed in units of stripes. Each of the image memory (A) 1403 and the image memory (B) 1404 is allocated with a status flag memory. A status flag indicates "busy" during an input operation of image data, and an external access is denied. While an image reading operation for one stripe is completed, the status flag indicates "full" to allow an access from the control unit 1412. Data in each image memory are cleared after they are output to a data selector 1405.

The data selector 1405 selects one of the image memory (A) 1403 and the image memory (B) 1404 under the control of the control unit 1412, fetches a stripe image from the selected memory, and outputs the fetched image to an outline vector extraction unit 1406 in the raster-scanning format. More specifically, while data are being written in the stripe image memory (A), the processing of the memory (B) is completed. Therefore, in this case, the content of the memory (B) is output to the data selector 1405.

The outline vector extraction unit 1406 extracts outline vectors which express outline loops of image data as vectors from stripe images output from the data selector 1405 in the raster-scanning order by a method described in Japanese Laid-Open No. 04-157578, and outputs the extracted outline vectors to a FIFO vector data memory (A) 1407. This extraction method will be briefly described below. The states of a pixel of interest and its surrounding pixels in image data are checked. When two adjacent pixels have different pixel values, a coarse outline vector is detected between the two pixels, and detected coarse outline vectors are sorted in the form of a loop surrounding black pixels, thus obtaining an outline vector.

The vector data memory (A) 1407 is a FIFO memory for temporarily storing outline vector data of a stripe image extracted by the outline vector extraction unit 1406.

An outline vector smoothing/variable-magnification unit 1408 receives outline vector data from the FIFO vector data memory (A) 1407, executes smoothing and variable-magnification processing by a method described in Japanese Laid-Open No. 05-174140, and outputs the processing result to a FIFO vector data memory (B) 1409. This smoothing/variable-magnification method will be briefly described below. For example, when vectors forming a closed loop includes two horizontal vectors and two vertical vectors, and these vectors each have a length "1", the vector group forming the corresponding closed loop is deleted. That is, vectors are smoothed by a method for operating outline vectors according to predetermined rules on the basis of the relationship between a vector of interest and vectors before and after the vector of interest in outline vectors forming a closed loop, or by a method for defining corner points as fixed points and other points as floating points, calculating a weighting coefficient of a floating point of interest with. respect to points before and after the point of interest, and correcting the position of the floating point of interest. Also, variable-magnification processing is achieved by, e.g., multiplying coordinates representing vectors with a desired magnification.

The vector data memory (B) 1409 is a FIFO memory for temporarily storing vector data which are subjected to variable-magnification/smoothing processing, and are output from the outline vector smoothing/variable-magnification unit 1408.

A binary image reproduction unit 1410 reads vector data subjected to variable-magnification/smoothing processing from the vector data memory (B) 1409, and reproduces a binary image in units of stripes. Upon completion of this processing, the unit 1410 outputs the reproduced image data to an image output unit 1411 via an interface (not shown). The reproduction method will be briefly described below. An outline loop (including one subjected to enlargement processing) is drawn on the basis of vector data obtained by smoothing processing, and a portion inside the loop is filled with black pixels. This processing is executed according to, e.g., Japanese Laid-Open No. 05-020467.

Each of the outline vector extraction unit 1406, the outline vector smoothing/variable-magnification unit 1408, and the binary image reproduction unit 1410 includes a CPU, ROM, and RAM (working memory), and operates independently. These units start their processing operations in response to commands from the control unit 1412. Each of these units has a status flag memory. During processing, each unit sets the flag to be "busy", and while each unit waits for a processing start command (for the next stripe) from the control section 1412 after processing is completed, each unit sets the flag to be "ready". These flags can be accessed by the control unit 1412.

The binary image output unit 1411 receives image data from the binary image reproduction unit 1410 via an interface unit (not shown), and automatically displays binary image data in the raster-scanning format, forms a hard copy of the image data, or outputs the image data onto a communication path. The unit 1411 comprises, e.g., a liquid crystal display, a thermal recording device, or a modem.

The control unit 1412 controls the input/output timings of processing in the units 1401 to 1411, and selection of data paths. The control unit 1412 includes a CPU, ROM, and RAM, and its signal line is connected to those of the units 1401 to 1411. The control unit 1412 reads status flags from these signal lines, or can send processing start/stop signals via these signal lines. With these signals, the control unit 1412 controls the respective units.

<Description of Control Procedure>

Figure 86:
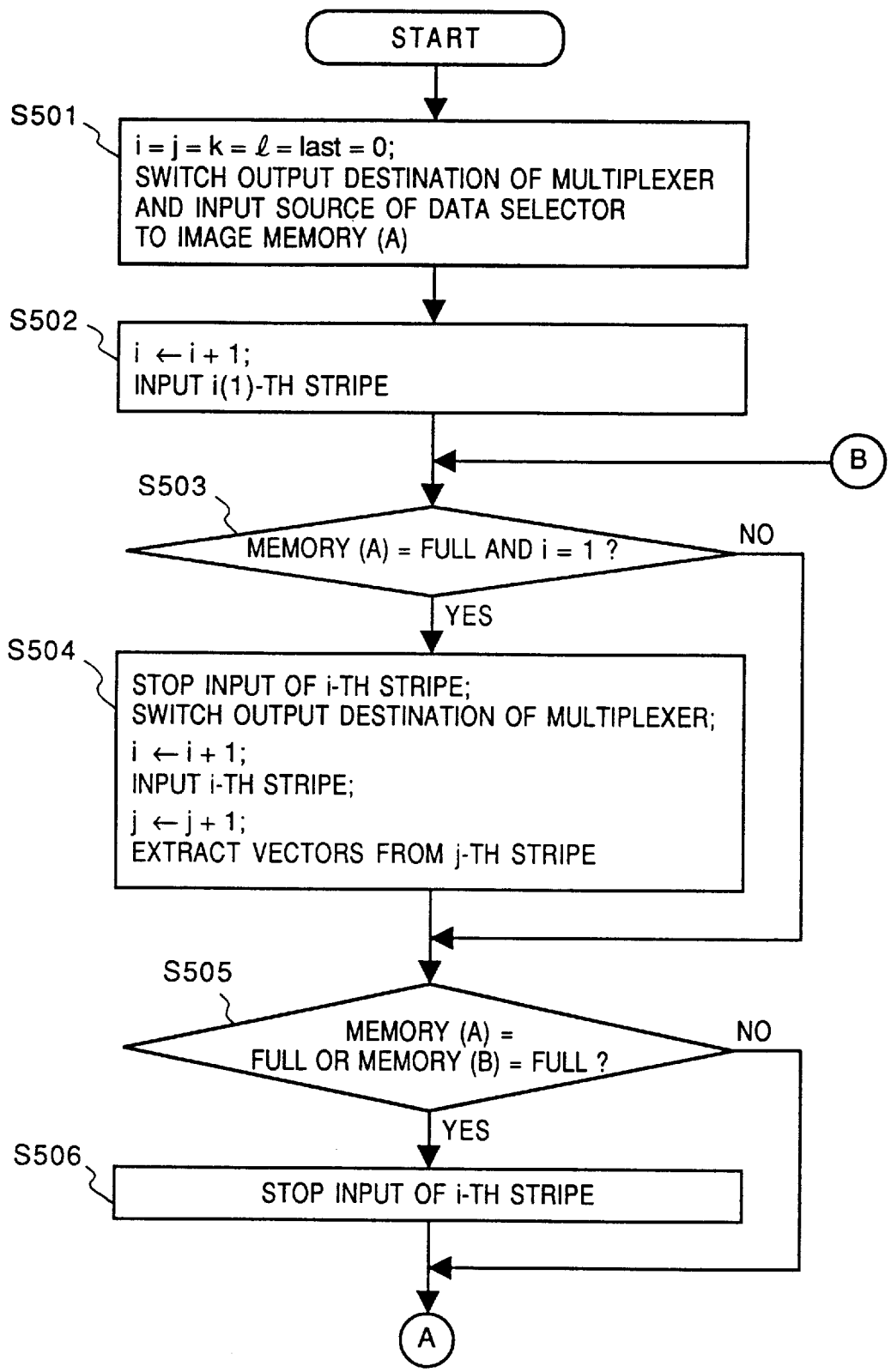
FIG. 86 is a flow chart showing processing executed by a control unit 1412 in the ninth embodiment.
Figure 87:
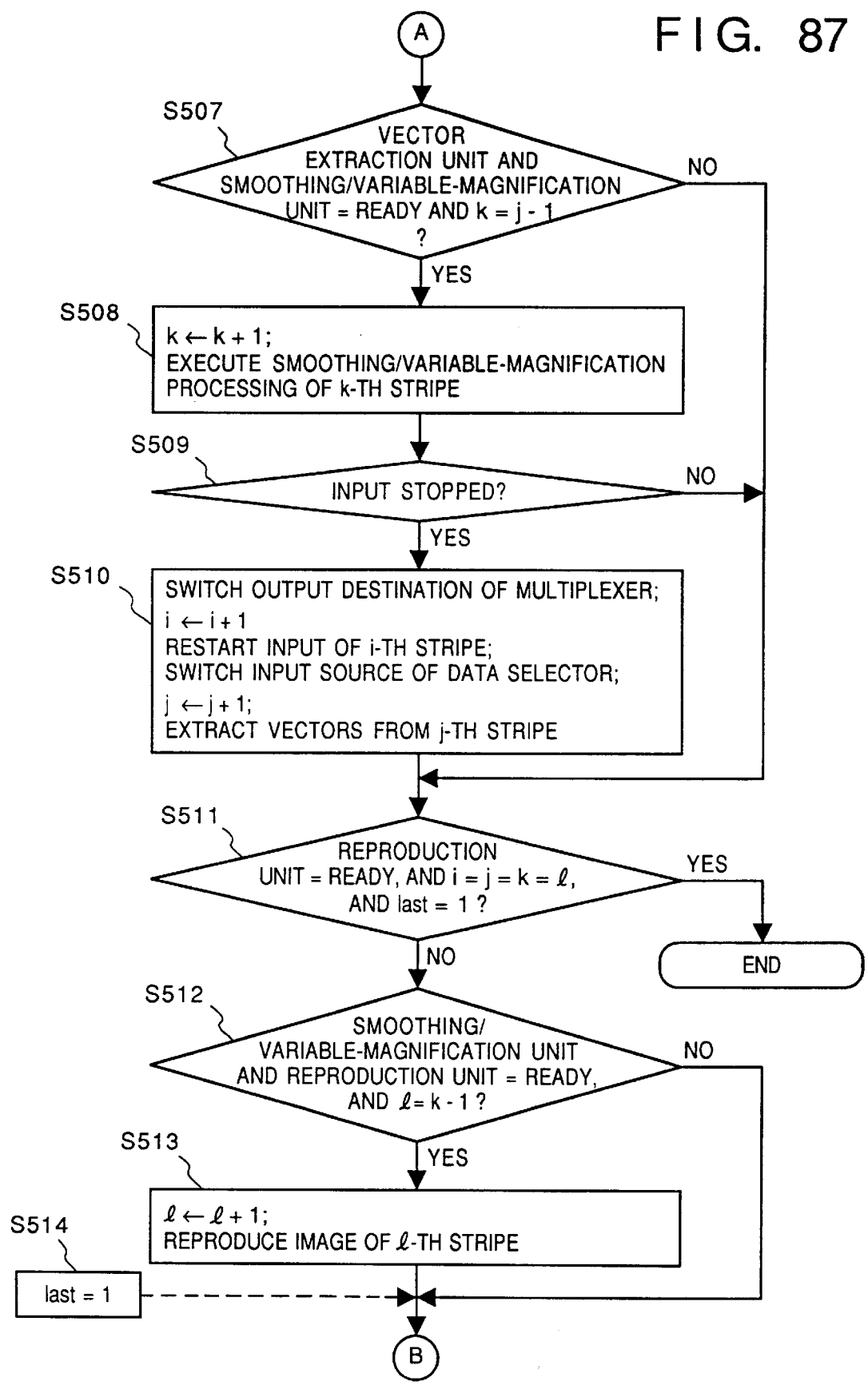
FIG. 87 is a flow chart showing processing executed by the control section 1412 in the ninth embodiment.
Figure 88:
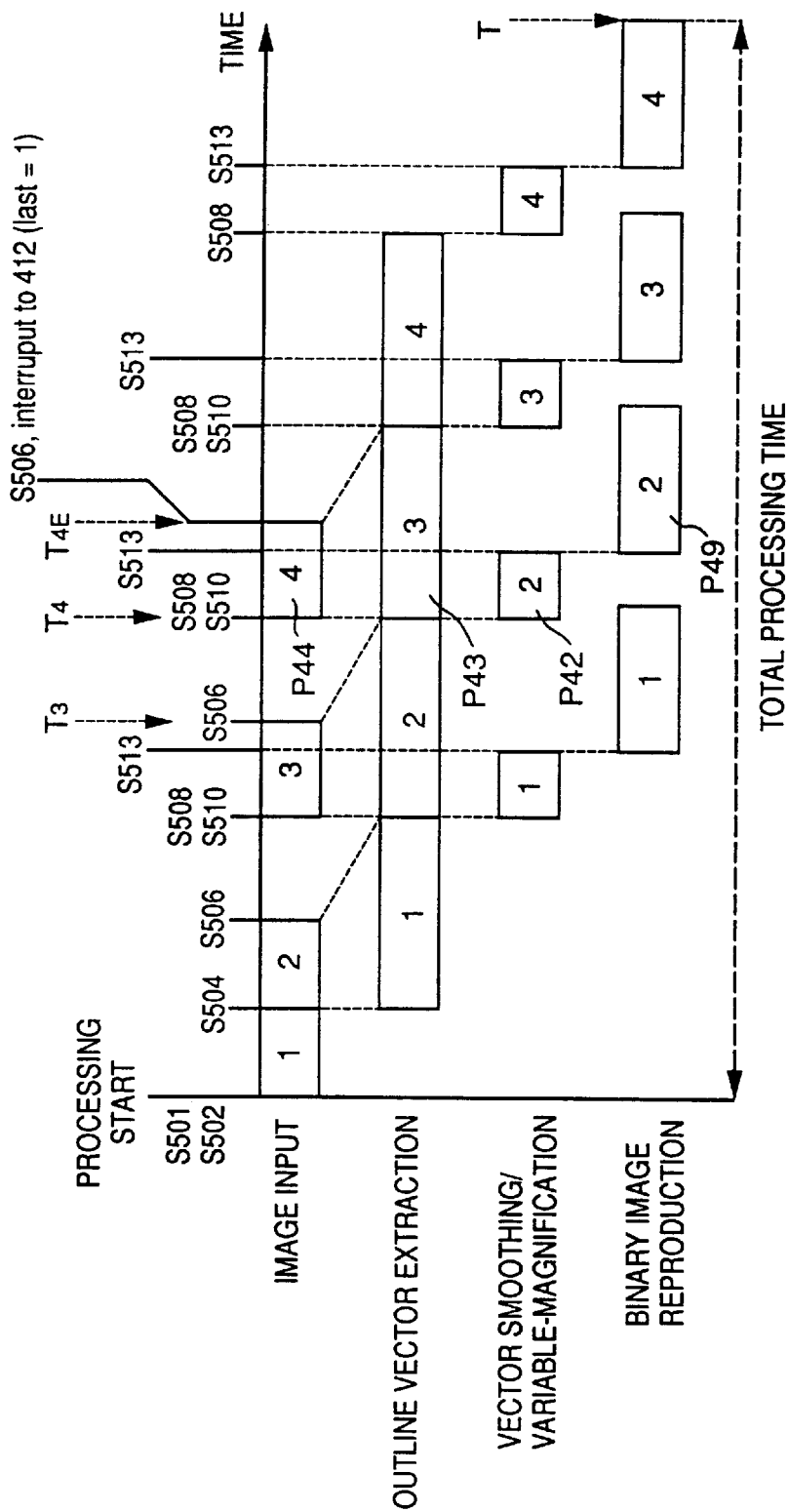
FIG. 88 is a timing chart showing processing timings in units of stripes by the respective units of the apparatus of the ninth embodiment.

FIGS. 86 and 87 are flow charts showing control executed by the control unit 1412. A program corresponding to these flow charts is stored in the internal ROM of the control unit 1412. FIG. 88 shows the processing timings of stripes of the binary image acquisition unit 1401, the outline vector extraction unit 1406, the outline vector smoothing/variable-magnification unit 1408, and the binary image reproduction unit 1410 in correspondence with steps in the flow charts in FIGS. 86 and 87 when an input image is divided into four stripes.

In FIGS. 86 and 87, variables i, j, k, l, and last respectively have the following meanings:

i: the number of a stripe which is being input (or has already been input) from the binary image acquisition unit 1401 to the multiplexer 1402 j: the number of a stripe which is being processed (or has already been processed) by the outline vector extraction unit 1406 k: the number of a stripe which is being processed (or has already been processed) by the outline smoothing/variable-magnification unit 1408 l: the number of a stripe which is being processed (or has already been processed) by the binary image reproduction unit 1410

(the number of the stripe in the variables i, j, k, and l complies with FIG. 82)

last: a flag indicating whether or not the last line of an input image is input from the binary image acquisition unit 1401 to the multiplexer 1402.

Note that the values of the variables i, j, k, l, and last are stored in the internal RAM of the control unit 1412.

In step S501, i, j, k, l, and last are initialized to "0", and both the output destination of the multiplexer 1402 and the input source of the data selector 1405 are set at the stripe image memory (A) 1403 side.

In step S502, the control unit increments the value i by "1", and supplies a signal to the binary image acquisition unit 1401 to start image data input of the i (=1)-th stripe from the binary image acquisition unit 1401 to the multiplexer 1402. This image data is temporarily stored in the image memory (A) 1403 via the multiplexer 1402. After the signal is supplied, the flow advances to step S503.

In step S503, the control unit reads out the status flag of the image memory (A) 1403. If the control unit determines in step S503 that the status flag="full" and i=1, i.e., the image memory (A) 1403 loads the first stripe, the flow advances to step S504. Otherwise, the flow advances to step S505.

In step S504, the control unit executes the following processing. This step is executed only once, and when the processing is completed, the flow advances to step S505.

1) The control unit 1412 supplies a signal to the binary image acquisition unit 1401 to temporarily stop the image input operation of the i (=1)-th stripe from the binary image acquisition unit 1401 to the multiplexer 1402.

2) The control unit switches the output destination of the multiplexer 1402 to the image memory (B) 1404 side, increments the value i by "1" to "2", and supplies a signal to the binary image acquisition unit 1401 to restart the stopped image input operation from the binary image acquisition unit 1401 to the multiplexer 1402. Image data input from the binary image acquisition unit 1401 to the image memory (B) 1404 after the restart signal corresponds to the i (=2)-th stripe.

3) The control unit increments the value j by "1", and supplies a signal for starting outline vector extraction processing for the j (=1)-th stripe to the outline vector extraction unit 1406.

In step S505, if i is an odd number, the control unit accesses the status flag of the image memory (A) 1403; if i is an even number, it accesses the status flag of the image memory (B) 1404. If the accessed status flag is "full", i.e., the image memory storing input data is full of data, the flow advances to step S506; otherwise, the flow advances to step S507.

In step S506, the control unit 1412 supplies a signal to the binary image acquisition unit 1401 to temporarily stop the image input operation of the i-th stripe from the binary image acquisition unit 1401 to the multiplexer 1402. Thereafter, the flow advances to step S507.

In step S507, it is checked:
1) if the status flags of both the outline vector extraction unit 1406 and the outline vector smoothing/variable-magnification unit 1408 are "ready"; and
2) if k=j−1 is satisfied. If YES in both 1) and 2), i.e., if the outline vector extraction processing of the j-th stripe and the outline vector smoothing/variable-magnification processing of the k (=j−1)-th stripe are completed, and both the processing units are ready, the flow advances to step S508; otherwise, the flow advances to step S511.

In step S508, the control unit increments the value k by "1", and supplies a signal for starting outline vector smoothing/variable-magnification processing of the k-th stripe to the outline vector smoothing/variable-magnification unit 1408. Thereafter, the flow advances to step S509.

In step S509, it is checked if the image input operation from the binary image acquisition unit 1401 to the multiplexer 1402 remains stopped at that time (by step S506). If YES in step S509, the flow advances to step S510; otherwise, the flow advances to step S511.

In step S510, the control unit executes the following processing, and thereafter, the flow advances to step S511.

1) The control unit switches the output destination of the multiplexer 1402 from the currently selected image memory to the other image memory, increments the value i by "1", and supplies a signal for restarting the stopped image input operation from the binary image acquisition unit 1401 to the multiplexer 1402 to the binary image acquisition unit 1401. Image data input from the binary image acquisition unit 1401 at that time corresponds to the i-th stripe.

2) The control unit switches the input source of the data selector 1405 from the currently selected image memory to the other memory, increments the value j by "1", and supplies a signal for starting outline vector extraction processing for the j-th stripe (stored in the newly selected image memory) to the outline vector extraction unit 1406.

In step S511, it is checked:
1) if the status flag of the binary image reproduction unit 1401 is "ready";
2) if the values i, j, k, and l are equal to each other; and
3) if the flag "last" has become 1 (already by an interrupt signal from the binary image acquisition unit 1401).

If YES in all 1), 2), and 3), i.e., if all image data to be input have already been input, and reproduction of the input image data is completed, processing ends; otherwise, the flow advances to step S512.

In step S512, it is checked:
1) if the status flags of both the outline vector smoothing/variable-magnification unit 1408 and the binary image reproduction unit 1410 are "ready"; and
2) if l=k−1 is satisfied. If YES in both 1) and 2), i.e., if image data to be reproduced still remain, and the reproduction unit 1410 is ready, the flow advances to step S513; otherwise, the flow returns to step S503.

In step S513, the control unit increments the value l by "1", and supplies a signal to the binary image reproduction unit 1410 to start binary image reproduction processing after variable-magnification processing for the l-th stripe. Thereafter, the flow returns to step S503.

Figure 83:
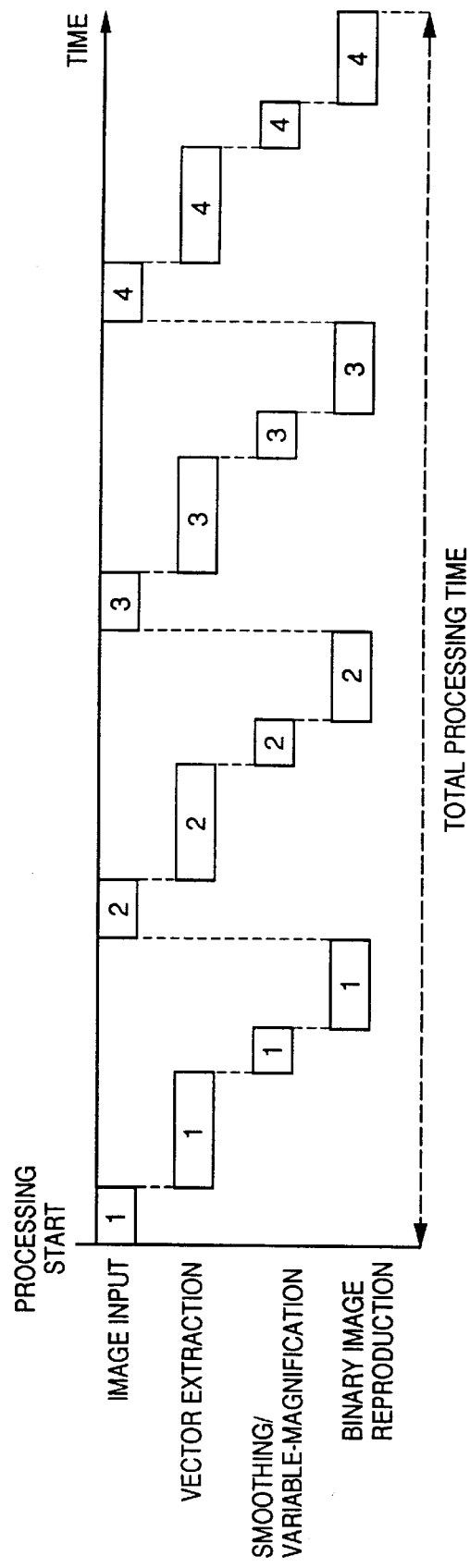
FIG. 83 is a timing chart showing processing timings in units of stripes when an input image is divided into stripes, and the stripes are subjected to outline variable-magnification processing.

As described above, since the image input processing, outline vector extraction processing, outline vector smoothing/variable-magnification processing, and binary image reproduction processing are executed in a pipeline manner in units of stripes, the processing time can be greatly shortened as compared to a conventional system (FIG. 83).

Figure 84:
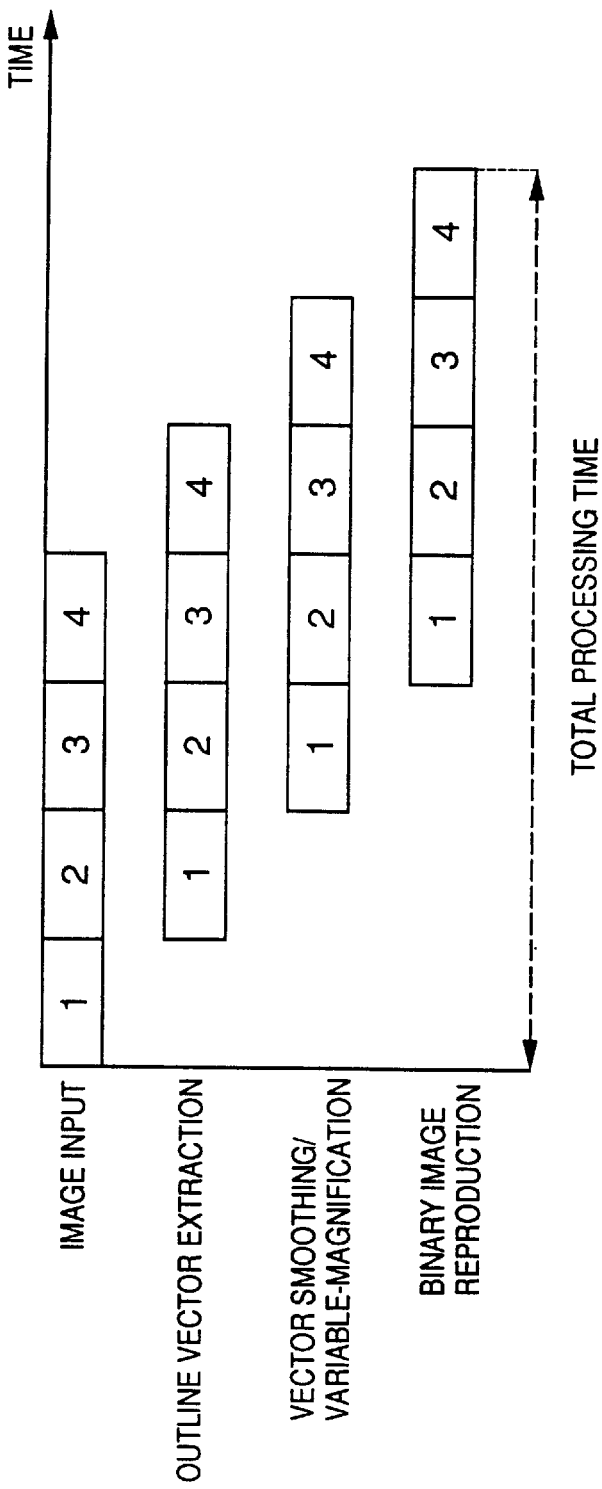
FIG. 84 is a view showing the concept that processing in units of stripes is executed in a pipeline manner when an input image is divided into stripes, and the stripes are subjected to outline variable-magnification processing.

FIG. 84 illustrates processing in respective processes when the processing units constituting the image processing apparatus shown in FIG. 85 are divided into four processes, i.e., an image input process (the binary image acquisition unit 1401 and the multiplexer 1402), an outline vector extraction process (the outline vector extraction unit 1406), an outline vector smoothing/variable-magnification process (the outline vector smoothing/variable-magnification unit 1408), and a binary image reproduction process (the binary image reproduction unit 1410). FIG. 84 exemplifies an, image divided into four stripes. As is apparent from FIG. 84, the image processing apparatus of this embodiment can independently process different stripes in units of processes, and for this reason, four stripes can be simultaneously processed in a pipeline manner in the entire apparatus. Therefore, the idle time of each processing unit can be decreased, and the processing efficiency can be drastically improved.

FIG. 88 illustrates FIG. 84 along the flow charts in FIGS. 86 and 87. In FIG. 88, the processing in the apparatus of this embodiment is divided into four processes, i.e., an image input process (the binary image acquisition unit 1401 and the multiplexer 1402), an outline vector extraction process (the outline vector extraction unit 1406), an outline vector smoothing/variable-magnification process (the outline vector smoothing/variable-magnification unit 1408), and a binary image reproduction process (the binary image reproduction unit 1410). FIG. 88 explains processing timings of stripes of binary image acquisition unit 1401, the outline vector extraction unit 1406, the outline vector smoothing/variable-magnification unit 1408, and the binary image reproduction unit 1410 in correspondence with steps in the flow charts in FIGS. 86 and 87 when an input image is divided into four stripes. Of the processing shown in FIG. 88, the processing at an input timing ($T_4$ in FIG. 88) of the fourth stripe will be exemplified below.

Upon completion of the outline vector extraction processing of the second stripe and the outline vector smoothing/variable-magnification processing of the first stripe, the flow advances to step S508 to start the smoothing/variable-magnification processing of the second stripe so as to satisfy the conditions in step S507 (P42 in FIG. 88). The image data input operation is stopped at a timing T3 in FIG. 88 in step S506. For this reason, the input operation of image data of the fourth stripe (P44) and the outline vector extraction of the third stripe (P43) are started in step S510.

In this manner, upon completion of the smoothing/variable-magnification processing of the second stripe, and the image reproduction processing of the first stripe, the reproduction processing (P44) of the second stripe is started in step S513.

On the other hand, when the image input operation is completed at a timing $T_{4E}$, the flag "last" is set to be "1" in response to the interrupt signal from the binary image acquisition unit 1401.

Thereafter, no image input operation is performed, and if it is determined at a timing T1 that all the four processes are completed, the image processing of the apparatus of this embodiment is completed in step S511.

As described above, the throughput time of the entire processing can be shortened with an arrangement having a minimum working memory. More specifically, apparatus cost can be reduced, and processing efficiency can be improved. Furthermore, when the present invention is applied to communication equipment such as a facsimile apparatus, communication cost can also be reduced.

The above embodiment exemplifies a case wherein the processing operations from the image data input operation to the image reproduction are executed. Even when processing for storing, as outline vector data, vector data stored in the vector data memory (A) upon execution of outline vector extraction from an input image in the arrangement shown in FIG. 85 is executed, or even when processing for executing smoothing/variable-magnification processing of the stored vector data, and reproducing the processed image data is executed, high-speed processing can be achieved as in the above-mentioned processing procedure. Also, high-speed processing can be achieved even when processing for extracting outline vectors from input image data, and storing vector data obtained by executing smoothing/variable-magnification processing of the outline vectors, and stored in the vector data memory (B) is executed.

<10th Embodiment>

In the ninth embodiment, the binary image acquisition unit 1401 must be kept waited for a data input operation. However, some apparatuses cannot perform such an operation. In this case, the apparatus may be arranged not to require an input wait state. Such an image processing apparatus will be described below as the 10th embodiment of the present invention.

<Apparatus Arrangement>

Figure 89:
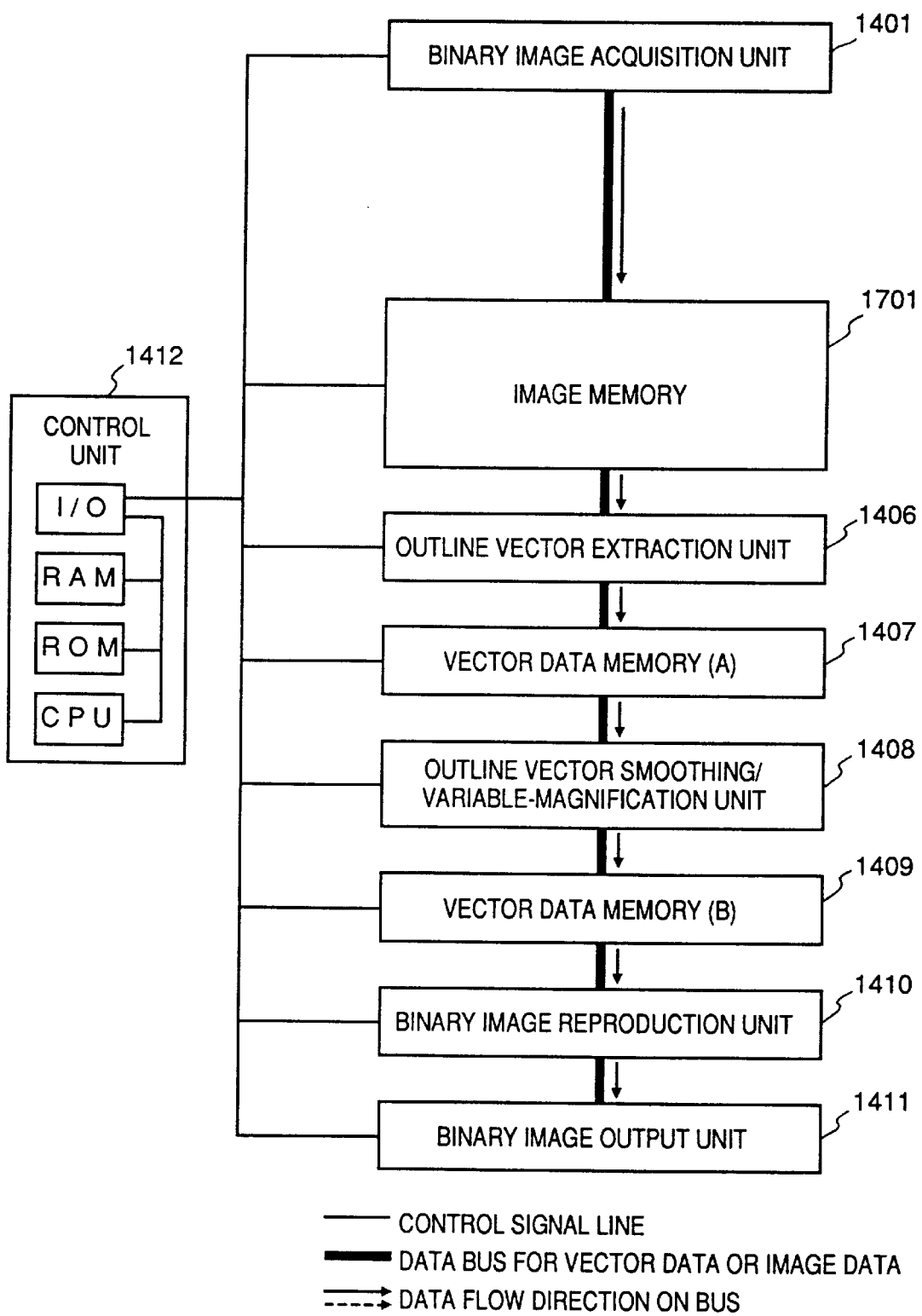
FIG. 89 is a block diagram showing an arrangement of an apparatus according to the 10th embodiment of the present invention.

FIG. 89 is a block diagram showing an apparatus according to the 10th embodiment of the present invention. Referring to FIG. 89, the stripe image memory (A) 1403, the stripe image memory (B) 1404, the multiplexer 1402, and the data selector 1405 are omitted from the arrangement shown in FIG. 85 of the ninth embodiment, and an image memory 1701 for one frame of an input image is prepared instead. In the image memory 1701, for example, a dual port RAM may be used to prepare independent input and output buses, so that input and output operations can be simultaneously executed. An address counter of the image memory 1701 comprises an IC which can be accessed by the control unit 1412 as needed, so that the number of lines of an input image input from the binary image acquisition unit 1401 to the image memory 1701 can be detected by the control unit 1412. In addition, the image memory 1701 is arranged so that data from an arbitrary position to another arbitrary position on the image memory 1701 can be output to the outline vector extraction unit 1406 under the control of the control unit 1412. Although the remaining units, i.e., the binary image acquisition unit 1401, and the outline vector extraction unit 1406 to the control unit 1412 in FIG. 89 are the same as those in FIG. 85, no interrupt signal is supplied from the binary image acquisition unit 1401 to the control unit 1412. Instead, the image memory 1701 comprises a circuit for, when the image memory 1701 outputs the last line of an input image to the outline vector extraction unit 1406, detecting data reading from the last address, and outputting the same interrupt signal as that of the binary image acquisition unit 1401 of the ninth embodiment to the control circuit 1412. The binary image acquisition unit 1401 continuously outputs all input image data to the image memory 1701 (without stopping the input operation).

<Processing Procedure>

Figure 90:
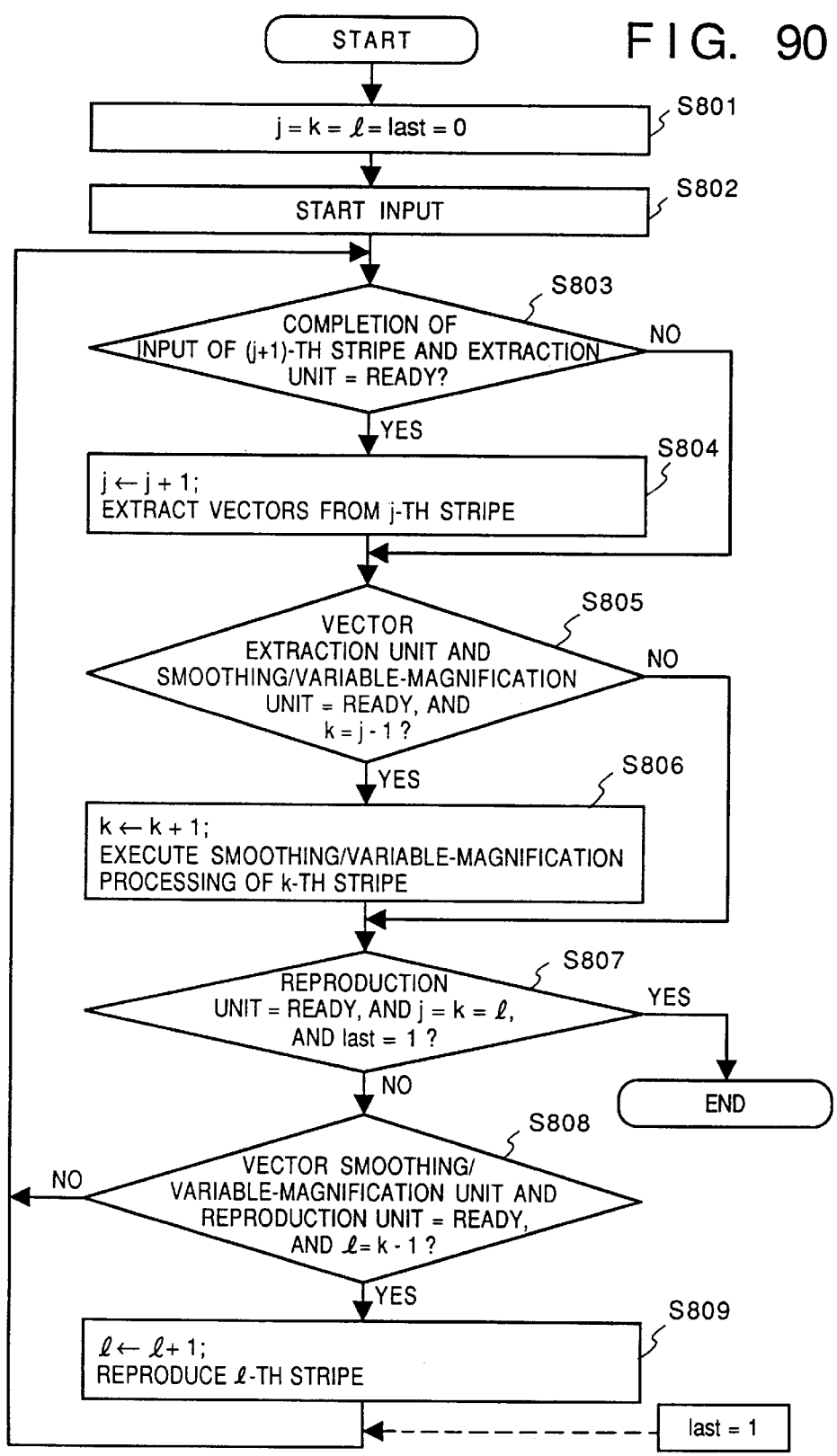
FIG. 90 is a flow chart showing processing executed by a control unit 1412 in the 10th embodiment.
Figure 91:
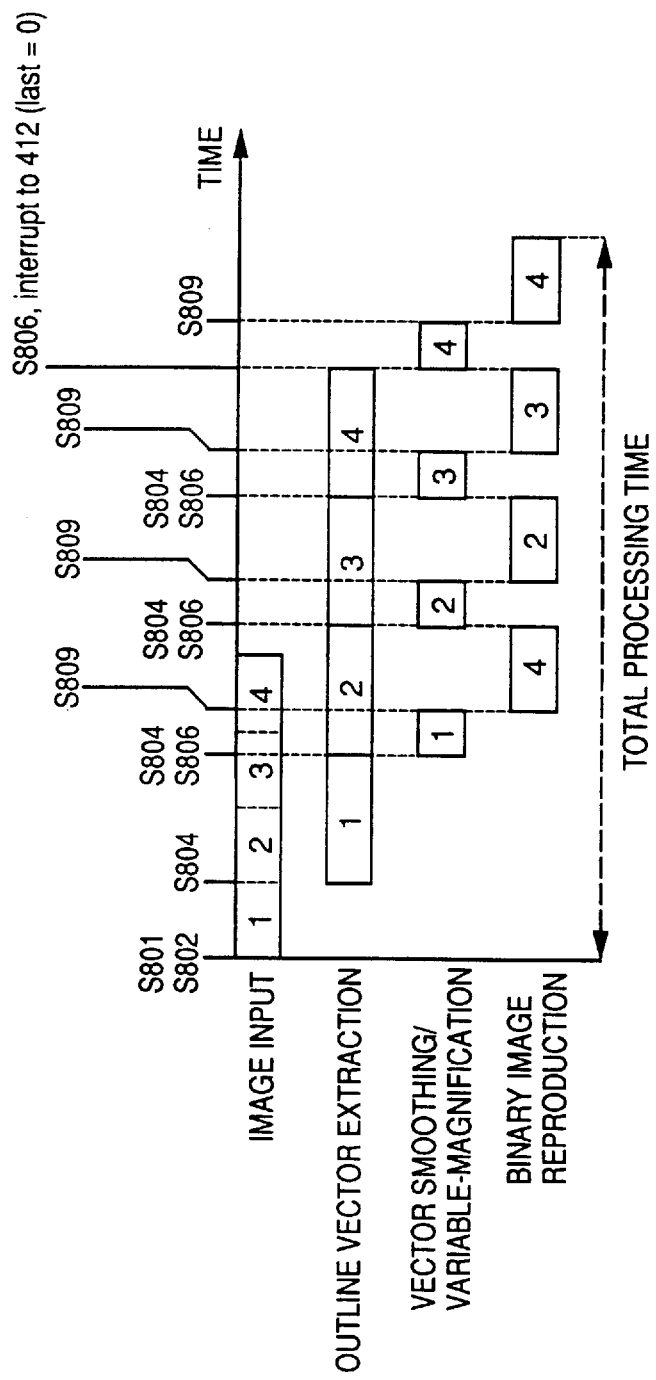
FIG. 91 is a timing chart showing processing timings in units of stripes by the respective units of the apparatus of the 10th embodiment.

FIG. 90 is a flow chart showing control executed by the control unit 1412 of this embodiment. A program corresponding to this flow chart is stored in the internal ROM of the control unit 1412. FIG. 91 shows the processing timings of stripes of the binary image acquisition unit 1401, the outline vector extraction unit 1406, the outline vector smoothing/variable-magnification processing unit 1408, and the binary image reproduction unit 1410 in correspondence with steps in the flow chart in FIG. 90 when an input image is divided into four stripes.

In FIG. 90, variables j, k, l, and last respectively have the following meanings.

j: the number of a stripe which is being processed (or has already been processed) by the outline vector extraction unit 1406 k: the number of a stripe which is being processed (or has already been processed) by the outline smoothing/variable-magnification unit 1408 l: the number of a stripe which is being processed (or has already been processed) by the binary image reproduction unit 1410

(the number of the stripe in the variables j, k, and l complies with FIG. 82)

last: a flag indicating whether or not the last line of an input image is input from the binary image acquisition unit 1401 to the image memory 1701.

Note that the values of the variables j, k, l, and last are stored in the internal RAM of the control unit 1412.

In step S801, the initial values of j, k, l, and last are set to be "0".

In step S802, the control unit 1412 supplies a signal to the binary image acquisition unit 1401 to start an image data input operation from the binary image acquisition unit 1401 to the image memory 1701. Unlike in the ninth embodiment, the input operation is not stopped until the last line of an input image is input to the image memory 1701. Thereafter, the flow advances to step S803.

In step S803, it is checked if data in an amount corresponding to the (j+1)-th stripe of an input image have already been input from the binary image acquisition unit 1401 to the image memory 1701, and if the status flag of the outline vector extraction unit 1406 is "ready". If YES in step S803, i.e., if vector extraction of the (j+1)-th stripe image is ready, the flow advances to step S804.

Otherwise, the flow advances to step S805.

In step S804, the control unit increments the value j by "1", supplies a signal to the image memory 1701 to output image data of the j-th stripe to the outline vector extraction unit 1406, and at the same time, supplies a signal to the outline vector extraction unit 1406 to start outline vector extraction processing for the j-th stripe. Upon completion of the processing, the flow advances to step S805.

In step S805, it is checked:

1) if the status flags of both the outline vector extraction unit 1406 and the outline vector smoothing/variable-magnification unit 1408 are "ready"; and 2) if k=j−1 is satisfied. If YES in both 1) and 2), i.e., if smoothing/variable-magnification processing of the j-th stripe is ready, the flow advances to step S806; otherwise, the flow advances to step S807.

In step S806, the control unit increments the value k by "1", and supplies a signal for starting outline vector smoothing/variable-magnification processing of the k-th stripe to the outline vector smoothing/variable-magnification unit 1408. Thereafter, the flow advances to step S807.

In step S807, it is checked if:
1) if the status flag of the binary image reproduction unit 1410 is "ready";
2) if the values j, k, and l are equal to each other; and
3) if the flag "last" has become "1" (already by the interrupt signal from the image memory 1701). If YES in all 1), 2), and 3), i.e., if the input operation of image data to be input is completed, and processing for all the stripes of input image data is completed, the processing ends; otherwise, the flow advances to step S808.

In step S808, it is checked:
1) if the status flags of both the outline vector smoothing/variable-magnification unit 1408 and the binary image reproduction unit 1401 are "ready"; and
2) l=k−1 is satisfied. If YES in both 1) and 2), i.e., if reproduction processing of the k-th stripe is ready, the flow advances to step S809; otherwise, the flow returns to step S803.

In step S809, the control unit increments the value l by "1", and supplies a signal to the binary image reproduction unit 1401 to start binary image reproduction processing after variable-magnification processing for the l-th stripe.

Although this embodiment requires the image memory for one frame for storing an input image as compared to the ninth embodiment (the ninth embodiment requires a memory for only two stripes), the input operation of the binary image acquisition unit 1401 need not be stopped. The total processing time of this embodiment is almost equal to that in the ninth embodiment.

FIG. 91 is substantially the same as FIG. 88 in the ninth embodiment, except that since the image memory has a capacity for one frame, the image input operation is not synchronized with outline vector extraction processing as the next processing.

<11th Embodiment>

Since the number of outline vectors extracted from one stripe largely varies depending on the complexity of a stripe image, the vector data memory, and the working memory included in the outline vector extraction unit must have capacities large enough to store all outline vector data for one stripe of even a very complex image. However, in practice, since such a complex image is rare, most of the memory capacity is wasted. As the 11th embodiment, an image processing apparatus which adopts the following apparatus arrangement and the processing procedure for solving this problem will be described below.

<Apparatus Arrangement>

Figure 92:
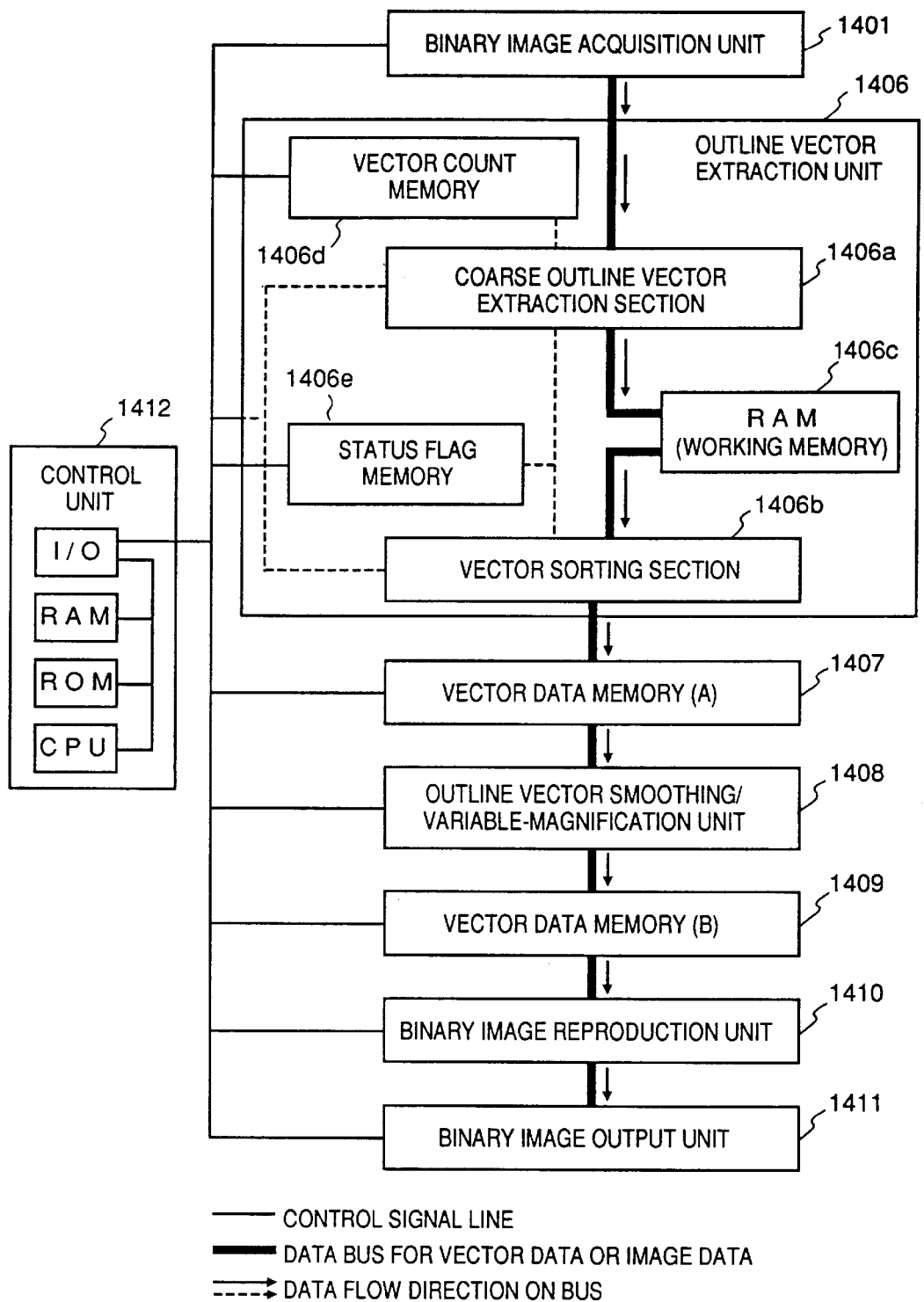
FIG. 92 is a block diagram showing an arrangement of an apparatus according to the 11th embodiment of the present invention.

FIG. 92 is a block diagram showing an arrangement of the apparatus according to the 11th embodiment. As shown in FIG. 92, the image memory 1701 connected to the binary image acquisition unit 1401 is omitted from FIG. 89 of the 10th embodiment, so that the binary image acquisition unit 1401 directly inputs image data to the outline vector extraction unit 1406 in units of rasters. Also, the binary image acquisition unit 1401 is arranged to be able to stop/restart an image data input operation to the outline vector extraction unit 1406 in response to a signal from the control unit 1412 as in the ninth embodiment. In addition, when the binary image acquisition unit 1401 inputs the last line of an input image to the outline vector extraction unit 1406, it supplies an interrupt signal to the control unit 1412 to set "1" in the flag "last" on the RAM of the control unit 1412.

The outline vector extraction unit 1406 includes a CPU, ROM, RAM (working memory), and status flag (which can be accessed by the control unit 1412), and operates independently. The unit 1406 starts its processing in response to a command from the control unit 1412. As for the processing executed by the outline vector extraction unit 1406, a procedure disclosed in Japanese Laid-Open No. 04-157578 described above is used as in the ninth and 10th embodiments. In addition, the extraction unit 1406 of this embodiment consists of two stages:

1) a coarse outline vector extraction section 1406a for extracting coarse outline vectors from image data every time image data for one raster is input, and writing the extracted data on a working memory 1406c; and
2) a vector sorting section 1406b for sorting coarse outline vectors extracted by the coarse outline vector extraction section 1406a and written on the working memory 1406c in units of loops, and outputting the sorted data to the vector data memory (A) 1407. In the unit 1406, processing operations are executed in the order of the coarse outline vector extraction section 1406a → the vector sorting section 1406b, and are never simultaneously performed. A status flag in a status flag memory 1406e is set to be "busy" when the processing of the coarse outline vector extraction section 1406a is started, and is set to be "ready" when the processing of the vector sorting section 1406b is completed.

Although the processing in the above description is the same as that in the ninth and 10th embodiments, this embodiment executes coarse outline vector extraction processing simultaneously with an input operation of image data in units of rasters. In this embodiment, the control unit 1412 can separately supply processing start/stop signals to the coarse outline vector extraction section 1406a and the vector sorting section 1406b.

The outline vector extraction unit 1406 includes a vector count memory 1406d for storing the number of outline vectors extracted by the coarse outline vector extraction section 1406a in addition to the above-mentioned status flag memory, as shown in FIG. 92. The memory 1406d can also be accessed by the control unit 1412, as needed. The control unit 1412 accesses the vector count memory 1406d as needed to check the number of vectors extracted by the coarse outline vector extraction section 1406a. When the control unit 1412 determines that the number of extracted vectors exceeds a predetermined value, it causes the binary image acquisition unit 1401 to stop the image input operation to the outline vector extraction unit 1406, and causes the coarse outline vector extraction section 1406a to stop coarse outline vector extraction processing. An image input from the binary image acquisition unit 1401 to the coarse outline vector extraction section 1406a from the beginning of the input operation up to this timing can be considered as one stripe. Immediately thereafter, the control unit causes the vector sorting section 1406b to start vector sorting processing for this stripe. As soon as the outline vector extraction processing for this stripe (i.e., the processing operations in both the coarse outline vector extraction section 1406a and the vector sorting section 1406b) is completed, the control unit 1412 causes the outline vector extraction unit 1406 to output the extracted vector data to the vector data memory (A) 1407, and supplies a signal to the outline vector smoothing/variable-magnification unit 1408 to start processing for this stripe. At the same time, the control unit 1412 restarts the stopped image input operation from the binary image acquisition unit 1401 to the outline vector extraction unit 1406, and causes the outline vector extraction unit 1406 to start outline vector extraction processing for the currently input image data (corresponding to a second stripe). Thereafter, the outline vector extraction processing, outline vector smoothing/variable-magnification processing, and image reproduction processing are executed in a pipeline manner as in the ninth embodiment.

Figure 93:
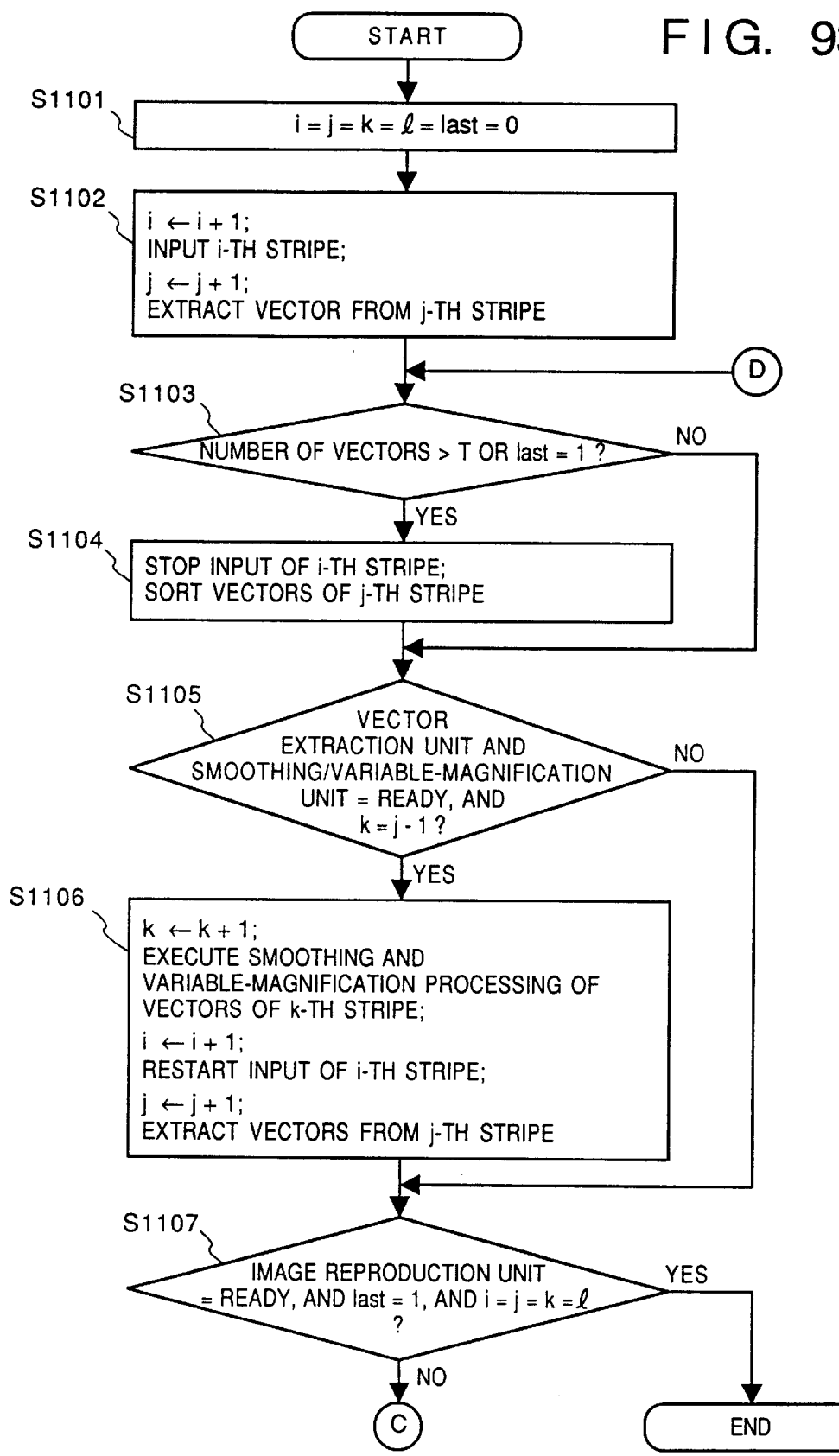
FIG. 93 is a flow chart showing processing executed by a control unit 1412 in the 11th embodiment.
Figure 94:
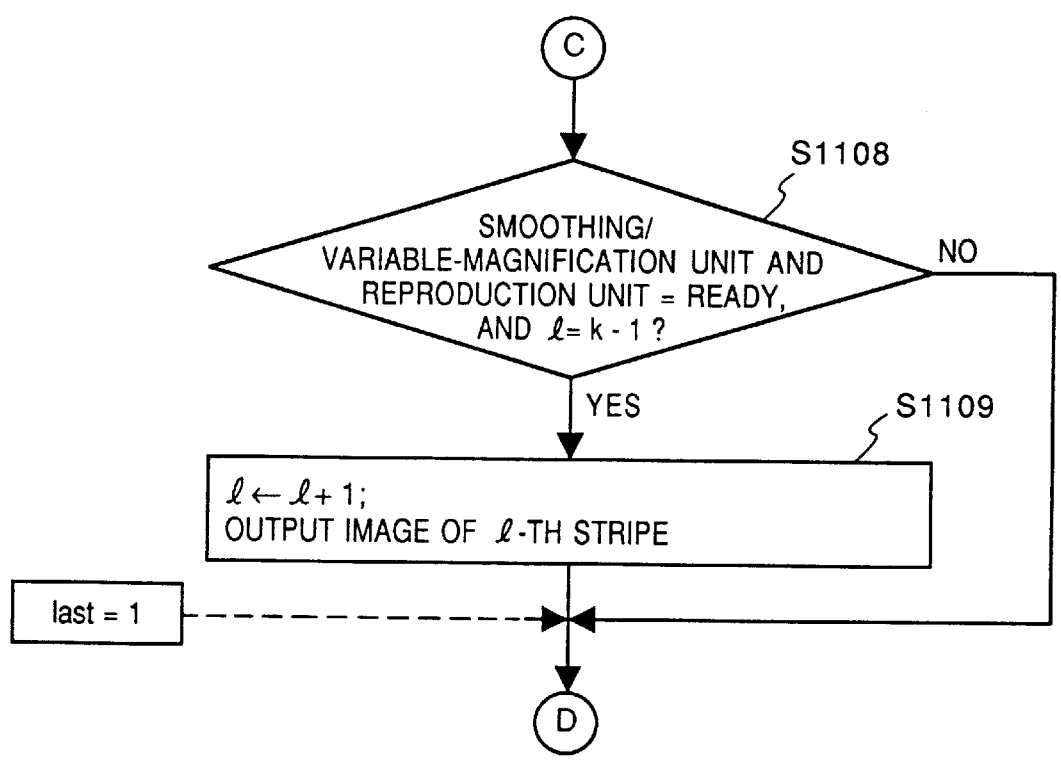
FIG. 94 is a flow chart showing processing executed by the control unit 1412 in the 11th embodiment.

FIGS. 93 and 94 are flow charts showing control executed by the control unit 1412 in the 11th embodiment. A program corresponding to these flow charts are stored in the internal ROM of the control unit 1412. FIG. 95 shows the processing timings of stripes of the binary image acquisition unit 1401, the outline vector extraction unit 1406, the outline vector smoothing/variable-magnification unit 1408, and the binary image reproduction unit 1410 in correspondence with steps in the flow charts in FIGS. 93 and 94 when an input image is divided into four stripes.

In FIGS. 93 and 94, variables i, j, k, l, and last respectively have the following meanings:

i: the number of a stripe which is being input (or has already been input) from the binary image acquisition unit 1401 to the multiplexer 1402 j: the number of a stripe which is being processed (or has already been processed) by the outline vector extraction unit 1406 k: the number of a stripe which is being processed (or has already been processed) by the outline smoothing/variable-magnification unit 1408 l: the number of a stripe which is being processed (or has already been processed) by the binary image reproduction unit 1410

(the number of the stripe in the variables i, j, k, and l complies with FIG. 82)

last: a flag indicating whether or not the last line of an input image is input from the binary image acquisition unit 1401 to the outline vector extraction unit 1406.

Note that the values of the variables i, j, k, l, and last are stored in the internal RAM of the control unit 1412.

In step S1101, the variables i, j, k, l, and last are respectively set to be an initial value "0", and the flow advances to step S1102.

In step S1102, the control unit increments the value i by "1", and supplies a signal to the binary image acquisition unit 1401 to start an image data input operation of an i (=1)-th stripe from the binary image acquisition section 1401 to the outline vector extraction unit 1406. At the same time, the control unit increments the value j by "1", and supplies a signal to the coarse outline vector extraction section 1406a to start processing for sequentially extracting coarse outline vectors from input image data sent from the binary image acquisition unit 1401 in units of rasters. The processing for sequentially extracting coarse outline vectors from input image data is executed according to a method described in Japanese Laid-Open No. 04-157578. As described above, in this method, the relationship among a pixel of interest and its surrounding pixels is checked to obtain a vector defined between black and white pixels, and an outline vector is obtained using the defined vector. Thereafter, the flow advances to step S1103.

In step S1103, the control unit accesses the vector count memory 1406d to check the number of outline vectors extracted by the coarse outline vector extraction section 1406a. If the number of outline vectors exceeds a predetermined value T, or if the value "last" has become "1" (already by an interrupt signal from the binary image acquisition unit 1401), the flow advances to step S1104; otherwise, the flow advances to step S1105.

In step S1104, the control unit supplies signals to the binary image acquisition unit 1401 and the coarse outline vector extraction section 1406a to temporarily stop the image input operation from the binary image acquisition unit 1401 to the coarse outline vector extraction section 1406a, and coarse outline vector extraction processing in the coarse outline vector extraction section 1406a. Image data input to the coarse outline vector extraction section 1406a until this timing is processed as the i-th stripe. At the same time, the control unit supplies a signal to the vector sorting section 1406b to start vector sorting processing for this stripe.

In step S1105, it is checked:

1) if the status flags of both the outline vector extraction unit 1406 and the outline vector smoothing/variable-magnification unit 1408 are "ready"; and 2) if k=j−1 is satisfied. If YES in step S1105, i.e., the smoothing/variable-magnification processing of the j-th stripe is ready, the flow advances to step S1106; otherwise, the flow advances to step S1107.

In step S1106, the control unit executes the following processing, and thereafter, the flow advances to step S1107.

1) The control unit increments the value k by "1", and supplies a signal to the outline vector smoothing/variable-magnification unit 1408 to start outline vector smoothing/variable-magnification processing for the k-th stripe.

2) The control unit increments the value i by "1", and supplies a signal to the binary image acquisition unit 1401 to restart the image input operation from the binary image acquisition unit 1401 to the outline vector extraction unit 1406, which operation is stopped in step S1104. At the same time, the control unit increments the value j by "1", and supplies a signal to the coarse outline vector extraction section 1406a to start coarse outline vector extraction processing for the j-th stripe.

In step S1107, it is checked:

1) if the flag "last" has become "1" (already by an interrupt signal from the binary image acquisition unit 1401);

2) if the values i, j, k, and l are equal to each other; and 3) if the status flag of the binary image reproduction unit 1410 is "ready". If YES in 1), 2), and 3), i.e., if processing up to image reproduction is completed for all input image data, the processing ends; otherwise, the flow advances to step S1108.

In step S1108, it is checked:

1) if the status flags of both the outline vector smoothing/variable-magnification unit 1408 and the binary image reproduction unit 1410 are "ready"; and 2) if l=k−1 is satisfied. If YES in both 1) and 2), i.e., if reproduction processing of the k-th stripe is ready, the flow advances to step S1109; otherwise, the flow returns to step S1103.

In step S1109, the control unit increments the value l by "1", and supplies a signal to the binary image reproduction unit 1410 to start binary image reproduction processing for the l-th stripe.

When the above-mentioned processing is executed, the numbers of lines in stripes do not become constant. However, the data amount of extracted vector data can become almost constant in units of stripes. As a result, the capacity of the vector data memory can be saved, and the memory capacity can be effectively used.

<12th Embodiment>

In the 11th embodiment, an image memory for one frame as in FIG. 89 of the 10th embodiment may be inserted between the binary image acquisition unit 1401 and the outline vector extraction unit 1406 in FIG. 92, so that input image data is continuously input to this image memory. With this arrangement, an apparatus, which cannot set an input waiting state, can be coped with.

<13th Embodiment>

In the ninth to 12th embodiments, the image output unit 1411 cannot often intermittently output an image in units of stripes depending on apparatuses. In order to cope with such a case, the following two ways of apparatus arrangements may be adopted.

1) In the ninth to 12th embodiments, an output image buffer may be arranged in the image output unit 1411, and output image data in units of stripes sent from the image reproduction unit 1410 to the image output unit 1411 are sequentially written in this buffer. After processing for all the stripes is completed, the written image is output.

2) In the ninth to 12th embodiments, control associated with the image reproduction unit 1410 is omitted from the flow charts (FIGS. 86, 87, 90, 93, and 94) of the processing executed by the control unit 1412, and all vector data output from the outline vector smoothing/variable-magnification unit 1408 are stored in the vector data memory (B) 1409. Only when the outline vector smoothing/variable-magnification processing of the last stripe is completed, the control unit 1412 supplies a processing start signal to the image reproduction unit 1410 to start image reproduction processing of all the stripes (i.e., an image as a result of variable-magnification processing for one frame of an input image). The reproduced image is directly output from the image output unit 1411. Upon execution of such processing, the processing timings of stripes of the outline vector extraction unit 1406, the outline vector smoothing/variable-magnification unit 1408, and the image reproduction unit 1410 are as shown in FIG. 96. When the above-mentioned processing is executed, the vector data memory (B) 1409 requires a considerably larger capacity than that of the method described in the ninth embodiment. In this case, vector data may be held while being converted into a data format disclosed in previously filed Japanese Laid-Open Nos. 05-342340 or 06-004658. These data formats will be briefly described below. That is, the coordinate data of the start or end point of an outline vector is held as difference data from adjacent coordinates, and is held as variable-length data in accordance with its number of digits. When this arrangement is used, the capacity required for the vector data memory (B) 1409 can be reduced.

<14th Embodiment>

Figure 97B:
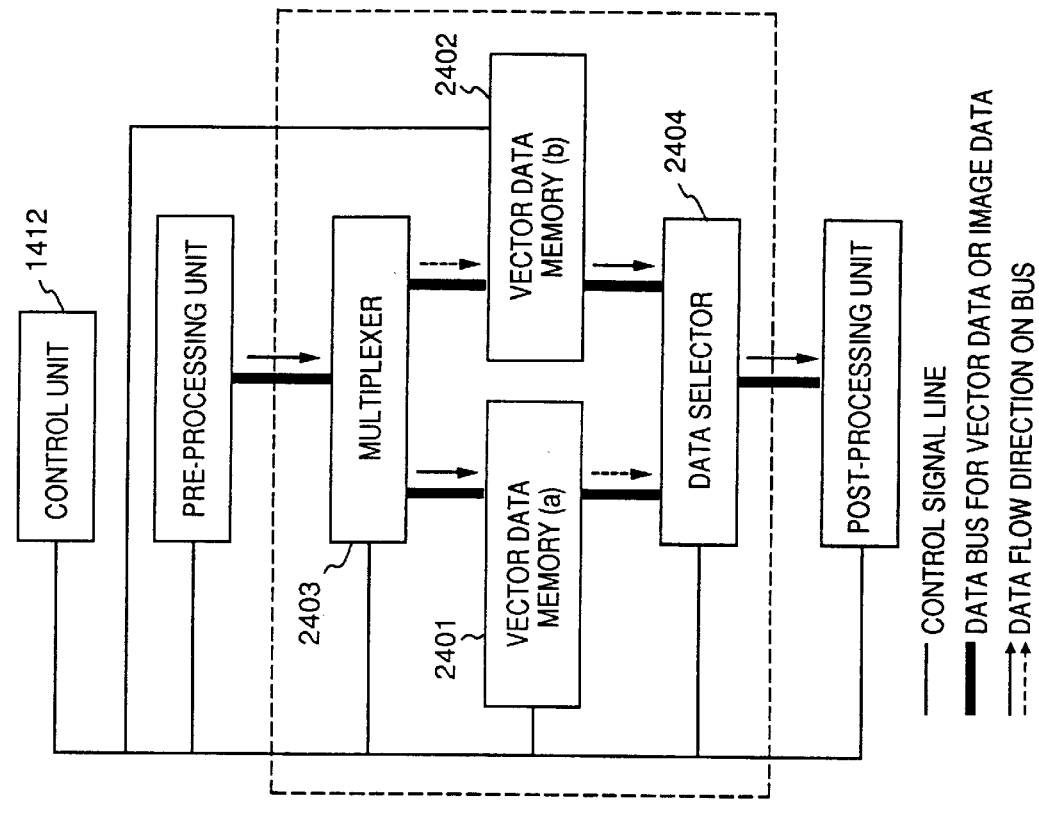
FIGS. 97A and 97B are block diagrams when a FIFO memory is replaced by a combination of a memory+a multiplexer+data selector in the 14th embodiment of the present invention.
Figure 97A:
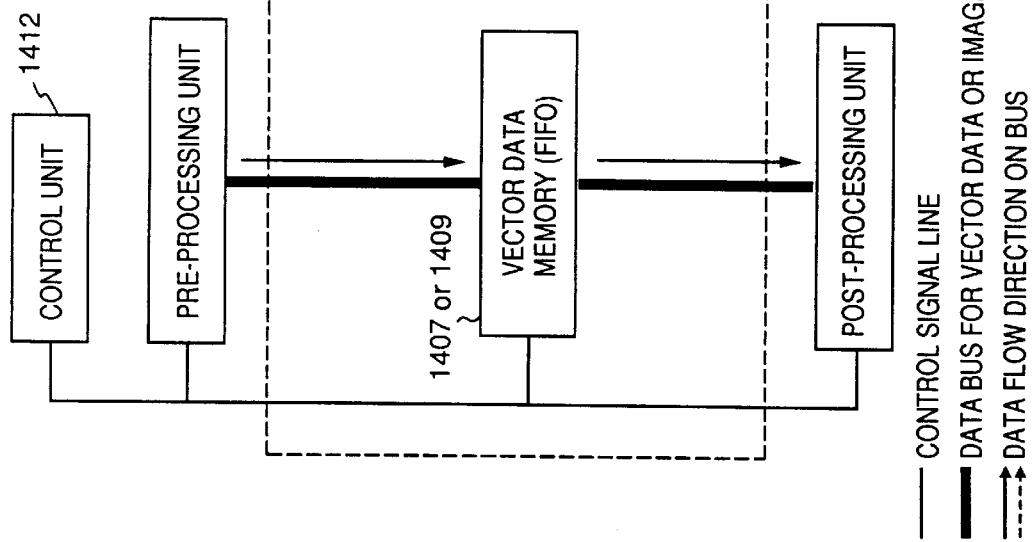

In the ninth to 13th embodiments, each of the vector data memory (A) 1407 and the vector data memory (B) 1409 shown in FIG. 85 (or FIG. 88 or 92; both of which are FIFO memories; FIG. 96A) may be replaced by a set of two normal (not FIFO) memories (a) 2401 and (b) 2402, a multiplexer 2403, and a data selector 2404, as shown in FIG. 97B. In this case, as for control of the blocks 2401 to 2404 by the control unit 1412, the output destination of the multiplexer 2403 and the input source of the data selector 2404 are switched at a proper timing, so that vector data are alternately written in the memories (a) 2401 and (b) 2402, and at the same time, vector data are read out from the other memory which is not subjected to the write access, like in control of the blocks 1402 to 1405 in the ninth embodiment. In this manner, since the write and read accesses are not simultaneously made for an identical memory, the memory need not adopt a FIFO memory.

<15th Embodiment>

In the ninth to 13th embodiments, the image input unit inputs a binary image. However, the present invention is not limited to this. For example, a binarization unit may be arranged at the output side of the image acquisition unit, and processing may be performed for an image binarized by the binarization unit. In the ninth, tenth, and 12th to 14th embodiments, a binarization unit may be arranged at the output side of the image memory, and an image binarized by the binarization unit may be subjected to outline vector extraction.

Similarly, as for the image output unit, after a binary image is reproduced, the binary image may be converted into a pseudo multi-value image. For example, the pixel values of a binary image may be intentionally output as the minimum and maximum gradation values of 256 gradation levels (0 to 255) in place of two gradation levels (0 and 1).

<16th Embodiment>

As the 16th embodiment, an image processing apparatus for obtaining a desired image by dividing an image into stripes, independently executing outline vector extraction processing, variable-magnification processing, and smoothing processing in units of stripes, and thereafter, combining the processing results will be described below.

More particularly, an image processing apparatus capable of making the number of lines of the image to be outputted so as to be almost equal to the number of lines of the image obtained by enlarging/reducing the entire input image will be described below.

The 16th embodiment of the present invention will be described in detail below with reference to the accompanying drawings.

<Apparatus Arrangement>

Figure 99:
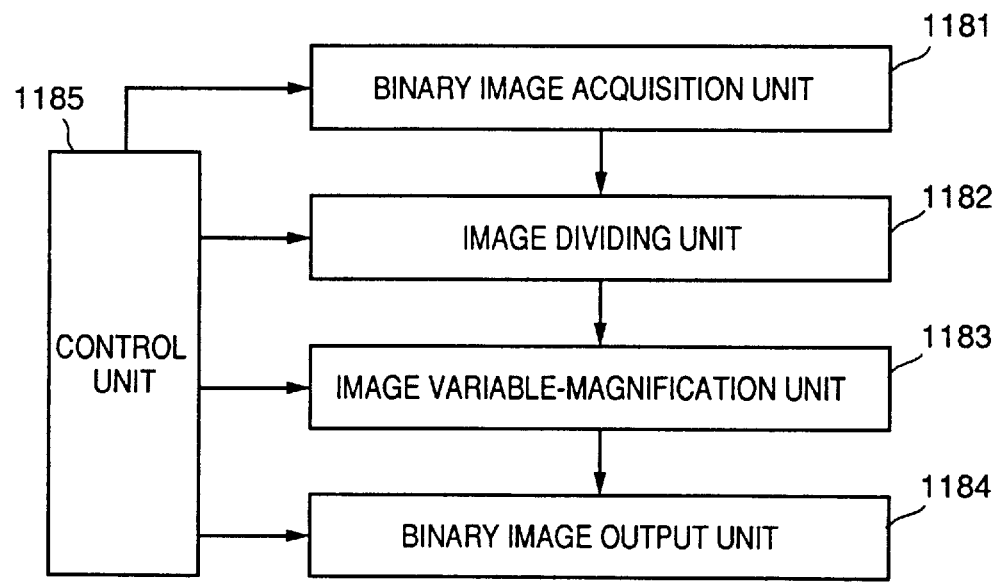
FIG. 99 is a block diagram showing an apparatus for executing variable-magnification processing of an image in the 16th and 17th embodiments of the present invention.

FIG. 99 is a block diagram of an apparatus for executing variable-magnification processing of an image in this embodiment. Referring to FIG. 99, a binary image acquisition unit 1181 acquires a digital binary image to be subjected to outline extraction·variable-magnification processing, and outputs a binary image in the raster-scanning format. For example, the unit 1181 comprises a known raster-scanning type binary image output device for reading an image using an image reader, binarizing the read image, and outputting the binary image in the raster-scanning format.

Figure 98:
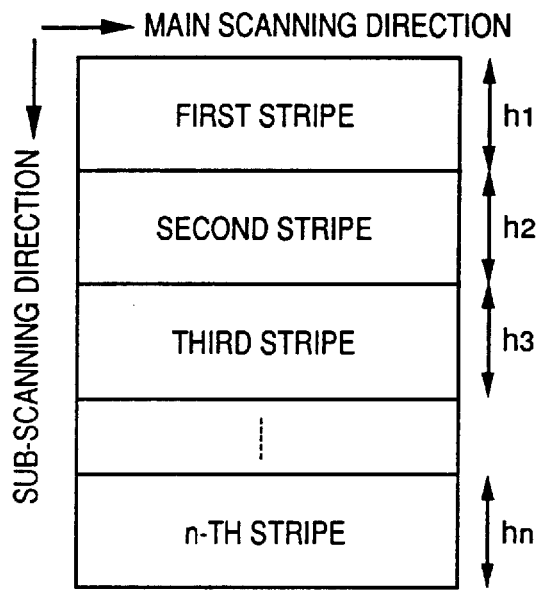
FIG. 98 is a view showing a method of dividing an input images into stripes.

An image dividing unit 1182 divides an acquired binary image into at least one stripe, i.e., area, as shown in FIG. 82. The number of lines in each stripe can be arbitrarily set by an external means. FIG. 98 shows an example of divided stripe images.

An image variable-magnification unit 1183 performs variable-magnification processing of an image in units of divided stripes. The arrangement itself for performing variable-magnification processing of an image in units of divided stripes comprises a device described in the above-mentioned first to eighth embodiments, and previously proposed Japanese Patent Laid-Open Nos. 05-174140 or 05-020467. The processing of this unit will be briefly described below. Each of divided stripes is raster-scanned to check the states of a pixel of interest and its eight surrounding pixels, thereby extracting outline vectors of black pixel portions. Smoothing processing for the obtained outline vectors is performed, and the smoothed outline vectors are subjected to variable-magnification processing at an arbitrary magnification. A binary image expressing the data is reproduced from the outline vector data subjected to the smoothing-variable-magnification processing as binary image data in the raster-scanning format in units of divided stripes. The smoothing processing includes, e.g., processing for defining, as fixed points (corner points), points recognized as corners of a binary image, and points other than the corner points as floating points, calculating a weighting coefficient for a floating point of interest with a plurality of corner points or floating points before and after the floating point of interest, and correcting the coordinate position of the floating point of interest. The binary image reproduction processing includes processing for filling a portion inside an outline drawn based on the smoothed vector data (including an outline drawn after enlargement processing) with black pixels. Note that the number of lines after variable-magnification processing in units of stripes, which is required upon execution of variable-magnification processing of vector data, can be arbitrarily set by an external means.

A binary image output unit 1184 comprises, e.g., a display for displaying binary image data in the raster-scanning format, a display for forming a hard copy, or an interface unit for outputting data onto a communication line.

A control unit 1185 controls the overall processing flow. For example, the control unit 1185 obtains the number of lines in each stripe when an input image is divided into stripes, the number of lines after variable-magnification processing in units of stripes, and the like.

Figure 100:
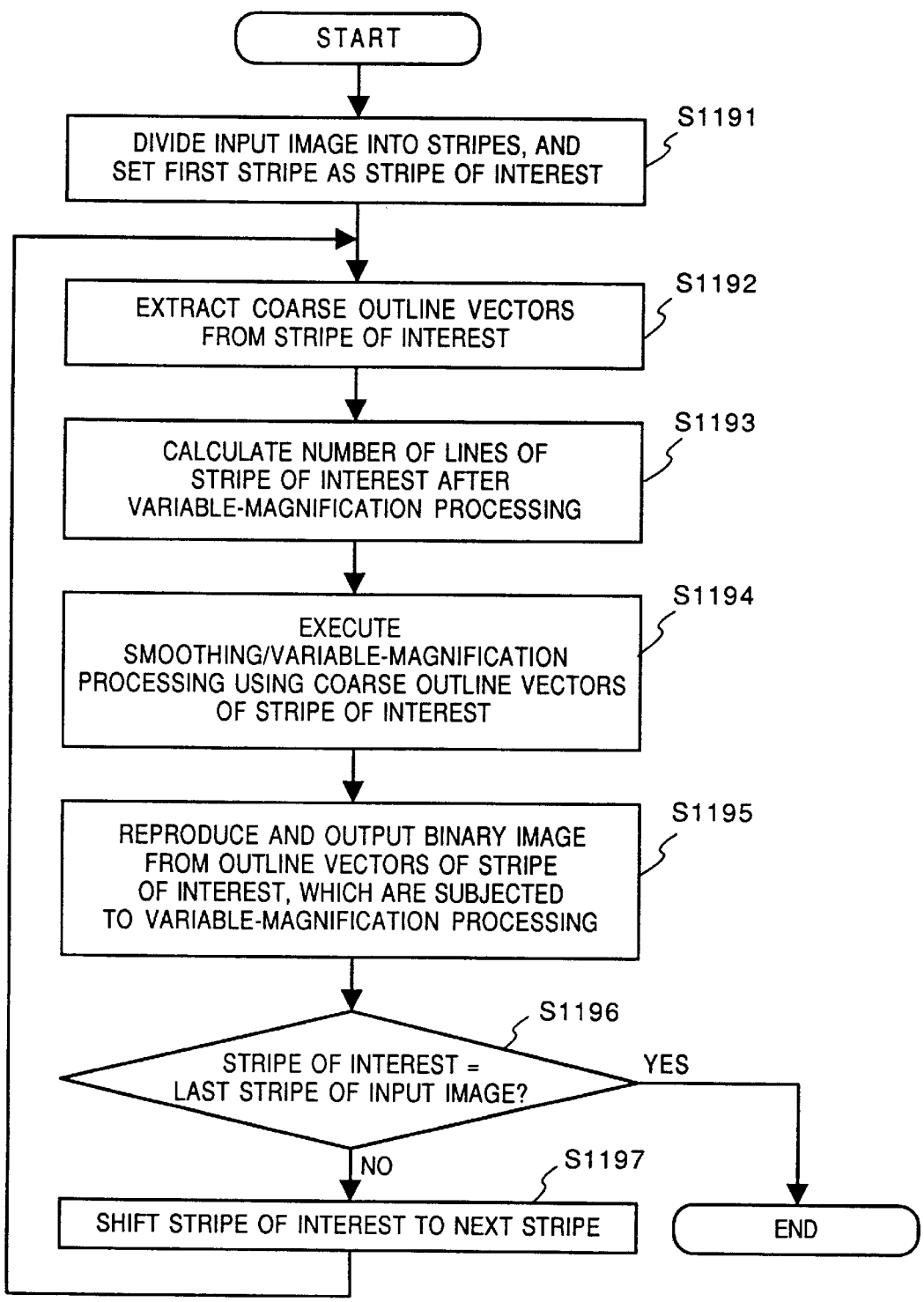
FIG. 100 is a flow chart showing the processing flow in the 16th and 17th embodiments.

FIG. 100 is a flow chart showing the processing flow of the 16th embodiment.

The control unit 1185 (FIG. 99) executes processing along a procedure shown in the flow chart in FIG. 100.

In step S1191, an input image is divided into stripes, and the first stripe is set as a stripe of interest. Upon division of an input image, the number of lines in each stripe may be arbitrarily set by an external means, or an input image may be divided into a predetermined number of lines in place of setting the number of lines externally.

In step S1192, outline vectors (coarse outline vectors) are extracted from the stripe of interest.

Upon completion of step S1192, the flow advances to step S1193, and the number of lines of an output image after variable-magnification processing is executed for the stripe of interest is calculated by a method to be described later.

After the number of lines of an output image is calculated, the flow advances to step S1194 to execute smoothing and variable-magnification processing of the outline vectors in the stripe of interest. In step S1194, as described above, smoothing and variable-magnification processing described in Japanese Laid-Open No. 05-174140, i.e., processing for defining, as fixed points, points recognized as corners, and points other than the fixed points as floating points, calculating a weighting coefficient for a floating point of interest and points before and after the floating point of interest, smoothing the floating point of interest by multiplying the weighting coefficient, and executing variable-magnification processing by multiplying coordinates with a desired value before or after smoothing is executed, so that the number of lines of an output image becomes equal to the value calculated in step S1193.

Upon completion of the smoothing·variable-magnification processing of the stripe of interest, the flow advances to step S1195, and a binary image is reproduced and output from the outline vectors of the stripe of interest, which are subjected to the variable-magnification processing. The reproduction-output processing of a binary image can be realized by the method and arrangement described in previously proposed Japanese Laid-Open No. 05-020467. This processing will be briefly described below. That is, the positions of the two end points of a vector of interest are corrected according to predetermined rules on the basis of the direction of the vector of interest in an outline vector group forming a closed loop, the relationship between the vector of interest and vectors before and after the vector of interest, and the direction of a region to be painted, and thereafter, a region from an odd-numbered outline point encountered upon scanning in the main scanning direction to an even-numbered outline point encountered upon scanning is painted.

Upon completion of the reproduction and output processing of a binary image, the flow advances to step S1196 to check if the stripe of interest is the last stripe of an input image. If YES in step S1196, the processing ends; otherwise, the flow advances to step S1197 to shift the stripe of interest to the next stripe, and thereafter, the flow returns to step S1192.

Figure 101:
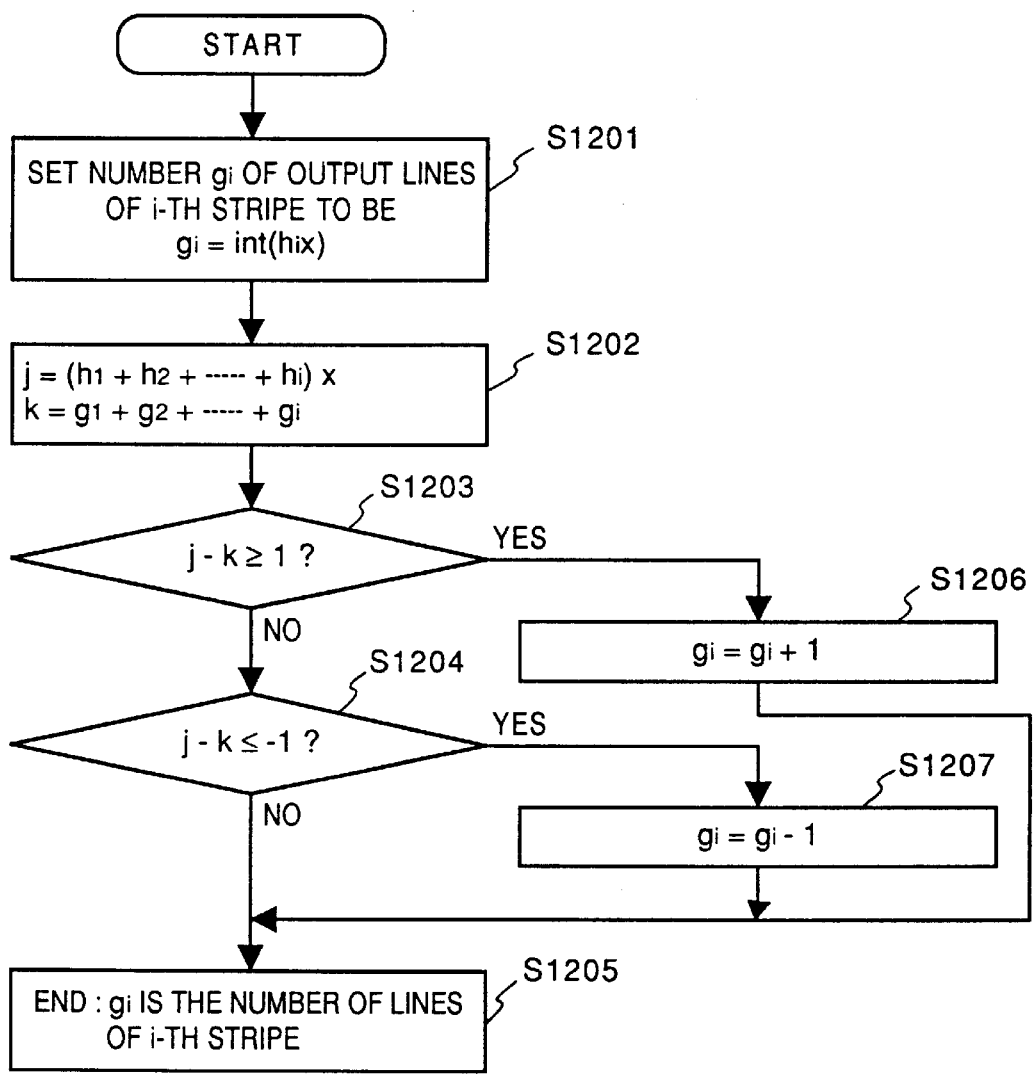
FIG. 101 is a flow chart for obtaining the number of lines of an output image after variable-magnification processing upon execution of the variable-magnification processing for each of divided stripes in the 16th embodiment.

A method of calculating the number of lines of an output image i.e., an image size, obtained upon execution of variable-magnification processing i.e., enlargement/reduction in units of stripes in step S1193 in FIG. 100 will be described below. FIG. 101 is a flow chart showing the calculation method.

In FIG. 101, assume that the current stripe of interest is the i-th stripe.

Assume that the number of lines of the i-th stripe is $h_i$.

Assume that a predetermined magnification i.e., enlargement/reduction ratio of variable-magnification processing for the entire input image is x.

Under the above-mentioned conditions, in step S1201, the number gi of lines of the stripe of interest of an output image is temporarily calculated by $g_i = \text{int}(h_i \cdot x)$. The flow then advances to step S1202. Note that "int" means an integer conversion function.

In step S1202, $j=(h_1+h_2+\ldots+h_i) \times x$, and $k=g_1+g_2+\ldots+g_i$ are calculated. The value j represents the number of lines obtained when an image as a total of the first stripe to the stripe of interest is subjected to variable-magnification processing, and the value k represents a sum of the numbers of lines obtained upon execution of variable-magnification processing in units of stripes. After the values j and k are calculated, the flow advances to step S1203.

In step S1203, it is checked if $j-k \geq 1$. If YES in step S1203, i.e., if the number of lines obtained upon execution of variable-magnification processing for the entire image is larger than the sum of the numbers of lines obtained execution of variable-magnification processing in units of stripes, the value gi is incremented by "1" in step S1206, i.e., the number of lines of the stripe of interest is increased by "1", and the flow advances to step S1205; if NO in step S1203, the flow advances to step S1204.

In step S1204, it is checked if the value j−k calculated in step S1203 is equal to or smaller than −1. If YES in step S1204, i.e., if the number of lines obtained upon execution of variable-magnification processing for the entire image is smaller than the sum of the numbers of lines obtained execution of variable-magnification processing in units of stripes, the value gi is decremented by "1" in step S1207, i.e., the number of lines of the stripe of interest is decreased by "1", and the flow advances to step S1205; if NO in step S1204, the flow advances to step S1205.

In step S1205, the value gi at that time is determined as the number of lines of an output image after the variable-magnification processing of the i-th stripe, and the processing ends. If the function INT rounds a decimal fraction to an integer by truncating, since $j \geq k$ is satisfied all the time, step S1204 is not necessary. Conversely, if the function INT rounds a decimal fraction by increasing the last retained digit by 1, since j≦k is satisfied all the time, step S1203 is not necessary.

In this manner, when the number of lines of an output image after variable-magnification processing in units of stripes is calculated, the number of lines of a final output image obtained by combining output images is not largely different from a desired value, i.e., the number of lines (=int(($h_1+h_2+...+h_n$)×x)) of an output image obtained upon execution of variable-magnification processing without dividing an input image. In other words, the output image size can fall within a range of (theoretical size∓1 line).

<17th Embodiment>

Figure 102:
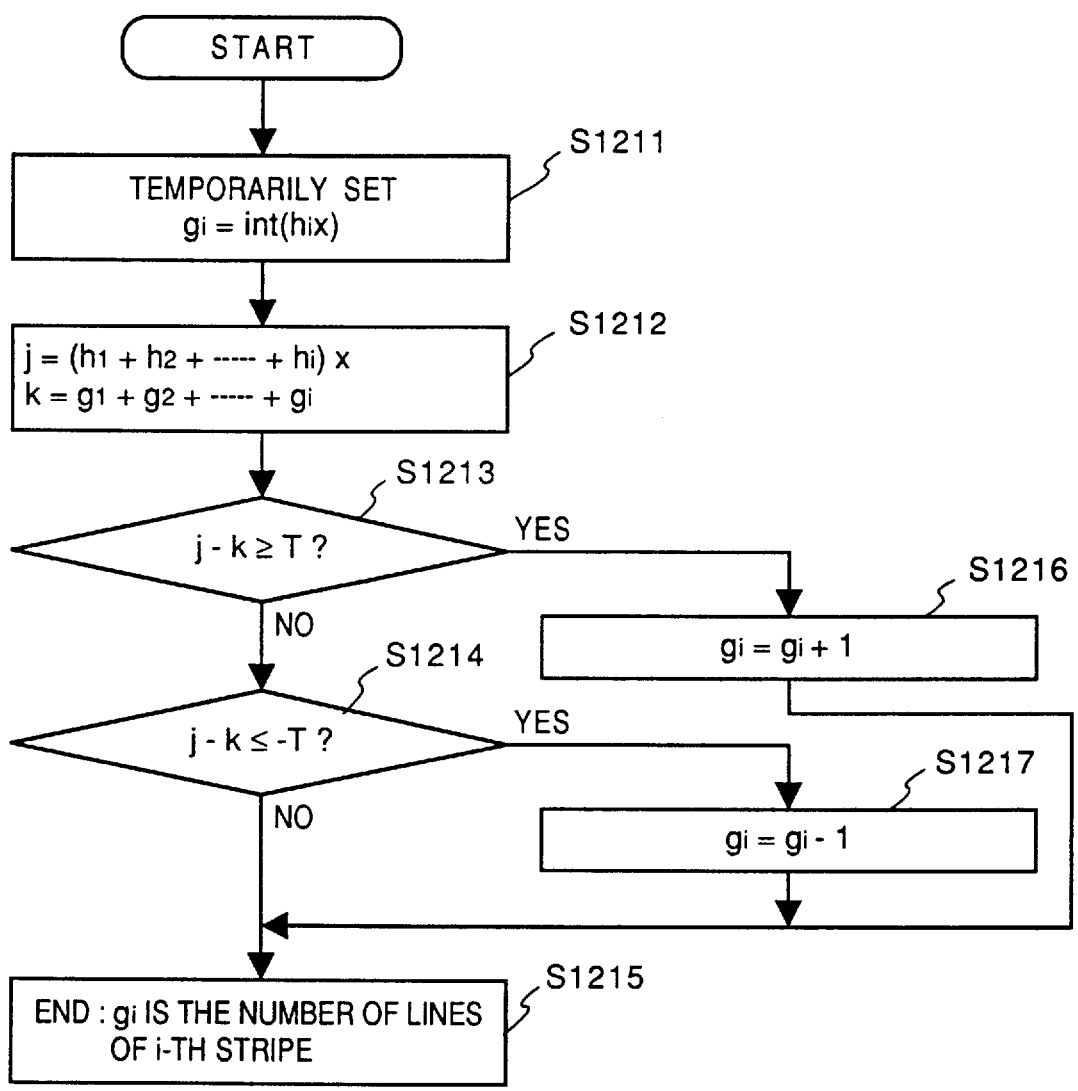
FIG. 102 is a flow chart for obtaining the number of lines of an output image after variable-magnification processing upon execution of the variable-magnification processing for each of divided stripes in the 17th embodiment.

In the 16th embodiment, step S1193 in FIG. 100, i.e., the method of calculating the number of lines of an output image obtained upon execution of variable-magnification processing may adopt the following method. FIG. 102 is a flow chart showing the calculation method.

Assume that the current stripe of interest is the i-th stripe.

Assume that the number of lines of the i-th-stripe is $h_i$.

Assume that a predetermined magnification of variable-magnification processing for the entire input image is x.

Assume that T is an arbitrary constant satisfying 0.5≦T≦1.

In step S1211, the number gi of lines of the stripe of interest of an output image is temporarily calculated by $g_i$=int($h_1$·x). The flow then advances to step S1212.

In step S1212, j=($h_1+h_2+...+h_i$)×x, and k=$g_1+g_2+...+g_i$ are calculated. The value j represents the number of lines obtained when an image as a total of the first stripe to the stripe of interest is subjected to variable-magnification processing, and the value k represents a sum of the numbers of lines obtained upon execution of variable-magnification processing in units of stripes. After the values j and k are calculated, the flow advances to step S1213.

In step S1213, it is checked if j−k≧T. If YES in step S1213, the value $g_i$ is incremented by "1", and the flow advances to step S1215; otherwise, the flow advances to step S1214.

In step S1214, it is checked if the value j−k calculated in step S1213 is equal to or smaller than −T. If YES in step S1214, the value $g_i$ is decremented by "1", and the flow advances to step S1215; otherwise, the flow advances to step S1215.

In step S1215, the value $g_i$ at that time is determined as the number of lines of an output image after the variable-magnification processing of the i-th stripe, and the processing ends. If the function INT rounds a decimal fraction to an integer by truncating, since j≧k is satisfied all the time, step S1214 is not necessary. Conversely, if the function INT rounds a decimal fraction by increasing the last retained digit by 1, since j≦k is satisfied all the time, step S1213 is not necessary.

In this manner, when the number of lines of an output image after variable-magnification processing in units of stripes is calculated, the number of lines of a final output image obtained by combining output images is not largely different from a desired value, i.e., the number of lines (=int(($h_1+h_2+...+h_n$)×x)) of an output image obtained upon execution of variable-magnification processing without dividing an input image.

<18th Embodiment>

The procedure for executing image variable-magnification processing in units of stripes in the 17th embodiment is not limited to the above-mentioned, procedure for extracting outline vectors from a binary image, smoothing the obtained outline vectors, executing variable-magnification processing of the smoothed outline vectors at an arbitrary magnification, and reproducing a binary image expressing the data from the obtained vector data. For example, pixels of an original image may be repetitively used by a number of times corresponding to a magnification in accordance with the magnification. Alternatively, arbitrary methods, such as an SPC (Selectic Processing Conversion) method for periodically thinning out pixels (Matsumoto & Kobayashi, "Examination of Image Quality Evaluation in Facsimile Resolution Conversion", Journal of Society of Image Electronics, Vol. 12, No. 5, pp. 354–362, 1983), smoothing with reference to pixel patterns around a pixel of interest (Imanaka & Semasa, "Improvement of Image Quality of Facsimile Received Image by Smoothing Processing", Draft of Annual Meeting of Society of Image Electronics No. 18, 1991), a projection method for projecting an original image onto a conversion image plane having a different line density, and determining a pixel value of a converted image by binarizing an integral value associated with one pixel within this plane by threshold logic (Arai & Yasuda, "Examination of Facsimile Line Density Conversion", Journal of Society of Image Electronics, Vol. 7, No. 1, pp. 11–18, 1978), and the like may be used. In this case, since processing can be started immediately after the first stripe is fetched, i.e., since processing can be started before the entire input image sent in the raster-scanning order is fetched in an image buffer, the time until the end of processing can be shortened.

<19th Embodiment>

Figure 103:
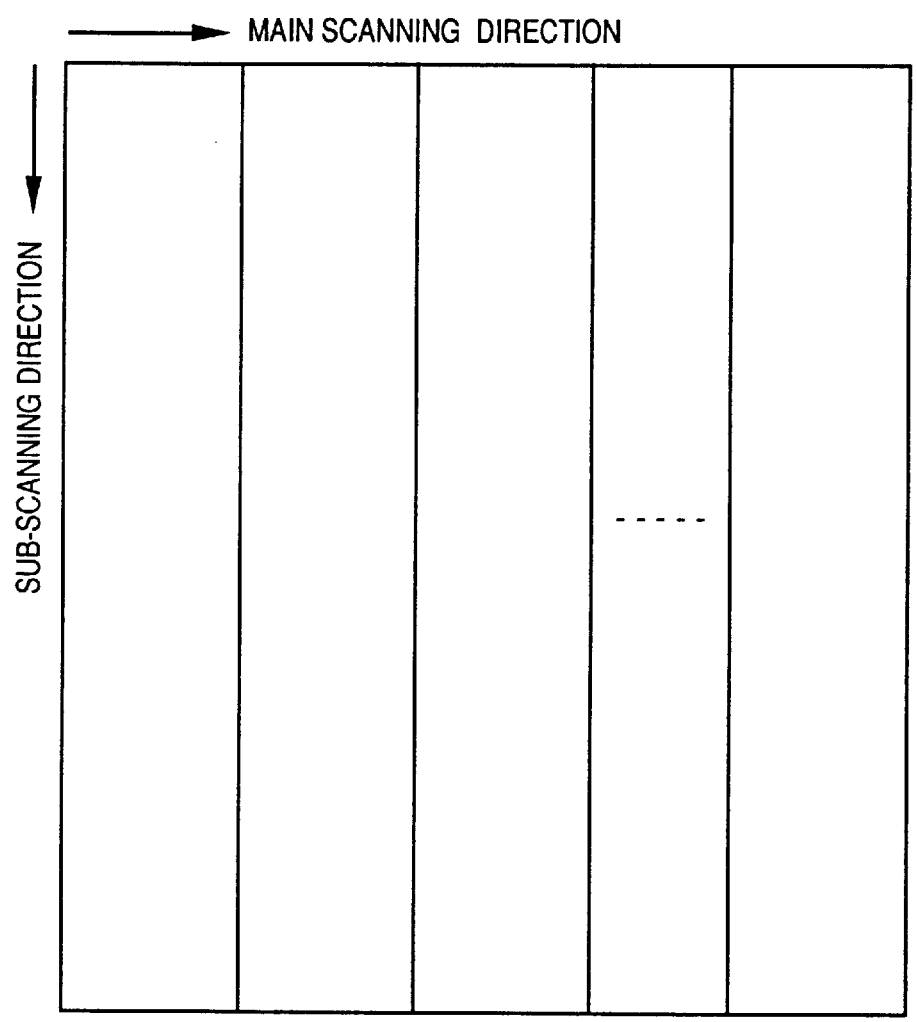
FIG. 103 is a view showing an example wherein an input image is divided in the sub-scanning direction in the 19th embodiment of the present invention.
Figure 104:
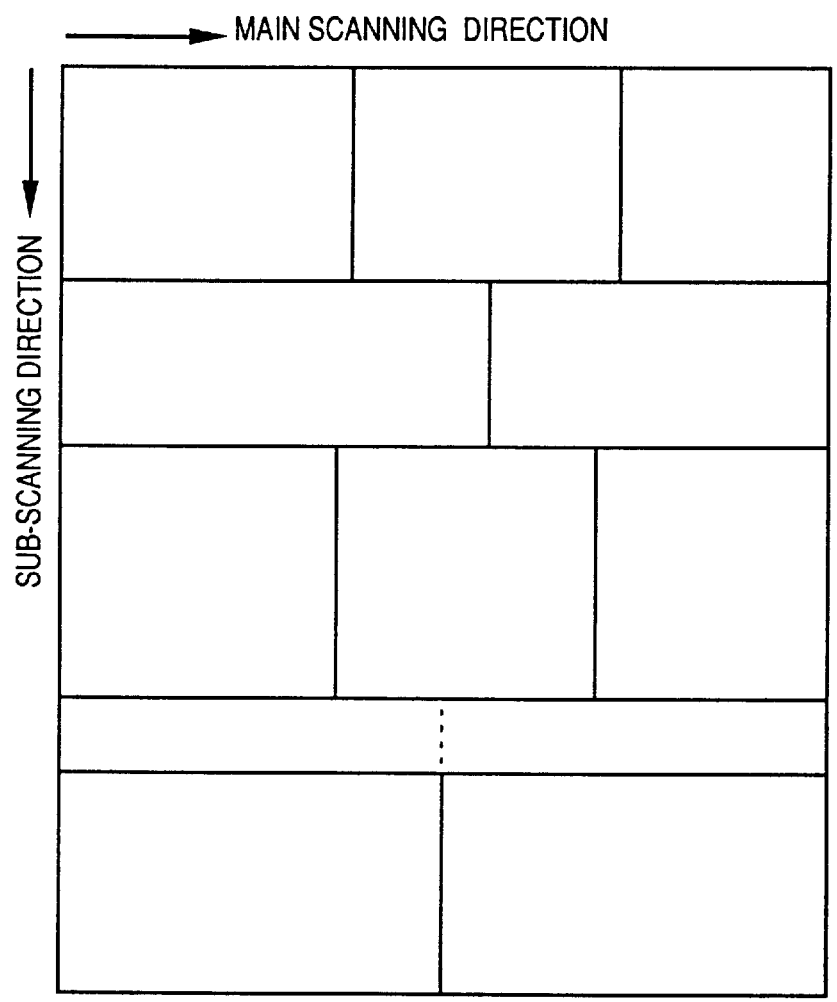
FIG. 104 is a view showing an example wherein an input image is divided into rectangular images having arbitrary sizes in the 19th embodiment of the present invention.

The above-mentioned processing for obtaining a desired variable-magnification image by dividing an input image into stripes, executing variable-magnification processing in units of stripes, and combining the obtained output images can be applied to a case wherein an input image is divided in the main scanning direction in place of the sub-scanning direction, as shown in FIG. 103, if the number of lines is replaced by the number of pixels in the main scanning direction. Also, as shown in FIG. 104, when each stripe divided in the sub-scanning direction is divided in the main scanning direction again, an input image can be consequently divided into rectangular images having arbitrary sizes to execute variable-magnification processing. When an input image is divided into rectangular images having arbitrary sizes, and variable-magnification processing is executed in units of rectangular images, the following merits are expected.

Figure 105:
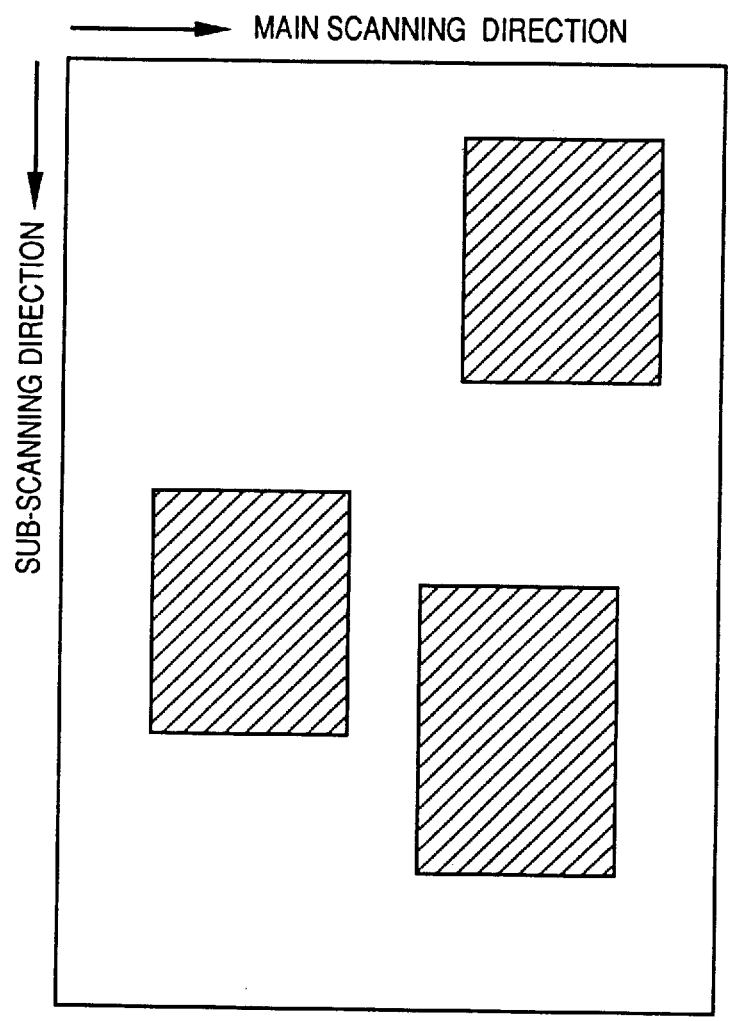
FIG. 105 is a view showing an example of an input image when it is effective to divide an input image into rectangular images having arbitrary sizes in the 19th embodiment.
Figure 106:
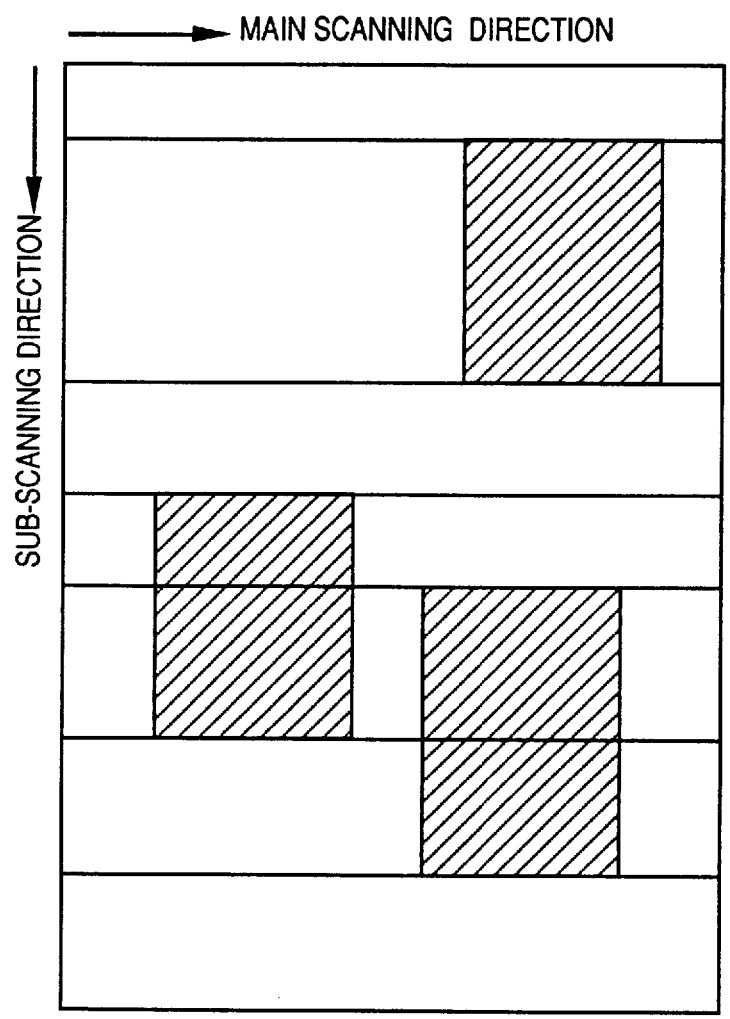
FIG. 106 is a view showing an example wherein an input image is divided into rectangular images having arbitrary sizes in the 19th embodiment.

For example, when an image shown in FIG. 105 is input, hatched portions in FIG. 105 are to be processed using an image variable-magnification processing technique A, and the remaining portion is to be processed using an image variable-magnification processing technique B, the input image is divided, as shown in FIG. 106, and variable-magnification processing of these rectangular images is performed using the technique A for the hatched portions, and the technique B for the remaining portion, thereby obtaining a desired variable-magnification image. In this case, the switching position of the two techniques is instructed by an operation panel (not shown).

<20th Embodiment>

When processing is executed in units of divided stripes, as has been described in the above embodiments, a finally output image at a joint portion of stripes deteriorates, as shown in FIG. 107. As the 20th embodiment, an image processing apparatus, which can prevent this, will be described below.

The 20th embodiment of the present invention will be described in detail below with reference to the accompanying drawings.

<Apparatus Arrangement>

Figure 109:
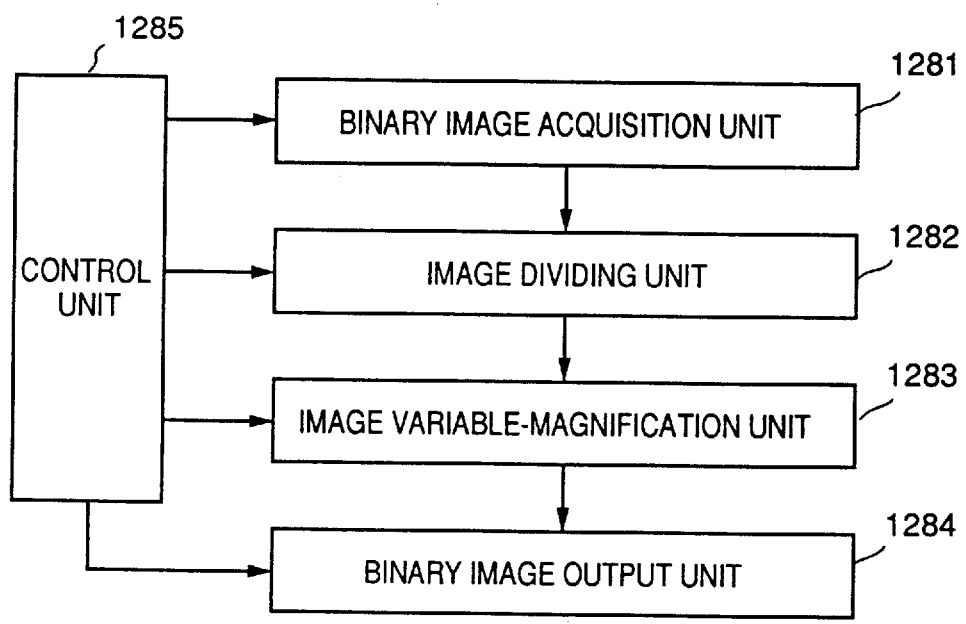
FIG. 109 is a block diagram showing an apparatus for executing variable-magnification processing of an image in the 20th and 21st embodiments of the present invention.

FIG. 109 is a block diagram showing an apparatus for executing variable-magnification processing of an image in this embodiment. Referring to FIG. 109, a binary image acquisition unit 1281 acquires a digital binary image to be subjected to outline extraction·variable-magnification processing, and outputs a binary image in the raster-scanning format. For example, the unit 1281 comprises a known raster-scanning type binary image output device for reading an image using an image reader, binarizing the read image, and outputting the binary image in the raster-scanning format.

Figures 108A, 108B:
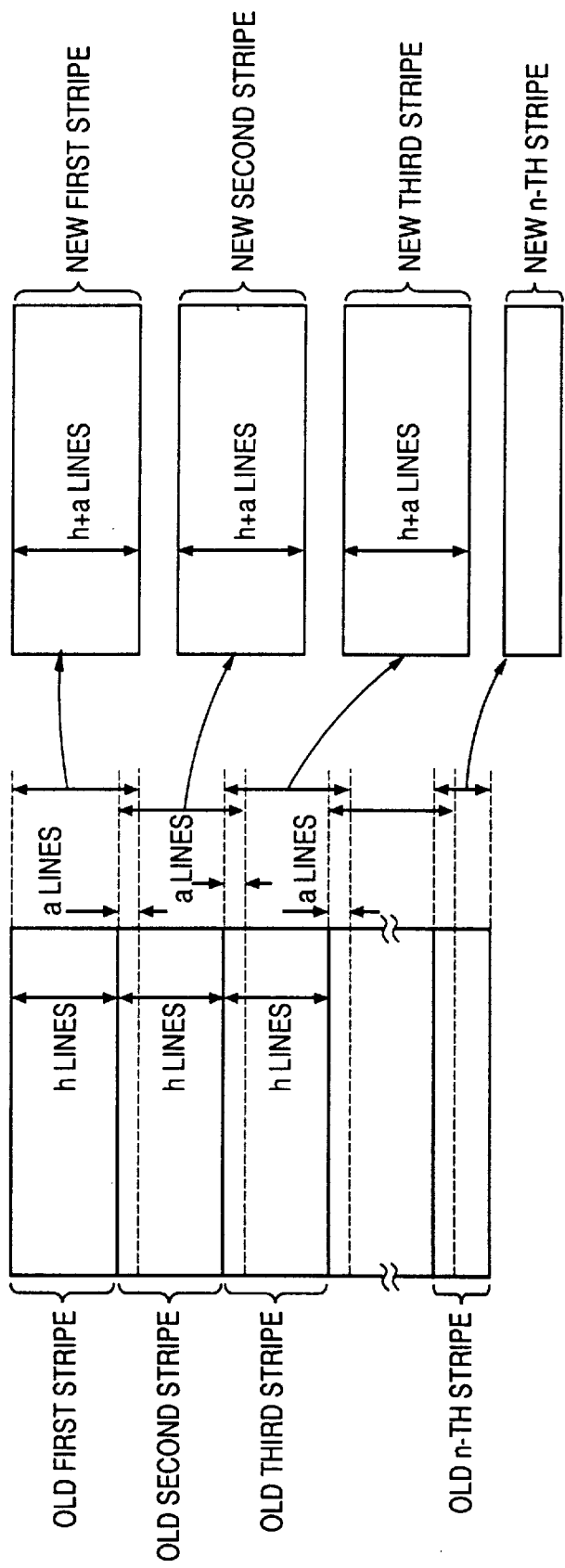
FIGS. 108A and 108B are views showing a method of dividing an input image into stripes in the 20th embodiment of the present invention.

An image dividing unit 1282 divides an acquired binary image into at least one stripe, as shown in FIG. 108B. The unit 1282 has an image memory for one frame, temporarily stores an image for one frame acquired by the acquisition unit 1281, and outputs data in the first line to the end line calculated by a control unit 1285 as one stripe to an image variable-magnification unit 1286. A method of calculating the start and end lines will be described later.

An image variable-magnification unit 1283 performs variable-magnification processing of an image in units of divided stripes. The arrangement itself for performing variable-magnification processing of an image in units of divided stripes comprises a device described in the above-mentioned first to eighth embodiments, and Japanese Laid-Open Nos. 05-174140 and 05-020467. The processing of this unit will be briefly described below. Each of divided stripes is raster-scanned to check the states of a pixel of interest and its eight surrounding pixels, thereby extracting outline vectors of black pixel portions. Smoothing processing for the obtained outline vectors is performed, and the smoothed outline vectors are subjected to variable-magnification processing at an arbitrary magnification. A binary image expressing the data is reproduced from the outline vector data subjected to the smoothing·variable-magnification processing as binary image data in the raster-scanning format in units of divided stripes. The smoothing processing includes, e.g., processing for defining, as fixed points (corner points), points recognized as corners of a binary image, and points other than the corner points as floating points, calculating a weighting coefficient for a floating point of interest with a plurality of corner points or floating points before and after the floating point of interest, and correcting the coordinate position of the floating point of interest. The binary image reproduction processing includes processing for filling a portion inside an outline drawn based on the smoothed vector data (including an outline drawn after enlargement processing) with black pixels. Note that the number of lines after variable-magnification processing in units of stripes, which is required upon execution of variable-magnification processing of vector data, can be arbitrarily set by an external means.

A binary image output unit 1284 comprises, e.g., a display for displaying binary image data in the raster-scanning format, a display for forming a hard copy, or an interface unit for outputting data onto a communication line. The unit 1284 has an image buffer for one frame, receives output images subjected to variable-magnification processing in units of stripes from the image variable-magnification unit 1283, constructs a finally output image on the image buffer by a method to be described later, and outputs the finally output image.

The control unit 1285 controls the overall processing flow. For example, the control unit 1285 executes control upon dividing of an input image into stripes, control upon writing of processing result images in units of stripes in the image buffer, and the like. The control unit 1285 includes a CPU, a ROM written with a program to be executed by the CPU, and a RAM for storing data.

<Control Procedure>

Figure 110:
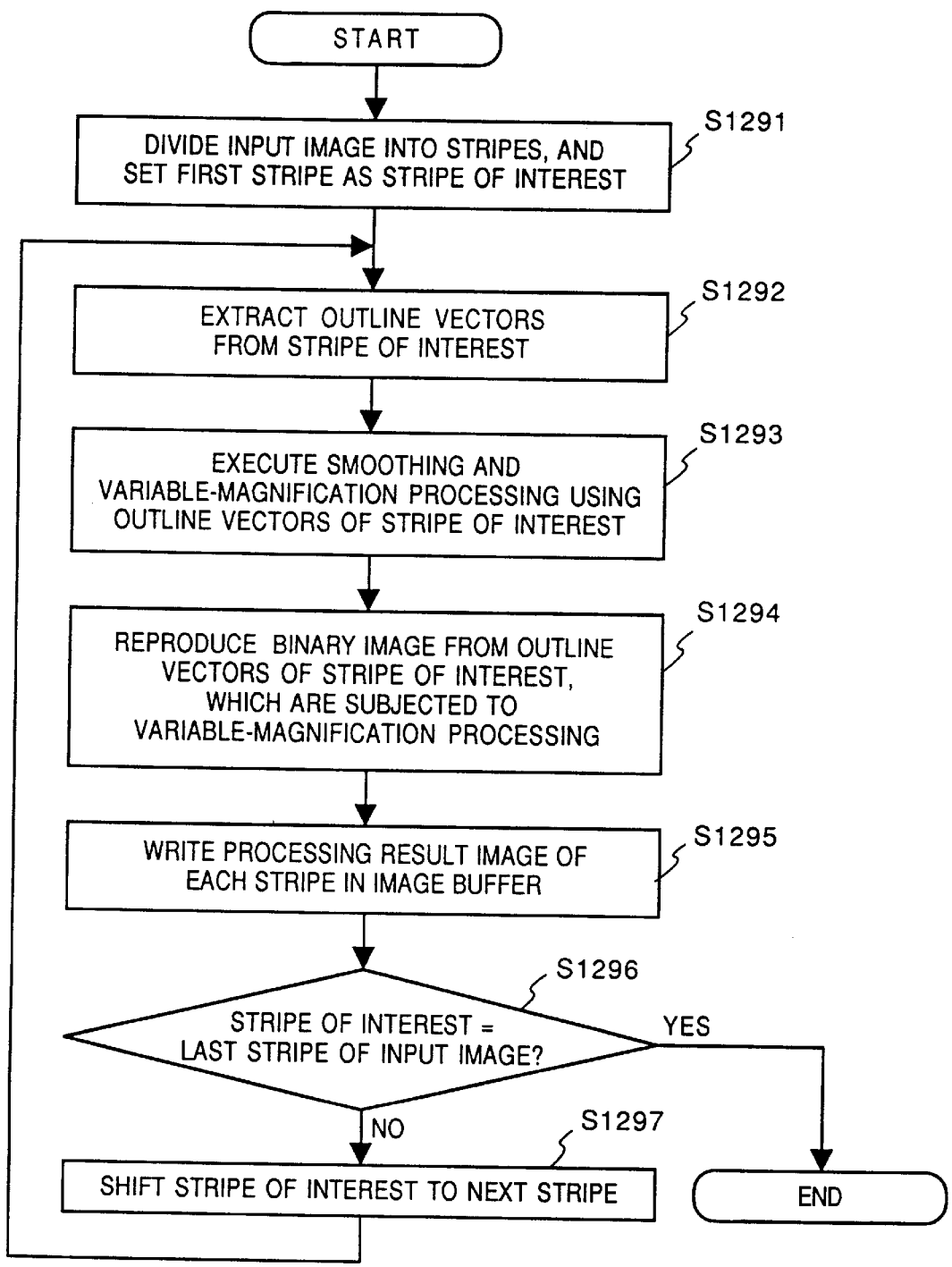
FIG. 110 is a flow chart showing the processing flow in the 20th and 21st embodiments.

FIG. 110 is a flow chart showing the processing flow of the 20th embodiment.

The control unit 1285 (FIG. 109) executes the processing along the flow shown in FIG. 110. This procedure is realized by executing the program stored in the ROM of the control unit 1285 by the CPU.

In step S1291, an input image is divided into stripes, as shown in FIG. 108B. More specifically, the input image is divided into stripes each including h lines, and thereafter, upper a lines of the (i+1)-th stripe are connected to the lowermost portion of the i-th stripe. The last stripe is used without any modification. As a result, the number of lines of stripes other than the last stripe is h+a. More specifically, data in the $(h_{i-1}+1)$-th line to the $(h_i+a)$-th line (if this value exceeds the number of lines of the input image, the last line of the input image) are read out from the image memory for one frame in the image dividing unit 1282 shown in FIG. 109, and are defined as the i-th stripe. The i-th stripe is set as a stripe of interest, and the flow then advances to step S1292.

In step S1292, outline vectors in the stripe of interest are extracted. Upon completion of step S1292, the flow advances to step S1293 to execute smoothing and variable-magnification processing of the outline vectors in the stripe of interest. In step S1293, as described above, smoothing and variable-magnification processing described in Japanese Laid-Open No. 05-174140, i.e., processing for defining, as fixed points, points recognized as corners, and points other than the fixed points as floating points, calculating a weighting coefficient for a floating point of interest and points before and after the floating point of interest, smoothing the floating point of interest by multiplying the weighting coefficient, and executing variable-magnification processing by multiplying coordinates with a desired value before or after smoothing is executed.

Upon completion of the smoothing and variable-magnification processing of the stripe of interest, the flow advances to step S1294. In step S1294, a binary image is reproduced from the outline vectors, subjected to the variable-magnification processing, of the stripe of interest. The reproduction processing of a binary image can be realized by the method and arrangement described in previously proposed Japanese Laid-Open No. 05-020467. This processing will be briefly described below. That is, the positions of the two end points of a vector of interest are corrected according to predetermined rules on the basis of the direction of the vector of interest in an outline vector group forming a closed loop, the relationship between the vector of interest and vectors before and after the vector of interest, and the direction of a region to be painted, and thereafter, a region from an odd-numbered outline point encountered upon scanning in the main scanning direction to an even-numbered outline point encountered upon scanning is painted.

If a predetermined magnification of the variable-magnification processing is represented by x, the number of lines of an output result image of each stripe is given by (int((h+a)×x). Note that (int) is a function for converting a decimal fraction into an integer, and may adopt arbitrary functions such as truncating, rounding by increasing the last retained digit by 1, rounding off, and the like. Upon completion of the binary image reproduction processing, the flow advances to step S1295.

In step S1295, the processing result image of each stripe is written on the image buffer by the following method.

1) The processing result output image of the first stripe is output onto the image buffer without any modifications.

2) As for the processing result output images of other stripes, data for upper (int(a×x÷2)) lines from each image are abandoned, and the remaining data are overwritten from a position returning by (int(a×x÷2)) lines from the last line of an image already output onto the image buffer.

Upon completion of writing of data onto the image buffer, the flow advances to step S1296 to check if the stripe of interest is the last stripe of the input image. If YES in step S1296, an image (finally output image) constructed on the image buffer is output to an external device, and the processing ends. Otherwise, the flow advances to step S1297 to shift the stripe of interest to the next stripe, and the flow returns to step S1292.

With the above-mentioned variable-magnification and reproduction processing, since lines near the boundary portion between adjacent stripes are abandoned, deterioration of an image near the boundary can be prevented. More specifically, upon execution of the variable-magnification processing of an image, high-speed processing and a decrease in cost by saving the working memory can be realized while preventing deterioration of an image.

When smoothing is simply performed in units of stripes, a point near a boundary of stripes, which point should be determined as a corner point, may be determined as a floating point (non-corner point). In other words, if a point is separated from a boundary by a certain distance, it is normally processed without receiving a large influence. Therefore, data for the number of lines larger than a predetermined value are processed in consideration of lines to be abandoned in advance, and thereafter, data for a proper number of lines are abandoned. Although the memory capacity required per processing is increased as compared to the third embodiment described previously, higher-speed processing can be realized since the processing is simpler than that in the third embodiment.

<21st Embodiment>

In the 20th embodiment, the method of writing processing result images in units of stripes in the image buffer in step S1296 in FIG. 110 may be modified as follows.

1) The processing result output image of the first stripe is output onto the image buffer without any modifications.

2) The processing result output image of each of other stripes is overwritten from a position returning by (int (a×x)) lines from the last line of an image already output onto the image buffer.

When such processing is executed, although an image portion for upper a lines of each stripe such as a pixel 1102 in, e.g., FIG. 107B, deteriorates as a result of variable-magnification and smoothing processing, processing for abandoning data for upper (int(a×x÷2)) lines from each processing result output image in units of stripes can be omitted, and the apparatus arrangement can be simplified.

<22nd Embodiment>

In the 20th or 21st embodiment, the number of lines in each stripe obtained when an input image is divided into stripes need not always be constant. In this case, the following apparatus may be proposed.

Figure 111:
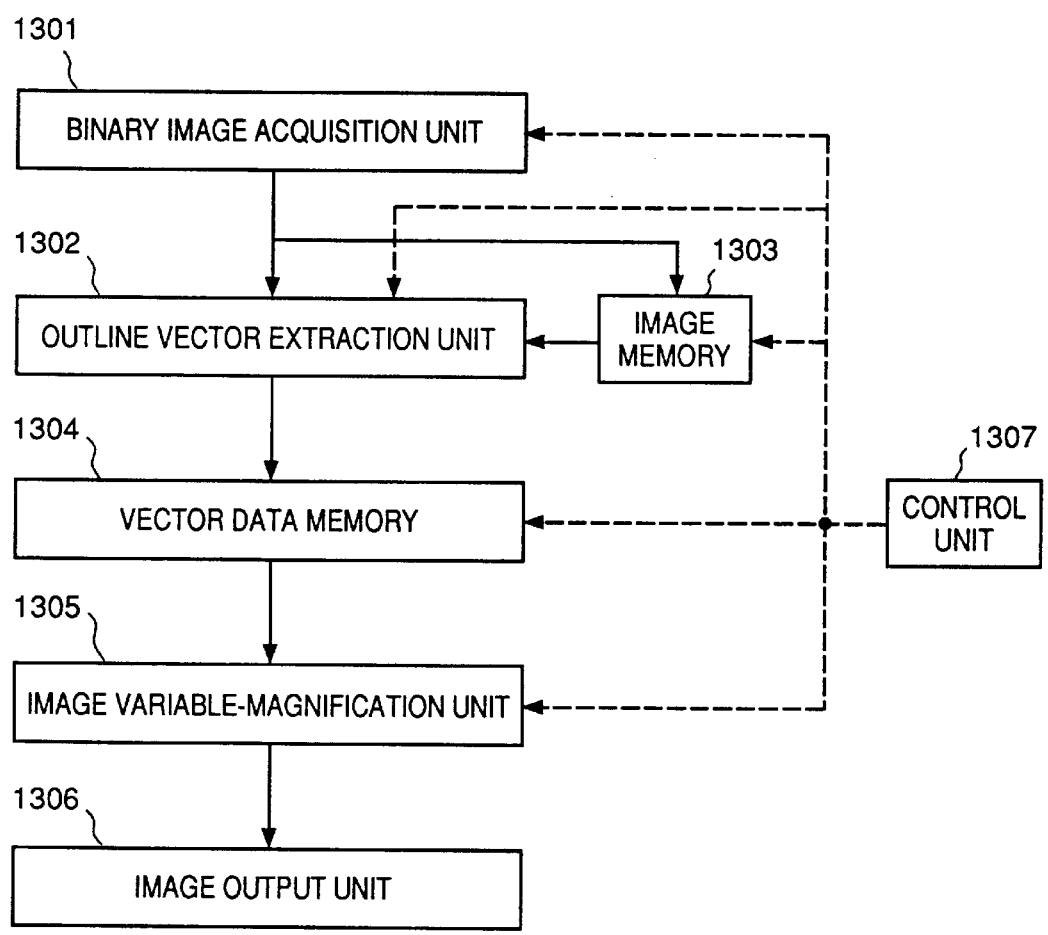
FIG. 111 is a block diagram showing an apparatus for executing variable-magnification processing of an image in the 22nd embodiment of the present invention.

FIG. 111 is a block diagram showing an apparatus for executing variable-magnification processing of an image according to this embodiment. Referring to FIG. 111, a binary image acquisition unit 1301 is the same as the binary image acquisition unit 1281 shown in FIG. 109.

An outline vector extraction unit 1302 acquires a binary image from the binary image acquisition unit 1301 in the raster-scanning order, extracts outline vectors in turn, and outputs the extracted outline vector data to a vector data memory 1304.

An image memory 1303 is a FIFO memory having a capacity for a lines. The image acquisition unit 1301 simultaneously outputs input image data to the vector extraction unit 1302 and the image memory 1303 in units of rasters. This input/output control is executed by a control unit 1307.

The vector data memory 1304 temporarily stores outline vector data obtained as a result of processing of the vector extraction unit 1302.

An outline smoothing·variable-magnification unit 1305 executes smoothing and variable-magnification processing for data stored in the vector data memory 1304 in a vector data format.

A binary image output unit 1306 has an image buffer for one frame as in the binary image output unit 1284 shown in FIG. 109. An output method to the image buffer will be described later.

The control unit 1307 controls the overall processing flow. The control unit 1307 comprises a CPU, a ROM, and a RAM (none of them are shown).

Figure 112:
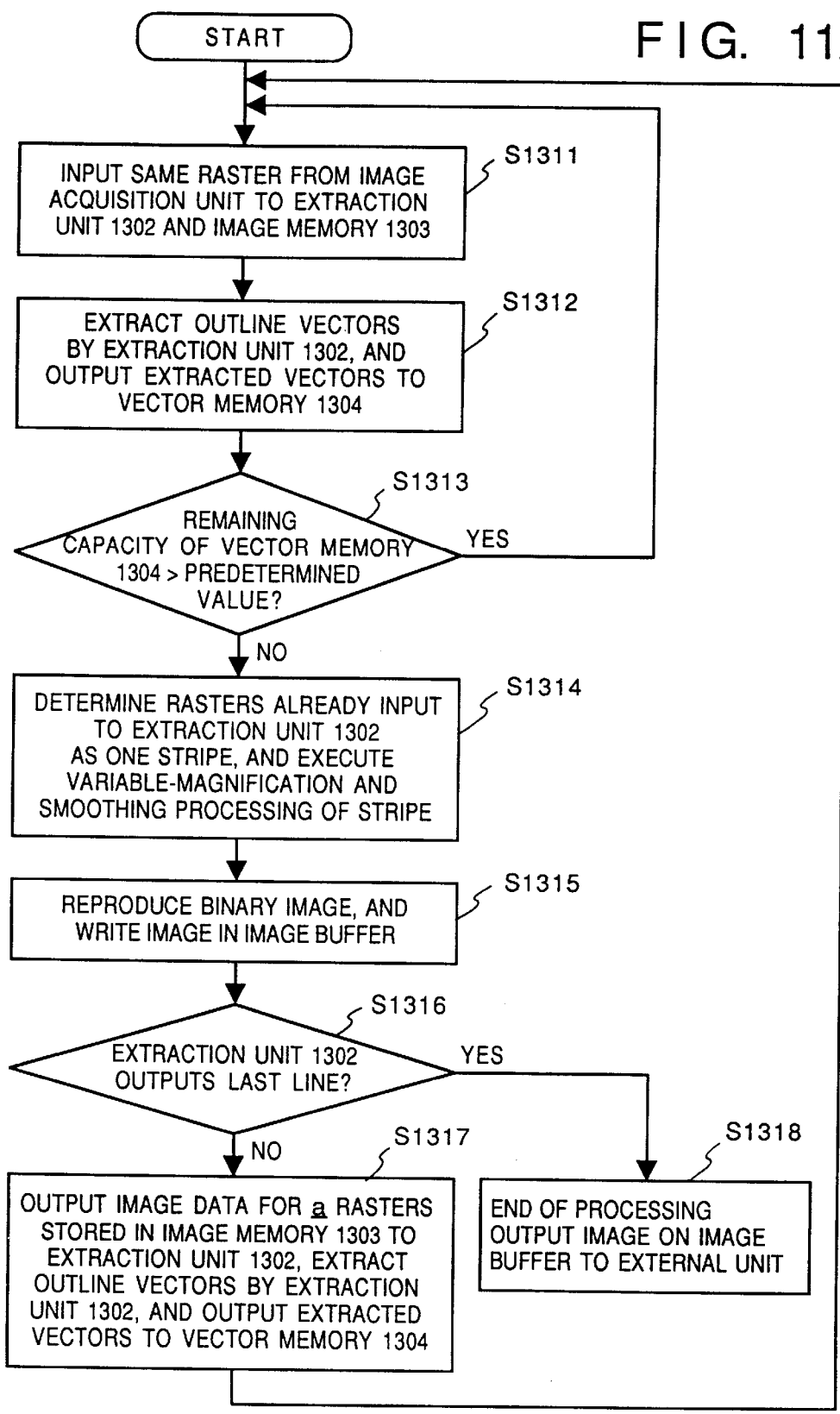
FIG. 112 is a flow chart showing the processing flow in the 22nd embodiment.

FIG. 112 is a flow chart showing the processing flow executed by the control unit 1307 in this embodiment. This procedure is realized by executing a program stored in the ROM by the CPU.

In step S1311, the image acquisition unit 1301 inputs the same image data for one raster to the vector extraction unit 1302 and the image memory 1303, and the flow advances to step S1312. Image data overflowing from the FIFO image memory 1303 are ignored.

In step S1312, outline vectors are extracted from an image input in units of rasters, and the outline vector data are sequentially output to the vector data memory 1304. Thereafter, the flow advances to step S1313.

Figure 113:
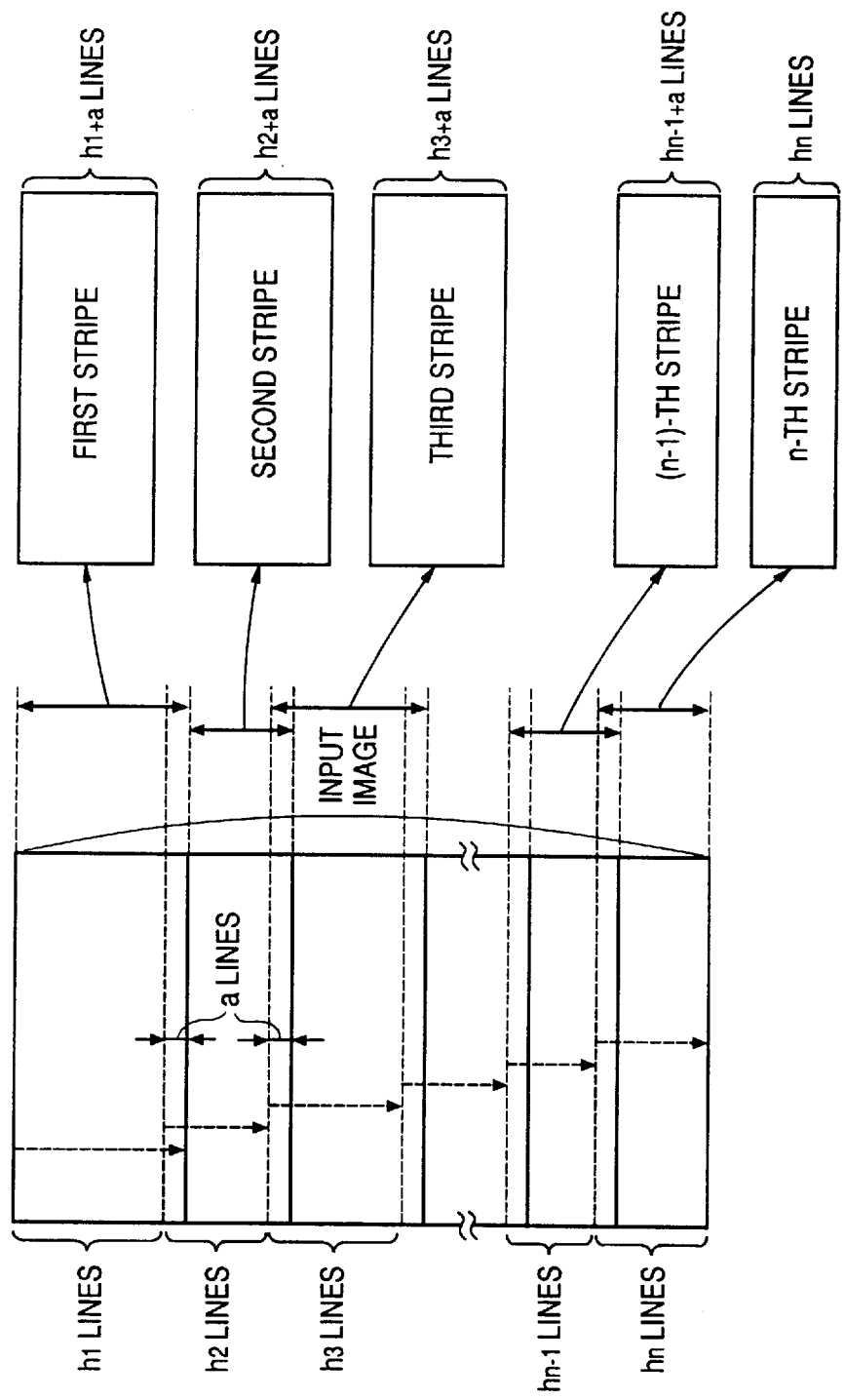
FIGS. 113A and 113B are views showing a method of dividing an input image in the 22nd embodiment.

In step S1313, the control unit 1307 checks the remaining capacity of the vector data memory 1304. If the remaining capacity is larger than a predetermined capacity, the flow returns to step S1311. However, if the remaining capacity runs short, an image input to the vector extraction unit 1302 so far is considered as one stripe, and this stripe is set as a stripe of interest. Thereafter, the flow advances to step S1314. At this time, the vector data memory 1304 stores outline vector data extracted from the entire stripe of interest, and the image memory 1303 stores image data for lower a rasters of the stripe of interest. When an input image is divided into stripes with this method, the input image is divided into stripes, as shown in FIG. 113, and is input to the outline vector extraction unit 1302 in units of rasters in the order of dotted arrows in FIG. 113.

In step S1314, variable-magnification and smoothing processing is executed for the outline vector data of the entire stripe of interest, which data are stored in the vector data memory 1304. Upon completion of this processing, the flow advances to step S1315. In step S1315, a binary image is reproduced from the outline vectors, subjected to the variable-magnification and smoothing processing, of the stripe of interest, and is output onto the image buffer by the same method as in step S1295 in FIG. 110. Upon completion of this processing, the flow advances to step S1316.

In step S1316, the control unit 1307 checks if the image acquisition unit 1301 outputs the last raster of the input image (i.e., if the stripe of interest is the last stripe). If YES in step S1316, an image constructed on the image buffer is output to an external device, and the processing ends. If NO in step S1316, the flow advances to step S1317.

In step S1317, image data for $\underline{a}$ rasters stored in the image memory 1303 are output to the vector extraction unit 1302, and the processing result is written in the vector data memory 1304. The image for $\underline{a}$ rasters corresponds to the first $\underline{a}$ rasters of the next stripe. Upon completion of this processing, the flow returns to step S1311, and an image following the image for $\underline{a}$ rasters is input from the acquisition unit 1301 to the vector extraction unit 1302 and the image memory 1303 in units of rasters, thus continuing the processing.

When the processing is executed by the above-mentioned apparatus, the image memory for $\underline{a}$ rasters can be used in place of the image memory for one frame unlike in the image dividing unit 1282 in the 22nd embodiment.

<23rd Embodiment>

In the 20th to 22nd embodiments, since processing is performed in units of divided stripes, the number of lines of a finally output image constructed on the image buffer may become different from the number of lines of an output image obtained when the entire input image is subjected to variable-magnification processing, depending on a magnification due to rounding errors upon execution of variable-magnification calculations in units of stripes.

More specifically, if we let:

n be the total number of stripes;

hi be the number of lines of the i-th stripe ($1 \leq i \leq n$); and x be a predetermined magnification of variable-magnification processing for the entire input image (x is a real number), since the number of lines, including a decimal fraction, of each image to be output upon execution of variable-magnification processing in units of stripes must be rounded to be output as an integer number of lines, the number of lines of a finally output image obtained by constructing these output images on the image buffer is given by:

$$((int)(h_1+a)x)+((int)(h_2+a)x)+\ldots+((int)(h_{n-1}+a)x)+(int)h_n x-(n-1)\times 2\times((int)a\times x \div 2)$$

In contrast to this, the number of lines of an output image obtained when the entire input image is subjected to variable-magnification processing is given by:

$$(int)(h_1+h_2+\ldots+h_n)\cdot x$$

Therefore, if x is not an integer, as the number n of stripes obtained by dividing an image is increased, the difference between the numbers of lines of these two images becomes larger due to rounding errors upon execution of calculations (int) for converting into an integer.

In order to avoid this, when image data subjected to variable-magnification processing in units of stripes are written in the image buffer, the number of lines to be overwritten and the number of lines to be abandoned must be adjusted by the following method.

Figure 114:
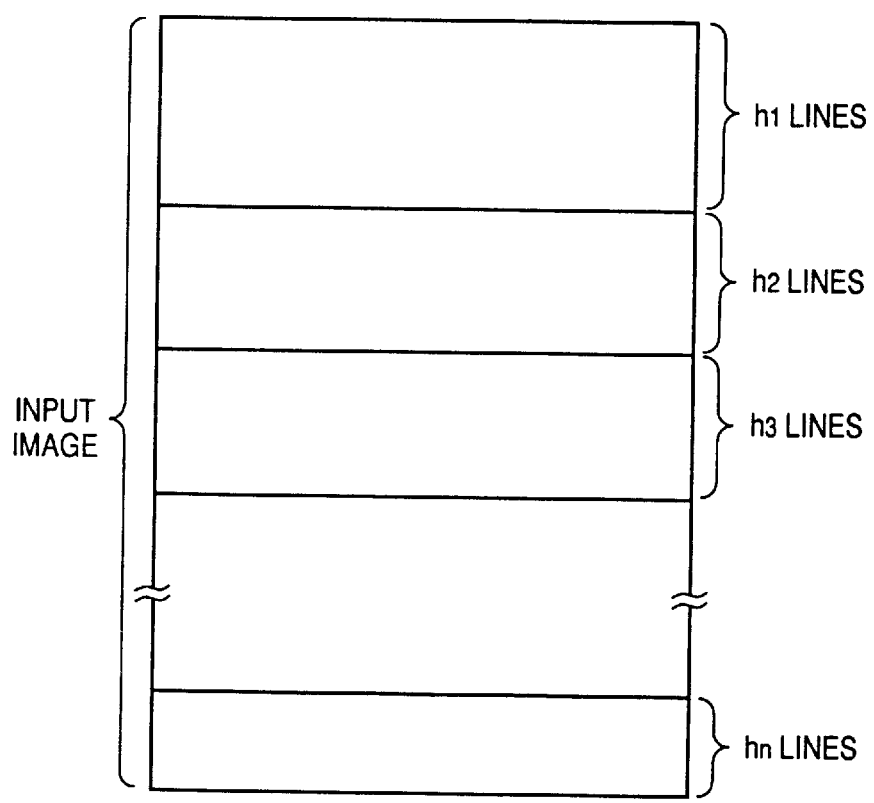
FIG. 114 is a view showing an example wherein an input image is simply divided in the 23rd embodiment of the present invention.

First, an input image is simply divided into n stripes, as shown in FIG. 114. Assume that the number of lines of the i-th stripe is hi. Upper $\underline{a}$ lines of the (i+1)-th stripe are connected to the lowermost portion of the i-th stripe ($i \neq n$). As a result, the number of lines of the i-th stripe ($i \neq n$) becomes $h_i+a$, and the input image is divided, as shown in FIG. 113. When outline extraction processing, variable-magnification processing, and smoothing processing is performed for new stripes obtained as described above, the number of lines of each output image as a result of the processing becomes $(int)(h_i+a)\cdot x$.

Figure 115:
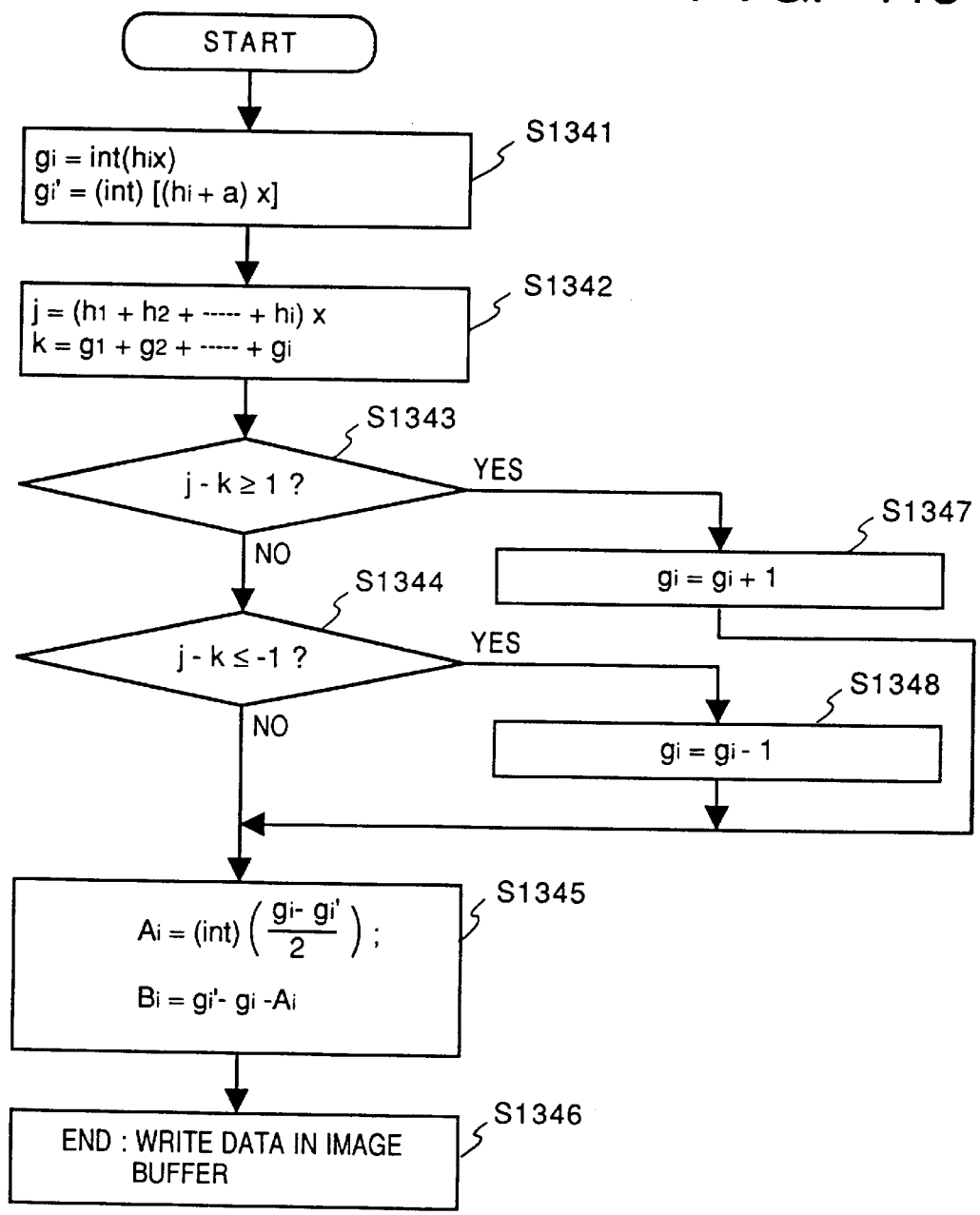
FIG. 115 is a flow chart showing a method of obtaining the number of lines to be overwritten when variable-magnification processing result images in units of stripes are written in an image buffer in the 23rd embodiment.

Thereafter, the control unit 1285 in FIG. 109 of the 20th embodiment or the control unit 1307 in FIG. 111 of the 22nd embodiment executes processing, as shown in the flow chart in FIG. 115.

Assume that the current stripe of interest is the i-th stripe.

Assume that T is an arbitrary constant satisfying $0.5 \leq T \leq 1$.

In step S1341, the number $g_i$ of lines of the stripe of interest after enlargement, and the number $g'_i$ of lines of a sum of the stripe of interest and $\underline{a}$ lines after enlargement of it as a whole are calculated by:

$$g_i=(int)h_i\cdot x$$

$$g'_i=(int)(h_i+a)\cdot x$$

The flow advances to step S1342 to calculate values j and k:

$$j=(h_1+h_2+\ldots+h_i)\cdot x$$

$$k=g_1+g_2+\ldots+g_i$$

After the number j of lines of an image from the first stripe to the stripe of interest after enlargement of it as a whole and the number k of lines obtained by enlarging stripes and then joining the enlarged stripes are calculated, the flow advances to step S1343.

In step S1343, it is checked if a value (j−k) is equal to or larger than the constant T. If YES in step S1343, the value $g_i$ is incremented by "1", and the flow advances to step S1345; otherwise, the flow advances to step S1344.

In step S1344, it is checked if the value (j−k) is equal to or larger than −T. If YES in step S1344, the value gi is decremented by "1", and the flow advances to step S1345; otherwise, the flow advances to step S1345.

In step S1345, $A_i$ and $B_i$ are calculated and stored as follows, and the flow advances to step S1346.

$$A_i=int((g'_i-g_i)\div 2)$$

$$B_i=(g'_i-g_i)-A_i$$

Figure 116:
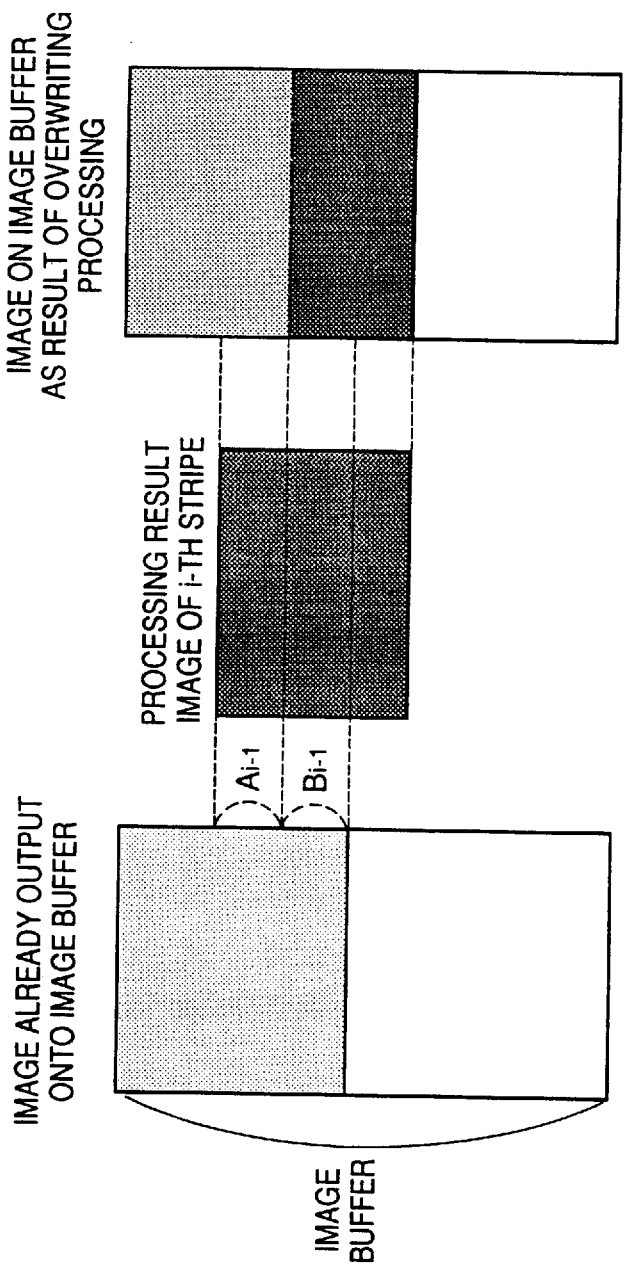
FIG. 116 is a view showing a method of writing variable-magnification processing result images in units of stripes in the image buffer in the 23rd embodiment.

In step S1346, when the processing result image of the outline extraction processing, variable-magnification processing, and smoothing processing of the i-th stripe is written in the image buffer, 1) if i=1, the output image is output onto the image buffer without any modifications; or 2) if i≠1, data for upper $A_{i-1}$ lines of the processing result image are abandoned, and the remaining data of the processing result image are overwritten from a position returning by $B_{i-1}$ lines from the last line of the image already output onto the image buffer ($A_{i-1}$ and $B_{i-1}$ may replace each other), as shown in FIG. 116.

With the above-mentioned processing, the number of lines of a finally output image constructed on the image buffer is not largely different from that of an output image obtained when variable-magnification processing is executed for the entire input image. Specifically, the number of the former lines is within ±1 of that of the later. In addition, deterioration of an image near a boundary of stripes can be prevented.

<24th Embodiment>

In the description of the 23rd embodiment, the total number n of stripes, and the number hi of lines of each stripe are predetermined values. However, the present invention is not limited to this. More specifically, the value $h_i$ may be dynamically determined in accordance with the use state of the vector data memory, and the total number n of stripes may be determined only when the entire processing is completed. The present invention can be practiced using such an arrangement, as a matter of course. In this embodiment, control shown in FIG. 115 in the 23rd embodiment may be executed in units of processing operations of each stripe.

<25th Embodiment>

In the 20th to 24th embodiments described above, a processing result associated with a common image region present between continuous stripes is processed in such a manner that the processing result of the next stripe to be processed is overwritten on the processing result portion of the already processed stripe. However, the present invention is not limited to this. For example, in place of overwriting, overlapping pixels may be logically ORed or ANDed, and these results may be used as output data. If a logic sum is used, an effect of emphasizing preservation of black pixels surrounded by a white pixel region of an original image can be provided; if a logic product is used, an effect of emphasizing preservation of white pixels surrounded by a black pixel region of an original image can be provided. Also, special effects can be provided using other logic calculations.

<26th Embodiment>

The above discussions have been given under an assumption that the number a of common lines in an image region between two adjacent stripes is a constant independent from the stripes. However, the present invention is not limited to this. More specifically, a may be defined as a value ai determined according to the number $h_i$ of lines of each stripe. In this case, a in the above description can be replaced by ai to execute the same processing as described above.

<27th Embodiment>

As for variable-magnification processing to be executed in units of stripes, outline information of an image is used in the above description. However, the present invention is not limited to this. For example, the same problem is posed when variable-magnification processing is executed in units of stripes using a projection method for projecting an original image onto a conversion image plane having a different line density, and determining a pixel value of a converted image by binarizing an integral value associated with one pixel within this plane by threshold logic (Arai & Yasuda, "Examination of Facsimile Line Density Conversion", Journal of Society of Image Electronics, Vol. 7, No. 1, pp. 11–18, 1978). However, such a problem can be solved by the methods disclosed in the above description of the present invention.

Note that the present invention can be applied to either a system consisting of a plurality of devices or an apparatus consisting of a single device. Also, the present invention can be applied to a case wherein the invention is achieved by supplying a program to the system or the apparatus.

As described above, according to the ninth to 27th embodiments of the present invention, the throughput time of the entire processing can be drastically, shortened upon execution of image processing for obtaining a fine variable-magnification image using outline vectors of an input image.

Furthermore, upon execution of variable-magnification processing in units of stripes, the number of lines of a finally output image obtained by combining processing results can be prevented from being largely different from the number of lines of an output image obtained when the entire input image is subjected to variable-magnification processing.

Furthermore, deterioration of a finally output image at a joint portion of stripes caused upon execution of processing in units of stripes can also be prevented.

<28th to 32nd Embodiments>

In the ninth to 27th embodiments described above, three processing units, i.e., an outline vector extraction processing unit, a variable-magnification/smoothing processing unit, and an image reproduction processing unit constituting outline variable-magnification processing are arranged to operate independently. With this arrangement, for example, as shown in FIG. 84, while outline vector variable-magnification/smoothing processing of the i-th vector is executed, outline vector extraction processing of the (i+1)-th stripe can be executed. In this manner, since outline vector extraction processing, outline vector variable-magnification/ smoothing processing, and image reproduction processing for each stripe are executed in a pipeline manner, the throughput time of the entire processing is greatly shortened.

Upon execution of processing for obtaining a variable-magnification image of an input image by executing outline variable-magnification processing by the method described in Japanese Laid-Open No. 05-174140 in units of stripes, and combining the processing result, it is found that a reproduced image deteriorates by smoothing in an example shown in, e.g., FIG. 107A. More specifically, if an input image shown in FIG. 107A is divided into stripes each including five lines, as shown in FIG. 107B, and if the method and apparatus described in Japanese Laid-Open No. 05-174140 are adopted, recessed portions (white pixels) 1101, 1102, and 1103 in FIG. 107B are deleted after smoothing, and portions corresponding to these recessed portions 1101, 1102, and 1103, i.e., white pixels 1101', 1102', and 1103' in FIG. 107C are undesirably omitted from a reproduced image after the variable-magnification processing. In order to prevent such image deterioration, the 18th to 27th embodiments described above made the following proposal. In this proposal, an input image is divided into stripes to partially overlap each other (the overlapping portion will be referred to as a "margin" hereinafter), as shown in FIG. 117B, outline variable-magnification processing is executed in units of stripes by the method described in Japanese Laid-Open No. 05-174140, a portion corresponding to half of the margin portion of each stripe before variable-magnification processing is deleted from each obtained variable-magnification image, as shown in FIG.

117C, and thereafter, the variable-magnification images are combined, thereby obtaining a variable-magnification image of the input image.

In the ninth to 17th embodiments, although the throughput time of the entire processing can be greatly shortened, image deterioration caused between stripes cannot be prevented. In the 18th to 27th embodiments, although image deterioration at a joint portion of stripes can be prevented, the throughput time of the entire processing cannot be shortened. Even when these two techniques are applied to an input image to execute processing for obtaining a variable-magnification image free from image deterioration at high speed, the arrangement in each of the ninth to 17th embodiments cannot obtain a "margin" between stripes required in the 18th to 27th embodiments.

The 28th to 32nd embodiments have been made in consideration of the above-mentioned problems, and have as their object to provide an image processing method and apparatus, which can drastically shorten the throughput time of the entire processing while suppressing image deterioration at a joint portion of stripes upon execution of image processing for obtaining a fine variable-magnification image using outline vectors of an input image.

<28th Embodiment>

The apparatus arrangement of the 28th embodiment is the same as that shown in FIG. 89.

An image memory 1701 temporarily stores a binary image input from a binary image acquisition unit 1401 in the raster-scanning format, and has a capacity for one frame of an input image.

Figure 117:
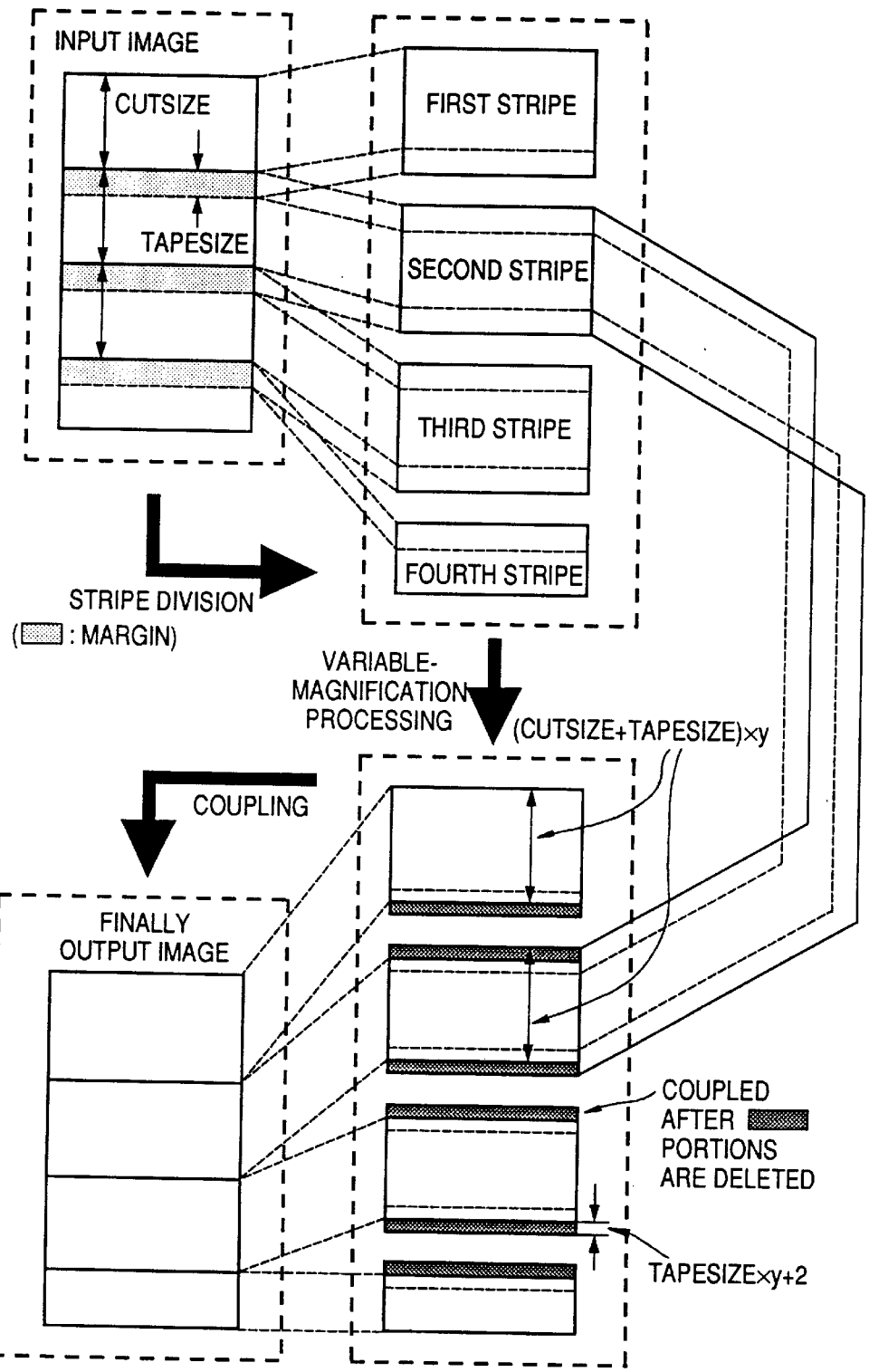
FIGS. 117A to 117D are charts showing the processing flow in the 28th embodiment of the present invention.

An outline vector extraction unit 1406 extracts outline vectors from a stripe image output in the raster-scanning order from the image memory 1701 by the method described in Japanese Laid-Open No. 04-157578, and outputs the extracted outline vectors to a FIFO vector memory (A) 1407. The unit 1406 reads out the ((i−1)×cutsize+1)-th line to the (i×cutsize+tapesize)-th line in an input image from the image memory 1407 as the i-th stripe in response to a processing start signal from a control unit 1412, and executes outline vector extraction processing for this stripe. Note that "cutsize" and "tapesize" have the following meanings. That is, as shown in FIG. 117, the number of lines of an overlapping margin portion upon execution of smoothing/variable-magnification processing while assuring overlapping regions between stripes corresponds to "cutsize", and the number of lines of a non-overlapping portion corresponds to "tapesize".

When the outline vector extraction unit 1406 reads out the last raster of the input image from the image memory 1701, it supplies an interrupt signal to the control unit 1412 to set the value of the flag "last" in the control unit 1412 to be "1".

The vector data memory (A) 1407 is a FIFO vector data memory (A) for temporarily storing outline vector data of a stripe image, which are extracted by the outline vector extraction unit 1406.

An outline vector smoothing/variable-magnification unit 1408 receives outline vector data from the FIFO vector data memory (A) 1407, executes smoothing and variable-magnification processing by a method described in Japanese Laid Open No. 05-174140, and outputs the processing result to a FIFO vector data memory (B) 1409. This smoothing/variable-magnification method will be briefly described below. For example, when vectors forming a closed loop include two horizontal vectors and two vertical vectors, and these vectors each have a length "1", the vector group forming the corresponding closed loop is deleted. That is, vectors are smoothed by a method for operating outline vectors according to predetermined rules on the basis of the relationship between a vector of interest and vectors before and after the vector of interest in outline vectors forming a closed loop, or by a method for defining corner points as fixed points and other points as floating points, calculating a weighting coefficient of a floating point of interest with respect to points before and after the point of interest, and correcting the position of the floating point of interest. Also, variable-magnification processing is achieved by, e.g., multiplying coordinates representing vectors with a desired magnification.

The vector data memory (B) 1409 temporarily stores vector data which are subjected to variable-magnification/smoothing processing, and are output from the outline vector smoothing/variable-magnification unit 1408.

A binary image reproduction unit 1410 reads vector data subjected to variable-magnification/smoothing processing from the vector data memory (B) 1409, and reproduces a binary image in units of stripes by the method described in Japanese Laid-Open No. 05-020467. This reproduction processing method will be briefly described below. An outline loop (including one obtained by enlargement processing) is drawn based on smoothed vector data, and a portion inside the loop is filled with black pixels. After the reproduction processing is completed, lines (tapesize×(vertical magnification)÷2) corresponding to half of a margin of an input stripe are deleted from upper and lower portions of a reproduced image. Note that the upper portion of the first stripe and the lower portion of the last stripe are not deleted. Thereafter, this image data is output to an image output unit 1411.

Each of the outline vector extraction unit 1406, the outline vector smoothing/variable-magnification unit 1408, and the binary image reproduction unit 1410 includes a CPU, ROM, and RAM (working memory), and operates independently. These units start their processing in response to commands from the control unit 1412. Each of these units has a status flag memory (not shown). During processing, each unit sets the flag to be "busy", and while each unit waits for a processing start command (for the next stripe) from the control section 1412 after processing is completed, each unit sets the flag to be "ready". These flags can be accessed by the control unit 1412.

Upon reception of image data from the binary image reproduction unit 1410, the binary image output unit 1411 automatically displays binary image data in the raster-scanning format, forms a hard copy, or outputs data onto a communication path. For example, the unit 1411 comprises a liquid crystal display, a thermal recording device, or a modem.

The control unit 1412 controls the input/output timings of processing in the units 1401 to 1411, and designates lines to be output as a stripe of an input image on the image memory. The control unit 1412 includes a CPU, ROM, and RAM, and is connected to signal lines of the units 1401 to 1411. The control unit 1412 can read status flags from these signal lines, and can supply processing start/stop signals to them, as needed. With these signals, the control unit 1412 controls the respective units.

<Control Procedure>

Figure 118:
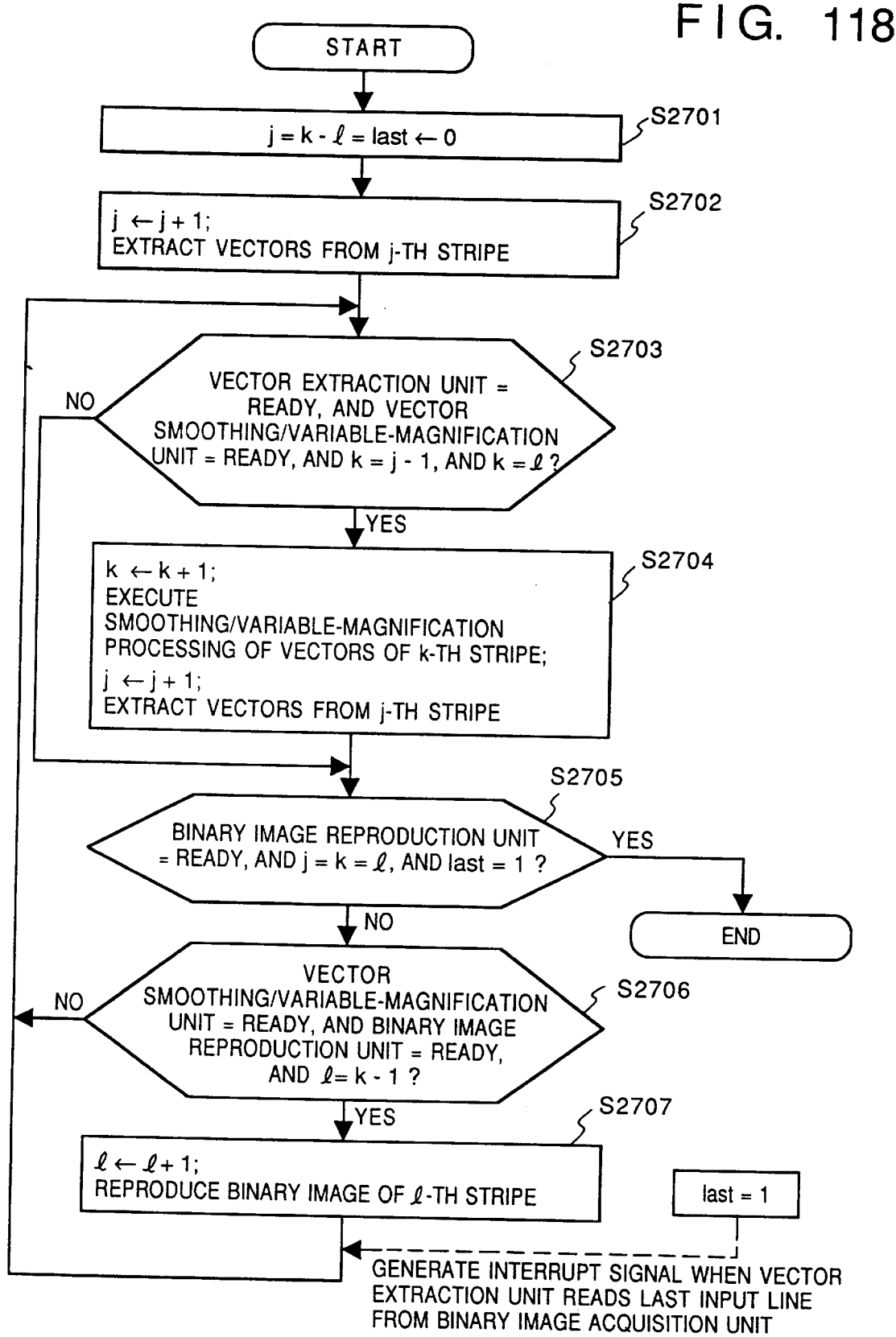
FIG. 118 is a flow chart showing processing executed by a control unit 2609 in the 28th embodiment.
Figure 119:
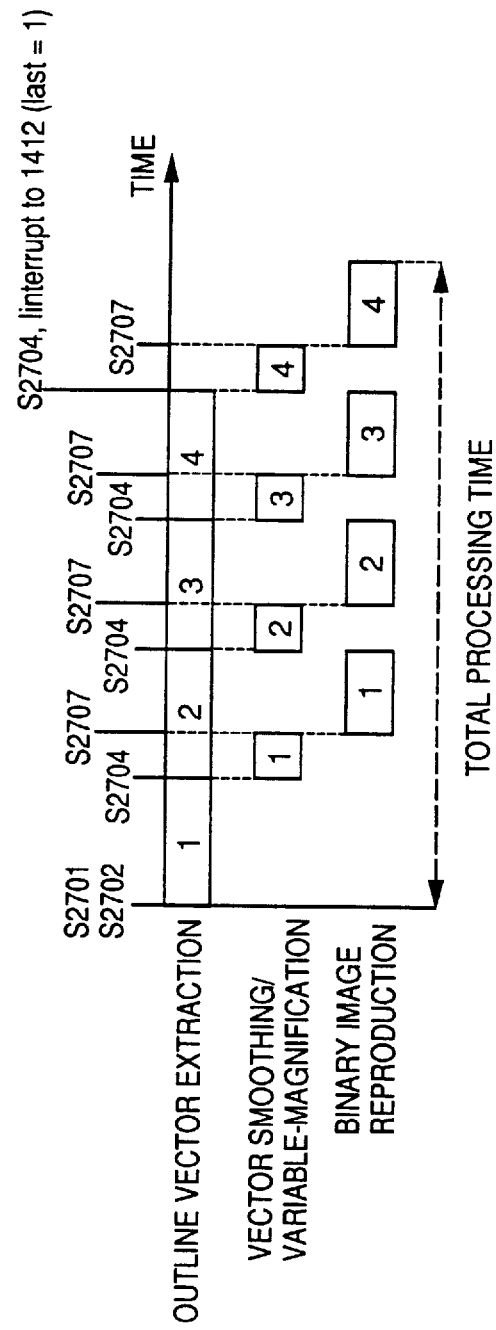
FIG. 119 is a timing chart showing processing timings in units of stripes in the 28th embodiment.

FIG. 118 is a flow chart showing control executed by the control unit 1412 shown in FIG. 89 according to this embodiment. A program corresponding to this flow chart is stored in the internal ROM of the control unit 1412. FIG. 119 shows the processing timings of stripes of the image memory 1701, the outline vector extraction unit 1406, the outline vector smoothing/variable-magnification unit 1408, and the binary image reproduction unit 1410 in correspondence with steps in the flow chart in FIG. 118 when an input image is divided into four stripes.

In FIG. 118, variables j, k, l, and last respectively have the following meanings.

j: the number of a stripe which is being processed (or has already been processed) by the outline vector extraction unit 1406 k: the number of a stripe which is being processed (or has already been processed) by the outline smoothing/variable-magnification unit 1408 l: the number of a stripe which is being processed (or has already been processed) by the binary image reproduction unit 1410

(the number of the stripe in the variables j, k, and l complies with FIG. 82)

last: a flag indicating whether or not the last line of an input image is read out from the image memory 1701 by the outline vector extraction unit 1406.

Note that the values of the variables j, k, l, and last are stored in the internal RAM of the control unit 1412.

When the binary image acquisition unit 1401 inputs all input image data to the image memory 1701, the control unit 1412 starts the following processing.

In step S2701, the initial values of j, k, l, and last are set to be "0", and the flow advances to step S2702.

In step S2702, the control unit 1412 increments the value j by "1", and supplies a signal to the outline vector extraction unit 1406 to start outline vector extraction processing for the j (=1)-th stripe. In this case, the stripe to be subjected to the vector extraction includes lines (tapesize) as upper and lower margins. The first and last stripes do not have upper or lower margin, i.e., have a margin at a side contacting another stripe.

In step S2703, it is checked:

1) if the status flags of both the outline vector extraction unit 1406 and the outline vector smoothing/variable-magnification unit 1408 are "ready";

2) if k=j−1 is satisfied, i.e., if the stripe subjected to smoothing/variable-magnification processing latest is a stripe immediately before the stripe subjected to latest vector extraction; and 3) if k=l is satisfied, i.e., if the stripe subjected to smoothing/variable-magnification processing latest has already been reproduced. If YES in step S2703, the flow advances to Step S2704; otherwise, the flow advances to step S2705.

In step S2704, the control unit increments the value k by "1", and supplies a signal to the outline vector smoothing/variable-magnification unit 1406 to start outline vector smoothing/variable-magnification processing of the k-th stripe. At the same time, the control unit increments the value j by "1", and supplies a signal to the outline vector extraction unit 1408 to start outline extraction processing of the j-th stripe. Thereafter, the flow advances to step S2705.

In step S2705, it is checked:

1) if the status flag of the binary image reproduction unit 1410 is "ready";

2) if the values j, k, and l are equal to each other, i.e., if the stripe subjected to latest vector extraction has already been subjected to smoothing/variable-magnification processing and reproduction processing; and 3) if the flag "last" has become "1" (already by an interrupt signal from the outline vector extraction unit 1406), i.e., if all image data are input. If YES in step S2705, the processing ends, and an image on the binary image output unit 1411 is output. Otherwise, the flow advances to step S2706.

In step S2706, it is checked:

1) if the status flags of both the outline vector smoothing/variable-magnification unit 1408 and the binary image reproduction unit 1411 are "ready"; and 2) if l=k−1 is satisfied, i.e., if the latest reproduced stripe is a stripe immediately before the stripe subjected to the latest smoothing/variable-magnification processing. If YES in both 1) and 2), the flow advances to step S2707; otherwise, the flow returns to step S2703.

In step S2707, the control unit increments the value l by "1", and supplies a signal to the binary image reproduction unit 1410 to start binary image reproduction processing after variable-magnification processing of the l-th stripe. The binary image reproduction unit 1410 joints intermediate stripes after it deletes half of lines obtained by executing variable-magnification processing of "tapesize" lines, i.e., (tapesize×(vertical magnification)÷2) lines from each of upper and lower portions of each stripe. As for the first and last stripes, the above-mentioned processing is performed for only a portion with a margin.

When the processing is performed in the above-mentioned procedure, since the processing operations of the respective units can be performed parallel to each other, as shown in FIG. 119, high-speed processing can be realized, and a fine variable-magnification processing result image can be obtained from an input binary image without causing image deterioration near a joint portion of stripes.

<29th Embodiment>

Since the number of outline vectors extracted from a certain stripe largely varies depending on the complexity of a stripe image, the vector data memory, and the working memory included in the outline vector extraction unit must have capacities large enough to store all outline vector data for one stripe of even a very complex image. However, in practice, since such a complex image is rare, most of the memory capacity is wasted. In order to prevent this, the following apparatus arrangement and the processing procedure may be adopted.

Figure 120:
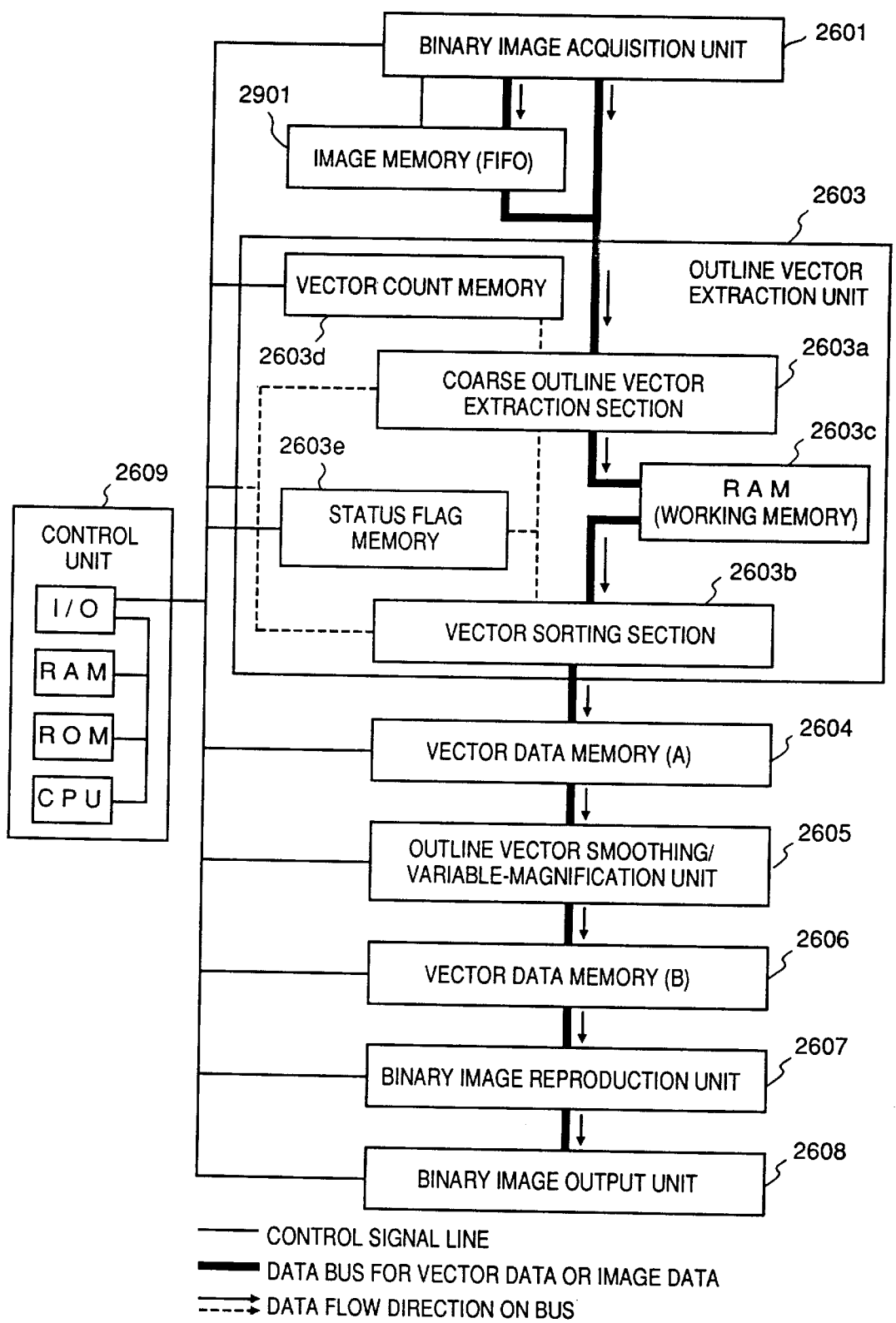

FIG. 120 is a block diagram showing an arrangement of an apparatus according to the 29th embodiment. A difference from the arrangement shown in FIG. 92 described above is that an image acquisition unit 2601 and an outline vector extraction unit 2603 are connected via two data buses. One bus directly connects the image acquisition unit 2601 and the outline vector extraction unit 2603, and a FIFO image memory 2901 is inserted in the other bus. The image memory 2901 is prepared with a capacity for "tapesize" lines. The image acquisition unit 2601 inputs the same image data to the outline vector extraction unit 2603 and the image memory 2901 in units of rasters. The image acquisition unit 2601 includes a CPU and a ROM, and executes the following processing.

1) The image acquisition unit 2601 stops/restarts an image data input operation to the outline vector extraction unit 2603 (and the image memory 2901) in response to a signal from a control unit 2609.

2) The image acquisition unit 2601 simultaneously outputs the same image data to the outline vector extraction unit 2603 and the image memory 2901. In this case, data overflowing from the image memory 2901 are not used. With this arrangement, image data for "tapesize" lines of the lowermost portion of a stripe image input to the outline vector extraction unit 2603 are always present on the image memory 2901.

3) The output timing of an image for "tapesize" lines from the image memory 2901 to the outline vector extraction unit 2603 is controlled by the image acquisition unit 2601. More specifically, output control of the image memory 2901 is executed not by the control unit 2609 but by the image acquisition unit 2601. When the image acquisition unit 2601 restarts an image input operation in response to a signal from the control unit 2609, it outputs image data on the image memory 2901 to the outline vector extraction unit 2603 first, and then, outputs image data on the image acquisition unit 2601 to the outline vector extraction unit 2603 (and the image memory 2901). With this processing, stripe image data can be input to the outline vector extraction unit 2603 to include an overlapping portion for "tapesize" lines, as shown in FIG. 117B.

4) When the last line of an input image is input to the outline vector extraction unit 2603, the image acquisition unit 2601 supplies an interrupt signal to the control unit 2609 to set the flag "last" on the RAM of the control unit 2609 to be "1".

The outline vector extraction unit 2603 includes a CPU, ROM, RAM (working memory), and status flag (which can be accessed by the control unit 2609), and operates independently. The unit 2603 starts its processing in response to a command from the control unit 2609. As for the processing executed by the outline vector extraction unit 1406, a processing unit disclosed in Japanese Laid-Open No. 04-157578 described above is used as in the above embodiments. In addition, the extraction unit 1406 of this embodiment comprises:

1) a coarse outline vector extraction section 2603a for extracting coarse outline vectors from image data every time image data for one raster is input, and writing the extracted data on a working memory (a RAM 2603c in FIG. 120); and 2) a vector sorting section 2603b for sorting coarse outline vectors extracted by 1) and written on the working memory 2603c in units of loops, and outputting the sorted data to a vector data memory (A) 2604. In the unit 2603, processing operations are executed in the order of the coarse outline vector extraction section 2603a→the vector sorting section 2603b, and are never simultaneously performed. A status flag 2603e is set to be "busy" when the processing of the coarse outline vector extraction section 2603a is started, and is set to be "ready" when the processing of the vector sorting section 2603b is completed.

Although the processing in the above description is the same as that in the 28th embodiment, the 29th embodiment executes coarse outline vector extraction processing simultaneously with an input operation of image data in units of rasters. In this embodiment, the control unit 2609 can separately supply processing start/stop signals to the coarse outline vector extraction section 2603a and the vector sorting section 2603b.

The outline vector extraction unit 2603 includes a vector count memory 2603d for storing the number of outline vectors extracted by the coarse outline vector extraction section 2603a in addition to the above-mentioned status flag memory, as shown in FIG. 120. The memory 2603d can also be accessed by the control unit 2609, as needed. The control unit 2609 accesses the vector count memory 2603d as needed to check the number of vectors extracted by the coarse outline vector extraction section 2603a. When the control unit 2609 determines that the number of extracted vectors exceeds a predetermined value, it causes the binary acquisition unit 2601 to stop the image input operation to the outline vector extraction unit 2603, and causes the coarse outline vector extraction section 2603a to stop coarse outline vector extraction processing. An image input from the image acquisition unit 2601 to the coarse outline vector extraction section 2603a from the beginning of the input operation up to this timing can be considered as one stripe.

Immediately thereafter, the control unit causes the vector sorting section 2603b to start vector sorting processing for this stripe. As soon as the outline vector extraction processing for this stripe (i.e., the processing operations in both the coarse outline vector extraction section 2603a and the vector sorting section 2603b) is completed, the control unit 2609 causes the outline vector extraction unit 2603 to output the extracted vector data to the vector data memory (A) 2604, and supplies a signal to an outline vector smoothing/variable-magnification unit 2605 to start processing for this stripe. At the same time, the control unit 2609 restarts the stopped image input operation from the image acquisition unit 2601 to the outline vector extraction unit 2603 (in this case, the image acquisition unit 2601 outputs image data on the image memory 2901 first, and then outputs data on the image acquisition unit 2601). Similarly, the control unit causes the outline vector extraction unit 2603 to start outline vector extraction processing for the currently input image data (corresponding to a second stripe).

Thereafter, the outline vector extraction processing, outline vector smoothing/variable-magnification processing, and image reproduction processing are executed in a pipeline manner as in the 28th embodiment.

Figure 121:
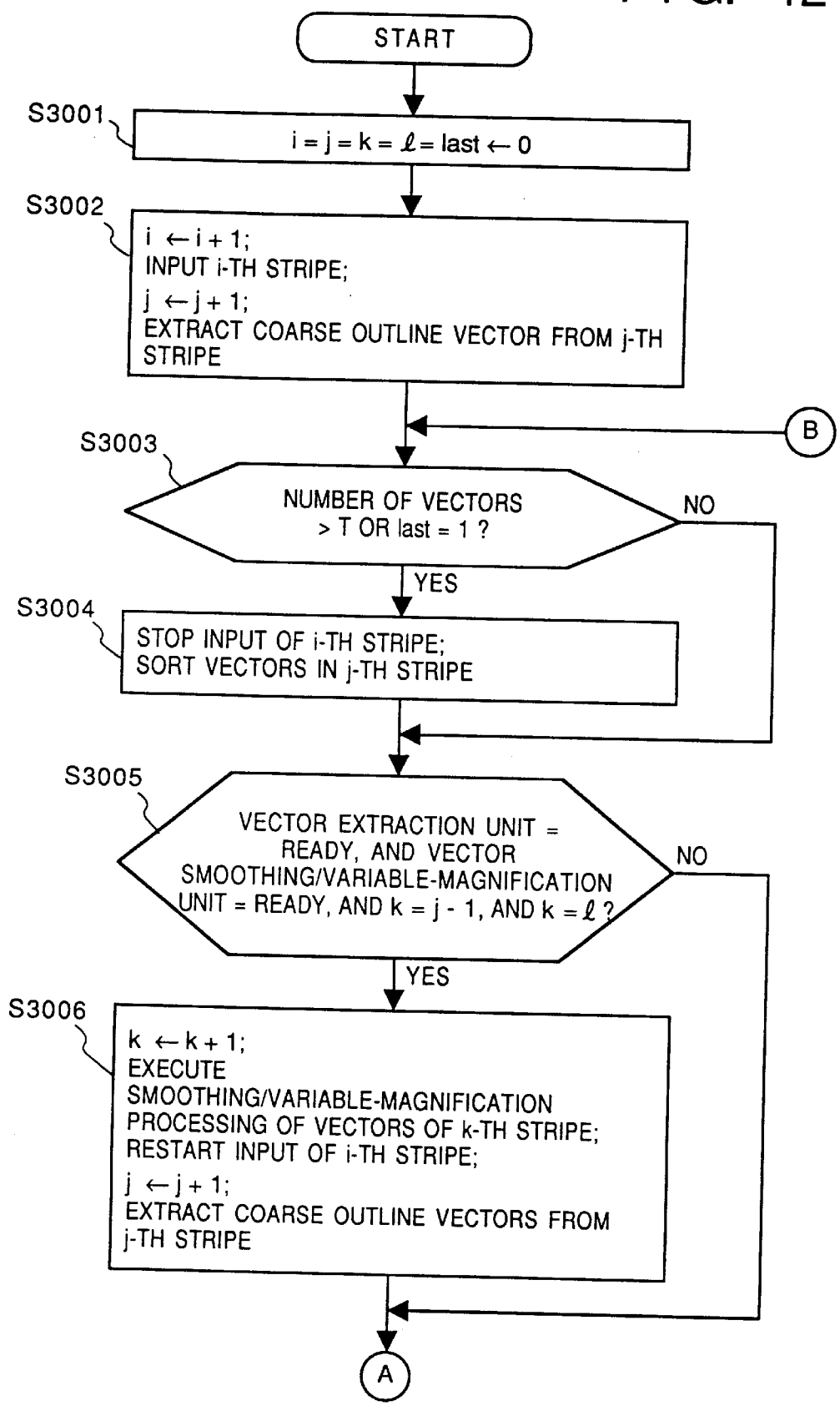
Figure 122:
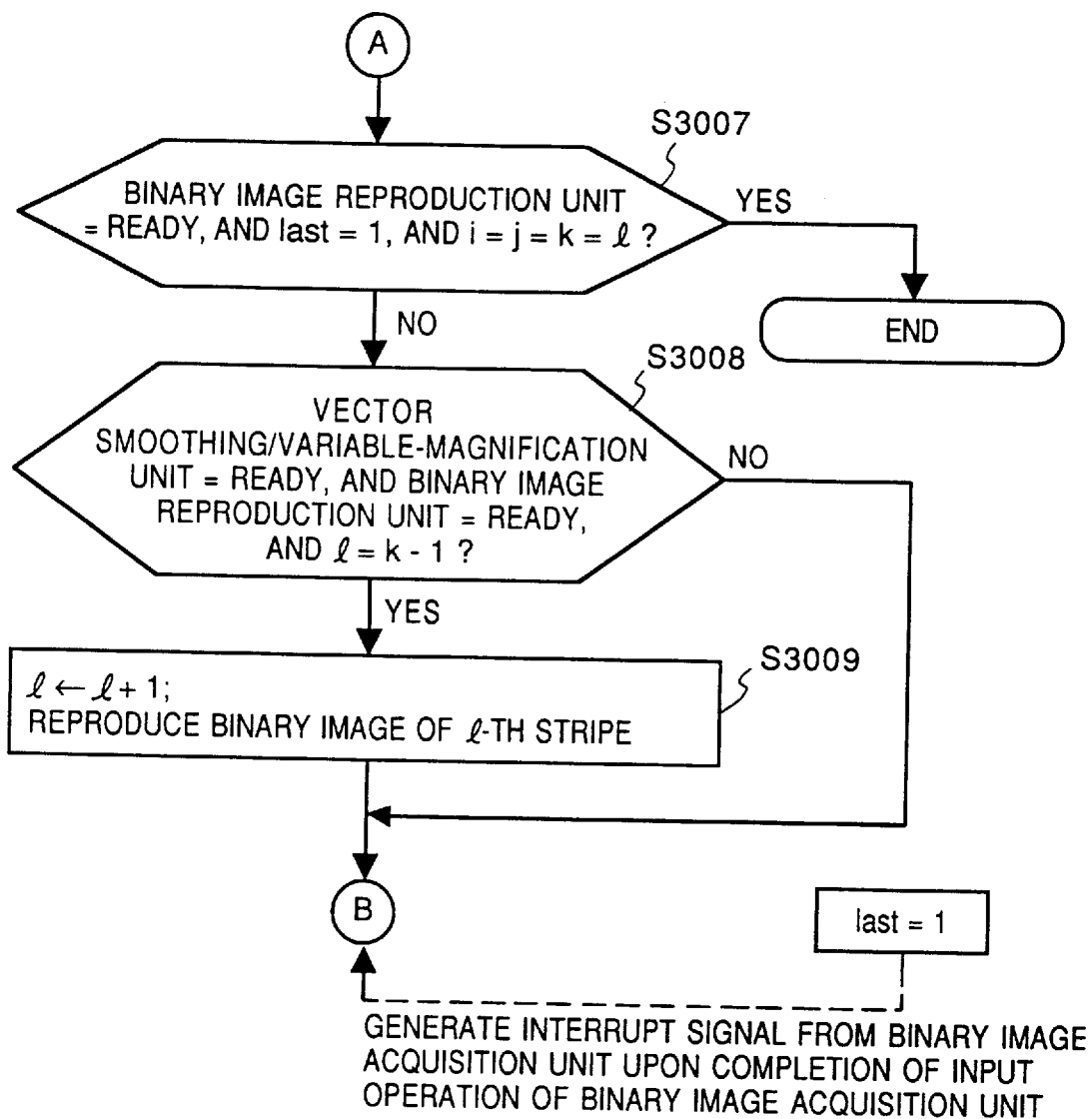

FIGS. 121 and 122 are flow charts showing control executed by the control unit 2609 in the 29th embodiment. A program corresponding to these flow charts is stored in the internal ROM of the control unit 2609. Since the processing order in this embodiment is substantially the same as FIGS. 93 and 94 described above, please refer to FIG. 95 for the operation timings of the respective processing units.

In FIGS. 121 and 122, variables i, j, k, l, and last respectively have the following meanings:

i: the number of a stripe which is being input (or has already been input) from the binary image acquisition unit 2601 to the outline vector extraction unit 2603 j: the number of a stripe which is being processed (or has already been processed) by the outline vector extraction unit 2603 k: the number of a stripe which is being processed (or has already been processed) by the outline smoothing/variable-magnification unit 2605 l: the number of a stripe which is being processed (or has already been processed) by a binary image reproduction unit 2607

(the number of the stripe in the variables i, j, k, and l complies with FIG. 82)

last: a flag indicating whether or not the last line of an input image is input from the image acquisition unit 2601 to the outline vector extraction unit 2603.

Note that the values of the variables i, j, k, l, and last are stored in the internal RAM of the control unit 2609.

In step S3001, the initial values of the variables i, j, k, l, and last are set to be "0", and the flow advances to step S3002.

In step S3002, the control unit increments the value i by "1", and supplies a signal to the image acquisition unit 2601 to start an image data input operation of the i (=1)-th stripe from the image acquisition unit 2601 to the outline vector extraction unit 2603. At this time, if the stripe of interest is other than the first stripe, the binary image acquisition unit 2601 controls the image memory 2901 to output stored data before the unit 2601 inputs data to the vector extraction unit 2603, and thereafter, starts the output operation of image data after the output operation of the image memory 2901 is completed.

The control unit 2609 increments the value j by "1", and supplies a signal to the coarse outline vector extraction section 2603a to start processing for sequentially extracting coarse outline vectors from input image data sent from the image acquisition unit 2601 in units of rasters by the method described in Japanese Laid-Open No. 04-157578 or in the first to eighth embodiments. Thereafter, the flow advances to step S3003.

In step S3003, the control unit accesses the vector count memory 2603d to check the number of outline vectors extracted by the coarse outline vector extraction section 2603a. If the number of outline vectors exceeds a predetermined value T, or if the value "last" becomes "1" (already by an interrupt signal from the image acquisition unit 2601), the flow advances to step S3004; otherwise, the flow advances to step S3005.

In step S3004, the control unit supplies signals to the image acquisition unit 2601 and the coarse outline vector extraction section 2603a to temporarily stop the image input operation from the image acquisition unit 2601 to the coarse outline vector extraction section 2603a, and coarse outline vector extraction processing of the coarse outline vector extraction section 2603a. Image data input to the coarse outline vector extraction section 2603a until this timing is processed as the i-th stripe. At the same time, the control unit supplies a signal to the vector sorting section 2603b to start vector sorting processing for this stripe.

In step S3005, it is checked:
1) if the status flags of both the outline vector extraction unit 2603 and the outline vector smoothing/variable-magnification unit 2605 are "ready";
2) if k=j−1 is satisfied, i.e., if the latest reproduced stripe is a stripe immediately before the stripe subjected to latest smoothing/variable-magnification processing; and
3) if k=l is satisfied, i.e., if the stripe subjected to latest smoothing/variable-magnification processing has already been reproduced. If YES in step S3005, the flow advances to step S3006; otherwise, the flow advances to step S3007.

In step S3006, the control unit executes the following processing, and thereafter, the flow advances to step S3007.
1) The control unit increments the value k by "1", and supplies a signal to the outline vector smoothing/variable-magnification unit 2605 to start outline vector smoothing/variable-magnification processing for the k-th stripe.
2) The control unit increments the value i by "1", and supplies a signal to the image acquisition unit 2601 to restart the stopped image input operation from the image acquisition unit 2601 to the outline vector extraction unit 2603. At the same time, the control unit increments the value j by "1", and supplies a signal to the coarse outline vector extraction section 2603a to start coarse outline vector extraction processing for the j-th stripe.

In step S3007, it is checked:
1) if the flag "last" has become "1" (already by an interrupt signal from the image acquisition unit 2601), i.e., if the input operation of image data is completed;
2) if the values i, j, k, and l are equal to each other, i.e., if all input image data are subjected to vector extraction processing, smoothing/variable-magnification processing, and reproduction processing; and
3) if the status flag of the binary image reproduction unit 2607 is "ready". If YES in all 1), 2), and 3), the processing ends; otherwise, the flow advances to step S3008.

In step S3008, it is checked:
1) if the status flags of both the outline vector smoothing/variable-magnification unit 2605 and the binary image reproduction unit 2607 are "ready"; and
2) if l=k−1 is satisfied, i.e., if the latest reproduced stripe is a stripe immediately before the stripe subjected to latest smoothing/variable-magnification processing. If YES in both 1) and 2), the flow advances to step S3009; otherwise, the flow returns to step S3003.

In step S3009, the control unit increments the value l by "1", and supplies a signal to the binary image reproduction unit 2607 to start binary image reproduction processing for the l-th stripe. The reproduction processing is executed in the same manner as in the above embodiments.

When the outline variable-magnification processing of an input image is executed with the above-mentioned processing, although the number of lines in each stripe is not constant, the data amount of extracted vector data can become almost constant in units of stripes in addition to the same effect as in the 28th embodiment. As a result, the vector data memory capacity can be saved, and the memory can be effectively used.

<30th Embodiment>

The 29th embodiment may be modified as follows.

Figure 123:
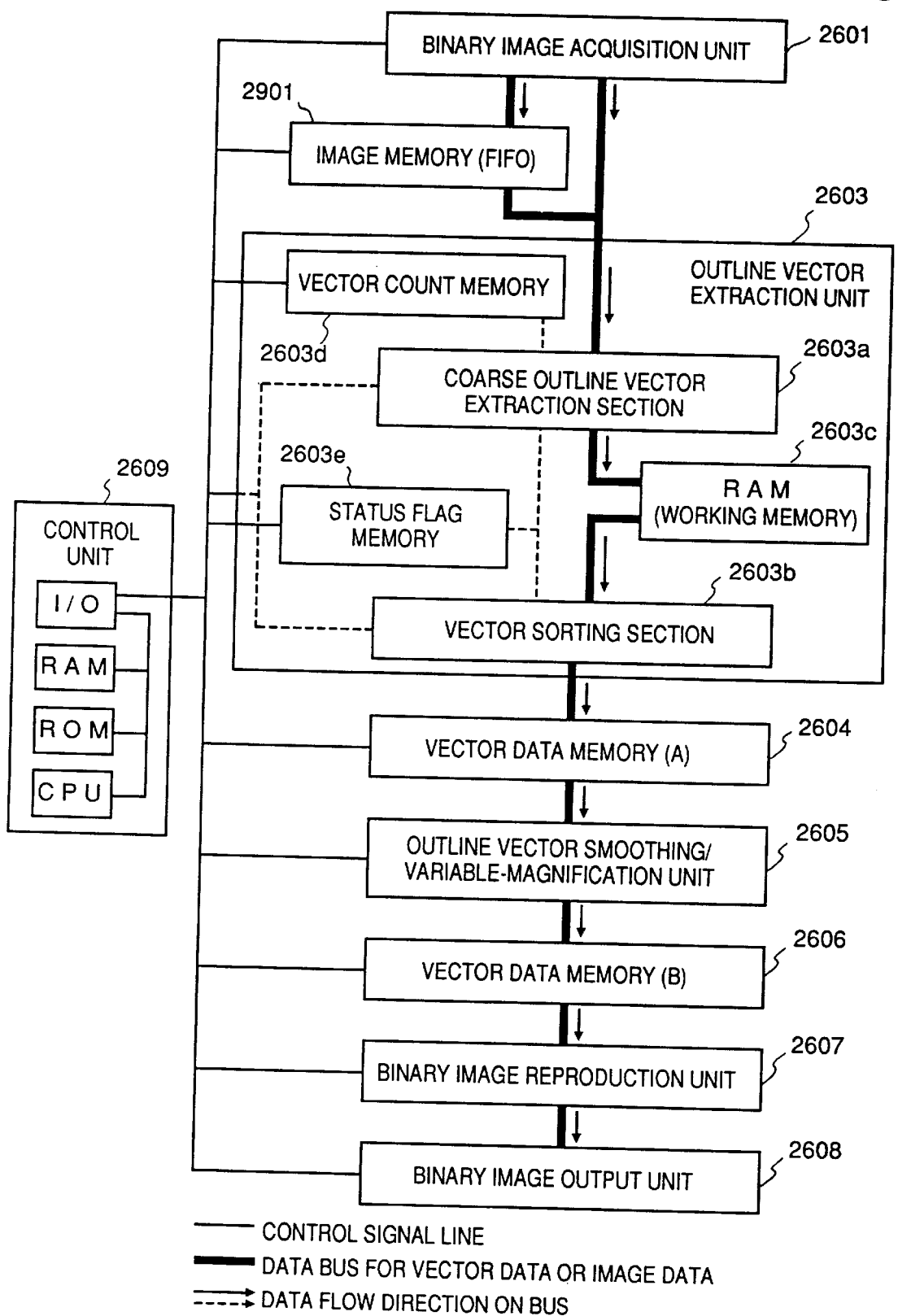

As shown in FIG. 123, a control signal line is connected between the control unit 2609 (FIG. 120) to the FIFO image memory 2901, so that the control unit 2609 can start an image data output operation of the image memory 2901 (to the outline vector extraction unit 2603). When the image memory 2901 outputs all stored data, it supplies an interrupt signal to the control unit 2609 to set the value of a flag "fifo" to be "0". The flag "fifo" indicates the operation state of the image memory 2901, and is allocated on a RAM of the image memory 2901. Also, a signal line for controlling the image memory 2901 from the binary image acquisition unit 2601 is removed.

Figure 124:
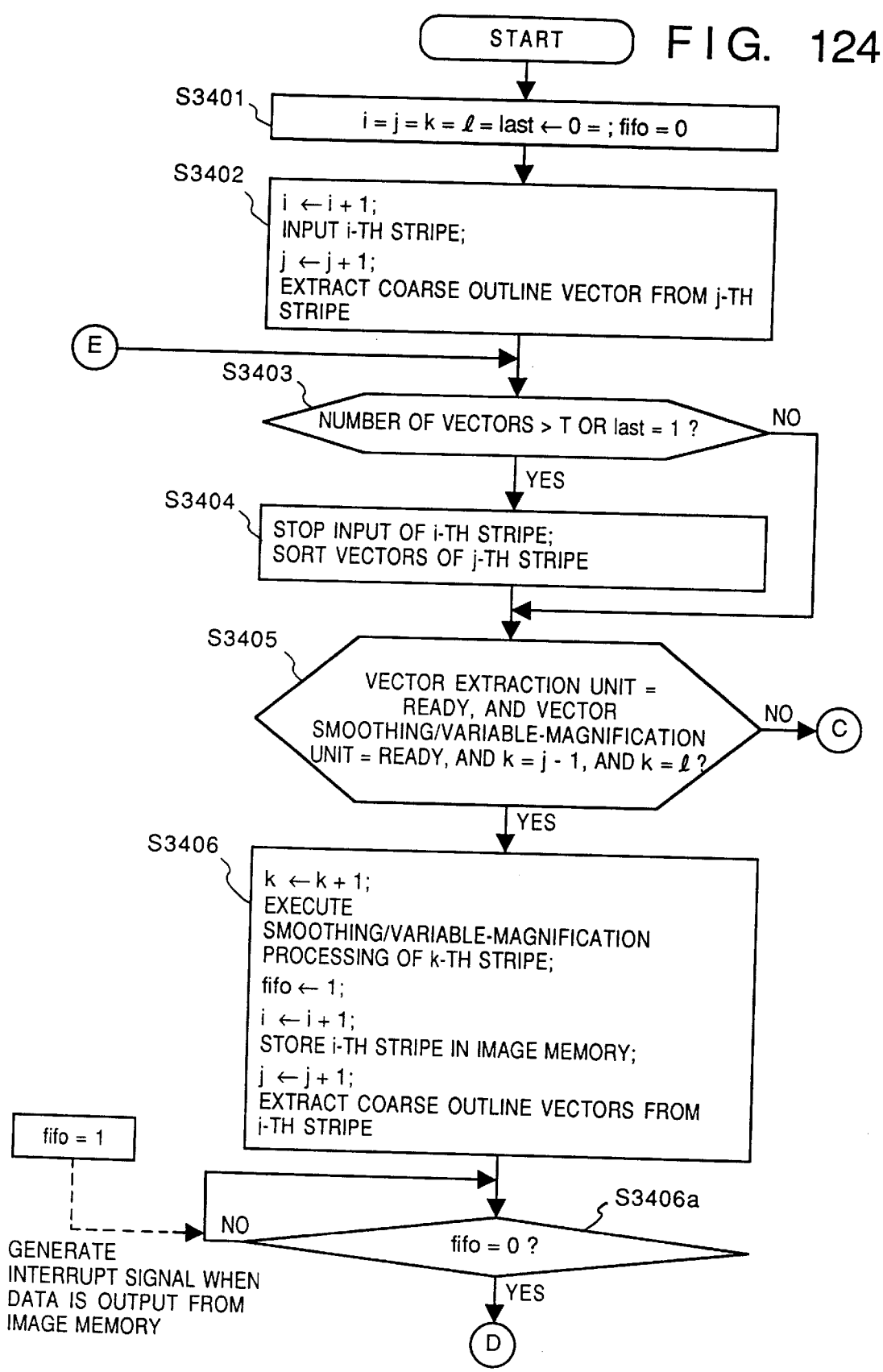
Figure 125:
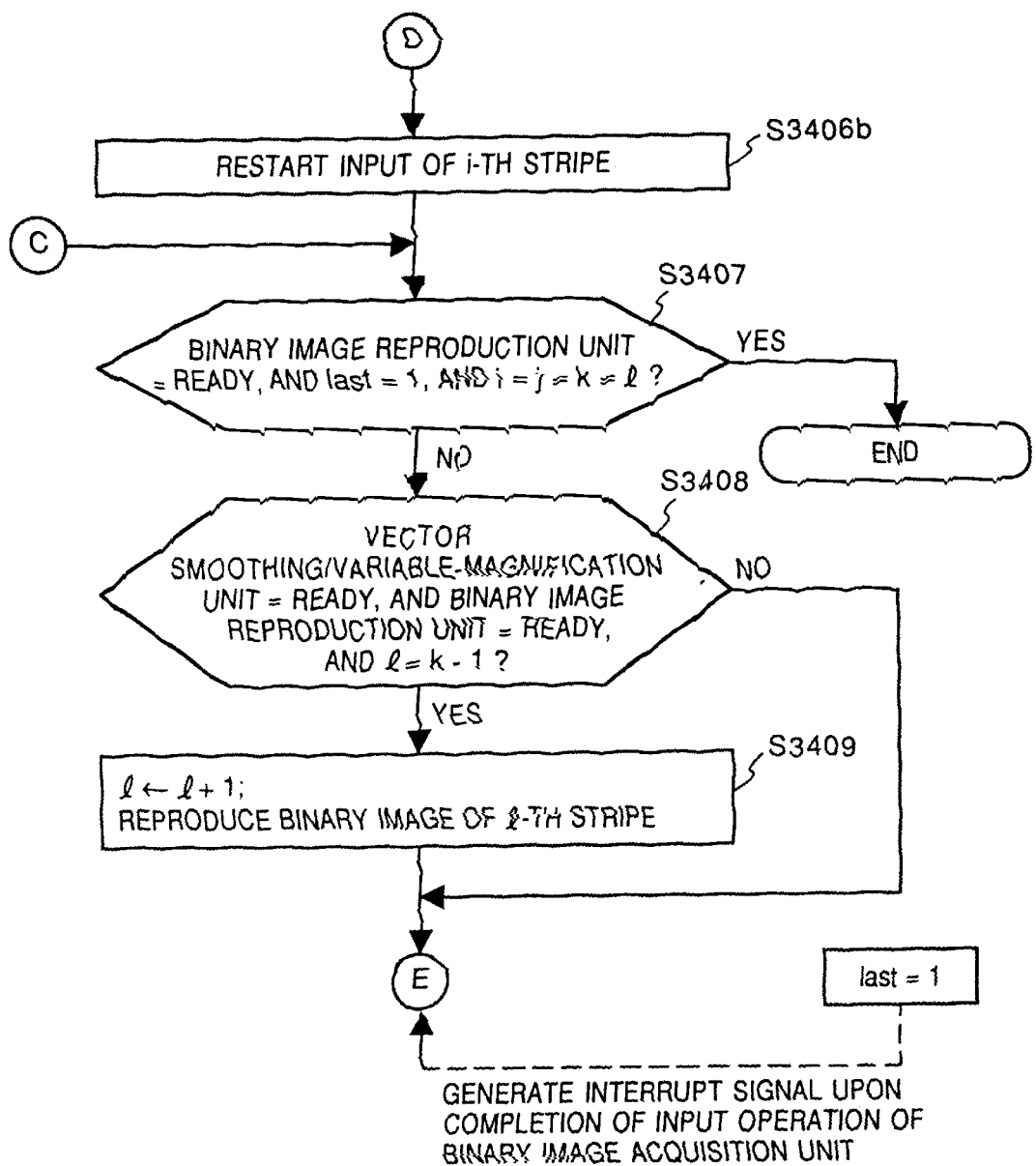

In this case, the flow chart of control executed by the control unit 2609 is as shown in FIGS. 124 and 125. Only different steps from those shown in FIGS. 121 and 122 will be described below.

In step S3401, the initial value of "fifo" is set to be "0" as well as i, j, k, l, and "last".

Steps S3402 to S3405 have the same contents as in steps S3002 to S3005 in FIGS. 121 and 122 of the 29th embodiment described above.

In step S3406, the control unit executes the following processing, and thereafter, the flow advances to step S3406a.
1) The control unit increments the value k by "1", and supplies a signal to the outline vector smoothing/variable-magnification unit 2605 to start outline vector smoothing/variable-magnification processing for the k-th stripe.
2) The control unit sets "1" in the value "fifo".
3) The control unit increments the value i by "1", and supplies a signal to the image memory 2901 to output image data stored therein. These image data correspond to a margin portion of the i-th stripe. At the same time, the control unit increments the value j by "1", and supplies a signal to the coarse outline vector extraction section 2603*a* to start coarse outline vector extraction processing of the j-th stripe.

In step S3406*a*, the control waits until the value of the flag "fifo" becomes "0" in response to an interrupt signal generated upon completion of the output operation of the image memory 2901. When the value "fifo" becomes "0", the flow advances to step S3406*b*.

In step S3406*b*, the control unit supplies a signal to the binary image acquisition unit 2601 to restart the image data input operation from the binary image acquisition unit 2601 to the outline vector extraction unit 2603, which operation is stopped in step S3404. Thereafter, the flow advances to step S3407. The following steps S3407 to S3409 execute the same processing as in steps S3007 to S3009.

With the above-mentioned procedure, the apparatus of the 30th embodiment can reduce the load on the binary image acquisition unit 2601 in addition to the effect of the apparatus of the 29th embodiment.

<31st Embodiment>

The arrangement and control method of the 29th embodiment may be modified as follows.

Figure 126:
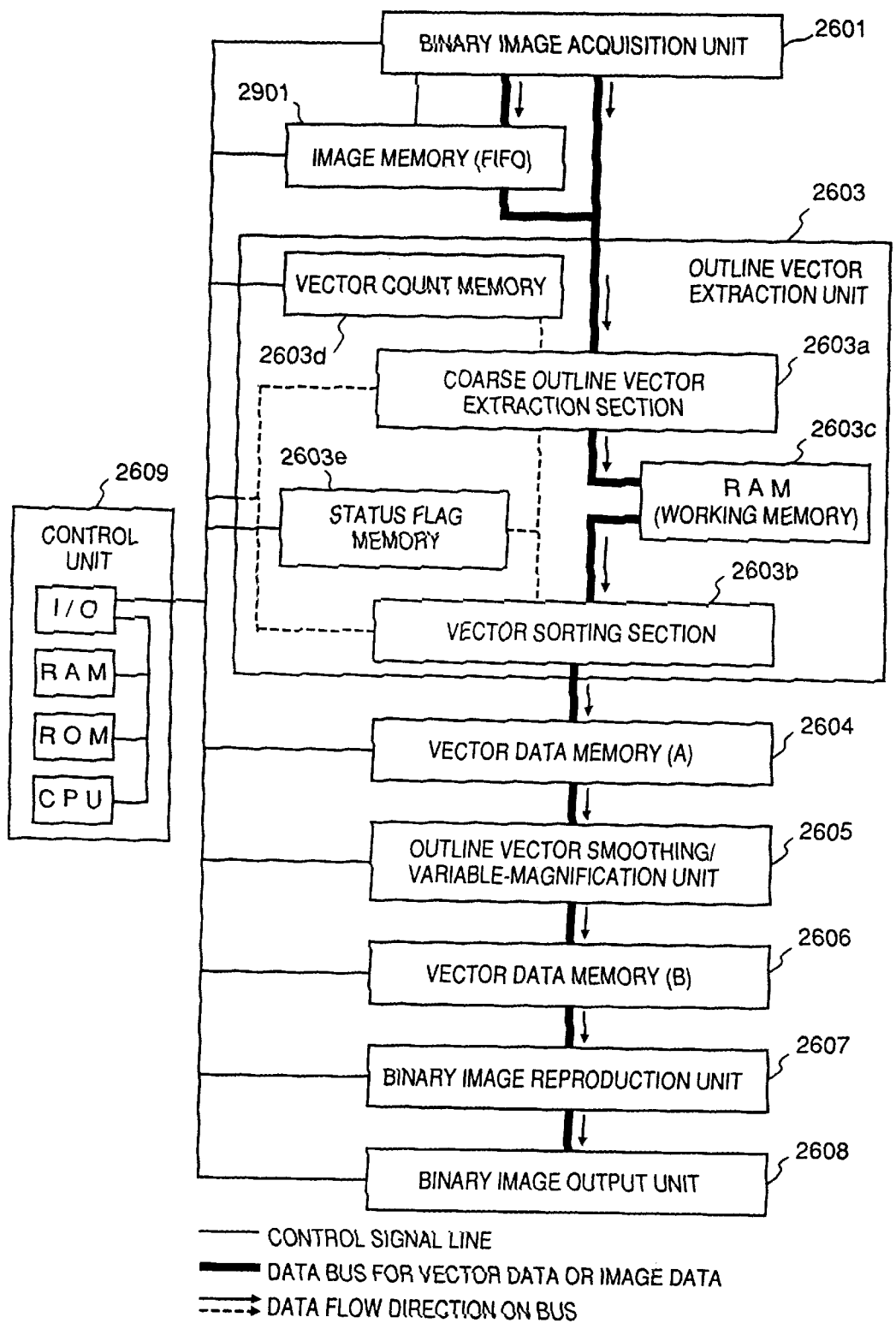

As shown in FIG. 126, a control signal line is connected between the control unit 2609 (FIG. 120) and the image memory 2901. The control unit 2609 can control the operation of the image memory 2901 via this signal line. In addition, the image memory 2901 supplies a signal to the binary image acquisition unit 2601 when it outputs all stored data, and the binary image acquisition unit 2601 starts the image input operation to the vector extraction unit 2603 in response to this signal. In this case, control executed by the control unit 2609 must be modified, as shown in the flow charts of FIGS. 121 and 122.

In step S3006 in FIGS. 121 and 122, when image data of the i-th stripe are to be output to the outline vector extraction unit 2603, the control unit 2609 supplies a signal to the image memory 2901 to output data stored in the image memory 2901. Thereafter, when the image memory 2901 outputs all stored data, it supplies a signal to the binary image acquisition unit 2601 to start the image data input operation from the binary image acquisition unit 2601 to the outline vector extraction unit 2603.

<32nd Embodiment>

In the 28th to 31st embodiments, the image input unit inputs a binary image. However, the present invention is not limited to this. For example, a binarization unit may be arranged at the output side of the image acquisition unit, and vector extraction and subsequent processing operations may be performed for an image binarized by the binarization unit. Also, a binarization unit may be arranged at the output side of the image memory, and an image binarized by the binarization unit may be subjected to outline vector extraction.

Similarly, as for the image output unit, after a binary image is reproduced, the binary image may be converted into a pseudo multi-value image using a known method. For example, the pixel values of a binary image may be intentionally output as the minimum and maximum gradation values of 256 gradation levels (0 to 255) in place of two gradation levels (0 and 1).

Note that the present invention can be applied to either a system consisting of a plurality of devices or an apparatus consisting of a single device. Also, the present invention can be applied to a case wherein the invention is achieved by supplying a program to the system or the apparatus.

As described above, the image processing method and apparatus according to the 28th to 32nd can drastically shorten the throughput time of the entire processing while suppressing image deterioration at a joint portion of stripe upon execution of image processing for obtaining a fine variable-magnification image using outline vectors of an input image.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

What is claimed is:

1. An image processing apparatus comprising:

division means for dividing input image data into a plurality of areas;

first calculation means for calculating a first image size as a sum of image sizes obtained by execution of enlargement/reduction for each of first to i-th areas;

second calculation means for calculating a second image size as an image size obtained by subjecting an image comprising the total area of the first to i-th areas to enlargement/reduction at a designated enlargement/reduction ratio; and enlargement/reduction means for determining an enlargement/reduction ratio of enlargement/reduction to be performed on the image comprising the i-th area, based on the first image size and the second image size, and for enlarging/reducing the image of the i-th area at the determined enlargement/reduction ratio.

2. An image processing method comprising:

a division step for dividing input image data into a plurality of areas;

a first calculation step for calculating a first image size as a sum of image sizes obtained by execution of enlargement/reduction for each of first to i-th areas;

a second calculation step for calculating a second image size as an image size obtained by subjecting an image comprising the total area of the first to i-th areas to enlargement/reduction at a designated enlargement/reduction ratio; and an enlargement/reduction step for determining an enlargement/reduction ratio of enlargement/reduction to be performed on the image comprising the i-th area, based on the first image size and the second image size, and for enlarging/reducing the image of the i-th area at the determined enlargement/reduction ratio.

3. An image processing apparatus comprising:

division means for dividing input image data into a plurality of areas;

extraction means for extracting outline vector data from an area divided by said division means;

first calculation means for calculating a first image size as a sum of image sizes obtained by execution of enlargement/reduction for each of first to i-th areas;

second calculation means for calculating a second image size as an image size obtained by subjecting an image comprising the total area of the first to i-th areas to enlargement/reduction at a designated enlargement/reduction ratio; and enlargement/reduction means for determining an enlargement/reduction ratio of enlargement/reduction to be performed on the image comprising the i-th are, based on the first image size and the second image size, and for enlarging/reducing the image of the i-th area by using outline vectors extracted by said extraction means at the determined enlargement/reduction ratio.

4. The apparatus according to claim 3, further comprising:

reproduction means for reproducing image data of the i-th area enlarged/reduced by said enlargement/reduction means, wherein said enlargement/reduction means performs enlargement/reduction at the determined enlargement/reduction ratio.

5. The apparatus according to claim 3, wherein the areas are indicative of stripe images.

6. An image processing apparatus according to claim 3, further comprising input means for inputting image data.

7. An image processing apparatus according to claim 6, wherein said input means is an input interface.

8. An image processing apparatus according to claim 3, further comprising output means for output image data obtained by said enlargement/reduction means.

9. An image processing apparatus according to claim 8, wherein said output means includes a printer, a display or a modem.

10. An image processing apparatus according to claim 3, wherein said division means divides input image into a plurality of band images, each aligned in a sub-scanning direction.

11. An image processing apparatus according to claim 3, wherein said enlargement/reduction means includes smoothing means for smoothing the outline vectors extracted by said extraction means.

12. An image processing apparatus according to claim 3, wherein said division means divides the input image data into a plurality of areas which each have a predetermined margin area overlapped with an adjacent area, said first calculation means calculates the first image size as the sum of image sizes, excepting the size of margin areas, obtained by execution of enlargement/reduction for each of first to i-th areas, said second calculation means calculates the second image size as the image size, excepting the size of margin areas, obtained by subjecting an image comprising the total area of the first to i-th areas at the designated enlargement/reduction ratio, and wherein said image processing apparatus further comprises combining means for combining enlarged/reduced areas by overlapping enlarged/reduced margin areas.

13. An image processing method comprising:

a division step of dividing input image data into a plurality of areas;

an extraction step for extracting outline vector data from an area divided by said division step;

a first calculation step of calculating a first image size as a sum of image sizes obtained by execution of enlargement/reduction for each of first to i-th areas;

a second calculation step of calculating a second image size as an image size obtained by subjecting an image comprising the total area of the first to i-th areas to enlargement/reduction at a designated enlargement/reduction ratio;

a enlargement/reduction step of determining an enlargement/reduction ratio of enlargement/reduction to be performed on the image comprising the i-th area, based on the first image size and the second image size, and for enlarging/reducing the image of the i-th area by using outline vectors extracted by said extraction step at the determined enlargement/reduction ratio.

14. The method according to claim 13, further comprising:

a reproduction step of reproducing image data of the i-th area enlarged/reduced in said enlargement/reproduction step;

wherein in said enlargement/reduction step, enlargement/reduction is performed at the determined enlargement/reduction ratio.

15. The apparatus according to claim 13, wherein the areas are indicative of stripe images.

16. An image processing method according to claim 13, further comprising an inputting step for inputting image data.

17. An image processing method according to claim 16, wherein said inputting step inputs the image data with an input interface.

18. An image processing apparatus according to claim 13, further comprising an outputting step for outputting image data obtained by said enlargement/reduction step.

19. An image processing apparatus according to claim 18, wherein said outputting step outputs the image data obtained by said enlargement/reduction step with a printer, a display, or a modem.

20. An image processing method according to claim 13, wherein said division step divides input image into a plurality of band images, each aligned in a sub-scanning direction.

21. An image processing method according to claim 13, wherein said enlargement/reduction step includes a smoothing step, for smoothing the outline vectors extracted by said extraction step.

22. An image processing method according to claim 13, wherein said division step divides the input image data into a plurality of areas which each have a predetermined margin area overlapped with an adjacent area, said first calculation step calculates the first image size as the sum of image sizes, excepting the size of margin areas, obtained by execution of enlargement/reduction for each of first to i-th areas, said second calculation step calculates the second image size as the image size, excepting the size of margin areas, obtained by subjecting an image comprising the total area of the first to i-th areas at the designated enlargement/reduction ratio, and wherein said image processing method further comprises a combining step for combining enlarged/reduced areas by overlapping enlarged/reduced margin areas.

* * * * *

UNITED STATES PATENT AND TRADEMARK OFFICE
CERTIFICATE OF CORRECTION

PATENT NO. : 5,828,794

DATED : October 27, 1998

INVENTOR(S): AKIHIRO KATAYAMA, ET AL.

It is certified that error appears in the above-identified patent and that said Letters Patent is hereby corrected as shown below:

On the title page,

REFERENCES CITED [56]

FOREIGN PATENT DOCUMENTS:

"04157578" should read --04-157578--.
      "05020467" should read --05-020467--.
      "05174140" should read --05-174140--.
      "06012490" should read --06-012490--.

OTHER PUBLICATIONS:

In "Imanaka", "Receieved" should read --Received--.

In the drawings

SHEET 60

FIG. 72
     "9" should read --19--.

SHEET 76

FIG. 88
     "interruput" should read --interrupt--.

SHEET 106

FIG. 119
     "linterrupt" should read --interrupt--.

UNITED STATES PATENT AND TRADEMARK OFFICE
CERTIFICATE OF CORRECTION

PATENT NO. : 5,828,794

DATED : October 27, 1998

INVENTOR(S): AKIHIRO KATAYAMA, ET AL.

It is certified that error appears in the above-identified patent and that said Letters Patent is hereby corrected as shown below:

COLUMN 5

Line 36, "packet s" should read --packets--.

COLUMN 6

Line 53, "images" should read --image--.

COLUMN 8

Line 12, Close up right margin.
    Line 65, "latches," should read --latches--.

COLUMN 9

Line 22, "like," should read --like.--.

COLUMN 17

Line 13, "a, case" should read --a case--.

COLUMN 19

Line 14, "In" should read --¶ In--.
    Line 16, "S182," should read --S182, a--.

UNITED STATES PATENT AND TRADEMARK OFFICE
CERTIFICATE OF CORRECTION

PATENT NO. : 5,828,794

DATED : October 27, 1998

INVENTOR(S): AKIHIRO KATAYAMA, ET AL.

It is certified that error appears in the above-identified patent and that said Letters Patent is hereby corrected as shown below:

COLUMN 23

Line 27, "5," should read --S5,--.

COLUMN 24

Line 39, "05-174140" should read --05-020467--.

COLUMN 26

Line 24, "FIG." should read --figure--.

COLUMN 27

Line 55, "Start"," should read --start",--.

COLUMN 29

Line 54, "are" should read --is--.

COLUMN 30

Line 17, "Patent Appli-" should read --Laid-Open--.
    Line 18, "cation No. 3-345062)" should read --No. 05-174140)--.

UNITED STATES PATENT AND TRADEMARK OFFICE
CERTIFICATE OF CORRECTION

PATENT NO. : 5,828,794

DATED : October 27, 1998

INVENTOR(S): AKIHIRO KATAYAMA, ET AL.

It is certified that error appears in the above-identified patent and that said Letters Patent is hereby corrected as shown below:

COLUMN 30 (Continued)

Line 21, "Patent Application No. 4-169581," should read --Laid-Open No. 06-012490,--.
    Line 26, "with in" should read --within--.
    Line 36, Close up right margin.
    Line 66, "outline vectors," should read --outline,--.

COLUMN 32

Line 39, "(p-, q-2" should read --(p-1, q-2)--.

COLUMN 35

Line 30, "abovementioned" should read --above-mentioned--.
    Line 51, "abovementioned" should read --above-mentioned--.

COLUMN 37

Line 6, "includes" should read --include--.
    Line 15, "with." should read --with--.

UNITED STATES PATENT AND TRADEMARK OFFICE
CERTIFICATE OF CORRECTION

PATENT NO. : 5,828,794

DATED : October 27, 1998

INVENTOR(S): AKIHIRO KATAYAMA, ET AL.

It is certified that error appears in the above-identified patent and that said Letters Patent is hereby corrected as shown below:

COLUMN 40

Line 1, "ready,,the" should read --ready, the--.
    Line 22, "an," should read --an--.

COLUMN 46

Line 41, Close up right margin.

COLUMN 48

Line 57, "Patent" should be deleted.

COLUMN 52

Line 1, "above-mentioned," should read --above-mentioned--.

COLUMN 56

Line 66, "S1315." (first occurrence) should read --S1315. ¶ --.

COLUMN 57

Line 38, "hi" should read --$h_i$--.

UNITED STATES PATENT AND TRADEMARK OFFICE
CERTIFICATE OF CORRECTION

PATENT NO. : 5,828,794

DATED : October 27, 1998

INVENTOR(S): AKIHIRO KATAYAMA, ET AL.

It is certified that error appears in the above-identified patent and that said Letters Patent is hereby corrected as shown below:

COLUMN 58

Line 6, "hi" should read --$h_i$--.
　　Line 47, "gi" should read --$g_i$--.

COLUMN 59

Line 14, "hi" should read --$h_i$--.

COLUMN 63

Line 49, "Step" should read --step--.

COLUMN 70

Line 4, "32nd" should read --32nd embodiments--.
　　Line 10, "particularly," should read --particularity,--.

COLUMN 71

Line 1, "are," should read --area,--.

UNITED STATES PATENT AND TRADEMARK OFFICE
CERTIFICATE OF CORRECTION

PATENT NO. : 5,828,794

DATED : October 27, 1998

INVENTOR(S) : AKIHIRO KATAYAMA, ET AL.

It is certified that error appears in the above-identified patent and that said Letters Patent is hereby corrected as shown below:

<u>COLUMN 72</u>

```
Line 4,  "a" should read --an--.
Line 20, "apparatus" should read --method--.
Line 28, "apparatus" should read --method--.
Line 31, "apparatus" should read --method--.
```

Signed and Sealed this

Twentieth Day of July, 1999

Attest:

Attesting Officer

Q. TODD DICKINSON

Acting Commissioner of Patents and Trademarks